(12) United States Patent
Forenza et al.

(10) Patent No.: US 10,749,582 B2
(45) Date of Patent: Aug. 18, 2020

(54) SYSTEMS AND METHODS TO COORDINATE TRANSMISSIONS IN DISTRIBUTED WIRELESS SYSTEMS VIA USER CLUSTERING

(71) Applicant: Rearden, LLC, Mountain View, CA (US)

(72) Inventors: Antonio Forenza, San Francisco, CA (US); Erik Lindskog, Cupertino, CA (US); Stephen G. Perlman, Palo Alto, CA (US)

(73) Assignee: REARDEN, LLC, Mountain View, CA (US)

( * ) Notice: Subject to any disclaimer, the term of this patent is extended or adjusted under 35 U.S.C. 154(b) by 0 days.

(21) Appl. No.: 16/436,864

(22) Filed: Jun. 10, 2019

(65) Prior Publication Data

US 2019/0296810 A1 Sep. 26, 2019

Related U.S. Application Data

(63) Continuation of application No. 15/181,383, filed on Jun. 13, 2016, now Pat. No. 10,320,455, which is a
(Continued)

(51) Int. Cl.
*H04B 7/0456* (2017.01)
*H04B 7/06* (2006.01)
(Continued)

(52) U.S. Cl.
CPC .......... *H04B 7/0456* (2013.01); *H04B 7/024* (2013.01); *H04B 7/0434* (2013.01);
(Continued)

(58) Field of Classification Search
CPC ..... H04B 7/0452; H04B 7/0456; H04B 7/632
See application file for complete search history.

(56) References Cited

U.S. PATENT DOCUMENTS

| 4,003,016 A | 1/1977 | Remley |
| 4,253,193 A | 2/1981 | Kennard et al. |

(Continued)

FOREIGN PATENT DOCUMENTS

| AU | 2018200832 A1 | 2/2018 |
| CA | 1307842 C | 9/1992 |

(Continued)

OTHER PUBLICATIONS

3GPP, "LTE", downloaded from http://www.3gpp.org/LTE on Aug. 14, 2014, 4 pages.
(Continued)

*Primary Examiner* — Kevin Kim
(74) *Attorney, Agent, or Firm* — Nicholson De Vos Webster & Elliott, LLP

(57) ABSTRACT

Systems and methods are described for coordinating transmissions in distributed wireless systems via user clustering. For example, a method according to one embodiment of the invention comprises: measuring link quality between a target user and a plurality of distributed-input distributed-output (DIDO) distributed antennas of base transceiver stations (BTSs); using the link quality measurements to define a user cluster; measuring channel state information (CSI) between each user and each DIDO antenna within a defined user cluster; and precoding data transmissions between each DIDO antenna and each user within the user cluster based on the measured CSI.

15 Claims, 45 Drawing Sheets

Related U.S. Application Data continuation of application No. 14/023,302, filed on Sep. 10, 2013, now Pat. No. 9,369,888, which is a continuation of application No. 12/917,257, filed on Nov. 1, 2010, now Pat. No. 8,542,763, which is a continuation-in-part of application No. 12/802,988, filed on Jun. 16, 2010, now Pat. No. 10,200,094, which is a continuation-in-part of application No. 12/802,976, filed on Jun. 16, 2010, now Pat. No. 8,170,081, which is a continuation-in-part of application No. 12/802,974, filed on Jun. 16, 2010, now Pat. No. 9,826,537, which is a continuation-in-part of application No. 12/802,989, filed on Jun. 16, 2010, now Pat. No. 9,819,403, which is a continuation-in-part of application No. 12/802,958, filed on Jun. 16, 2010, now Pat. No. 10,187,133, which is a continuation-in-part of application No. 12/802,975, filed on Jun. 16, 2010, which is a continuation-in-part of application No. 12/802,938, filed on Jun. 16, 2010, now Pat. No. 8,571,086, which is a continuation-in-part of application No. 12/630,627, filed on Dec. 3, 2009, now Pat. No. 8,654,815, which is a continuation-in-part of application No. 12/143,503, filed on Jun. 20, 2008, now Pat. No. 8,160,121, which is a continuation-in-part of application No. 11/894,394, filed on Aug. 20, 2007, now Pat. No. 7,599,420, which is a continuation-in-part of application No. 11/894,362, filed on Aug. 20, 2007, now Pat. No. 7,633,994, which is a continuation-in-part of application No. 11/894,540, filed on Aug. 20, 2007, now Pat. No. 7,636,381, which is a continuation-in-part of application No. 11/256,478, filed on Oct. 21, 2005, now Pat. No. 7,711,030, which is a continuation-in-part of application No. 10/817,731, filed on Apr. 2, 2004, now Pat. No. 7,885,354.

(51) Int. Cl.
*H04B 7/0426* (2017.01)
*H04W 24/02* (2009.01)
*H04B 7/024* (2017.01)
*H04W 24/08* (2009.01)
*H04B 7/0452* (2017.01)

(52) U.S. Cl.
CPC .......... *H04B 7/0626* (2013.01); *H04W 24/02* (2013.01); *H04W 24/08* (2013.01); *H04B 7/0452* (2013.01)

(56) References Cited

U.S. PATENT DOCUMENTS

| | | |
|---|---|---|
| 4,564,935 A | 1/1986 | Kaplan |
| 4,771,289 A | 9/1988 | Masak |
| 5,045,862 A | 9/1991 | Alden et al. |
| 5,088,091 A | 2/1992 | Schroeder et al. |
| 5,095,500 A | 3/1992 | Tayloe et al. |
| 5,097,485 A | 3/1992 | O'Connor et al. |
| 5,315,309 A | 5/1994 | Rudow et al. |
| 5,377,183 A | 12/1994 | Dent |
| 5,400,037 A | 3/1995 | East |
| 5,483,667 A | 1/1996 | Faruque |
| 5,600,326 A | 2/1997 | Yu et al. |
| 5,661,765 A | 8/1997 | Ishizu |
| 5,742,253 A | 4/1998 | Conroy et al. |
| 5,809,422 A | 9/1998 | Raleigh et al. |
| 5,838,671 A | 11/1998 | Ishikawa et al. |
| 5,872,814 A | 2/1999 | McMeekin |
| 5,983,104 A | 11/1999 | Wickman et al. |
| 6,005,516 A | 12/1999 | Reudink et al. |
| 6,005,856 A | 12/1999 | Jensen et al. |
| 6,014,107 A | 1/2000 | Wiesenfarth |
| 6,041,365 A | 3/2000 | Kleinerman |
| 6,052,582 A | 4/2000 | Blasing et al. |
| 6,061,021 A | 5/2000 | Zibell |
| 6,061,023 A | 5/2000 | Daniel et al. |
| 6,067,290 A | 5/2000 | Paulraj et al. |
| 6,252,912 B1 | 6/2001 | Salinger |
| 6,308,080 B1 | 10/2001 | Burt et al. |
| 6,377,782 B1 | 4/2002 | Bishop et al. |
| 6,400,761 B1 | 6/2002 | Smee et al. |
| 6,411,612 B1 | 6/2002 | Halford et al. |
| 6,442,151 B1 | 8/2002 | H'Mimy et al. |
| 6,445,910 B1 | 9/2002 | Oestreich |
| 6,459,900 B1 | 10/2002 | Scheinert |
| 6,473,467 B1 | 10/2002 | Wallace et al. |
| 6,484,030 B1 | 11/2002 | Antoine et al. |
| 6,718,180 B1 | 4/2004 | Lundh et al. |
| 6,760,388 B2 | 7/2004 | Ketchum et al. |
| 6,763,225 B1 | 7/2004 | Farmine et al. |
| 6,771,706 B2 | 8/2004 | Ling et al. |
| 6,785,341 B2 | 8/2004 | Walton et al. |
| 6,791,508 B2 | 9/2004 | Berry et al. |
| 6,801,580 B2 | 10/2004 | Kadous |
| 6,804,311 B1 | 10/2004 | Dabak et al. |
| 6,834,043 B1 | 12/2004 | Vook et al. |
| 6,836,673 B1 | 12/2004 | Trott |
| 6,862,271 B2 | 3/2005 | Medvedev et al. |
| 6,888,809 B1 | 5/2005 | Foschini et al. |
| 6,920,192 B1 | 7/2005 | Laroia et al. |
| 6,978,150 B2 | 12/2005 | Hamabe |
| 7,006,043 B1 | 2/2006 | Nalbandian |
| 7,013,144 B2 | 3/2006 | Yamashita et al. |
| 7,068,704 B1 | 6/2006 | Orr |
| 7,072,413 B2 | 7/2006 | Walton et al. |
| 7,072,693 B2 | 7/2006 | Farlow et al. |
| 7,095,723 B2 | 8/2006 | Sezgin et al. |
| 7,116,723 B2 | 10/2006 | Kim et al. |
| 7,120,440 B2 | 10/2006 | Cho et al. |
| 7,139,527 B2 | 11/2006 | Tamaki et al. |
| 7,142,154 B2 | 11/2006 | Quilter et al. |
| 7,154,936 B2 | 12/2006 | Bjerke et al. |
| 7,154,960 B2 | 12/2006 | Liu et al. |
| 7,167,684 B2 | 1/2007 | Kadous et al. |
| 7,193,991 B2 | 3/2007 | Melpignano et al. |
| 7,197,082 B2 | 3/2007 | Alexiou et al. |
| 7,197,084 B2 | 3/2007 | Ketchum et al. |
| 7,242,724 B2 | 7/2007 | Alexiou et al. |
| 7,248,879 B1 | 7/2007 | Walton et al. |
| 7,272,294 B2 | 9/2007 | Zhou et al. |
| 7,310,680 B1 | 12/2007 | Graham |
| 7,327,795 B2 | 2/2008 | Oprea |
| 7,333,540 B2 | 2/2008 | Yee |
| 7,369,876 B2 | 5/2008 | Lee et al. |
| 7,412,212 B2 | 8/2008 | Hottinen |
| 7,418,053 B2 | 8/2008 | Perlman et al. |
| 7,437,177 B2 | 10/2008 | Ozluturk et al. |
| 7,486,931 B2 | 2/2009 | Cho et al. |
| 7,502,420 B2 | 3/2009 | Ketchum |
| 7,548,752 B2 | 6/2009 | Sampath et al. |
| 7,558,575 B2 | 7/2009 | Losh et al. |
| 7,599,420 B2 | 10/2009 | Forenza et al. |
| 7,609,751 B1 | 10/2009 | Giallorenzi et al. |
| 7,630,337 B2 | 12/2009 | Zheng et al. |
| 7,633,944 B1 | 12/2009 | Chang et al. |
| 7,633,994 B2 | 12/2009 | Forenza et al. |
| 7,636,381 B2 | 12/2009 | Forenza et al. |
| 7,688,789 B2 | 3/2010 | Pan et al. |
| 7,729,433 B2 | 6/2010 | Jalloul et al. |
| 7,751,368 B2 | 7/2010 | Li et al. |
| 7,751,843 B2 | 7/2010 | Butala |
| 7,756,222 B2 | 7/2010 | Chen et al. |
| 7,986,742 B2 | 7/2011 | Ketchum et al. |
| 8,041,362 B2 | 10/2011 | Li et al. |
| 8,081,944 B2 | 12/2011 | Li |
| 8,126,510 B1 | 2/2012 | Samson et al. |
| 8,170,081 B2 | 5/2012 | Forenza et al. |
| 8,260,198 B2 | 9/2012 | Yamaura |

(56) References Cited

U.S. PATENT DOCUMENTS

| | | |
|---|---|---|
| 8,320,432 B1 | 11/2012 | Chockalingam et al. |
| 8,428,177 B2 | 4/2013 | Tsai et al. |
| 8,451,764 B2 | 5/2013 | Chao et al. |
| 8,482,462 B2 | 7/2013 | Komijani et al. |
| 8,638,880 B2 | 1/2014 | Baldemair et al. |
| 8,654,815 B1 | 2/2014 | Forenza et al. |
| 8,675,768 B2 | 3/2014 | Xu et al. |
| 8,705,484 B2 | 4/2014 | Caire et al. |
| 8,731,480 B2 | 5/2014 | Kim et al. |
| 8,797,970 B2 | 8/2014 | Xing et al. |
| 8,849,339 B2 | 9/2014 | Anto et al. |
| 8,902,862 B2 | 12/2014 | Yu et al. |
| 8,971,380 B2 | 3/2015 | Forenza et al. |
| 8,989,155 B2 | 3/2015 | Forenza et al. |
| 9,094,180 B2 | 7/2015 | Zirwas et al. |
| 9,252,858 B2 | 2/2016 | Abbasfar et al. |
| 9,307,506 B1 | 4/2016 | Kelly et al. |
| 9,331,882 B2 | 5/2016 | Fehri et al. |
| 9,685,997 B2 | 6/2017 | Forenza et al. |
| 9,698,881 B2 | 7/2017 | Nammi et al. |
| 10,277,290 B2 | 4/2019 | Forenza et al. |
| 2001/0031647 A1 | 10/2001 | Scherzer et al. |
| 2002/0027985 A1 | 3/2002 | Rashid-Farrokhi |
| 2002/0051433 A1 | 5/2002 | Affes et al. |
| 2002/0136169 A1 | 9/2002 | Struhsaker et al. |
| 2002/0142723 A1 | 10/2002 | Foschini et al. |
| 2002/0168017 A1 | 11/2002 | Berthet et al. |
| 2002/0181444 A1 | 12/2002 | Acampora |
| 2002/0193146 A1 | 12/2002 | Wallace et al. |
| 2003/0003863 A1 | 1/2003 | Thielecke et al. |
| 2003/0012315 A1 | 1/2003 | Fan |
| 2003/0036359 A1 | 2/2003 | Dent et al. |
| 2003/0043887 A1 | 3/2003 | Hudson |
| 2003/0043929 A1 | 3/2003 | Sampath |
| 2003/0048753 A1 | 3/2003 | Jalali |
| 2003/0065779 A1 | 4/2003 | Malik et al. |
| 2003/0114165 A1 | 6/2003 | Mills |
| 2003/0125026 A1 | 7/2003 | Tsunehara et al. |
| 2003/0125040 A1 | 7/2003 | Walton et al. |
| 2003/0139196 A1 | 7/2003 | Medvedev et al. |
| 2003/0147362 A1 | 8/2003 | Dick et al. |
| 2003/0148738 A1 | 8/2003 | Das et al. |
| 2003/0156056 A1 | 8/2003 | Perry |
| 2003/0161282 A1 | 8/2003 | Medvedev et al. |
| 2003/0211843 A1 | 11/2003 | Song et al. |
| 2003/0214431 A1 | 11/2003 | Hager et al. |
| 2003/0220112 A1 | 11/2003 | Bugeja |
| 2003/0235146 A1 | 12/2003 | Wu et al. |
| 2004/0009755 A1 | 1/2004 | Yoshida |
| 2004/0042556 A1 | 3/2004 | Medvedev et al. |
| 2004/0043784 A1 | 3/2004 | Czaja et al. |
| 2004/0082356 A1 | 4/2004 | Walton et al. |
| 2004/0095907 A1 | 5/2004 | Agee et al. |
| 2004/0097197 A1 | 5/2004 | Juncker et al. |
| 2004/0131011 A1 | 7/2004 | Sandell et al. |
| 2004/0136349 A1 | 7/2004 | Walton et al. |
| 2004/0152480 A1 | 8/2004 | Willars et al. |
| 2004/0170430 A1 | 9/2004 | Gorokhov |
| 2004/0176097 A1 | 9/2004 | Wilson et al. |
| 2004/0179627 A1 | 9/2004 | Ketchum et al. |
| 2004/0185909 A1 | 9/2004 | Alexiou et al. |
| 2004/0190636 A1 | 9/2004 | Oprea |
| 2004/0203347 A1 | 10/2004 | Nguyen |
| 2004/0203987 A1 | 10/2004 | Butala |
| 2004/0209579 A1 | 10/2004 | Vaidyanathan |
| 2004/0252632 A1 | 12/2004 | Bourdoux et al. |
| 2005/0003865 A1 | 1/2005 | Lastinger et al. |
| 2005/0020237 A1 | 1/2005 | Alexiou et al. |
| 2005/0024231 A1 | 2/2005 | Fincher et al. |
| 2005/0031047 A1 | 2/2005 | Maltsev et al. |
| 2005/0041750 A1 | 2/2005 | Lau |
| 2005/0041751 A1 | 2/2005 | Nir et al. |
| 2005/0043031 A1 | 2/2005 | Cho et al. |
| 2005/0047515 A1 | 3/2005 | Walton et al. |
| 2005/0058217 A1 | 3/2005 | Sandhu et al. |
| 2005/0075110 A1 | 4/2005 | Posti et al. |
| 2005/0096058 A1 | 5/2005 | Warner et al. |
| 2005/0101259 A1 | 5/2005 | Tong et al. |
| 2005/0101352 A1 | 5/2005 | Logothetis et al. |
| 2005/0111406 A1 | 5/2005 | Pasanen et al. |
| 2005/0111599 A1 | 5/2005 | Walton et al. |
| 2005/0148368 A1 | 7/2005 | Scheinert et al. |
| 2005/0157683 A1 | 7/2005 | Ylitalo et al. |
| 2005/0169396 A1 | 8/2005 | Baier et al. |
| 2005/0174977 A1 | 8/2005 | Pedlar et al. |
| 2005/0186991 A1 | 8/2005 | Bateman |
| 2005/0232135 A1 | 10/2005 | Mukai et al. |
| 2005/0239406 A1 | 10/2005 | Shattil |
| 2005/0259627 A1 | 11/2005 | Song et al. |
| 2005/0265273 A1 | 12/2005 | Karabinis et al. |
| 2005/0271009 A1 | 12/2005 | Shirakabe et al. |
| 2005/0287962 A1 | 12/2005 | Mehta et al. |
| 2006/0023803 A1 | 2/2006 | Perlman et al. |
| 2006/0046658 A1 | 3/2006 | Cruz et al. |
| 2006/0050804 A1 | 3/2006 | Leclair |
| 2006/0056855 A1 | 3/2006 | Nakagawa et al. |
| 2006/0062180 A1 | 3/2006 | Sayeedi et al. |
| 2006/0098568 A1 | 5/2006 | Oh et al. |
| 2006/0098754 A1 | 5/2006 | Kim et al. |
| 2006/0146755 A1 | 7/2006 | Pan et al. |
| 2006/0159160 A1 | 7/2006 | Kim et al. |
| 2006/0165120 A1 | 7/2006 | Karabinis |
| 2006/0198461 A1 | 9/2006 | Hayase |
| 2006/0199584 A1 | 9/2006 | Bergstrom et al. |
| 2006/0203708 A1 | 9/2006 | Sampath et al. |
| 2006/0209979 A1 | 9/2006 | Sandell et al. |
| 2006/0270359 A1 | 11/2006 | Karmi et al. |
| 2006/0281421 A1 | 12/2006 | Pan et al. |
| 2006/0287743 A1 | 12/2006 | Sampath et al. |
| 2006/0292990 A1 | 12/2006 | Karabinis et al. |
| 2007/0004337 A1 | 1/2007 | Biswas et al. |
| 2007/0025464 A1 | 2/2007 | Perlman |
| 2007/0054633 A1 | 3/2007 | Piirainen |
| 2007/0058590 A1 | 3/2007 | Wang et al. |
| 2007/0064823 A1 | 3/2007 | Hwang et al. |
| 2007/0066331 A1 | 3/2007 | Zheng et al. |
| 2007/0082674 A1 | 4/2007 | Pedersen et al. |
| 2007/0086400 A1 | 4/2007 | Shida et al. |
| 2007/0093273 A1 | 4/2007 | Cai |
| 2007/0093274 A1 | 4/2007 | Jafarkhani et al. |
| 2007/0099665 A1 | 5/2007 | Kim et al. |
| 2007/0132653 A1 | 6/2007 | Weller et al. |
| 2007/0135125 A1 | 6/2007 | Kim et al. |
| 2007/0183362 A1 | 8/2007 | Mondal et al. |
| 2007/0206504 A1 | 9/2007 | Koo et al. |
| 2007/0211747 A1 | 9/2007 | Kim |
| 2007/0242782 A1 | 10/2007 | Han et al. |
| 2007/0243871 A1 | 10/2007 | Chen et al. |
| 2007/0249380 A1 | 10/2007 | Stewart et al. |
| 2007/0253508 A1 | 11/2007 | Zhou et al. |
| 2007/0254602 A1 | 11/2007 | Li et al. |
| 2007/0258531 A1 | 11/2007 | Chen et al. |
| 2007/0263736 A1 | 11/2007 | Yuda et al. |
| 2007/0280116 A1 | 12/2007 | Wang et al. |
| 2008/0013644 A1 | 1/2008 | Hugl et al. |
| 2008/0051150 A1 | 2/2008 | Tsutsui |
| 2008/0080631 A1 | 4/2008 | Forenza et al. |
| 2008/0080635 A1 | 4/2008 | Hugl et al. |
| 2008/0089396 A1 | 4/2008 | Zhang et al. |
| 2008/0102881 A1 | 5/2008 | Han et al. |
| 2008/0107135 A1 | 5/2008 | Ibrahim |
| 2008/0117961 A1 | 5/2008 | Han et al. |
| 2008/0118004 A1 | 5/2008 | Forenza et al. |
| 2008/0125051 A1 | 5/2008 | Kim et al. |
| 2008/0130790 A1 | 6/2008 | Forenza et al. |
| 2008/0132281 A1 | 6/2008 | Kim et al. |
| 2008/0181285 A1 | 7/2008 | Hwang et al. |
| 2008/0192683 A1 | 8/2008 | Han et al. |
| 2008/0192697 A1 | 8/2008 | Shaheen |
| 2008/0205538 A1 | 8/2008 | Han et al. |
| 2008/0214185 A1 | 9/2008 | Cho et al. |
| 2008/0227422 A1 | 9/2008 | Hwang et al. |
| 2008/0232394 A1 | 9/2008 | Kozek et al. |
| 2008/0233902 A1 | 9/2008 | Pan et al. |

(56) References Cited

U.S. PATENT DOCUMENTS

| | | |
|---|---|---|
| 2008/0239938 A1 | 10/2008 | Jalloul et al. |
| 2008/0260054 A1 | 10/2008 | Myung et al. |
| 2008/0261587 A1 | 10/2008 | Lennartson et al. |
| 2008/0268833 A1 | 10/2008 | Huang et al. |
| 2008/0292011 A1 | 11/2008 | Yang |
| 2008/0317014 A1 | 12/2008 | Veselinovic et al. |
| 2009/0023467 A1 | 1/2009 | Huang et al. |
| 2009/0034636 A1 | 2/2009 | Kotecha et al. |
| 2009/0041151 A1 | 2/2009 | Khan et al. |
| 2009/0046678 A1 | 2/2009 | Lee et al. |
| 2009/0046800 A1 | 2/2009 | Xu et al. |
| 2009/0060013 A1 | 3/2009 | Ashikhmin et al. |
| 2009/0067402 A1 | 3/2009 | Forenza et al. |
| 2009/0069054 A1* | 3/2009 | Zangi .......... H04L 5/0023 455/562.1 |
| 2009/0075686 A1 | 3/2009 | Gomadam et al. |
| 2009/0086648 A1 | 4/2009 | Xu et al. |
| 2009/0086855 A1 | 4/2009 | Jin et al. |
| 2009/0135944 A1 | 5/2009 | Dyer et al. |
| 2009/0168914 A1 | 7/2009 | Chance et al. |
| 2009/0195355 A1 | 8/2009 | Mitchell |
| 2009/0202016 A1 | 8/2009 | Seong et al. |
| 2009/0207822 A1 | 8/2009 | Kim et al. |
| 2009/0209206 A1 | 8/2009 | Zou et al. |
| 2009/0227249 A1 | 9/2009 | Ylitalo |
| 2009/0227292 A1 | 9/2009 | Laroia et al. |
| 2009/0232245 A1 | 9/2009 | Lakkis |
| 2009/0262695 A1 | 10/2009 | Chen et al. |
| 2009/0268675 A1 | 10/2009 | Choi |
| 2009/0285156 A1 | 11/2009 | Huang et al. |
| 2009/0290517 A1 | 11/2009 | Rao et al. |
| 2009/0296650 A1 | 12/2009 | Venturino et al. |
| 2009/0316807 A1 | 12/2009 | Kim et al. |
| 2009/0318183 A1 | 12/2009 | Hugl et al. |
| 2010/0008331 A1 | 1/2010 | Li et al. |
| 2010/0034151 A1 | 2/2010 | Alexiou et al. |
| 2010/0068999 A1 | 3/2010 | Bangs et al. |
| 2010/0098030 A1 | 4/2010 | Wang et al. |
| 2010/0099428 A1 | 4/2010 | Bhushan et al. |
| 2010/0119001 A1 | 5/2010 | Walton et al. |
| 2010/0150013 A1 | 6/2010 | Hara et al. |
| 2010/0157861 A1 | 6/2010 | Na et al. |
| 2010/0164802 A1 | 7/2010 | Li et al. |
| 2010/0172309 A1 | 7/2010 | Forenza et al. |
| 2010/0183099 A1 | 7/2010 | Toda et al. |
| 2010/0189191 A1 | 7/2010 | Taoka et al. |
| 2010/0195527 A1 | 8/2010 | Gorokhov et al. |
| 2010/0203887 A1 | 8/2010 | Kim et al. |
| 2010/0220679 A1 | 9/2010 | Abraham et al. |
| 2010/0227562 A1 | 9/2010 | Shim et al. |
| 2010/0234071 A1 | 9/2010 | Shabtay et al. |
| 2010/0238984 A1 | 9/2010 | Sayana et al. |
| 2010/0260060 A1 | 10/2010 | Abraham et al. |
| 2010/0260103 A1 | 10/2010 | Guey et al. |
| 2010/0260115 A1 | 10/2010 | Frederiksen et al. |
| 2010/0265842 A1 | 10/2010 | Khandekar et al. |
| 2010/0279625 A1 | 11/2010 | Ko et al. |
| 2010/0290369 A1 | 11/2010 | Hui et al. |
| 2010/0290382 A1 | 11/2010 | Hui et al. |
| 2010/0296591 A1 | 11/2010 | Xu et al. |
| 2010/0315966 A1 | 12/2010 | Weigand |
| 2010/0316154 A1 | 12/2010 | Park et al. |
| 2010/0316163 A1 | 12/2010 | Forenza et al. |
| 2010/0322176 A1 | 12/2010 | Chen et al. |
| 2010/0323611 A1* | 12/2010 | Choudhury .......... H04B 7/024 455/7 |
| 2011/0002371 A1 | 1/2011 | Forenza et al. |
| 2011/0002410 A1 | 1/2011 | Forenza et al. |
| 2011/0002411 A1 | 1/2011 | Forenza et al. |
| 2011/0003606 A1 | 1/2011 | Forenza et al. |
| 2011/0003607 A1 | 1/2011 | Forenza et al. |
| 2011/0003608 A1 | 1/2011 | Forenza et al. |
| 2011/0007856 A1 | 1/2011 | Jang et al. |
| 2011/0019715 A1 | 1/2011 | Brisebois |
| 2011/0038436 A1 | 2/2011 | Kim et al. |
| 2011/0044193 A1 | 2/2011 | Forenza et al. |
| 2011/0051832 A1 | 3/2011 | Mergen et al. |
| 2011/0069638 A1 | 3/2011 | Ishizu et al. |
| 2011/0085610 A1 | 4/2011 | Zhuang et al. |
| 2011/0086611 A1 | 4/2011 | Klein et al. |
| 2011/0090840 A1 | 4/2011 | Lee et al. |
| 2011/0090885 A1 | 4/2011 | Safavi |
| 2011/0105174 A1 | 5/2011 | Pelletier et al. |
| 2011/0111781 A1 | 5/2011 | Chen et al. |
| 2011/0135308 A1 | 6/2011 | Tarlazzi et al. |
| 2011/0142020 A1 | 6/2011 | Kang et al. |
| 2011/0142104 A1 | 6/2011 | Coldrey et al. |
| 2011/0164597 A1 | 7/2011 | Amini et al. |
| 2011/0164697 A1 | 7/2011 | Liao et al. |
| 2011/0194504 A1 | 8/2011 | Gorokhov et al. |
| 2011/0195670 A1 | 8/2011 | Dakshinamurthy et al. |
| 2011/0199946 A1 | 8/2011 | Breit et al. |
| 2011/0205963 A1 | 8/2011 | Tang et al. |
| 2011/0207416 A1 | 8/2011 | Doi |
| 2011/0211485 A1 | 9/2011 | Xu et al. |
| 2011/0216662 A1 | 9/2011 | Nie et al. |
| 2011/0261769 A1 | 10/2011 | Ji et al. |
| 2011/0274053 A1 | 11/2011 | Baik et al. |
| 2011/0294527 A1 | 12/2011 | Brueck et al. |
| 2011/0305195 A1 | 12/2011 | Forck et al. |
| 2011/0306381 A1 | 12/2011 | Jia et al. |
| 2011/0310987 A1 | 12/2011 | Lee et al. |
| 2011/0310994 A1 | 12/2011 | Ko et al. |
| 2012/0002743 A1 | 1/2012 | Cavalcante et al. |
| 2012/0014415 A1 | 1/2012 | Su et al. |
| 2012/0014477 A1 | 1/2012 | Ko et al. |
| 2012/0021707 A1 | 1/2012 | Forrester et al. |
| 2012/0039419 A1 | 2/2012 | Maddah-Ali et al. |
| 2012/0046039 A1 | 2/2012 | Hagerman et al. |
| 2012/0051257 A1 | 3/2012 | Kim et al. |
| 2012/0054172 A1 | 3/2012 | Agrawal et al. |
| 2012/0076023 A1 | 3/2012 | Ko et al. |
| 2012/0076028 A1 | 3/2012 | Ko et al. |
| 2012/0076042 A1 | 3/2012 | Chun et al. |
| 2012/0076236 A1 | 3/2012 | Ko et al. |
| 2012/0082038 A1 | 4/2012 | Xu et al. |
| 2012/0087261 A1 | 4/2012 | Yoo et al. |
| 2012/0087430 A1 | 4/2012 | Forenza et al. |
| 2012/0093078 A1 | 4/2012 | Perlman et al. |
| 2012/0108278 A1 | 5/2012 | Kim et al. |
| 2012/0114021 A1 | 5/2012 | Chung et al. |
| 2012/0163427 A1 | 6/2012 | Kim |
| 2012/0188988 A1 | 7/2012 | Chung et al. |
| 2012/0218968 A1 | 8/2012 | Kim et al. |
| 2012/0224528 A1 | 9/2012 | Tapia et al. |
| 2012/0230691 A1 | 9/2012 | Hui et al. |
| 2012/0236741 A1 | 9/2012 | Xu et al. |
| 2012/0236840 A1 | 9/2012 | Kim et al. |
| 2012/0252470 A1 | 10/2012 | Wong et al. |
| 2012/0258657 A1 | 10/2012 | Scheinert |
| 2012/0281555 A1 | 11/2012 | Gao et al. |
| 2012/0281622 A1 | 11/2012 | Saban et al. |
| 2012/0288022 A1 | 11/2012 | Guey et al. |
| 2012/0289284 A1 | 11/2012 | Kuningas |
| 2012/0300717 A1 | 11/2012 | Cepeda et al. |
| 2012/0314570 A1 | 12/2012 | Forenza et al. |
| 2012/0314649 A1 | 12/2012 | Forenza et al. |
| 2012/0328301 A1 | 12/2012 | Gupta et al. |
| 2013/0010840 A1 | 1/2013 | Maddah-Ali et al. |
| 2013/0033998 A1 | 2/2013 | Seo et al. |
| 2013/0038766 A1 | 2/2013 | Perlman et al. |
| 2013/0039168 A1 | 2/2013 | Forenza et al. |
| 2013/0039332 A1 | 2/2013 | Nazar et al. |
| 2013/0039349 A1 | 2/2013 | Ebrahimi et al. |
| 2013/0039387 A1 | 2/2013 | Qu |
| 2013/0058307 A1 | 3/2013 | Kim et al. |
| 2013/0077514 A1 | 3/2013 | Dinan |
| 2013/0077569 A1 | 3/2013 | Nam et al. |
| 2013/0083681 A1 | 4/2013 | Ebrahimi et al. |
| 2013/0089009 A1 | 4/2013 | Li et al. |
| 2013/0089159 A1 | 4/2013 | Liu |
| 2013/0094548 A1 | 4/2013 | Park |
| 2013/0114437 A1 | 5/2013 | Yoo et al. |
| 2013/0114763 A1 | 5/2013 | Park |

(56) References Cited

U.S. PATENT DOCUMENTS

| | | |
|---|---|---|
| 2013/0115986 A1 | 5/2013 | Mueck et al. |
| 2013/0128821 A1 | 5/2013 | Hooli et al. |
| 2013/0142290 A1 | 6/2013 | Farmanbar et al. |
| 2013/0170360 A1 | 7/2013 | Xu et al. |
| 2013/0188567 A1 | 7/2013 | Wang et al. |
| 2013/0195047 A1 | 8/2013 | Koivisto et al. |
| 2013/0195086 A1 | 8/2013 | Xu et al. |
| 2013/0195467 A1 | 8/2013 | Schmid et al. |
| 2013/0208604 A1 | 8/2013 | Lee et al. |
| 2013/0208671 A1 | 8/2013 | Royz et al. |
| 2013/0242890 A1 | 9/2013 | He et al. |
| 2013/0242956 A1 | 9/2013 | Hall |
| 2013/0272170 A1 | 10/2013 | Chatterjee et al. |
| 2013/0273950 A1 | 10/2013 | Sun et al. |
| 2013/0286958 A1 | 10/2013 | Liang et al. |
| 2013/0286997 A1 | 10/2013 | Davydov et al. |
| 2013/0315189 A1 | 11/2013 | Kim et al. |
| 2013/0315195 A1 | 11/2013 | Ko et al. |
| 2013/0315211 A1 | 11/2013 | Balan et al. |
| 2013/0329592 A1 | 12/2013 | Beale |
| 2014/0038619 A1 | 2/2014 | Moulsley |
| 2014/0064206 A1 | 3/2014 | Bao et al. |
| 2014/0086296 A1 | 3/2014 | Badic et al. |
| 2014/0087680 A1 | 3/2014 | Luukkala et al. |
| 2014/0094169 A1 | 4/2014 | Takano |
| 2014/0112216 A1 | 4/2014 | Seo et al. |
| 2014/0113677 A1 | 4/2014 | Parkvall et al. |
| 2014/0140225 A1 | 5/2014 | Wala |
| 2014/0146756 A1 | 5/2014 | Sahin et al. |
| 2014/0153427 A1 | 6/2014 | Seo et al. |
| 2014/0185700 A1 | 7/2014 | Dong et al. |
| 2014/0198744 A1 | 7/2014 | Wang et al. |
| 2014/0206280 A1 | 7/2014 | Nilsson et al. |
| 2014/0219142 A1 | 8/2014 | Schulz et al. |
| 2014/0219202 A1 | 8/2014 | Kim et al. |
| 2014/0219267 A1 | 8/2014 | Eyuboglu et al. |
| 2014/0225788 A1 | 8/2014 | Schulz et al. |
| 2014/0241209 A1 | 8/2014 | Pollakowski et al. |
| 2014/0241218 A1 | 8/2014 | Moshfeghi |
| 2014/0241240 A1 | 8/2014 | Kloper et al. |
| 2014/0245095 A1 | 8/2014 | Nammi et al. |
| 2014/0295758 A1 | 10/2014 | Pedersen |
| 2014/0301345 A1 | 10/2014 | Kim et al. |
| 2014/0307630 A1 | 10/2014 | Nagata et al. |
| 2014/0340255 A1 | 11/2014 | Meerkerk et al. |
| 2014/0340260 A1 | 11/2014 | Richards |
| 2014/0341143 A1 | 11/2014 | Yang et al. |
| 2014/0348077 A1 | 11/2014 | Chen et al. |
| 2014/0348090 A1 | 11/2014 | Nguyen et al. |
| 2014/0348131 A1 | 11/2014 | Duan et al. |
| 2015/0003311 A1 | 1/2015 | Feuersaenger et al. |
| 2015/0011197 A1 | 1/2015 | Tarraf et al. |
| 2015/0016317 A1 | 1/2015 | Park et al. |
| 2015/0092416 A1 | 4/2015 | Potucek et al. |
| 2015/0098410 A1 | 4/2015 | Jöngren et al. |
| 2015/0117392 A1 | 4/2015 | Hammarwall et al. |
| 2015/0131751 A1 | 5/2015 | Bayesteh et al. |
| 2015/0270882 A1 | 9/2015 | Shattil |
| 2015/0271003 A1 | 9/2015 | Kuchi et al. |
| 2015/0296533 A1 | 10/2015 | Park et al. |
| 2015/0304855 A1 | 10/2015 | Perlman et al. |
| 2015/0305010 A1 | 10/2015 | Guan et al. |
| 2016/0013855 A1 | 1/2016 | Campos et al. |
| 2016/0061027 A1 | 3/2016 | Gao et al. |
| 2016/0094318 A1 | 3/2016 | Shattil et al. |
| 2016/0157146 A1 | 6/2016 | Karabinis |
| 2016/0248559 A1 | 8/2016 | Guo et al. |
| 2016/0302028 A1 | 10/2016 | Ling et al. |
| 2016/0353290 A1 | 12/2016 | Nammi et al. |
| 2016/0374070 A1 | 12/2016 | Ghosh |
| 2019/0385057 A1 | 12/2019 | Litichever et al. |

FOREIGN PATENT DOCUMENTS

| | | |
|---|---|---|
| CA | 2011298 C | 5/1999 |
| CN | 1256803 A | 6/2000 |
| CN | 1516370 A | 7/2004 |
| CN | 1538636 A | 10/2004 |
| CN | 1703113 A | 11/2005 |
| CN | 1734972 A | 2/2006 |
| CN | 1820424 A | 8/2006 |
| CN | 1898973 A | 1/2007 |
| CN | 101238648 A | 8/2008 |
| CN | 101291503 A | 10/2008 |
| CN | 101310454 A | 11/2008 |
| CN | 101405965 A | 4/2009 |
| CN | 101536320 A | 9/2009 |
| CN | 101542938 A | 9/2009 |
| CN | 101682432 A | 3/2010 |
| CN | 101873281 A | 10/2010 |
| CN | 101981826 A | 2/2011 |
| CN | 102007707 A | 4/2011 |
| CN | 102185641 A | 9/2011 |
| CN | 102186541 A | 9/2011 |
| CN | 102439891 A | 5/2012 |
| CN | 102948085 A | 2/2013 |
| CN | 103069903 A | 4/2013 |
| CN | 103117975 A | 5/2013 |
| CN | 104025684 A | 9/2014 |
| EP | 1359683 A1 | 11/2003 |
| EP | 1392029 A1 | 2/2004 |
| EP | 1597842 A1 | 11/2005 |
| EP | 2244390 A2 | 10/2010 |
| EP | 2889957 A1 | 7/2015 |
| EP | 2904814 A1 | 8/2015 |
| EP | 1597842 B1 | 6/2016 |
| EP | 3419188 A1 | 12/2018 |
| GB | 2300547 A | 11/1996 |
| JP | H11252613 A | 9/1999 |
| JP | 2001217759 A | 8/2001 |
| JP | 2002281551 A | 9/2002 |
| JP | 2002374224 A | 12/2002 |
| JP | 2003018054 A | 1/2003 |
| JP | 2003134013 A | 5/2003 |
| JP | 2003179948 A | 6/2003 |
| JP | 2003284128 A | 10/2003 |
| JP | 2004502376 A | 1/2004 |
| JP | 2004104206 A | 4/2004 |
| JP | 2005039822 A | 2/2005 |
| JP | 2005159448 A | 6/2005 |
| JP | 2006081162 A | 3/2006 |
| JP | 2006245871 A | 9/2006 |
| JP | 2007060106 A | 3/2007 |
| JP | 2007116686 A | 5/2007 |
| JP | 2008035287 A | 2/2008 |
| JP | 2009213052 A | 9/2009 |
| JP | 2009273167 A | 11/2009 |
| JP | 2009540692 A | 11/2009 |
| JP | 2010016674 A | 1/2010 |
| JP | 2010021999 A | 1/2010 |
| JP | 2010068496 A | 3/2010 |
| JP | 2010193189 A | 9/2010 |
| JP | 2010537577 A | 12/2010 |
| JP | 2011035912 A | 2/2011 |
| JP | 2011078025 A | 4/2011 |
| JP | 2011517393 A | 6/2011 |
| JP | 2012124859 A | 6/2012 |
| JP | 2013502117 A | 1/2013 |
| JP | 2013507064 A | 2/2013 |
| JP | 2013102450 A | 5/2013 |
| KR | 20120003781 A | 1/2012 |
| RU | 2330381 C2 | 7/2008 |
| RU | 2010110620 A | 9/2011 |
| RU | 2012121952 A | 2/2014 |
| TW | 201031243 A | 8/2010 |
| TW | 201112665 A | 4/2011 |
| TW | 201212570 A | 3/2012 |
| TW | 201220741 A | 5/2012 |
| WO | WO-9923767 A1 | 5/1999 |
| WO | 00/54463 A1 | 9/2000 |
| WO | WO-0201732 A2 | 1/2002 |

(56) References Cited

FOREIGN PATENT DOCUMENTS

| | | |
|---|---|---|
| WO | WO-0208785 A1 | 1/2002 |
| WO | WO-02054626 A1 | 7/2002 |
| WO | WO-02093784 A1 | 11/2002 |
| WO | WO-02099995 A2 | 12/2002 |
| WO | WO-03003604 A1 | 1/2003 |
| WO | WO-03084092 A2 | 10/2003 |
| WO | WO-03094460 A2 | 11/2003 |
| WO | WO-03107582 A2 | 12/2003 |
| WO | WO-2004017586 A1 | 2/2004 |
| WO | WO-2005046081 A1 | 5/2005 |
| WO | WO-2005064871 A1 | 7/2005 |
| WO | WO-2006049417 A1 | 5/2006 |
| WO | WO-2006063138 A2 | 6/2006 |
| WO | WO-2006078019 A1 | 7/2006 |
| WO | WO-2006110737 A2 | 10/2006 |
| WO | WO-2006113872 A1 | 10/2006 |
| WO | WO-2007024913 A1 | 3/2007 |
| WO | WO-2007027825 A2 | 3/2007 |
| WO | WO-2007046621 A1 | 4/2007 |
| WO | WO-2007114654 A1 | 10/2007 |
| WO | 2008/119216 A1 | 10/2008 |
| WO | WO-2009099752 A1 | 8/2009 |
| WO | WO-2009125962 A2 | 10/2009 |
| WO | 2009/151989 A2 | 12/2009 |
| WO | 20101019524 A2 | 2/2010 |
| WO | WO-2010017482 A1 | 2/2010 |
| WO | WO-2010067419 A1 | 6/2010 |
| WO | WO-2011018121 A1 | 2/2011 |
| WO | WO-2011099802 A2 | 8/2011 |
| WO | WO-2011100492 A1 | 8/2011 |
| WO | WO-2011116824 A1 | 9/2011 |
| WO | WO-2011155763 A2 | 12/2011 |
| WO | WO-2012001086 A1 | 1/2012 |
| WO | WO-2012044969 A1 | 4/2012 |
| WO | WO-2012058600 A2 | 5/2012 |
| WO | WO-2012061325 A1 | 5/2012 |
| WO | WO-2012108976 A1 | 8/2012 |
| WO | WO-2012130071 A1 | 10/2012 |
| WO | WO-2013040089 A2 | 3/2013 |
| WO | WO-2013166464 A1 | 11/2013 |
| WO | WO-2013173809 A1 | 11/2013 |
| WO | 20141055294 A1 | 4/2014 |
| WO | 20161057304 A1 | 4/2016 |

OTHER PUBLICATIONS

3GPP Technical Specification Group, "Spatial channel model, SCM-134 text V6.0", Spatial Channel Model AHG (Combined ad-hoc from 3GPP and 3GPP2), Apr. 2003, pp. 1-45.
3GPP TR 25.876 V7.0.0 (Mar. 2007)., "Technical Report 3rd Generation Partnership Project; Technical Specification Group Radio Access Network; Multiple Input Multiple Output in UTRA; (Release 7)3GPP TR 25.876 v7.0.0 (Mar. 2007)," Mar. 2007, pp. 2-76.
3GPP TR 25.912, "Feasibility Study for Evolved UTRA and UTRAN", V9.0.0 (Oct. 2009), Oct. 2009, pp. 1-66.
3GPP TR 25.913, "Requirements for Evolved UTRA (E-UTRA) and Evolved UTRAN (E-UTRAN)", V8.0.0 (Jan. 2009), Jan. 2009, pp. 1-20.
3GPP, TS 36.201, "Evolved Universal Terrestrial Radio Access (E-UTRA); LTE Physical Layer—General Description (Release 11)," Oct. 2012, pp. 1-14.
3GPP, TS 36.211, "Evolved Universal Terrestrial Radio Access (E-UTRA); Physical Channels and Modulation (Release 11)," Oct. 2012, pp. 1-107.
3GPP TS 36.211 V8.7.0 (May 2009), "Technical Specification 3rd Generation Partnership Project; Technical Specification Group Radio Access Network; Evolved Universal Terrestrial Radio Access (E-UTRA); Physical Channels and Modulation (Release 8) 3GPP TS 36.211 V8.7.0 (May 2009)," May 2009, pp. 1-83.
3GPP, TS 36.212, "Evolved Universal Terrestrial Radio Access (E-UTRA); Multiplexing and channel coding (Release 11)," Oct. 2012, pp. 1-80.
3GPP TS 36.212 V9.1.0 Release 9, LTE; Evolved Universal Terrestrial Radio Access (E-UTRA); Multiplexing and channel coding, ETSI TS 136 212 (Apr. 2010), Technical Specification, Apr. 2010, pp. 1-63.
3GPP, TS 36.212.V8.7.0 (May 2009), "Technical Specification 3rd Generation Partnership Project; Technical Specification Group Radio Access Network; Evolved Universal Terrestrial Radio Access (E-UTRA); Multiplexing and channel Coding (Release 8) 3GPP, TS 36.212.V8.7.0 (May 2009)," May 2009, 60 pages.
3GPP, TS 36.213, "Evolved Universal Terrestrial Radio Access (E-UTRA); Physical layer procedures (Release 11)," Oct. 2012, 145 pages.
3GPP, TS 36.808, "Evolved Universal Terrestrial Radio Access (E-UTRA); Carrier Aggregation (Release 10)", v10.0.0, Jun. 2012, 28 pages.
3GPP, "UMTS", Universal Mobile Telecommunications System, downloaded from www.3gpp.org/articleumts on Nov. 17, 2014, 2 pages.
Abbasi N., "Capacity estimation of HF-MIMO systems," International Conference on Ionospheric Systems and Techniques, 2009, 5 pages.
Adrian K., et al., "Quantum Tagging: Authenticating Location via Quantum Information and Relativistic Signalling Constraints," 2010, Phys. Rev. A84, 012326 (2011), DOI: 10.1103/PhysRevA.84.012326, arXiv: 1008.2147, 9 pages.
Aggarwal R., et al., "On the Design of Large Scale Wireless Systems," IEEE Journal of Selected Areas Communications, Jun. 2012, vol. 31 (2), pp. 1-50.
Airgo—Wireless without Limits—Homepage, http:www.airgonetworks.com, printed on Apr. 9, 2004, 1 page.
Aktas D., et al., "Scaling Results on the Sum Capacity of Cellular Networks with MIMO Links", IEEE Transactions on Information Theory, 2006, vol. 52, pp. 3264-3274.
Akyildiz I.F., et al., "The Evolution to 4G Cellular Systems: LTE-Advanced," Physical Communication, Elsevier, 2010, vol. 3 (2010), pp. 217-244.
Alamouti S.M., et al., "A simple transmit diversity technique for wireless communications," IEEE Journal on Selected Areas in Communications, 1998, vol. 16(8), pp. 1451-1458.
Alrabadi O.N., et al., "Beamforming via Large and Dense Antenna Arrays above a Clutter," Institute of Electrical and Electronics Engineers Journal on Selected Areas in Communications, 2013, vol. 31 (2), pp. 314-325.
Andersen J. B., et al., "The MIMO Cube—a Compact MIMO Antenna," IEEE Proceedings of Wireless Personal Multimedia Communications International Symposium, vol. 1, Oct. 2002, pp. 112-114.
Andersen J.B., "Antenna Arrays in Mobile Communications: Gain, diversity, and Channel Capacity.1," IEEE Antennas and Propagation Magazine, vol. 42 (2), Apr. 2000, pp. 12-16.
Anderson A.L., et al., "Beamforming in large-scale MIMO Multiuser Links Under a Per-node Power Constraint," Proceedings in International Symposium on Wireless Communication Systems, Aug. 2012, pp. 821-825.
Andrews J.G., "Seven Ways That Hetnet are a Cellular Paradigm Shift," IEEE Communications Magazine, Mar. 2013, [online], Retrieved from the Internet: http://users.ece.utexas.edu/-jandrews/pubs/And HetNet CommMag2012v3.pdf, pp. 136-144.
Andrews M.R., et al., "Tripling the Capacity of Wireless Communications using Electromagnetic Polarization," Nature, 2001, vol. 409, pp. 316-318.
Anritsu, "LTE resource guide", 18 pages, 2009, www.us.anritsu.com.
Araujo D. C., et al., "Channel Estimation for Millimeter-Wave Very-Large MIMO Systems," EUSPICO 2014, in proceedings, Sep. 1-5, 2014, 5 pages.
Arnau J., et al., "Dissection of Multibeam Satellite Communications with a Large-scale Antenna System Toolbox," European Wireless 2014 (EW2014), May 14-16, 2014, pp. 548-553.
ArrayComm, "Field-Proven Results," Improving wireless economics through MAS software, printed on Mar. 28, 2011, www.arraycomm.comserve.phppage=proof, 3 pages.

(56) References Cited

OTHER PUBLICATIONS

Artigue C., et al.,"On the Precoder Design of Flat Fading MIMO Systems Equipped with MMSE Receivers: A Large System Approach", IEEE Trans. Inform. Theory, 2011, vol. 57 (7), pp. 4138-4155.
AT&T, "1946: First Mobile Telephone Call" 1 page, Jun. 17, 1946 [online]. Retrieved from the Internet: http:www.corp.att.comattlabsreputationtimeline46mobile.html.
Baker M., "LTE-Advanced Physical Layer," Alcatel-Lucent, Dec. 2009, 48 pages.
Barbieri A., et al., "Coordinated Downlink Multi-point Communications in Heterogeneous Cellular Networks", (Qualcomm), Information Theory and App. Workshop, Feb. 2012, pp. 7-16.
BelAir Networks, "Small cells", 4 pages, 2007 [online], retrieved from the Internet: http:www.belairnetworks.comsitesdefaultfilesVVPSmallCells.pdf.
Benedetto M.D., et al., "Analysis of the effect of the I/Q baseband Filter mismatch in an OFDM modem," Wireless personal communications, 2000, pp. 175-186.
Bengtsson E.L., "UE Antenna Properties and Their Influence on Massive MIMO System Performance," 2002, 5 pages.
Bengtsson M., "A Pragmatic Approach to Multi-User Spatial Multiplexing," IEEE, 2002, pp. 130-134.
Bhagavatula R., et al., "Sizing up MIMO Arrays," IEEE Vehicular Technology Magazine, 2008, vol. 3 (4), pp. 31-38.
Bjornson E, et al., Designing Multi-User MIMO for Energy Efficiency: When is Massive MIMO the Answer?, IEEE Wireless Communications and Networking Conference (WCNC), Istanbul, Turkey, Apr. 2014, 6 pages.
Bjornson E, et al., Massive MIMO and Small Cells: Improving Energy Efficiency by Optimal Soft-Cell Coordination, ICT, 2013, Wireless Communications Symposium, pp. 5442-5447.
Blelloch G.E., "Introduction to Data Compression", Jan. 31, 2013, pp. 1-55.
Bloomberg BusinessWeek, "Steve Perlman's Wireless Fix", Aug. 14, 2014, 7 pages [online], Retrieved from the Internet: http://www.businessweek.commagazinethe-edison-of-silicon-valley-07272011.html.
Boche H., et al., "A General Duality Theory for Uplink and Downlink Beamforming", 2002, vol. 1, pp. 87-91.
Boche H., et al., "Analysis of Different Precoding decoding Strategies for Multiuser Beamforming", IEEE Vehicular Technology Conference, 2003, vol. 1, pp. 39-43.
Bourdoux A., et al., "Non-reciprocal Transceivers in OFDM/SDMA Systems: Impact and Mitigation", IEEE, 2003, pp. 183-186.
Brodersen R. et al., "Degrees of Freedom in Multiple Antenna Channels: A Signal Space Approach," IEEE Transactions on Information Theory, 2005, vol. 51 (2), pp. 523-536.
Bydon, "Silicon Valley Inventor's Radical Rewrite of Wireless", The Wall Street Journal [online]. [retrieved on Jul. 28, 2011] Retrieved from the Internet: URL: http:blogs.wsj.comdigits20110728silicon-valley-inventors-radical-rewrite-of-wireless, 2 pages.
C. Guthy, W. Utschick, and M.L. Honig, Large System Analysis of Projection Based Algorithms for the MIMO Broadcast Channel, in Proc. of the IEEE Intl Symp. Inform. Theory, Austin, U.S.A., Jun. 2010, 5 pages.
Caire G., et al., "On the Achievable Throughput of a Multiantenna Gaussian Broadcast Channel," IEEE Transactions on Information Theory, Jul. 23, 2001, vol. 49, pp. 1-46.
Caire, "On Achivable Rates in a Multi-Antenna Broadcast Downlink," IEEE Transactions on Information Theory, 2003, vol. 49, pp. 1691-1706.
Catreux S., et al., "Adaptive Modulation and MIMO Coding for Broadband Wireless Data Networks," IEEE Communications Magazine, 2002, vol. 2, pp. 108-115.
Cerato B., et al., Hardware implementation of low-complexity detector for large MIMO, in Proc. IEEE ISCAS'2009, Taipei, May 2009, pp. 593-596.
Cetiner B.A., et al., "Multifunctional Reconfigurable MEMS Integrated Antennas for Adaptive MIMO Systems," Adaptive Antennas and MIMO Systems for Wireless Systems, IEEE Communications Magazine, vol. 42 (12), Dec. 2004, pp. 62-70.
Cetiner et al., "A Reconfigurable Spiral Antenna for Adaptive MIMO Systems," EURASIP Journal on Wireless Communications and Networking 2005:3, 382-389, plus International Journal of Digital Multimedia Broadcasting, Special Issue on: Audio Coding, Indexing, and Effects for Broadcasting Applications, Call for Papers Hindawi Publishing Corporation, http://www.hindawi.com, pp. 1, and Special Issue on: Advances in 3DTV: Theory and Practice, Call for Papers Hindawi Publishing Corporation, http://www.hindawi.com, pp. 1.
Chae C B., et al., "Adaptive MIMO Transmission Techniques for Broadband Wireless Communication Systems", IEEE Communications Magazine, 2010, vol. 48 (5), pp. 112-118.
Chae C B., et al., "Coordinated Beamforming with Limited Feedback in the MIMO Broadcast Channel," Special Issue on Exploiting Limited Feedback in Tomorrow's Wireless Comm. Networks, IEEE Journal on Selected Areas in Communications, 2008, vol. 26 (8), pp. 1505-1515.
Chandrasekaran S., et al., "Near-Optimal Large-MIMO Detection Using Randomized MCMC and Randomized Search Algorithms," Proceeding in Institute of Electrical and Electronics Engineers International Conference on Communications, 2011, 5 pages.
Chapter 26—Electromagnetic-Wave Propagation, 1973, pp. 1-32, Reference Data for Radio Engineers, 5th Edition, Howard W. Sams & Co., Inc.
Chen R., et al., "Transmit selection diversity for unitary precoded multiuser spatial multiplexing systems with linear receivers," IEEE Trans. on Signal Processing, 2005, pp. 1-30.
Chen R., et al., "Transmit Selection Diversity for Unitary Precoded Multiuser Spatial Multiplexing Systems with Linear Receivers," IEEE Trans. on Signal Processing, 2007, vol. 55 (3), pp. 1159-1171.
Chen R., "Multiuser Space-Time Block Coded MIMO System with Downlink," IEEE Communications Society, 2004, pp. 2689-2693.
Chockalingam A., "Low-Complexity Algorithms for Large-MIMO Detection," International Symposium on Communications, Control and Signal Processing, 2010, 6 pages.
Choi J., et al., "Downlink Training Techniques for FDD Massive MIMO Systems: Open-Loop and Closed-Loop Training with Memory," IEEE Journal of Selected Topics in Signal Processing on Signal Processing for Large-Scale MIMO Communications, 2013, 13 pages.
Choi J., et al., "Interpolation Based Transmit Beamforming for MIMO-OFDM with Limited Feedback," IEEE Transactions on Signal Processing, 2005, vol. 53 (11), pp. 4125-4135.
Choi J., et al., "Noncoherent Trellis Coded Quantization: A Practical Limited Feedback Technique for Massive MIMO Systems," Nov. 8, 2013, pp. 1-14.
Choi L.U., et al., "A transmit preprocessing technique for multiuser MIMO systems using a decomposition approach," IEEE Trans. Wireless Comm, 2004, vol. 3 (1), pp. 20-24.
Choi W., et al., "Opportunistic space division multiple access with beam selection," IEEE Trans. on Communications, 2006, pp. 1-23.
Chu D., et al., "Polyphase codes with good periodic correlation properties (corresp.)," IEEE Trans. Inform. Theory, 1972, vol. 18 (4), pp. 531-532.
Chuah C N., et al., "Capacity Scaling in MIMO Wireless Systems under Correlated Fading", IEEE Trans. Inform. Theory, 2002, vol. 48 (3), pp. 637-650.
Cohn H., et al., "Group-theoretic Algorithms for Matrix Multiplication", IEEE Symposium on Foundations of Computer Science, 2005, pp. 379-388.
Coopersmith D., et al., "Matrix Multiplication via Arithmetic Progression", Journal of Symbolic Computation, 1990, vol. 9, pp. 251-280.
Costa, "Writing on Dirty Paper," IEEE Transactions on Information Theory, 1983, vol. IT-29 (3), pp. 439-441.
Couillet R., et al., "A Deterministic Equivalent for the Analysis of Correlated MIMO Multiple Access Channels," IEEE Trans. Inform. Theory, 2011, vol. 57 (6), pp. 3493-3514.
Coulson J., et al., "Maximum likelihood synchronization for OFDM using a pilot symbol: analysis," IEEE Journal on Selected Areas in Communications, 2001, vol. 19 (12), pp. 2495-2503.

(56) References Cited

OTHER PUBLICATIONS

Dahlman E., et al., "4G: LTE/LTE-Advanced for Mobile Broadband", Elsevier, 2011, Cover page, Title page, Copyright page, Table of Contents, 21 pages.
Dai et al., "Reduced-complexity performance-lossless (quasi-)maximum-likelihood detectors for S-QAM modulated MIMO systems," Electronics Letters, 2013, vol. 49(11), pp. 724-725.
Dai et al., "Reducing the Complexity of Quasi-ML Detectors for MIMO Systems Through Simplified Branch Metric and Accumulated Branch Metric Based Detection," Communications Letters, 2013, vol. 17(5), pp. 916-919.
Dai X., et al., "Carrier frequency offset estimation for OFDM/SDMA systems using consecutive pilots," IEEE Proceedings Communications, 2005, vol. 152, pp. 624-632.
Daniel J., "Introduction to public safety: RF Signal Distribution Using Fiber Optics," 2009, 13 pages, http://www.rfsolutions.com/fiber.pdf.
Datta, et al., "A Hybrid RTS-BP Algorithm for Improved Detection of Large-MIMO M-QAM Signals," in Proc. IEEE National Conference on Communication, 2011, 6 pages.
Datta et al., "Random-Restart Reactive Tabu Search Algorithm for Detection in Large-MIMO Systems," IEEE Communications Letters, 2010, vol. 14(12), pp. 1107-1109.
Datta T., et al., "A Novel MCMC Based Receiver for Large-Scale Uplink Multiuser MIMO Systems," Jan. 2012, 37 pages.
Debbah M., et al., "MIMO Channel Modelling and the Principle of Maximum Entropy," IEEE Transactions on Information Theory, 2005, vol. 51 (5), pp. 1667-1690.
Degen C., et al., "Performance evaluation of MIMO systems using dual-polarized antennas," International Conference on Telecommunications, 2003, vol. 2, pp. 1520-1525.
Delfas N., "Mobile Data Wave: Who Dares to Invest, Wins," Morgan Stanley Research Global, Jun. 13, 2012, pp. 1-62.
Derrick W K et al., "Energy-Efficient Resource Allocation in OFDMA Systems with Large Numbers of Base Station Antennas", 2011, 30 pages.
Devasirvatham, "Radio Propagation Measurements At 850MHz. 1.7GHz and 4GHz Inside Two Dissimilar Office Buildings," Electronics Letter, 1990, vol. 26 (7), pp. 445-447.
Devasirvatham, "Time Delay Spread and Signal Level Measurements of 850 MHz Radio Waves in Building Environments," IEEE Transactions on Antennas and Propagation, 1986, vol. AP-34 (11), pp. 1300-1305.
Devasirvatham, "Time Delay Spread Measurements at 850 MHz and 1 7 GHz Inside a Metropolitan Office Building," Electronics Letters, 1989, vol. 25 (3), pp. 194-196.
Devillers B., et al. Mutual coupling effects in multiuser massive MIMO base stations, IEEE Antennas and Propagation Society International Symposium (APSURSI), Jul. 2012, 2 pages.
Dighe, et al., "Analysis of Transmit-Receive Diversity in Rayleigh Fading," IEEE Transactions on Communications, vol. 51 (4), Apr. 2003, pp. 694-703.
DigitalAir wireless, GeoDesy Laser Links 1.25Gbps Full Duplex, downloaded from URL: http:www.digitalairwireless.comoutdoor-wireless-networkspoint-to-point-wirelesslaser-fso-linksgeodesy-fso-laser-links.html on Oct. 2, 2015, 4 pages.
DigitalAir wireless, Outdoor Wireless, 5 pages, downloaded from http:www.digitalairwireless.com/outdoor-wireless-netvvorks.html on Sep. 29, 2015 on 5 pages.
Ding P., et al., "On the sum rate of channel subspace feedback for multi-antenna broadcast channels," IEEE Globecom, 2005 vol. 5, pp. 2699-2703.
Discussion Draft, A bill, 112th congress, 1st session, Jul. 12, 2011, House Republicans, Spectrum Innovation Act of 2011, 2011, 55 pages.
Dohler M., et al., "A Step towards MIMO: Virtual Antenna Arrays," European Cooperation in the Field of Scientific and Technical Research, 2003, 9 pages.

Dong L., et al., "Multiple-input multiple-output wireless communication systems using antenna pattern diversity," Proceedings of IEEE Globe Telecommunications Conference, 2002, vol. 1, pp. 997-1001.
Dumont J., et al. "On the Capacity Achieving Transmit Covariance Matrices for MIMO Rician Channels: An Asymptotic Approach," IEEE Transactions on Information Theory, 2010, vol. 56 (3), pp. 1048-1069.
Duplicity J., et al., "MU-MIMO in LTE Systems," EURASIP Journal on Wireless Communications and Networking, 2011, 10 pages.
Dupuy, et al., "On the Capacity Achieving Covariance Matrix for Frequency Selective MIMO Channels Using the Asymptotic Approach," IEEE Trans. Inform. Theory, 2010, pp. 2153-2157.
Dupuy, et al., On the Capacity Achieving Covariance Matrix for Frequency Selective MIMO Channels Using the Asymptotic Approach, IEEE Trans. Inform. Theory, 2011, vol. 57 (9), pp. 5737-5753.
Durgin, "Space-Time Wireless Channels", Prentice Hall Communications Engineering and Emerging Technologies Series, 2003, Upper Saddle River, NJ, Cover page, Title pages, Copyright page, Table of Contents, Preface, 16 pages, USA.
Eklund C., et al., "IEEE Standard 802.16: A Technical Overview of the WirelessMAN Air Interface for Broadband Wireless Access," IEEE Communications Magazine, Jun. 2002, 12 pages, http://ieee802.org/16/docs/02/C80216-02_05.pdf.
Ekstrom H., et al., "Technical Solutions for the 3G Long-Term Evolution", IEEE Communications Magazine, 2006, pp. 38-45.
Erceg V., et al., "TGn Channel Models," IEEE 802.11-03940r4, May 2004, 45 pages.
Ericsson, The evolution of EDGE, Feb. 2007, 18 pages, downloaded from http:www.ericsson.com/res/docs/whitepapersevolution_to_edge.pdf.
ETSI, Mobile Technologies GSM, Retrieved from the Internet: URL: http://www.etsi.org/WebSite/Technologies/gsm.asp on Aug. 14, 2014, 2 pages.
Fakhereddin M.J., et al., "Combined effect of polarization diversity and mutual coupling on MIMO capacity," Proc. IEEE Antennas and Prop. Symp, 2003, vol. 2, pp. 495-498.
FCC, Broadband action agenda, National Broadband Plan, 2010, pp. 1-8, Retrieved from the Internet: http://www.broadband.gov/plan/national-broadband-plan-action-agenda.pdf.
FCC, Open commission meeting, Sep. 23, 2010, Retrieved from the Internet: http:reboot.fcc.govopen-meetings2010september, 3 pages.
Federal Communications Commission, "Authorization of Spread Spectrum Systems under Parts 15 and 90 of the FCC Rules and Regulations", Jun. 1985, 18 pages.
Federal Communications Commission, "Evaluating Compliance with FCC Guidelines for Human Exposure to Radiofrequency Electromagnetic Fields," OET Bulletin 65, Ed. 97-01, Aug. 1997, 84 pages.
Fella A., "Adaptive WiMAX Antennas: The promise of higher ROI," http:www.wimax.comcommentaryspotlightspotlight8-08-2005searchterm=Adlane Fella, printed May 9, 2008, Aug. 8, 2005, 3 pages.
Feng S., et al., "Self-organizing networks (SON) in 3GPP LTE", Nom or Research, May 2008, pp. 1-15.
Fletcher P.N., et al., "Mutual coupling in multi-element array antennas and its influence on MIMO channel capacity," IEEE Electronics Letters, 2003, vol. 39 (4), pp. 342-344.
Forax RF-over-fiber Communications Systems, Syntonics, 2011, 2 pages, http://www.syntonicscorp.com/products/products-foraxRF.html.
Forenza A., et al., "Adaptive MIMO Transmission for Exploiting the Capacity of Spatially Correlated Channels," IEEE Trans. on Veh. Tech, 2007, vol. 56 (2), pp. 619-630.
Forenza A., et al., "Adaptive MIMO transmission scheme: Exploiting the spatial selectivity of wireless channels", Proceedings Institute of Electrical and Electronics Engineers Vehicular Technology Conference, 2005, vol. 5, pp. 3188-3192.
Forenza A., et al., "Benefit of Pattern Diversity Via 2-element Array of Circular Patch Antennas in Indoor Clustered MIMO Channels," IEEE Trans. on Communications, 2006, vol. 54 (5), pp. 943-954.

(56) References Cited

OTHER PUBLICATIONS

Forenza A., et al., "Impact of Antenna Geometry on MIMO Communication in Indoor Clustered Channels," Proc. IEEE Antennas and Prop. Symp, 2004, vol. 2, pp. 1700-1703.

Forenza A., et al., "Link Adaptation and Channel Prediction in Wireless OFDM Systems," Proceeding of IEEE International Midwest Symposium on Circuits and Systems, 2002, pp. 211-214.

Forenza A., et al., "Optimization Methodology for Designing 2-CPAs Exploiting Pattern Diversity in Clustered MIMO Channels", Institute of Electrical and Electronics Engineers Transactions on Communications, 2008, vol. 56(10), pp. 1748-1759.

Forenza A., et al., "Switching Between OSTBC and Spatial Multiplexing with Linear Receivers in Spatially Correlated MIMO Channels," IEEE Configuration Guide: Unified Model, 2006, pp. 1-5.

Foschini, et al., "Coordinating multiple antenna cellular networks to achieve enormous spectral efficiency", Proceedings of the IEEE, Aug. 2006, vol. 153 (4), pp. 548-555.

Foschini, et al., The Value of Coherent Base Station Coordination, Conference on In-formation Sciences and Systems (CISS 2005), Mar. 16-18, 2005, 6 pages.

Foschini G.J., et al., "Simplified processing for high spectral efficiency wireless communication employing multi-element arrays," IEEE Jour. Select. Areas in Comm, 1999, vol. 17 (11), pp. 1841-1852.

Fusco T., et al., "Blind Frequency-offset Estimation for OFDM/OQAM Systems," IEEE Transactions on [see also Acoustics, Speech, and Signal Processing, IEEE Transactions on], 2007, vol. 55, pp. 1828-1838.

Gao X., et al., "Linear Pre-Coding Performance in Measured Very-Large MIMO Channels," IEEE Vehicular Technology, 2011, pp. 1-5.

Garcia C.R., "Channel Model for Train to Train Communication Using the 400 MHz Band," in Proc. of IEEE Vehicular Technology Conference, 2008, pp. 3082-3086.

Ghogho M., et al., "Training design for multipath channel and frequency offset estimation in MIMO systems," IEEE Transactions on Signal Processing, 2006, vol. 54 (10), pp. 3957-3965.

Glazunov A.A., et al., "Experimental Characterization of the Propagation Channel along a Very Large Virtual Array in a Reverberation Chamber", Progress in Electromagnetics Research B, 2014, vol. 59, pp. 205-217.

Goldman D., "Sorry, America: your wireless airwaves are full", CNN Money, 3 pages, http://money.cnn.com/2012/02/21/technology/spectrum crunch/index.html.

Gopalakrishnan B., et al., "An Analysis of Pilot Contamination on Multi-User MIMO Cellular Systems with Many Antennas," Proceedings in Signal Processing Advances in Wireless Communications, 2011, pp. 381-385.

Govindasamy S., et al., "Asymptotic Spectral Efficiency of the Uplink in Spatially Distributed Wireless Networks with Multi-Antenna Base Stations," IEEE Transactions on Communications, 2013, vol. 61(7), pp. 1-13.

GSMA, "GSM technology," Aug. 14, 2014, Retrieved from the Internet: URL: http:http://www.gsmworld.comtechnologyindex.html, 1 page.

Guey J.C., et al., "Modeling and Evaluation of MIMO Systems Exploiting Channel Reciprocity in TDD Mode," VTC 2004-Fall, IEEE 60th, Oct. 2004, pp. 4265-4269.

Guillaud M., et al., "A Practical Method for Wireless Channel Reciprocity Exploitation Through Relative Calibration", IEEE Proceedings of Sign Processing, Aug. 2005, vol. 1, pp. 403-406.

Gunashekar G., "Investigations into the Feasibility of MIMO Techniques within the HF Band: Preliminary Results," Radio Science, 2009, 33 pages.

Guthy C., et al., "Large System Analysis of Sum Capacity in the Gaussian MIMO Broadcast Channel", IEEE J. Sel. Areas Communication, 2013, vol. 31 (2), pp. 149-159.

Guthy, et al., Large System Analysis of the Successive Encoding Successive Allocation Method for the MIMO BC, Proc. of the International ITG Workshop on Smart Antennas, Bremen, Germany, Feb. 2010.

Hachem W., et al., "A New Approach for Mutual Information Analysis of Large Dimensional Multi-Antenna Channels," IEEE Transactions on Information Theory, 2008, vol. 54(9), pp. 3987-4004.

Hakkarainen A., et al., "Widely-Linear Beamforming and RF Impairment Suppression in Massive Antenna Arrays", Journal of Communications and Networks, 2013, vol. 15 (4), pp. 383-397.

Hallen H., "Long-Range Prediction of Fading Signals", Institute of Electrical and Electronics Engineers Signal Processing Magazine, 2000, vol. 17 (3), pp. 62-75.

Haring L., "Residual carrier and sampling frequency synchronization in multiuser OFDM systems," IEEE 63rd Vehicular Technology Conference, 2006, vol. 4, pp. 1937-1941.

Hazlett et al., "Radio Spectrum for a Hungry Wireless World", Sep. 22, 2011, 41 pages.

Heath R W., et al., "Antenna Selection for Spatial Multiplexing Systems with Linear Receivers," IEEE Trans. Comm, 2001, vol. 5, pp. 142-144.

Heath R W., et al., "Switching between diversity and multiplexing in MIMO systems," IEEE Trans. Comm, 2005, vol. 53 (6), pp. 962-968.

Heath R.W., et al., "Exploiting Limited Feedback in Tomorrow's Wireless Communication Networks," IEEE Journal on Sel. Areas in Comm., Special Issue on Exploiting Limited Feedback in Tomorrow's Wireless Communication Networks, 2008, vol. 26 (8), pp. 1337-1340.

Heath R.W., et al., "Switching between Multiplexing and Diversity Based on Constellation Distance," Proc. of Allerton Conf on 208, Comm. Control and Comp, Oct. 4-6. 2000, pp. 212-221.

Hewlett Packard., "GPS and Precision Timing Applications," Application Note 1272, May 1996, pp. 1-28.

High Frequency Active Auroroal Research Program—Homepage, printed Apr. 9, 2004, http:www.haarp.alaska.edu, 1 page.

Hochwald B., et al., "Multi-Antenna Channel Hardening and its Implications for Rate Feedback and Scheduling", Institute of Electrical and Electronics Engineers Transactions on Information Theory, Sep. 2004, vol. 50 (9), pp. 1893-1909.

Hochwald B.M., et al., "A Vector-Perturbation Technique for Near-Capacity Multiantenna Multiuser Communication—Part I: Channel Inversion and Regularization", Institute of Electrical and Electronics Engineers Transactions on Communications, 2005, vol. 53 (1), pp. 195-202.

Hochwald B.M., et al., "A Vector-Perturbation Technique for Near-Capacity Multiantenna Multiuser Communication—Part II: Perturbation", Institute of Electrical and Electronics Engineers Transactions on Communications, 2005, vol. 53 (3), pp. 537-544.

Hong M., et al., "Joint Base Station Clustering and Beamformer Design for Partial Coordinated Transmission in Heterogeneous Networks," IEEE Journal on Selected Areas in Communications, Nov. 2012, vol. 31 (2), pp. 1-20.

Hosseini K., et al., "Massive MIMO and Small Cells: How to Density Heterogeneous Networks," Wireless Communications Symposium, IEEE ICC, 2013, pp. 5442-5447.

Hoydis J., et al., "Iterative Deterministic Equivalents for the Performance Analysis of Communication Systems," Dec. 18, 2011, pp. 1-43.

Huang Y., et al., "Joint Beamforming and Power Control in Coordinated Multicell: Max-Min Duality, Effective Network and Large System Transition," IEEE Transactions on Wireless Communications, 2013, pp. 1-14.

Huff G.H., et al., "A Novel Radiation Pattern and Frequency Reconfigurable Single Turn Square Spiral Microstrip Antenna," IEEE Microwave and Wireless Components Letters, vol. 13 (2), Feb. 2003, pp. 57-59.

Huh H., et al., Achieving "Massive MIMO" Spectral Efficiency with a Not-so-Large Number of Antennas. IEEE Transactions on Wireless Communications, Sep. 2012, vol. 11 (9), pp. 3226-3239.

(56) References Cited

OTHER PUBLICATIONS

Huh H., et al., Multi-cell MIMO Downlink with Cell Cooperation and Fair Scheduling: A Large-System Limit Analysis, IEEE Transactions on Information Theory, 2010, vol. 57 (12), pp. 1-29.
IEEE 802.22, "IEEE 802.22 Working Group on Wireless Regional Area Networks", [online], [retrieved on Aug. 14, 2014], Retrieved from the Internet: URL:http:www.ieee802.org/22/, 1 page.
IntelliCell: A Fully Adaptive Approach to Smart Antennas, ArrayComm, Incorporated, WP-ISA-031502-2.0, 2002, pp. 1-18.
ITU, "ISM Band," [online], Aug. 14, 2014. Retrieved from the Internet: http://www.itu.int/ITUR/terrestrial/faq/index.html#9013, pp. 1-8.
Jafar S.A., et al., "Channel Capacity and Beamforming for Multiple Transmit and Receive Antennas with Covariance Feedback," Proc. IEEE Int. Conf. on Comm, Jun. 2001, vol. 7, pp. 2266-2270.
Jafar S.A., et al., "Transmitter Optimization and Optimality of Beamforming for Multiple Antenna Systems," IEEE Trans Wireless Comm, Jul. 2004, vol. 3, No. 4, pp. 1165-1175.
Jakes W.C., Microwave Mobile Communications, IEEE Press, 1974, Table of Contents, 4 pages.
Jindal N., et al., "Dirty Paper Coding vs. TDMA for MIMO Broadcast Channels", IEEE Trans. on Information Theory, vol. 51, May 2005, pp. 1783-1794.
Jindal N., et al., "Multi-Antenna Broadcast Channels with Limited Feedback and User Selection," IEEE Journal on Selected Areas in Communications, 2007, vol. 25(7), pp. 1478-1491.
Jindal N., "MIMO Broadcast Channels with Finite-Rate Feedback," IEEE Trans. on Info. Theory, 2006, vol. 52, pp. 5045-5060.
Jing J., et al. "A Downlink Max-SINR Precoding for Massive MIMO System," International Journal of Future Generation Communication and Networking, Jun. 2014, vol. 7 (3), pp. 107-116.
Jorswieck E.A., et al., "Channel Capacity and Capacity-Range of Beamforming in MIMO Wireless Systems under Correlated Fading with Covariance Feedback," IEEE Transactions on Wireless Communications, Sep. 2004, vol. 3, pp. 1543-1553.
Jose J., "Channel Estimation and Linear Precoding in Multiuser Multiple-Antenna TDD Systems," IEEE Transactions on Vehicular Technology, 2011, vol. 60 (5), pp. 2102-2116.
Jose J., et al. "Pilot Contamination and Precoding in Multi-cell TDD Systems," IEEE Transactions on Wireless Communications, 2011, vol. 10 (8), pp. 2640-2651.
Jungnickel V., et al., "Capacity of MIMO systems with closely spaced antennas," IEEE, 2003, vol. 7 (8), pp. 361-363.
Kang M., et al., "Water-Filling Capacity and Beamforming Performance of MIMO Systems With Covariance Feedback," IEEE Workshop on Signal Processing Advances in Wireless Communications, Jun. 2003, pp. 556-560.
Kannan T.P., et al., "Separation of Cochannel Signals Under Imperfect Timing and Carrier Synchronization," IEEE Trans. Veh. Technol, 2001, vol. 50 (1), pp. 79-96.
Karakayali M.K., et al. "Network Coordination for Spectrally Efficient Communications in Cellular Systems," IEEE Wireless Communications Magazine, 2006, vol. 13 (4), pp. 56-61.
Karakayali M.K., et al., "On the Maximum Common Rate Achievable in a Coordinated Network," Proceedings of the International Conference on Communications (ICC'06), Mar. 3, 2006, vol. 9, pp. 1-6.
Kayama H., et al., "Demodulation Reference Signal Design and Channel Estimation for LTE-Advanced Uplink," Advances in Vehicular Networking Technologies, 2011, pp. 418-432.
Kermoal J.P., et al., "A Stochastic MIMO Radio Channel Model with Experimental Validation," IEEE Journal on Selected Areas in Communications, 2002, vol. 20 (6), pp. 1211-1226.
Knievel C., et al., "On Particle Swarm Optimization for MIMO Channel Estimation", Article ID 614384, Journal of Electrical and Computer Engineering, 2012, vol. 2012, 10 pages.
Knievel C, Low Complexity Receiver for Large-MIMO Space Time Coded Systems, in Proc. IEEE VTC—Fall'2011, Sep. 2011, 5 pages.

Kouassi B. et al., "Reciprocity-Based Cognitive Transmissions using a MU Massive MIMO Approach", 2013, pp. 1331-1335.
Kountouris M., et al., "HetNets and Massive MIMO: Modeling, Potential Gains, and Performance Analysis," in Proc. IEEE-APS Topical Conference on Antennas and Propagation in Wireless Communications, Sep. 2013, 5 pages.
Krim H., et al., "Two Decades of Array Signal Processing Research," IEEE Signal Proceedings Magazine, 1996, pp. 67-94.
Krishnan N., et al., "Cellular Systems with Many Antennas: Large System Analysis under Pilot Contamination," in Proceedings of the 50th Annual Allerton Conference on Communication, Control, and Computing, 2012, pp. 1220-1224.
Kumar K.R., et al. "Asymptotic Performance of Linear Receivers in MIMO Fading Channels," IEEE Information Theory Workshop, Feb. 19, 2009, 48 pages.
Lang S., et al., "Design and development of a 5.25 GHz software defined wireless OFDM communication platform," IEEE Communications Magazine, 2004, vol. 42 (6), 7 pages.
Lee C, Network Massive MIMO for Cell-Boundary Users: From a Precoding Normalization Perspective, IEEE Goblecom Workshops, 2012, 5 pages.
Lee J., et al., "A Compressed Analog Feedback Strategy for Spatially Correlated Massive MIMO Systems," in Proceedings IEEE Vehicular Technology Conference (VTC), Quebec, Canada, Sep. 2012, pp. 1-6.
Lee J., et al., "MIMO Technologies in 3GPP LTE and LTE-Advanced," EURASIP Journal on Wireless Communications and Networking, 2009, 10 pages.
Lee J., "Introduction of LTE-Advanced DL/UL MIMO," Samsung Electronics, Sep. 2009, 18 pages.
Lee K., et al., "Frequency-offset estimation for MIMO and OFDM systems using orthogonal training sequences," IEEE Trans. Veh. Technol, 2007, vol. 56 (1), pp. 146-156.
Li P., et al., Multiple Output Selection—LAS Algorithm in Large MIMO Systems, IEEE Commun., 2010, vol. 14 (5), pp. 399-401.
Liang et al., "Asymptotic Performance of MMSE Receivers for Large Systems Using Random Matrix Theory," IEEE Transactions on Information Theory, 2007, vol. 53(11), pp. 4173-4190.
Liang Y., et al., "Interference Suppression in Wireless Cellular Networks through Picocells," Annual Conference on Social Studies Communication and Education, 2007, vol. 2007, pp. 1041-1045.
Liang Y., et al., "On the Relationship Between MMSE-SIC and BI-GDFE Receivers for Large Multiple-Input Multiple-Output Channels," IEEE Transactions on Signal Processing, 2008, vol. 56 (8), pp. 3627-3637.
Liang Y.C., et al., "Block-iterative Generalized Decision Feedback Equalizers (BI-GDFE) for Large MIMO Systems: Algorithm Design and Asymptotic Performance Analysis," IEEE Transactions on Signal Processing, 2006, vol. 54(6), pp. 2035-2048.
Like deck chairs on the Titanic: why spectrum reallocation won't avert the coming data crunch but technology might keep the wireless industry afloat, Feb. 2012, pp. 705-719.
Lindstrom M., (Ericsson), "LTE-Advanced Radio Layer 2 and RRC Aspects," 3GPP TSG-RAN WG2, Dec. 17-18, 2009, 38 pages.
Liu G., "Time and frequency offset estimation for distributed multiple-input multiple-output orthogonal frequency division multiplexing system," Institute of Engineering and Technology Communications, 2010, vol. 4 (6), pp. 708-715.
Love D J., et al., "An Overview of Limited Feedback in Wireless Communication Systems," Special Issue on Exploiting Limited Feedback in Tomorrow's Wireless Communication Networks, IEEE Journal on Sel. Areas in Comm., 2008, vol. 26 (8), pp. 1341-1365.
Love D J., et al.,"Grassmannian Beamforming for Multiple-Input Multiple-Output Wireless Systems", IEEE Trans. on Info. Theory special issue on MIMO Communication, 2003, vol. 49, pp. 2735-2747.
Lozano A., et al., "Fundamental Limits of Cooperation", Mar. 2012, 27 pages.
Luise M., et al., "Carrier frequency acquisition and tracking for OFDM systems," IEEE. 1996, vol. 44 (11), pp. 1590-1598.
Luise M., et al., "Low-complexity blind carrier frequency recovery for OFDM signals over frequency-selective radio channels," IEEE Transactions. Communications, 2002, vol. 50 (7), pp. 1182-1188.

(56) References Cited

OTHER PUBLICATIONS

Marek S., "AT&T's Rinne talks about carrier aggregation trials, small cells and more", Retrieved from the Internet: URL: http:www.fiercebroadbandwireless.comstoryatts-rinne-talks-about-carrieraggregation- trials-small-cells-and-more2012-11-08, 3 pages.
Martinez A.O., et al., "Energy Detection Using Very Large Antenna Array Receivers," 48th Asilomar Conference on Signals, Systems, and Computers Proceedings, Nov. 2-5, 2014, 5 pages.
Martinez A.O., et al "Very Large Aperture Massive MIMO: a Measurement Based Study", Dec. 8, 2014, 6 pages.
Marzetta L.A., et al., "Noncooperative Cellular Wireless with Unlimited Numbers of Base Station Antennas," IEEE Transactions on Wireless Communications, 2010, vol. 9(11), pp. 3590-3600.
Masouros C., et al., "Large-Scale MIMO Transmitters in Fixed Physical Spaces: The Effect of Transmit Correlation and Mutual Coupling", IEEE Trans. Commun., 2013, vol. 61 (7), pp. 2794-2804.
Matthaiou M., et al. "Sum Rate Analysis of ZF Receivers in Distributed MIMO Systems," IEEE Journal on Selected Areas in Communications, 2013, vol. 31 (2), pp. 180-191.
Matthaiou M., et al., "Sum Rate Analysis of ZF Receivers in Distributed MIMO Systems with Rayleigh/Lognormal Fading," 2012 IEEE International Conference on Communications, ICC 2012, Ottawa, Jun. 10-15, pp. 3857-3861.
Mattheijssen P., "Antenna-Pattern Diversity versus Space Diversity for use at Handhelds," IEEE Trans. on Veh. Technol, 2004, vol. 53 (4), pp. 1035-1042.
Mazrouei-Sebdani M., "Vector Perturbation Precoding and User Scheduling for Network MIMO," IEEE WCNC, ISBN 978-1-61284-254-7, 2011, pp. 203-208.
McKay M R., et al., "A throughput-based adaptive MIMO BICM approach for spatially-correlated channels," IEEE to appear in Proc. ICC, 2006, 5 pages.
McKay M R., et al., "Multiplexing/beamforming switching for coded MIMO in spatially correlated channels based on Closed-Form BER Approximations," IEEE Transactions on Vehicular Technology, 2007, vol. 56 (5), pp. 2555-2567.
McLean J S., et al., "A re-examination of the fundamental limits on the radiation Q of electrically small antennas," IEEE Transactions on Antennas and Propagation, 1996, vol. 44 (5), pp. 672-676.
MikroTik, "Routerboard," [online], 2015, 30 pages, Retrieved from the Internet: URL: http:routerboard.com.
MIMO System uses SDMA for IEEE802.11n, Electronicstalk, 2004, pp. 1-3, http://www.electronicstalk.com/news/ime/ime149.html.
Minn., et al., "A robust timing and frequency synchronization for OFDM systems," IEEE Trans. Wireless Commun, 2003, vol. 2 (4), pp. 822-839.
Miyakawa H., et al., "A Method of Code Conversion for Digital Communication Channels with Intersymbol Interference," Transactions of the Institute of Engineers of Japan, vol. 52-A (6), 1969, pp. 272-273.
Mohammed S.K., et al., "A Low-Complexity Precoder for Large Multiuser MISO Systems", IEEE Vehicular Technology Conference, 2008, pp. 797-801.
Mohammed S.K., et al., "Constant-Envelope Multi-User Precoding for Frequency-Selective Massive MIMO Systems," IEEE Wireless Communications Letters, 2013, vol. 2(5), pp. 1-10.
Mohammed S.K., et al., "Single-User Beamforming in Large-Scale MISO Systems with Per-Antenna Constant-Envelope Constraints," IEEE Transactions on Wireless Communications, Sep. 2012, vol. 2012, pp. 3992-4005.
Mohammed S.K., et al., "Per-Antenna Constant Envelope Precoding for Large Multi-User MIMO Systems," IEEE Transactions on Communications, Jan. 2012, vol. 61(3), pp. 1-24.
Molisch et al., "MIMO Systems with Antenna Selection," IEEE Microwave Magazine, vol. 5 (1), Mar. 2004, pp. 46-56.
Montgomery B.G., "Analog RF-over-fiber technology, Syntonics LLC," 2008, pp. 2-51, http:chesapeakebayaoc.orgdocumentsSyntonics_AOC_RF_over-Fiber_19_Jan_08.pdf.
Monziano R. A., et al., "Introduction to Adaptive Arrays," New York, Wiley, 1980, Table of Contents 21 pages.
Moose P H., et al., "A technique for orthogonal frequency division multiplexing frequency offset correction," IEEE Trans. Commun, 1994, vol. 42 (10), pp. 2908-2914.
Morelli M., et al., "An improved frequency offset estimator for OFDM applications," IEEE Commun. Lett., 1999, vol. 3 (3), pp. 106-109.
Morelli M., et al., "Frequency ambiguity resolution in OFDM systems," IEEE Commun. Lett, 2000, vol. 4 (4), pp. 134-136.
Morris M. L., et al., "The Impact of Array Configuration on MIMO Wireless Channel Capacity," Proc. IEEE Antennas and Propagation Symposium, Jun. 2002, vol. 3, pp. 214-217.
Morris M.L., et al., "Network model for MIMO systems with coupled antennas and noisy amplifiers," IEEE Transactions on Antennas and Propagation, 2005, vol. 53, pp. 545-552.
Motorola, "Long Term Evolution (LTE): A Technical Overview," 2007, Retrieved from the Internet: http:business.motorola.comexperienceltepdfLTETechnicalOverview.pdf, 15 pages.
Moustakas A., et al., "MIMO Capacity through Correlated Channels in the Presence of Correlated Interferers and Noise: A (Not so) Large N Analysis", Institute of Electrical and Electronics Engineers Transformations and Information Theory, 2003, vol. 49 (10), pp. 2545-2561.
Moustakas A.L., et al., "Optimizing Multiple-Input Single-Output (MISO) Communication Systems with General Gaussian channels: Nontrivial Covariance and Nonzero Mean", Institute of Electrical and Electronics Engineers Transactions on Information Theory, 2003, vol. 49, pp. 2770-2780.
Muharar R., et al., "Downlink Beamforming with Transmit-Side Channel Correlation: A Large System Analysis," in Proc. IEEE International Conference on Communications (ICC), Kyoto, Japan, Jun. 2011, 5 pages.
Muller R., et al., "Vector Precoding for Wireless MIMO Systems and its Replica Analysis," IEEE J. Sel. Areas Commun, 2008, vol. 26 (3), pp. 530-540.
Muller R.R., et al., "Blind Pilot Decontamination," IEEE Journal of Selected Topics in Signal Processing on Signal Processing for Large-Scale MIMO Communications, 2013, 31 pages.
Nam J., et al., "Joint Spatial Division and Multiplexing: Realizing Massive MIMO Gains with Limited Channel State Information," in Proceedings Conference on Information Sciences and Systems, IEEE, Mar. 2012, 6 pages.
Narasimhan, et al., "M-ary Detection and q-ary Decoding in Large-Scale MIMO: A Non-Binary Belief Propagation Approach," Oct. 16, 2013, 7 pages.
NEC, "Self organizing networks", White paper, Feb. 2009, 5 pages.
Netsukuku, 8 pages, printed on Sep. 30, 2015, [online], Retrieved from the Internet: URL: http:netsukuku.freaknet.org.
Ngo H.Q., et al., Energy and Spectral Efficiency of Very Large Multiuser MIMO Systems, IEEE Transactions on Communications, May 21, 2012, vol. 61 (4), pp. 1436-1449.
Ngo H.Q., et al., EVD-Based Channel Estimations for Multicell Multiuser MIMO with Very Large Antenna Arrays, IEEE International Conference on Acoustics, Speed and Signal Processing (ICASSP), Kyoto, Japan, Mar. 2012, 5 pages.
Ngo H.Q., et al., Massive MU-MIMO Downlink TDD Systems with Linear Precoding and Downlink Pilots, Proceedings in Allerton Conference on Communication, Control, and Computing, Urbana-Champaign, Illinois, Oct. 2013, 6 pages.
Ngo H.Q., et al., The multicell multiuser MIMO uplink with very large antenna arrays and a finite-dimensional channel, IEEE Transactions Communications, 2013, vol. 61 (6), pp. 2350-2361.
Ngo H.Q., et al., Uplink Performance Analysis of Multicell MU-MIMO Systems with ZF Receivers, Jun. 2012, pp. 1-32.
Nguyen, et al., "Multiuser Transmit Beamforming via Regularized Channel Inversion: A Large System Analysis" IEEE Global Communications Conference, New Orleans, LO, US, Dec. 2008, pp. 1-4.
Nguyen S., et al., "Compressive Sensing-Based Channel Estimation for Massive Multiuser MIMO Systems" in proceeding IEEE WCNC, 2013, 6 pages.

(56) References Cited

OTHER PUBLICATIONS

Nguyen S., et al., "Precoding for Multicell Massive MIMO Systems With Compressive Rank-Q Channel Approximation," 24th IEEE International Symposium, 2013, pp. 1227-1232.

Nicta, "InterfereX", downloaded Jun. 22, 2015, 3 pages, http://www.interfereX.com.

Nokia Siemens Networks, "2020: Beyond 4g, Radio Evolution for the Gigabit Experience", White Paper, 2011, www.nokiasiemensnetworks.com, 16 pages.

Oberli C., et al., "Maximum likelihood tracking algorithms for MIMOOFDM, in Communications," IEEE International Conference on Networking, Jun. 20-24, 2004, vol. 4, pp. 2468-2472.

Oda Y., "Measured Path Loss and Multipath Propagation Characteristics in UHF and Microwave Frequency Bands for Urban Mobile Communications," IEEE, 2001, pp. 337-341.

Onggosanusi E. N., et al., High Rate Space-Time Block Coded Scheme: Performance and Improvement in Correlated Fading Channels, Proc. IEEE Wireless Comm. and Net. Conf, Mar. 2002, vol. 1, pp. 194-199.

Optimized Markov Chain Monte Carlo for Signal Detection in MIMO Systems: An Analysis of the Stationary Distribution and Mixing Time, Signal Processing, vol. 62, No. 17, Sep. 2014.

Ozgur A., et al., "Spatial Degrees of Freedom of Large Distributed MIMO Systems and Wireless Ad Hoc Networks", Institute of Electrical and Electronics Engineers Journal on Selected Areas in Communications, 2013, vol. 31 (2), pp. 202-214.

Papadogiannis A., et al "Efficient Selective Feedback Design for Multicell Cooperative Networks," Institute of Electrical and Electronics Engineers Transactions on Vehicular Technology, 2010, vol. 60 (1), pp. 196-205.

Papadopoulos H.C., et al., Achieving Large Spectral Efficiencies from MU-MIMO with Tens of Antennas: Location-Adaptive TDD MU-MIMO Design and User Scheduling, in Proc. IEEE Asilomar Conf. on Signals, Systems, and Computers (ACSSC), Pacific Grove, CA, Nov. 2010, pp. 636-643.

Parvall, et al., "LTE Advanced—Evolving LTE Towards IMT-Advanced," IEEE VTC 2008, 978-1-4244-1722-3/08/$25.00, 5 pages.

Paulraj A., et al., "Introduction to Space-Time Wireless Communications", 2003, 33 Pages.

Paulraj, "Is OFDMA, MIMO and OS the right stuff for mobile broad-band?" 63 pages, http://www.ieeevtc.org/vtc2005fall/presentations/paulraj.pdf, Sep. 2005.

Payami S., et al., Channel Measurements and Analysis for Very Large Array Systems At 2.6 GHz, in Proc. 6th European Conference on Antennas and Propagation, EuCAP 2012, Prague, Czech Republic, Mar. 26, 2012, 5 pages.

Per-Erik ., et al., "VDSL2: Next Important Broadband Technology", Ericsson Review No. 1, 2006, pp. 36-47.

Perlman et al., "Distributed-Input Distributed-Output (Dido), Wireless Technology: A New Approach to Multiuser Wireless", Rearden Labs White Paper, 19 pages, Jul. 2011, Retrieved from the Internet: http://www.reardenwireless.com11 0727-DIDOA %20New%20Approach%20to%20Multiuser%20Wireless.pdf.

Perlman, et al., "Distributed-Input Distributed-Output (Dido), Wireless Technology: A New Approach to Multiuser Wireless," Retrieved from http://www.rearden.com/DIDO/DIDO White Paper 110727.pdf, Aug. 2011, 19 pages.

Piazza D., et al., "Design and Evaluation of a Reconfigurable Antenna Array for MIMO Systems", IEEE Transactions on Antennas and Propagation, 2008, vol. 56 (3), pp. 869-881.

Ping-Heng., et al., "Compressive Sensing Based Channel Feedback Protocols for Spatially-Correlated Massive Antenna Arrays", in Proc. IEEE Wireless Communications and Networking Conference (WCNC 2012), Apr. 2012, pp. 492-497.

Pitarokoilis A. et al., "On the Optimality of Single-Carrier Transmission in Large-Scale Antenna Systems," IEEE Wireless Commun. Lett., Aug. 2012, vol. 1, No. 4, pp. 276-279.

Pitarokoilis, "Effect of Oscillator Phase Noise on Uplink Performance of Large MU-MIMO Systems," in Proc. of the 50th Annual Allerton Conference on Communication, Control, and Computing, Oct. 2012, 9 pages.

Pohl V., et al., "Antenna spacing in MIMO indoor channels," IEEE Proc. Veh. Technol. Conf, 2002, vol. 2, pp. 749-753.

Pollock et al., "Antenna Saturation Effects on MIMO Capacity," IEEE International Conference on Communications, 2003, vol. 4, pp. 2301-2305.

Proakis J., "Digital Communications Fourth edition," 2001, pp. 9, Department of Electrical and Computer Engineering, Northeastern University, ISBN 0-07-232111-3, Cover page, Title page, Table of Contents.

Proakis J.G., "Communication System Engineering," Prentice Hall, Table of Contents, 1994, 11 pages.

Qian, "Partially Adaptive Beamforming for Correlated Interference Rejection", IEEE Trans. On Sign. Proc., 1995, vol. 43 (2), pp. 506-515.

Qibi, "A Forward Link Performance Study of the 1 xEV-DO Rev. 0 System Using Field Measurements and Simulations," Lucent Technologies. Retrieved from the Internet: http://www.cdg.org/resources/white%5Fpapers/files/white_papers/files/Lucent%201xEV-DO%20Rev%20O%20Mar%2004.pdf, Mar. 2004, 19 pages.

Qualcomm, "The 1000x Data Challenge, the Latest on Wireless, Voice, Services and Chipset Evolution," 4G World, Oct. 31, 2012, 61 pages, Submitted as Parts 1-3.

Rao R.M., et al., "Multi-antenna testbeds for research and education in wireless communications," IEEE Communications Magazine, 2004, vol. 42 (12), pp. 72-81.

Rapajic P., et al., Information Capacity of Random Signature Multiple-Input Multiple Output Channel, IEEE Trans. Commun., 2000, vol. 48 (8), pp. 1245-1248.

Rappaport T., "Wireless Communications Principles and Practice," 2002, 13 pages, Prentice Hall.

Ravindran N., et al., "MIMO Broadcast Channels with Block Diagonalization and Finite Rate Feedback," IEEE, ICASSP Apr. 2007, pp. III-13-III-16.

Riegler, et al., "Asymptotic Statistics of the Mutual Information for Spatially Correlated Rician Fading MIMO Channels with Interference", IEEE Trans. Inform. Theory, 2010, vol. 56 (4), pp. 1542-1559.

Robinson S., "Toward an Optimal Algorithm for Matrix Multiplication," Nov. 2005, vol. 38 (9), 3 pages.

Ruckus wireless, "Long-range 802.11n (5GHz) Wi-Fi Point-to-Point/Multipoint backhaul," Sep. 4, 2015, 2 pages, Retrieved from the Internet: URL: http://www.ruckuswireless.com/products/ZoneFlex-outdoor7731.

Rusek, et al., "Scaling up MIMO: Opportunities and Challenges with Very Large Arrays", IEEE Signal Proces. Mag., Jan. 2012, vol. 30 (1), pp. 1-30.

Rysavy P., "No silver bullets for FCC, NTIA spectrum challenge", Daily report for executives, Bloomberg BNA, Aug. 2012, pp. 1-4, http://www.rysavy.com/Articles/2012 09 No Spectrum Silver Bullets.pdf.

Saleh A.A.M., et al.,"A Statistical Model for Indoor Multipath Propagation", Institute of Electrical and Electronics Engineers Journal on Selected Areas in Communications, 1987, vol. SAC-5 (2), pp. 128-137.

Schafhuber D et al., "MMSE and Adaptive Prediction of Time-Varying Channels for OFDM Systems", IEEE Trans. Wireless Commun., 2005, vol. 4 (2), pp. 593-602.

Schmidl T.M., et al., "Robust frequency and timing synchronization for OFDM," IEEE Trans. Commun, 1997, vol. 45 (12), pp. 1613-1621.

Schubert M., et al., "Joint 'Dirty Paper' Pre-Coding and Downlink Beamforming," Spread Spectrum Techniques and Applications, 2002 IEEE Seventh International Symposium, Dec. 2002, vol. 2, pp. 536-540.

Schuchert S., et al., "A novel I/Q imbalance compensation scheme for the reception of OFDM signals," IEEE Transaction on Consumer Electronics, 2001, pp. 313-318.

Serpedin E., et al., "Blind channel and carrier frequency offset estimation using periodic modulation precoders," IEEE Signal

(56) References Cited

OTHER PUBLICATIONS

Processing, IEEE Transactions on [see also Acoustics, Speech, and Signal Processing, IEEE Transactions on], 2000, vol. 48 (8), pp. 2389-2405.

Sharif M., et al., "On the capacity of MIMO broadcast channel with partial side information," IEEE Trans. Info. Th, Feb. 2005, vol. 51 (2), pp. 506-522.

Shen Z., et al., "Low complexity user selection algorithms for multiuser MIMO systems with block diagonalization," IEEE Transactions on Signal Processing, 2005, pp. 1-12.

Shen Z., et al., "Sum capacity of multiuser MIMO broadcast channels with block diagonalization," IEEE Trans. Wireless Comm, 2005, 5 pages.

Shepard C., Argos: Practical Many-Antenna Base Stations, in Proc. ACM Int. Conf. Mobile Computing and Networking (MobiCom), Aug. 2012, 12 pages.

Shepard C., ArgosV2: A Flexible Many-Antenna Research Platform, Extended Abstract for demonstration in Proc. ACM Int. Conf. Mobile Computing and Networking (MobiCom), Oct. 2013, 3 pages.

Shi K., et al., "Coarse frame and carrier synchronization of OFDM systems: a new metric and comparison," IEEE Trans. Wireless Commun, 2004, vol. 3 (4), pp. 1271-1284.

Shiu D., et al., "Fading correlation and its effect on the capacity of multielement antenna systems," IEEE Trans. Comm, 2000, vol. 48 (3), pp. 502-513.

Shuangqing Wei., et al., "On the Asymptotic capacity of MIMO Systems with Fixed Length Linear Antenna Arrays," IEEE International Conference on Communications, 2003, vol. 4, pp. 2633-2637.

Simon, M.K., et al., "Digital Communication Over Fading Channels," A Unified Approach to Performance Analysis, Wiley Series in Telecommunications and Signal Processing, 2000, 10 pages.

Simon S.H., et al., "Optimizing MIMO Antenna Systems with Channel Covariance Feedback," IEEE Journal on Selected Areas in Communications, 2003, vol. 2003, pp. 406-417.

Spencer Q H., et al., "Adaptive Antennas and MIMO Systems for Wireless Communications—An Introduction to the Multi-User MIMI Downlink," IEEE Communications Magazine, 2004, pp. 60-67.

Spencer Q H., et al., "Zero-forcing methods for downlink spatial multiplexing in multiuser MIMO channels," IEEE Trans. Sig. Proc, 2004, vol. 52, pp. 461-471.

Srinidhi N., et al., "Layered Tabu Search Algorithm for Large-MIMO Detection and a Lower Bound on ML Performance," IEEE Trans. Commun, 2010, 5 pages.

Srinidhi N., et al., "Layered Tabu Search Algorithm for Large-MIMO Detection and a Lower Bound on ML Performance", IEEE Trans. Commun, vol. 59, No. 11, pp. 2955-2963, Nov. 2011.

Stancil D.D., et al., "Doubling wireless channel capacity using co-polarised, co-located electric and magnetic dipoles", Electronics Letters, 2002, vol. 38 (14), pp. 746-747.

Stanley M., "Mobile Data Wave: Who Dares to Invest, Wins," Jun. 13, 2012, 23 pages.

Sternad M., et al., "Channel Estimation and Prediction for Adaptive OFDM Downlinks [Vehicular Applications]," in Proceeding IEEE Vehicular Technology Conference, vol. 2, Oct. 2003, pp. 1283-1287.

Stoytchev M., et al., "Compact antenna arrays for MIMO applications," IEEE Proc. IEEE Antennas and Prop. Symp., 2001, vol. 3, pp. 708-711.

Strangeways H., "Determination of the Correlation Distance for Spaced Antennas on Multipath HF Links and Implications for Design of SIMO and MIMO Systems," School of Electronic and Electrical Engineering, University of Leeds, IEEE First European Conf. on Antennas and Prop., 12 pages.

Strangways H.J., "Investigation of signal correlation for spaced and co-located antennas on multipath HF links and implications for the design of SIMO and MIMO system," IEEE First European Conf. on Antennas and Propagation (EuCAP 2006), Nov. 2006, pp. 1-6.

Strohmer T., "Application of Time-Reversal with MMSE Equalizer to UWB Communication," Proc. of IEEE Globecom, 2004, vol. 5, pp. 3123-3127.

Studer C., et al., "PAR-Aware Large-Scale Multi-User MIMO-OFDM Downlink", IEEE J. Sel. Areas Commun., Sep. 4, 2012, vol. 31 (2), pp. 303-313.

Sulonen K., et al. "Comparison of MIMO Antenna Configurations in Picocell and Microcell Environments," IEEE Journal on Selected Areas in Communications, 2003, vol. 21 (5), pp. 703-712.

Suraweera H.A., et al., Multi-Pair Amplify-and-Forward Relaying with Very Large Antenna Arrays, Proceedings in IEEE International Conference on Communications (ICC), Budapest, Hungary, Jun. 2013, 7 pages.

Suthisopapan P., et al., "Near Capacity Approaching Capacity of Large MIMO Systems by Non-Binary LDPC Codes and MMSE Detection", in Proc. of the IEEE International Symposium on Information Theory, Mar. 2012, 7 pages.

Suzuki H., et al., Highly Spectrally Efficient Ngara Rural Wireless Broadband Access Demonstrator, Proceedings in IEEE International Symposium on Communications and Information Technologies (ISCIT), Oct. 2012, 6 pages.

Suzuki H., et al., Large-scale multiple antenna fixed wireless systems for rural areas, Proceedings in IEEE PIMRC, Sep. 2012, 6 pages.

Svac P., et al., Soft-Heuristic Detectors for Large MIMO Systems, IEEE Trans. Signal Processing, 2013, vol. 61 (18), pp. 4573-4586.

Svantesson T., et al., "Analysis of Electromagnetic Field Polarizations in Multiantenna Systems," IEEE Transactions on Wireless Communications, vol. 3 (2), Mar. 2004, pp. 641-646.

Svantesson T., et al., "On Capacity and Correlation of Multi-Antenna Systems Employing Multiple Polarizations," IEEE Antennas and Propagation Society, 2002, vol. 3, pp. 202-205.

Takeuchi K., et al. "On an Achievable Rate of Large Rayleigh Block-Fading MIMO Channels with No CSI," IEEE Transactions on Information Theory, 2011, 47 pages.

Taluja P S., et al., Diversity Limits of Compact Broadband Multi-Antenna Systems, IEEE J. Sel. Areas Communication, 2013, vol. 31 (2), pp. 326-337.

Tang T., et al., "Joint frequency offset estimation and interference cancellation for MIMO-OFDM systems [mobile radio]," 2004 IEEE 60th Vehicular Technology Conference, VTC2004-Fal, 2004, vol. 3, pp. 1553-1557.

Tanumay Datta., et al., "A Novel Monte-Carlo-Sampling-Based Receiver for Large-Scale Uplink Multiuser MIMO Systems," IEEE Transactions on Vehicular Technology, 2013, vol. 62(7), pp. 3019-3038.

Taricco G., et al., "Asymptotic Mutual Information Statistics of Separately-Correlated Rician Fading MIMO Channels," IEEE Trans. Inform. Theory, Aug. 2008, vol. 54 (8), pp. 3490-3504.

Tarighat A., et al., "Compensation schemes and performance analysis of IQ imbalances in OFDM receivers," IEEE Signal Processing, Transactions on [see also Acoustics, Speech, and Signal Processing, IEEE Transactions on], 2005, vol. 53, pp. 3257-3268.

Tarokh V., et al., "Space-time block codes from orthogonal designs," IEEE Trans. Info, 1999, vol. 45, pp. 1456-1467.

Tarokh V., et al., "Space-Time Codes for High Data Rate Wireless Communication: Performance Criterion and Code Construction," IEEE Transactions on Information Theory, 1998, vol. 44, pp. 744-765.

Teletar I.E., "Capacity of Multi-antenna Gaussian Channels," European Transactions on Telecommunications, vol. 10, Nov. 1999, pp. 1-28.

Teukolsky S.A., Numerical Recipes in C: The Art of Scientific Computing, Cambridge University Press, 1992, 949 pages.

The White House, "Presidential Memorandum: Unleashing the Wireless Broadband Revolution", [retrieved on Jun. 28, 2010] Retrieved from the Internet: URL: http://www.whitehouse.gov/the-press-office/presidential-memorandum-unleashing-wireless-broadband-revolution.

Tomlinson M., "New Automatic Equaliser Employing Modulo Arithmetic," Electronics Letters, 1971, vol. 7 (5/6), pp. 138-139.

(56) References Cited

OTHER PUBLICATIONS

Tran L.N., et al. "A Conic Quadratic Programming Approach to Physical Layer Multicasting for Large-Scale Antenna Arrays," IEEE Signal Processing Letters, Jan. 1, 2014, vol. 21 (1), pp. 114-117.

Truong K.T., et al., "The Viability of Distributed Antennas for Massive MIMO Systems," Proceedings of the Asilomar Conference on Signals, Systems, and Computers, Pacific Grove, CA, Nov. 3-6, 2013, pp. 1318-1323.

Tsakalaki E. P., et al., On the Beamforming Performance of Large-Scale Antenna Arrays, Proc. Loughborough Antennas and Propagation Conference (LAPC), Nov. 12-13, 2012, 4 pages.

Tse D et al., "Diversity-multiplexing tradeoff in multiple-access channels", IEEE Trans. Info. Th., Mar. 2004, vol. 50 (9), pp. 1859-1874.

Tse et al., "Performance Tradeoffs between Maximum Ratio Transmission and Switched-Transmit Diversity," in Proc. 11th IEEE International Symposium on Personal, Indoor and Mobile Radio Communication, vol. 2, Sep. 2000, pp. 1485-1489.

Tureli U., et al., "OFDM blind carrier offset estimation: ESPRIT," IEEE Trans. Commun, 2000, vol. 48 (9), pp. 1459-1461.

Tyler N., et al., "Adaptive antennas: the Calibration Problem", IEEE Comm. Mag., pp. 114-122, Dec. 2004.

Ubuquiti, "airFiber", downloaded from http://www.ubnt.com/airfiber on Sep. 4, 2015, 10 pages.

Ubuquiti, "airMAX", [online], Retrieved from the Internet: http:www.ubnt.comairmax, 2015, 10 pages.

Uthansakul P., et al., MIMO antenna selection using CSI from reciprocal channel, Int. Journal of Elect. And Info. Eng., 2010, vol. 4 (10), pp. 482-491.

Valkama M., et al., "Advanced methods for I/Q imbalance compensation in communication receivers," IEEE Transactions on Signal Processing, vol. 49, No. 10, 2001, pp. 2335-2344.

Van B.D. et al.,"Beamforming: A Versatile Approach to Spatial Filtering," IEEE ASSP Magazine, 1988, pp. 4-24.

Van De Beek J., et al., "ML estimation of time and frequency offset in OFDM systems," IEEE Transactions, Signal Processing, 1997, vol. 45 (7), pp. 1800-1805.

Vance, "Steve Perlman's wireless fix", BusinessWeek, Jul. 2011, 10 pages [online], retrieved from the Internet: URL:http://www.businessweek.com/magazine/the-edison-of-silicon-valley-07272011.html.

Vaughan R.G., "On Optimum Combining at the Mobile," IEEE Transactions on Vehicular Technology, Nov. 1988, vol. 37(4), pp. 181-188.

Vaughn R., et al., "Switched parasitic elements for antenna diversity," IEEE Transactions on Antennas and Propagation, 1999, vol. 47, pp. 399-405.

Venkatesan et al., "Network MIMO: Overcoming InterCell Interference in Indoor Wireless Systems," ASILOMAR Conference on Signals, 2007, vol. 2007, pp. 83-87.

Venkatesan S., et al., "A WiMAX-Based Implementation of Network MIMO for Indoor Wireless Systems," EURASIP Journal on Advances in Signal Processing, 2009, vol. 2009, 11 pages.

Vieira J., et al., "A flexible 100-antenna testbed for Massive MIMO," in Proc IEEE Globecom 2014 Workshop—Massive MIMO: From Theory to Practice, Austin, Texas, USA, Dec. 2014, pp. 287-293.

Vishwanath S., "Duality, Achievable Rates, and Sum-Rate Capacity of Gaussian MIMO Broadcast Channels," IEEE Trans. Info. Th, 2003, vol. 49 (10), pp. 2658-2668.

Visotsky E., et al., "Space-Time Transmit Precoding with Imperfect Feedback," IEEE Transactions on Information Theory, 2001, vol. 47, pp. 2632-2639.

Visuri et al "Colocated Antenna Arrays: Design Desiderata for Wireless Communications," 2002, vol. 2002, pp. 580-584.

Viswanath P., et al., "Opportunistic beamforming using dump antennas," IEEE Transactions on Information Theory, 2002, vol. 48, pp. 1277-1294.

Viswanath, "Sum Capacity of the Vector Gaussian Broadcast Channel and Uplink-Downlink Duality," IEEE Transactions on Information Theory, 2003, vol. 49 (8), pp. 1912-1921.

Wagner et al., "Large System Analysis of Linear Precoding in MISO Broadcast Channels with Limited Feedback," IEEE Transactions on Information Theory, 2012, vol. 58(7), pp. 4509-4537.

Waldschmidt C., et al., "Compact MIMO-arrays based on polarisation-diversity", Proc. IEEE Antennas and Prop. Symp., 2003, vol. 2, pp. 499-502.

Waldschmidt C., et al., "Complete RF system model for analysis of compact MIMO arrays," IEEE Trans. on Vehicular Technologies, 2004, vol. 53, pp. 579-586.

Wallace J W., et al., "Termination-dependent diversity performance of coupled antennas: Network theory analysis," IEEE Transactions on Antennas and Propagation, 2004, vol. 52, pp. 98-105.

Wallace J.W., et al., "Statistical Characteristics of Measured MIMO Wireless Channel Data and Comparison to Conventional Models," Proceedings IEEE Vehicular Technology Conference, Oct. 2001, vol. 2 (7-11), pp. 1078-1082.

Wang Z., "Performance of Uplink Multiuser Massive MIMO system," International Conference on Acoustics Speech and Signal Processing, Florence, Italy, Nov. 6, 2013, 5 pages.

Wannstrom J., "Carrier Aggregation Explained," 3GPP, Jun. 2013, 6 pages, Retrieved from the Internet: URL: http://www.3gpp.org/Carrier-Aggregation-explained.

Warrington et al., "Measurement and Modeling of HF Channel Directional Spread Characteristics for Northerly Path," Radio Science, RS2006, 2006, vol. 41, pp. 1-13.

Webpass, Buildings online, printed on Sep. 4, 2015, Retrieved from the Internet: http://www.webpass.net/buildings?city=san+francisco&column=address&order=asc, 3 pages.

Weedon W.H., et al., "MEMS—Switched Reconfigurable Antennas," IEEE Antennas and Propagation Society, AP-S International Symposium (Digest), vol. 3, 2001, pp. 654-657.

Wen C K., et al., "Asymptotic Mutual Information for Rician MIMO-MA Channels with Arbitrary Inputs: A Replica Analysis", IEEE Trans. Commun., 2010, vol. 58 (10), pp. 2782-2788.

Wen C K., et al., "On the Sum-Rate of Multiuser MIMO Uplink Channels with Jointly-Correlated Rician fading", IEEE Trans. Commun., 2011, vol. 59 (10), pp. 2883-2895.

Wennestrom et al., "An Antenna Solution for MIMO Channels: The Switched Parasitic Antenna," IEEE International Symposium on Personal, Indoor and Mobile Radio Communications, PIMRC, vol. 1, 2001, pp. 159-163.

Wheeler H A., et al., "Small antennas," IEEE Transactions on Antennas and Propagation, 1975, vol. AP-23 (4), pp. 462-469.

Wi-Fi alliance, homepage, pp. 1-3, printed on Aug. 14, 2014, Retrieved from the Internet: URL: www.wi-fi.org.

Wi-Fi alliance, "Wi-Fi certified makes it Wi-Fi" 2009, http://www.wi-fi.org/files/WFA_Certification_Overview_WP_en.pdf, 1 page.

Wikipedia, 2014, 6 pages [online]. "IS-95" Retrieved from the Internet: URL: http:en.wikipedia.orgwikiIS-95.

Wikipedia, Advanced Mobile Phone System. 2014, 6 pages [online]. Retrieved from the Internet: URL: https://en.wikipedia.org/wiki/AdvancedMobilePhoneSystem.

WiMAX forum, 1 page, Aug. 14, 2014 http://www.wimaxforum.org/.

Wired, Has OnLive's Steve Perlman Discovered Holy Grail of Wireless?, Jun. 30, 2011 Retrieved from the Internet: http:www.wired.comepicenter201106perlman-holy-grail-wireless.

Wong I., et al., "Long Range Channel Prediction for Adaptive OFDM Systems," Proceedings IEEE Asilomar Conf. on Signals, Systems, and Computers, vol. 1,pp. 723-736, Pacific Grove, CA, USA, Nov. 7-10, 2004.

Wong I.C., et al., "Exploiting Spatia-Temporal Correlations in MIMO Wireless Channel Prediction," Dec. 2006, IEEE Globecom Conference, 5 pages.

Wong, I.C., et al., "Joint Channel Estimation and Prediction for OFDM Systems," Proceedings in IEEE Global Telecommunications Conference, St. Louis, MO, 2005, pp. 2255-2259.

Wong K., et al., "A Joint-Channel Diagonalization for Multiuser MIMO Antenna Systems," IEEE Transactions on Wireless Communications, 2003, vol. 2 (4), pp. 773-786.

(56) References Cited

OTHER PUBLICATIONS

Wong, "Performance Enhancement of Multiuser MIMO Wireless Communication Systems," IEEE Transactions on Communications, 2002, vol. 50 (12), pp. 1960-1970.

Wu M., et al., "Approximate Matrix Inversion for High-Throughput Data Detection in the Large-scale MIMO Uplink," IEEE International Symposium on Circuits and Systems (ISCAS), May 2013, pp. 2155-2158.

Xiao L., et al., "A Comparative Study of MIMO Capacity with Different Antenna Topologies," IEEE ICCS'02, vol. 1, Nov. 2002, pp. 431-435.

Xu J., "LTE-Advanced Signal Generation and Measurements using SystemVue," Agilent Technologies, Dec. 23, 2010, 46 pages.

Yang W., et al., "On the Capacity of Large-MIMO Block-Fading Channels," IEEE Journal on Selected Areas in Communications, Sep. 30, 2012, vol. 31(2), pp. 1-16.

Yin B., et al., "Full-Duplex in Large-Scale Wireless System," Proceeding of the Asilomar Conference on Signals, Systems and Computers, 2013, 5 pages.

Yin B., et al., "Implementation trade-offs for linear detection in large-scale MIMO systems," Proceeding Institute of Electrical and Electronics Engineers International Conference on Acoustics Speech, and Signal Processing, 2013, 5 pages.

Yin H., et al., A Coordinated Approach to Channel Estimation in Large-scale Multiple-antenna Systems, IEEE Journal on Selected Areas in Communications, Sep. 2, 2012, vol. 31 (2), pp. 1-10.

Yoo, et al., "Multi-antenna broadcast channels with limited feedback and user selection," Draft Version, Jun. 8, 2006 of IEEE Journal on Sel. Areas in Communications, vol. 25, Jul. 2007, pp. 1478-1491, 36 pages.

Yoo, "Multi-Antenna Downlink Channels with Limited Feedback and User Selection," IEEE Journal on Selected Areas in Communications, Sep. 2007, vol. 25 (7), pp. 1478-1491.

Yu, "Sum Capacity of Gaussian Vector Broadcast Channels," IEEE Transactions on Information Theory, 2004, vol. 50 (9), pp. 1875-1892.

Yu W., et al., "Trellis Precoding for the Broadcast Channel," IEEE GLOBECOM, 2001, vol. 2, pp. 1344-1348.

Zaidel B., et al., "Vector Preceding for Gaussian MIMO Broadcast Channels: Impact of Replica Symmetry Breaking", Institute of Electrical and Electronics Engineers Transactions on Information Theory, Mar. 2012, vol. 58 (3), pp. 1413-1440.

Zakhour R., et al., "Min-Max Fair Coordinated Beamforming via Large Systems Analysis,", in Proc. of the IEEE International Symposium on Information Theory, St. Petersburg, Jul. 2011.

Zamir R ., et al., "Capacity and lattice-strategies for cancelling known interference," Proceedings of International Symposium on Information Theory, Honolulu, Hawaii, Nov. 2000, pp. 1-32.

Zetterberg P., "Experimental Investigation of TDD Reciprocity based Zero-Forcing Transmit Precoding", EURASIP, Jun. 2010.

Zhang, "Coordinated Multi-Cell MIMO Systems with Cellular Block Diagonalization," IEEE, 2007, pp. 1669-1673.

Zhang J., et al., "Hermitian Precoding for Distributed MIMO Systems with Individual Channel State Information," IEEE Journal on Selected Areas in Communications, 2013, vol. 31 (2), pp. 241-250.

Zhang J., et al. "On Capacity of Large-Scale MIMO Multiple Access Channels with Distributed Sets of Correlated Antennas," IEEE Journal on Selected Areas in Communications, Sep. 26, 2012, vol. 31 (2), pp. 1-52.

Zhang, "Networked MIMO with Clustered Linear," IEEE Transactions on Wireless Communications, 2009, vol. 8 (4), pp. 1910-1921.

Zhang R., et al. Electromagnetic Lens-focusing Antenna Enabled Massive MIMO, Jun. 6, 2013, pp. 1-7.

Zheng L., et al., "Diversity and multiplexing: a fundamental tradeoff in multiple antenna channels," IEEE Trans. Info. Th., 2003, vol. 49 (5), pp. 1073-1096.

Zhou Q., et al., "An Improved LR-aided K-Best Algorithm for MIMO Detection," in Proc. IEEE International Conference on Wireless Communications and Signal Processing (WCSP), Oct. 2012, 5 pages.

Zhuang X., et al., "Channel models for link and system level simulations," IEEE 802.16 Broadband Wireless Access Working Group, 2004, 15 pages.

Zogg, "Multipath Delay Spread in a Hilly Region at 210 MHz," IEEE Transactions on Vehicular Technology, 1987, vol. VT-36 (4), pp. 184-187.

Zou R., et al., "Li Reducing the Complexity of Quasi-Maximum-Likelihood Detectors Through Companding for Coded MIMO Systems," IEEE Transactions on Vehicular Technology, Mar. 2012, vol. 2012, pp. 1109-1123.

Zyren J., "Overview on the 3GPP Long Term Evolution Physical Layer," Freescale White Paper, Jul. 2007, 27 pages.

3GPP TR 36.819, "3rd Generation Partnership Project; Technical Specification Group Radio Access Network; Coordinated multipoint operation for LTE physical layer aspects (Release 11)," Dec. 20, 2011, 69 pages.

Akbudak T., et al., "CoMP in Heterogeneous networks: A Low-Complexity Linear Transceiver Design," Workshop on Cooperative and Cognitice Mobile Networks, Communications (ICC), 2012 IEEE International Conference on, IEEE, Jun. 10, 2012, pp. 5624-5629.

Besson O., et al., "On parameter estimation of MIMO flat-fading channels with frequency offsets," IEEE Transactions on Transaction, Signal Processing, see also Acoustics, Speech, and Signal Processing, vol. 51 (3), 2003, pp. 602-613.

Choi J., et al., "Interpolation Based Unitary Precoding for Spatial Multiplexing MIMO-OFDM with Limited Feedback," Global Telecommunications Conference 2004 (GLOBECOM '04), IEEE, Dec. 3, 2004, pp. 214-218.

Dietrich C B., et al., "Spatial, polarization, and pattern diversity for wireless handheld terminals," Proc. IEEE Antennas and Prop. Symp, 2001, vol. 49, pp. 1271-1281.

ETSI Reconfigurable Radio Systems: Status and Future Directions on Software Defined Radio and Cognitive Radio Standards, IEEE Communications Magazine, IEEE Service Center, Sep. 2010, vol. 48 (9), pp. 78-86.

Gesbert D., et al., "From Theory to Practice: An Overview of MIMO Space—Time Coded Wireless Systems," IEEE Journal on Selected Areas in Communications, 2003, vol. 21 (3), pp. 281-302.

Gesbert D., et al., "Multi-Cell MIMO Cooperative Networks: A New Look at Interference," IEEE Journal on Selected Areas in Communications, Dec. 2010, vol. 28 (9), pp. 1380-1408.

Gesbert D., et al., "Outdoor MIMO Wireless Channels: Models and Performance Prediction," IEEE Transactions on Communications, 2002, vol. 50 (12), pp. 1926-1934.

Guillaud M., et al., "A Specular Approach to MIMO Frequency selective Channel Tracking and Prediction," Fifth IEEE Workshop on Signal Processing Advances in Wireless Communications, Jul. 11-14, 2004, pp. 59-63.

Kamata H., et. al, "Effects of IQ Imbalance and an Effective Compensation Scheme in the MIMO-OFDM Communication System," Proceedings of the 2005 Institute of Electronics, Information and Communication General Conference, Mar. 7, 2005, B-5-90, 5 pages.

Kellerman F C., "LDPC OFDM Space-Time Multipath Fading Channel Results," Proceedings SPIE, Digital Wireless Communications, XP-002672064, Jul. 2003, vol. 5100, pp. 19-30.

Khaled N., et al., "Interpolation Based Multi-Mode Precoding for MIMO-OFDM Systems with Limited Feedback," IEEE Transactions on Wireless Communications, vol. 6 (3), Mar. 2007, pp. 1003-1013.

Kumagawa S., et al., "A Study of Introducing Distributed Transmit Power Control to Distributed Antenna System," 2011, 30 pages.

Lee D., et al., "Coordinated Multipoint Transmission and Reception in LTE-Advanced: Deployment Scenarios and Operational Challenges," IEEE Communications Magazine, Feb. 2012, pp. 148-155.

Pan, et al., "Precoding and Power allocation for Cooperative MIMO systems," International Conference on Wireless Communications, Networking and Mobile Computing, IEEE, 2006, 4 pages.

(56) References Cited

OTHER PUBLICATIONS

Rao R., et al., "I/Q mismatch cancellation for MIMO-OFDM systems in Personal, Indoor and Mobile Radio Communication," PIMRC, vol. 4, 2004, pp. 2710-2714.
"Reconfigurable Radio Systems (RRS), Radio Base Station (RBS), Software Defined Radio (SDR)," Status Implementations and Costs Aspects Including Future Possibilities, Technical Report, ETSI, No. V1.1.1, 2009, 24 pages.
Samsung: "Discussion on open-loop CoMP schemes", 3GPP Draft; R1-093377 Open-Loop Comp, 3rd Generation Partnership Project (3GPP), Mobile Competence Centre; 650, Route Des Lucioles ; F-06921 Sophia-Antipolis Cedex, France, Aug. 19, 2009, 4 pages.
Huawei, et al., "CoMP Clarification of definitions and TP," R1-084351, Nov. 10-14, 2008, 3GPP TSG RAN WG1 Meeting #55, 7 pages.
Mitsubishi Electric, "Leakage-based Precoding for CoMP in LTE-A," 3GPP RAN1#56, R1-090596, Feb. 9-13, 2009, 14 pages.
Panasonic, "Target scenarios for new carrier types," 3GPP TSG-RAN WGI#72, R1-130684, Jan. 28, 2013-Feb. 1, 2013, 7 pages.
Texas Instruments, "Aspects of Coordinated Multi-Point Transmission for Advanced E-UTRA," Nov. 11-15, 2008, 3GPP TSG RAN WG1 #55, R1-084444, 5 pages.
Tarighat, et al., "MIMO OFDM receivers for systems with IQ imbalances," IEEE Trans. Sig. Pro, for orthogonal space-time block codes (OSTBC), 2005, vol. 53, pp. 3583-3596.
Wang Z., et al., "Enhanced downlink MU-Comp schemes for TD-LTE-Advanced," Wireless Communications and Networking Conference (WCNC), IEEE, 2010, 6 pages.
Zhang H., et al., "Cochannel Interference Mitigation and Cooperative Processing in Downlink Multicell Multiuser MIMO Networks," EURASIP Journal on Wireless Communications and Networking, vol. 2004 (2), Jul. 2004, pp. 222-235.
Abandonment from U.S. Appl. No. 13/475,598, dated Feb. 8, 2016, 1 page.
Abandonment from U.S. Appl. No. 14/086,700, dated Dec. 26, 2017, 2 pages.
Advisory Action for U.S. Appl. No. 12/802,989, dated May 4, 2017, 3 pages.
Communication Pursuant to Article 94(3) EPC for Application No. 13790935.4, dated Feb. 4, 2019, 11 pages.
Communication pursuant to Article 94(3) EPC for European Application No. 08798313.6, dated May 2, 2017, 7 pages.
Communication pursuant to Article 94(3) EPC for European Application No. 10156950.7, dated May 9, 2017, 9 pages.
Communication pursuant to Article 94(3) EPC from foreign counterpart European Application No. 10156954, dated Jan. 25, 2017, 5 pages.
Communication Pursuant to Article 94(3) EPC from foreign counterpart European Application No. 13784690.3, dated Aug. 23, 2018, 6 pages.
Communication pursuant to Article 94(3) EPC from foreign counterpart European Application No. 13856705.2, dated Jul. 18, 2017, 5 pages.
Communication under rule 71(3) EPC from foreign counterpart European Application No. 08798313.6, dated Oct. 24, 2017, 8 pages.
Corrected Notice of Allowability from U.S. Appl. No. 15/057,002, dated Jun. 3, 2019, 11 pages.
Corrected Notice of Allowance from U.S. Appl. No. 13/797,984, dated Feb. 8, 2018, 4 pages.
Decision of Grant a Patent from foreign counterpart Japanese Application No. 2016120928, dated Apr. 10, 2017, 6 pages.
Decision of Grant from foreign counterpart Japanese Patent Application No. 2015-510498, dated Jun. 14, 2017, 6 pages.
Decision of Grant from foreign counterpart Russian Patent Application No. 2014151216, dated Jan. 31, 2017, 18 pages.
Decision of Refusal from foreign counterpart Japanese Patent Application No. 2014530763, dated Dec. 19, 2016, 6 pages.
Decision of Refusal from foreign counterpart Korean Patent Application No. 2010-7006265, dated Apr. 23, 2015, 2 pages.
Decision to Grant a Patent from foreign counterpart Japanese Patent Application No. 2017-082862, dated Dec. 10, 2018, 7 pages.
Decision to Grant a patent from foreign counterpart Japanese Patent Application No. 2017-110950, dated Nov. 15, 2017, 6 pages.
European Search Report for Application No. 10156954.9-2411, dated Sep. 2, 2010, 5 pages.
Examination Report from counterpart Australian Patent Application No. AU2014200745, dated Sep. 25, 2015, 3 pages.
Examination Report from foreign counterpart Australian Patent Application No. 2016219662, dated Sep. 9, 2016, 2 pages.
Examination Report from foreign counterpart New Zealand Patent Application No. 622137, dated Dec. 21, 2016, 3 pages.
Examination Report No. 1 from Foreign Counterpart Australian Patent Application No. 2012308632, dated Oct. 11, 2016, 3 pages.
Examination report No. 1 from foreign counterpart Australian Patent Application No. 2015248161, dated Jul. 2, 2018, 5 pages.
Examination Report No. 2 from Foreign Counterpart Australian Patent Application No. 2012308632, dated Jun. 6, 2017, 5 pages.
Examination report No. 4 from foreign counterpart Australian Patent Application No. 2013347803, dated Jan. 25, 2018, 6 pages.
Examiner's Report from foreign counterpart Australian Patent Application No. 2013256044, dated May 9, 2016, 2 pages.
Examiner's Report from foreign counterpart Canadian Patent Application No. 2539333, dated Dec. 4, 2012, 15 pages.
Examiner's Report from foreign counterpart Canadian Patent Application No. 28656772, dated Jan. 7, 2016, 3 pages.
Examiner's Report from foreign counterpart Canadian Patent Application No. CN2695799, dated Apr. 1, 2015, 4 pages.
Extended European Search Report for Application No. 08798313.6, dated Nov. 14, 2012, 10 pages.
Extended European Search Report for Application No. 10156950.7, dated Jun. 11, 2012, 10 pages.
Extended European Search Report for Application No. 10184659.0, dated Nov. 29, 2012, 8 pages.
Extended European Search Report for Application No. 11838640.8, dated May 31, 2017, 15 pages.
Extended European Search Report for Application No. 13843203.4, dated Feb. 15, 2016, 8 pages.
Extended European Search Report for Application No. 13856705.2, dated Mar. 2, 2016, 10 pages.
Extended European Search Report for Application No. 14770916.6, dated Jan. 24, 2017, 12 pages.
Extended European Search Report for Application No. 14779084.4, dated Sep. 29, 2016, 8 pages.
Extended European Search Report for Application No. 15746217.7, dated Jan. 22, 2018, 18 pages.
Extended European Search Report for Application No. 18186156.8, dated Nov. 26, 2018, 7 pages.
Extended European Search Report for Application No. EP05254757, dated Sep. 13, 2005, 9 pages.
Extended European Search Report for Application No. EP13790935. 4, dated Dec. 1, 2015, 9 pages.
Extended European Search Report for Application No. 15780522.7, dated Feb. 6, 2018, 13 pages.
Extended Search Report from counterpart European Patent Application No. EP13784690.3, dated Nov. 23, 2015, 4 pages.
Final Office Action from foreign counterpart Japanese Application No. 2005223345, dated May 12, 2011, 9 Pages.
Final Office Action from U.S. Appl. No. 14/086,700, dated Oct. 14, 2016, 11 pages.
Final Office Action from U.S. Appl. No. 10/817,731, dated Jul. 9, 2008, 21 pages.
Final Office Action from U.S. Appl. No. 10/817,731, dated Sep. 11, 2009, 36 pages.
Final Office Action from U.S. Appl. No. 12/630,627, dated Apr. 2, 2013, 23 pages.
Final Office Action from U.S. Appl. No. 12/630,627, dated Oct. 20, 2011, 13 pages.
Final Office Action from U.S. Appl. No. 12/802,958, dated Apr. 15, 2015, 24 pages.
Final Office Action from U.S. Appl. No. 12/802,958, dated Apr. 29, 2016, 33 pages.

(56) References Cited

OTHER PUBLICATIONS

Final Office Action from U.S. Appl. No. 12/802,958, dated Jun. 7, 2017, 18 pages.
Final Office Action from U.S. Appl. No. 12/802,958, dated Jun. 25, 2013, 48 pages.
Final Office Action from U.S. Appl. No. 12/802,974, dated Aug. 1, 2014, 23 pages.
Final Office Action from U.S. Appl. No. 12/802,974, dated Nov. 30, 2015, 22 pages.
Final Office Action from U.S. Appl. No. 12/802,975, dated Aug. 4, 2014, 40 pages.
Final Office Action from U.S. Appl. No. 12/802,975, dated Dec. 14, 2015, 26 pages.
Final Office Action from U.S. Appl. No. 12/802,975, dated Dec. 22, 2016, 29 pages.
Final Office Action from U.S. Appl. No. 12/802,988, dated Aug. 2, 2013, 13 pages.
Final Office Action from U.S. Appl. No. 12/802,988, dated Feb. 8, 2017, 13 pages.
Final Office Action from U.S. Appl. No. 12/802,988, dated Jan. 13, 2016, 11 pages.
Final Office Action from U.S. Appl. No. 12/802,988, dated Jan. 22, 2018, 11 pages.
Final Office Action from U.S. Appl. No. 12/802,988, dated Oct. 21, 2014, 13 pages.
Final Office Action from U.S. Appl. No. 12/802,988, dated Sep. 5, 2012, 8 pages.
Final Office Action from U.S. Appl. No. 12/802,989, dated Aug. 25, 2015, 24 pages.
Final Office Action from U.S. Appl. No. 12/802,989, dated Jun. 12, 2014, 17 pages.
Final Office Action from U.S. Appl. No. 12/802,989, dated Nov. 2, 2016, 14 pages.
Final Office Action from U.S. Appl. No. 12/802,989, dated Nov. 27, 2012, 12 pages.
Final Office Action from U.S. Appl. No. 13/232,996, dated Apr. 11, 2017, 149 pages.
Final Office Action from U.S. Appl. No. 13/232,996, dated Jul. 31, 2013, 12 pages.
Final Office Action from U.S. Appl. No. 13/232,996, dated Mar. 21, 2018, 20 pages.
Final Office Action from U.S. Appl. No. 13/232,996, dated Nov. 12, 2015, 14 pages.
Final Office Action from U.S. Appl. No. 13/232,996, dated Oct. 23, 2014, 15 pages.
Final Office Action from U.S. Appl. No. 13/233,006, dated Dec. 19, 2017, 114 pages.
Final Office Action from U.S. Appl. No. 13/233,006, dated Feb. 18, 2014, 18 pages.
Final Office Action from U.S. Appl. No. 13/233,006, dated Nov. 5, 2015, 10 pages.
Final Office Action from U.S. Appl. No. 13/233,006, dated Oct. 12, 2016, 10 pages.
Final Office Action from U.S. Appl. No. 13/464,648, dated Aug. 1, 2013, 10 pages.
Final Office Action from U.S. Appl. No. 13/475,598, dated Aug. 27, 2014, 30 pages.
Final Office Action from U.S. Appl. No. 13/797,950, dated Aug. 24, 2017, 74 pages.
Final Office Action from U.S. Appl. No. 13/797,950, dated Feb. 2, 2016, 65 pages.
Final Office Action from U.S. Appl. No. 13/797,971, dated Oct. 9, 2015, 52 pages.
Final Office Action from U.S. Appl. No. 13/797,984, dated Sep. 29, 2016, 13 pages.
Final Office Action from U.S. Appl. No. 13/797,984, dated Aug. 20, 2015, 15 pages.
Final Office Action from U.S. Appl. No. 13/844,355, dated Aug. 12, 2015, 20 pages.
Final Office Action from U.S. Appl. No. 13/844,355, dated Dec. 15, 2016, 23 pages.
Final Office Action from U.S. Appl. No. 13/844,355, dated Feb. 7, 2018, 24 pages.
Final Office Action from U.S. Appl. No. 14/023,302, dated Mar. 2, 2015, 5 pages.
Final Office Action from U.S. Appl. No. 14/086,700, dated Sep. 2, 2015, 9 pages.
Final Office Action from U.S. Appl. No. 14/611,565, dated Jun. 16, 2016, 22 pages.
Final Office Action from U.S. Appl. No. 14/611,565, dated Oct. 25, 2017, 25 pages.
Final Office Action from U.S. Appl. No. 14/672,014, dated Oct. 16, 2017, 9 pages.
Final Office Action from U.S. Appl. No. 15/181,383, dated Jan. 11, 2018, 8 pages.
Final Office Action with partial English translation for Japanese Patent Application No. 2005223345, dated Feb. 18, 2014, 23 pages.
First Exam Report from foreign counterpart New Zealand Application No. 701567, dated Feb. 3, 2016, 4 pages.
First Exam Report from foreign counterpart New Zealand Application No. 701691, dated Feb. 10, 2016, 4 pages.
First Exam Report from foreign counterpart New Zealand Patent Application No. 717370, dated Apr. 8, 2016, 2 pages.
First Examination Report from foreign counterpart Australian Patent Application No. 2014248533, dated Mar. 1, 2017, 5 pages.
First Examination Report from foreign counterpart New Zealand Application No. 729017, dated Jun. 30, 2017, 3 pages.
First Examination Report from foreign counterpart New Zealand Patent Application No. 728719, dated May 31, 2017, 4 pages.
First Examination Report mailed for counterpart Australian Patent Application No. AU2011323559, datd Sep. 30, 2015, 3 pages.
First Examination Report mailed for foreign counterpart New Zealand Patent Application No. 622137, dated Aug. 28, 2014, 2 pages.
First Office Action and Search Report from foreign counterpart Chinese Patent Application No. 201210466082X, dated Apr. 3, 2015, 26 pages.
First Office Action and Search report from foreign counterpart Chinese Patent Application No. 201380026522.2, dated Mar. 27, 2017, 20 pages.
First Office Action and Search Report from foreign counterpart Chinese Patent Application No. 201580007666.2, dated Jan. 11, 2019, 13 pages.
First Office Action and Search Report from foreign counterpart Taiwan Application No. 100139880, dated Feb. 26, 2016, 27 pages.
First Office Action for counterpart Japan Patent Application No. JP2014264325, dated Nov. 12, 2015, 4 pages.
First Office Action from counterpart China Patent Application No. 200880102933.4, dated Dec. 7, 2012, 20 pages.
First Office Action from European Patent Application No. 05254757.7, dated Dec. 3, 2012, 6 pages.
First Office Action from foreign counterpart European Patent Application No. 12762167.0, dated Jan. 4, 2016, 4 pages.
First Office Action from foreign counterpart European Patent Application No. 201380035543.0, dated Feb. 15, 2016, 8 pages.
First Office Action from foreign counterpart Korean Patent Application No. 10-2015-7033311, dated Feb. 16, 2016, 12 pages.
First Office Action from foreign counterpart Mexican Patent Application No. MXa2014013795, dated Nov. 1, 2016, 3 pages.
First Office Action from foreign counterpart Mexican Patent Application No. MXa2014013795, dated Oct. 30, 2015, 7 pages.
First Office Action from foreign counterpart Russian Patent Application No. 2011131821, dated Jun. 26, 2015, 8 pages.
First Office Action from foreign counterpart Taiwan Patent Application No. 102117728, dated Aug. 9, 2016, 11 pages.
First Office Action dated Apr. 24, 2015 for foreign counterpart Mexican Patent Application No. MX/a/2014/002900, dated Apr. 24, 2015, 3 pages.
First Office Action Report for counterpart Chinese Patent Application No. 201310407419.4, dated Nov. 20, 2015, 8 pages.
Full Examination Report from foreign counterpart Australian Patent Application No. 2018253582, dated Jun. 3, 2019, 3 pages.

(56) References Cited

OTHER PUBLICATIONS

Further Examination Report from foreign counterpart New Zealand Application No. 701567, dated Aug. 24, 2016, 6 pages.
Further Examination Report from foreign counterpart New Zealand Application No. 701691, dated Sep. 26, 2016, 3 pages.
Further Examination Report from foreign counterpart New Zealand Patent Application No. 717370, dated Aug. 3, 2017, 4 pages.
Further Examination Report (Postponed Acceptance) from foreign counterpart New Zealand Patent Application No. 728719, dated Jan. 31, 2018, 2 pages.
International Preliminary Report on Patentability and Written Opinion for Application No. PCT/US2013/071749, dated Jun. 4, 2015, 7 pages.
International Preliminary Report on Patentability and Written Opinion for Application No. PCT/US2014/025102, dated Sep. 24, 2015, 10 pages.
International Preliminary Report on Patentability and Written Opinion for Application No. PCT/US2014/025108, dated Sep. 24, 2015, 8 pages.
International Preliminary Report on Patentability and Written Opinion for Application No. PCT/US2014/025123, dated Sep. 24, 2015, 10 pages.
International Preliminary Report on Patentability and Written Opinion for Application No. PCT/US2015/014511, dated Aug. 18, 2016, 5 pages.
International Preliminary Report on Patentability for Application No. PCT/US06/41009, dated Apr. 23, 2008, 4 pages.
International Preliminary Report on Patentability for Application No. PCT/US11/58663, dated May 7, 2013, 26 pages.
International Preliminary Report on Patentability for Application No. PCT/US2005/11033, dated Jun. 3, 2008, 7 pages.
International Preliminary Report on Patentability for Application No. PCT/US2008/073780, dated Mar. 4, 2010, 10 pages.
International Preliminary Report on Patentability for Application No. PCT/US2012/054937, dated Mar. 27, 2014, 13 pages.
International Preliminary Report on Patentability for Application No. PCT/US2013/039580, dated Nov. 4, 2014, 7 pages.
International Preliminary Report on Patentability for Application No. PCT/US2013/041726, dated Nov. 18, 2014, 6 pages.
International Preliminary Report on Patentability for Application No. PCT/US2015/023436, dated Oct. 27, 2016, 6 pages.
International Preliminary Report on Patentability for Application No. PCT/US2017/047963, dated Mar. 7, 2019, 8 pages.
International Preliminary Report on Patentability for Application No. PCT/US2017/058291, dated May 9, 2019, 7 pages.
International Preliminary Report on Patentability from foreign counterpart PCT/US2013/061493, dated Apr. 16, 2015, 7 pages.
International Search Report and the Written Opinion for Application No. PCT/US15/14511, dated May 18, 2015, 7 pages.
International Search Report and the Written Opinion for Application No. PCT/US2013/061493, dated Dec. 6, 2013, 9 pages.
International Search Report and Written opinion for Application No. PCT/US 06/41009, dated May 24, 2007, 6 Pages.
International Search Report and Written opinion for Application No. PCT/US05/11033, dated May 2, 2008, 10 pages.
International Search Report and Written Opinion for Application No. PCT/US13/41726, dated Jul. 16, 2013, 7 pages.
International Search Report and Written Opinion for Application No. PCT/US2008/073780, dated Nov. 19, 2008.
International Search Report and Written Opinion for Application No. PCT/US2012/054937, dated Apr. 2, 2013, 17 pages.
International Search Report and Written Opinion for Application No. PCT/US2013/039580, dated Aug. 20, 2013, 12 pages.
International Search Report and Written opinion for Application No. PCT/US2014/025105, dated Jul. 14, 2014, 12 pages.
International Search Report and Written Opinion for Application No. PCT/US2014/025108, dated Sep. 19, 2014, 10 Pages.
International Search Report and Written Opinion for Application No. PCT/US2015/023436, dated Aug. 19, 2015, 10 pages.
International Search Report and Written Opinion for Application No. PCT/US2017/047963, dated Nov. 3, 2017, 9 pages.
International Search Report and Written Opinion for Application No. PCT/US2017/058291, dated Mar. 8, 2018, 12 pages.
International Search Report and Written opinion for International Application No. PCT/US2013/071749, dated Apr. 8, 2014, 9 pages.
International Search Report and Written opinion for International Application No. PCT/US2014/025102, dated Jul. 18, 2014, 11 pages.
International Search Report and Written opinion for International Application No. PCT/US2014/025123, dated Jul. 18, 2014, 11 pages.
International Search Report and Written Opinion for PCT Application No. PCT/US 11/58663, dated Mar. 29, 2012, 33 pages.
Letter Restarting Period for Response from U.S. Appl. No. 13/233,006, dated Apr. 15, 2016, 9 pages.
Non-Final Office Action from U.S. Appl. No. 10/817,731, dated Jan. 4, 2008, 14 pages.
Non-Final Office Action from U.S. Appl. No. 10/817,731, dated Jan. 21, 2009, 23 pages.
Non-Final Office Action from U.S. Appl. No. 10/817,731, dated Mar. 15, 2010, 26 pages.
Non-Final Office Action from U.S. Appl. No. 10/817,731, dated May 18, 2007, 16 pages.
Non-Final Office Action from U.S. Appl. No. 10/902,978, dated Apr. 10, 2008, 8 pages.
Non-Final Office Action from U.S. Appl. No. 10/902,978, dated Nov. 6, 2007, 11 pages.
Non-Final Office Action from U.S. Appl. No. 11/256,478, dated Sep. 19, 2008, 14 pages.
Non-Final Office Action from U.S. Appl. No. 11/894,362, dated Oct. 29, 2008, 17 pages.
Non-Final Office Action from U.S. Appl. No. 11/894,394, dated Oct. 28, 2008, 13 pages.
Non-Final Office Action from U.S. Appl. No. 11/894,540, dated Apr. 29, 2009, 8 pages.
Non-Final Office Action from U.S. Appl. No. 11/894,540, dated Oct. 29, 2008, 13 pages.
Non-Final Office Action from U.S. Appl. No. 12/143,503, dated Dec. 9, 2010, 15 pages.
Non-Final Office Action from U.S. Appl. No. 12/630,627, dated Aug. 22, 2012, 23 pages.
Non-Final Office Action from U.S. Appl. No. 12/630,627, dated Mar. 16, 2011, 5 pages.
Non-Final Office Action from U.S. Appl. No. 12/637,643, dated Jun. 7, 2012, 25 pages.
Non-Final Office Action from U.S. Appl. No. 12/637,643, dated Sep. 23, 2011, 18 pages.
Non-Final Office Action from U.S. Appl. No. 12/802,958, dated Aug. 13, 2015, 22 pages.
Non-Final Office Action from U.S. Appl. No. 12/802,958, dated Jan. 16, 2018, 118 pages.
Non-Final Office Action from U.S. Appl. No. 12/802,958, dated Jun. 23, 2014, 24 pages.
Non-Final Office Action from U.S. Appl. No. 12/802,958, dated Nov. 4, 2016, 19 pages.
Non-Final Office Action from U.S. Appl. No. 12/802,958, dated Nov. 21, 2012, 17 pages.
Non-Final Office Action from U.S. Appl. No. 12/802,974, dated Apr. 24, 2015, 27 pages.
Non-Final Office Action from U.S. Appl. No. 12/802,974, dated Aug. 1, 2013, 35 pages.
Non-Final Office Action from U.S. Appl. No. 12/802,974, dated Dec. 19, 2012, 7 pages.
Non-Final Office Action from U.S. Appl. No. 12/802,975, dated Aug. 1, 2013, 27 pages.
Non-Final Office Action from U.S. Appl. No. 12/802,975, dated Aug. 14, 2013, 26 pages.
Non-Final Office Action from U.S. Appl. No. 12/802,975, dated Dec. 19, 2012, 16 pages.
Non-Final Office Action from U.S. Appl. No. 12/802,975, dated Jul. 1, 2016, 21 pages.

(56) References Cited

OTHER PUBLICATIONS

Non-Final Office Action from U.S. Appl. No. 12/802,975, dated May 7, 2015, 25 pages.
Non-Final Office Action from U.S. Appl. No. 12/802,975, dated Sep. 14, 2017, 23 pages.
Non-Final Office Action from U.S. Appl. No. 12/802,988, dated Apr. 12, 2013, 45 pages.
Non-Final Office Action from U.S. Appl. No. 12/802,988, dated Apr. 17, 2012, 10 pages.
Non-Final Office Action from U.S. Appl. No. 12/802,988, dated Aug. 15, 2016, 19 pages.
Non-Final Office Action from U.S. Appl. No. 12/802,988, dated Jun. 26, 2015, 17 pages.
Non-Final Office Action from U.S. Appl. No. 12/802,988, dated Mar. 24, 2014, 11 pages.
Non-Final Office Action from U.S. Appl. No. 12/802,988, dated Sep. 15, 2017, 11 pages.
Non-Final Office Action from U.S. Appl. No. 12/802,989, dated Jun. 14, 2012, 10 pages.
Non-Final Office Action from U.S. Appl. No. 12/802,989, dated Mar. 30, 2016, 35 pages.
Non-Final Office Action from U.S. Appl. No. 12/802,989, dated Nov. 25, 2014, 17 pages.
Non-Final Office Action from U.S. Appl. No. 12/802,989, dated Nov. 26, 2013, 27 pages.
Non-Final Office Action from U.S. Appl. No. 13/232,996, dated Apr. 11, 2013, 23 pages.
Non-Final Office Action from U.S. Appl. No. 13/232,996, dated Jun. 20, 2016, 30 pages.
Non-Final Office Action from U.S. Appl. No. 13/232,996, dated Jun. 24, 2015, 15 pages.
Non-Final Office Action from U.S. Appl. No. 13/232,996, dated Mar. 21, 2014, 9 pages.
Non-Final Office Action from U.S. Appl. No. 13/232,996, dated Sep. 21, 2017, 15 pages.
Non-Final Office Action from U.S. Appl. No. 13/233,006, dated Apr. 16, 2013, 8 pages.
Non-Final Office Action from U.S. Appl. No. 13/233,006, dated Apr. 28, 2017, 10 pages.
Non-Final Office Action from U.S. Appl. No. 13/233,006, dated Jun. 4, 2015, 12 pages.
Non-Final Office Action from U.S. Appl. No. 13/233,006, dated Sep. 12, 2013, 6 pages.
Non-Final Office Action from U.S. Appl. No. 13/233,006, dated Sep. 24, 2014, 9 pages.
Non-Final Office Action from U.S. Appl. No. 13/233,006, dated Apr. 1, 2016, 9 pages.
Non-Final Office Action from U.S. Appl. No. 13/461,682, dated Feb. 25, 2014, 37 pages.
Non-Final Office Action from U.S. Appl. No. 13/464,648, dated Feb. 12, 2013, 12 pages.
Non-Final Office Action from U.S. Appl. No. 13/464,648, dated Feb. 14, 2014, 11 pages.
Non-Final Office Action from U.S. Appl. No. 13/475,598, dated Dec. 30, 2013, 16 pages.
Non-Final Office Action from U.S. Appl. No. 13/475,598, dated Mar. 23, 2015, 14 pages.
Non-Final Office Action from U.S. Appl. No. 13/633,702, dated Dec. 17, 2013, 21 pages.
Non-Final Office Action from U.S. Appl. No. 13/797,950, dated Jan. 11, 2017, 65 pages.
Non-Final Office Action from U.S. Appl. No. 13/797,950, dated May 11, 2015, 61 pages.
Non-Final Office Action from U.S. Appl. No. 13/797,971, dated May 11, 2015, 52 pages.
Non-Final Office Action from U.S. Appl. No. 13/797,971, dated Oct. 4, 2016, 56 pages.
Non-Final Office Action from U.S. Appl. No. 13/797,984, dated Feb. 28, 2017, 13 pages.
Non-Final Office Action from U.S. Appl. No. 13/797,984, dated Jan. 14, 2016, 14 pages.
Non-Final Office Action from U.S. Appl. No. 13/797,984, dated Jan. 29, 2015, 15 pages.
Non-Final Office Action from U.S. Appl. No. 13/844,355, dated Apr. 18, 2016, 21 pages.
Non-Final Office Action from U.S. Appl. No. 13/844,355, dated Jan. 8, 2015, 23 pages.
Non-Final Office Action from U.S. Appl. No. 13/844,355, dated Jun. 30, 2017, 159 pages.
Non-Final Office Action from U.S. Appl. No. 14/023,302, dated Jul. 17, 2014, 37 pages.
Non-Final Office Action from U.S. Appl. No. 14/023,302, dated Jun. 11, 2015, 8 pages.
Non-Final Office Action from U.S. Appl. No. 14/086,700, dated Apr. 2, 2015, 12 pages.
Non-Final Office Action from U.S. Appl. No. 14/086,700, dated Mar. 4, 2016, 10 pages.
Non-Final Office Action from U.S. Appl. No. 14/086,700, dated May 25, 2017, 12 pages.
Non-Final Office Action from U.S. Appl. No. 14/156,254, dated Sep. 11, 2014, 44 pages.
Non-Final Office Action from U.S. Appl. No. 14/611,565, dated Apr. 4, 2019, 35 pages.
Non-Final Office Action from U.S. Appl. No. 14/611,565, dated Aug. 31, 2015, 21 pages.
Non-Final Office Action from U.S. Appl. No. 14/611,565, dated Mar. 14, 2017, 23 pages.
Non-Final Office Action from U.S. Appl. No. 14/672,014, dated Dec. 30, 2016, 7 pages.
Non-Final office action from U.S. Appl. No. 15/057,002, dated Oct. 23, 2017, 60 pages.
Non-Final Office Action from U.S. Appl. No. 15/181,383, dated May 22, 2017, 48 pages.
Non-Final Office Action from U.S. Appl. No. 15/201,276, dated Jan. 25, 2018, 77 pages.
Non-Final Office Action from U.S. Appl. No. 15/201,276, dated Mar. 1, 2017, 107 pages.
Non-Final Office Action from U.S. Appl. No. 15/340,914, dated Apr. 25, 2018, 15 pages.
Non-Final Office Action from U.S. Appl. No. 15/340,914, dated Jul. 21, 2017, 114 pages.
Non-Final Office Action from U.S. Appl. No. 15/616,817, dated Nov. 1, 2017, 14 pages.
Non-final Office Action from U.S. Appl. No. 13/844,355, dated Mar. 21, 2019, 31 pages.
Notice of Acceptance from Foreign Counterpart Australian Patent Application No. 2012308632, dated Sep. 13, 2017, 4 pages.
Notice of Acceptance from foreign counterpart Australian Patent Application No. 2013327697, dated Feb. 15, 2017, 4 pages.
Notice of Acceptance from foreign counterpart Australian Patent Application No. 2014248533, dated Jun. 28, 2017, 4 pages.
Notice of Acceptance from foreign counterpart Australian Patent Application No. 20160219662, dated May 5, 2017, 3 pages.
Notice of Acceptance from foreign counterpart Australian Patent Application No. AU20140200745, dated Sep. 19, 2016, 3 page.
Notice of Acceptance from foreign counterpart New Zealand Patent Application No. 610463, dated Aug. 5, 2015, 1 page.
Notice of Acceptance from foreign counterpart New Zealand Patent Application No. 717370, dated Jan. 10, 2018, 1 page.
Notice of Acceptance from foreign counterpart New Zealand Patent Application No. 738000, dated Jun. 4, 2019, 1 page.
Notice of Allowance from U.S. Appl. No. 13/797,984, dated Jan. 17, 2018, 146 pages.
Notice of Allowance and Search Report from foreign counterpart Taiwan Patent Application No. 102134408, dated Feb. 17, 2017, 9 pages.
Notice of Allowance for Patent from foreign counterpart Korean Patent Application No. 10-2017-7002596, dated Feb. 27, 2019, 3 pages.
Notice of Allowance from counterpart Mexican Patent Application No. MX/a/2014/002900, dated Nov. 26, 2015, 4 pages. Translation attached.

(56) References Cited

OTHER PUBLICATIONS

Notice of Allowance from counterpart U.S. Appl. No. 12/917,257, dated Dec. 6, 2012, 8 pages.
Notice of Allowance from foreign counterpart Australian Patent Application No. 2011323559, dated May 13, 2016, 2 pages.
Notice of Allowance from foreign counterpart Canadian Patent Application No. 2695799, dated Feb. 9, 2016, 1 page.
Notice of Allowance from foreign counterpart Canadian Patent Application No. P14906, dated Jun. 1, 2015, 1 page.
Notice of Allowance from foreign counterpart Korean Patent Application No. 2015- 7002560, dated Feb. 4, 2016, 2 Pages.
Notice of Allowance from U.S. Appl. No. 12/802,976, dated Mar. 14, 2011, 9 pages.
Notice of Allowance from U.S. Appl. No. 13/232,996, dated Oct. 12, 2016, 5 pages.
Notice of Allowance from U.S. Appl. No. 10/817,731, dated Sep. 30, 2010, 6 pages.
Notice of Allowance from U.S. Appl. No. 10/902,978, dated Apr. 16, 2008, 7 pages.
Notice of Allowance from U.S. Appl. No. 10/902,978, dated Jun. 27, 2008, 7 pages.
Notice of Allowance from U.S. Appl. No. 11/256,478, dated Jan. 26, 2010, 9 pages.
Notice of Allowance from U.S. Appl. No. 11/256,478, dated Jul. 30, 2009, 9 pages.
Notice of Allowance from U.S. Appl. No. 11/256,478, dated Oct. 29, 2009, 16 pages.
Notice of Allowance from U.S. Appl. No. 11/894,362, dated Mar. 23, 2009, 10 pages.
Notice of Allowance from U.S. Appl. No. 11/894,362, dated Nov. 10, 2009, 5 pages.
Notice of Allowance from U.S. Appl. No. 11/894,362, dated Sep. 3, 2009, 12 pages.
Notice of Allowance from U.S. Appl. No. 11/894,394, dated Jul. 30, 2009, 14 pages.
Notice of Allowance from U.S. Appl. No. 11/894,394, dated Jun. 26, 2009, 7 pages.
Notice of Allowance from U.S. Appl. No. 11/894,394, dated Mar. 6, 2009, 11 pages.
Notice of Allowance from U.S. Appl. No. 11/894,540, dated Nov. 9, 2009, 5 pages.
Notice of Allowance from U.S. Appl. No. 11/894,540, dated Sep. 14, 2009, 13 pages.
Notice of Allowance from U.S. Appl. No. 12/143,503, dated Apr. 11, 2011, 9 pages.
Notice of Allowance from U.S. Appl. No. 12/143,503, dated Aug. 18, 2011, 12 pages.
Notice of Allowance from U.S. Appl. No. 12/143,503, dated Dec. 9, 2011, 11 pages.
Notice of Allowance from U.S. Appl. No. 12/630,627, dated Sep. 25, 2013, 11 pages.
Notice of Allowance from U.S. Appl. No. 12/637,643, dated Jan. 17, 2013, 11 pages.
Notice of Allowance from U.S. Appl. No. 12/802,938, dated Apr. 4, 2013, 16 pages.
Notice of Allowance from U.S. Appl. No. 12/802,938, dated Dec. 6, 2012, 37 pages.
Notice of Allowance from U.S. Appl. No. 12/802,938, dated May 24, 2013, 10 pages.
Notice of Allowance from U.S. Appl. No. 12/802,938, dated Sep. 19, 2012, 8 pages.
Notice of Allowance from U.S. Appl. No. 12/802,974, dated Sep. 29, 2016, 5 pages.
Notice of Allowance from U.S. Appl. No. 12/802,974, dated Feb. 28, 2017, 15 pages.
Notice of Allowance from U.S. Appl. No. 12/802,974, dated Jun. 30, 2017, 89 pages.
Notice of Allowance from U.S. Appl. No. 12/802,974, dated Oct. 4, 2017, 17 pages.
Notice of Allowance from U.S. Appl. No. 12/802,974, dated Sep. 13, 2016, 43 pages.
Notice of Allowance from U.S. Appl. No. 12/802,976, dated Apr. 14, 2011, 16 pages.
Notice of Allowance from U.S. Appl. No. 12/802,976, dated Aug. 22, 2011, 8 pages.
Notice of Allowance from U.S. Appl. No. 12/802,976, dated Dec. 9, 2011, 11 pages.
Notice of Allowance from U.S. Appl. No. 12/802,976, dated Nov. 29, 2010, 7 pages.
Notice of Allowance from U.S. Appl. No. 12/802,989, dated Jun. 27, 2017, 121 pages.
Notice of Allowance from U.S. Appl. No. 12/917,257, dated May 31, 2013, 12 Pages.
Notice of Allowance from U.S. Appl. No. 13/232,996, dated Oct. 26, 2016, 4 pages.
Notice of Allowance from U.S. Appl. No. 13/233,006, dated Apr. 3, 2019, 19 pages.
Notice of Allowance from U.S. Appl. No. 13/461,682, dated Oct. 2, 2014, 10 pages.
Notice of Allowance from U.S. Appl. No. 13/464,648, dated Apr. 24, 2015, 23 pages.
Notice of Allowance from U.S. Appl. No. 13/464,648, dated Aug. 14, 2015, 21 pages.
Notice of Allowance from U.S. Appl. No. 13/464,648, dated Aug. 25, 2015, 4 pages.
Notice of Allowance from U.S. Appl. No. 13/464,648, dated Feb. 23, 2016, 15 pages.
Notice of Allowance from U.S. Appl. No. 13/464,648, dated Jan. 9, 2015, 11 pages.
Notice of Allowance from U.S. Appl. No. 13/464,648, dated Nov. 30, 2015, 12 pages.
Notice of Allowance from U.S. Appl. No. 13/464,648, dated Sep. 19, 2014, 5 pages.
Notice of Allowance from U.S. Appl. No. 13/475,598, dated Feb. 14, 2017, 41 pages.
Notice of Allowance from U.S. Appl. No. 13/475,598, dated Oct. 19, 2015, 29 pages.
Notice of Allowance from U.S. Appl. No. 13/633,702, dated Jan. 6, 2015, 27 pages.
Notice of Allowance from U.S. Appl. No. 13/633,702, dated Aug. 15, 2014, 11 pages.
Notice of Allowance from U.S. Appl. No. 13/797,971, dated Jan. 29, 2018, 15 pages.
Notice of Allowance from U.S. Appl. No. 13/797,971, dated May 4, 2017, 8 pages.
Notice of Allowance from U.S. Appl. No. 13/797,971, dated Oct. 18, 2017, 144 pages.
Notice of Allowance from U.S. Appl. No. 13/797,984, dated Oct. 19, 2017, 10 pages.
Notice of Allowance from U.S. Appl. No. 14/023,302, dated May 17, 2016 5 pages.
Notice of Allowance from U.S. Appl. No. 14/023,302, dated Oct. 9, 2015, 5 pages.
Notice of Allowance from U.S. Appl. No. 14/023,302, dated Apr. 27, 2016, 3 pages.
Notice of Allowance from U.S. Appl. No. 14/023,302, dated Feb. 5, 2016, 27 pages.
Notice of Allowance from U.S. Appl. No. 14/086,700, dated Feb. 28, 2018, 5 pages.
Notice of Allowance from U.S. Appl. No. 14/156,254, dated Feb. 26, 2016, 21 pages.
Notice of Allowance from U.S. Appl. No. 14/156,254, dated Jul. 8, 2015, 7 pages.
Notice of Allowance from U.S. Appl. No. 14/156,254, dated Mar. 12, 2015, 5 pages.
Notice of Allowance from U.S. Appl. No. 14/156,254, dated Nov. 3, 2015, 29 pages.
Notice of Allowance from U.S. Appl. No. 15/201,276, dated Nov. 27, 2017, 7 pages.
Notice of Allowance from U.S. Appl. No. 15/616,817, dated Apr. 25, 2018, 10 pages.

(56) References Cited

OTHER PUBLICATIONS

Notice of Allowance from U.S. Appl. No. 13/232,996, dated Mar. 20, 2019, 10 pages.
Notice of Allowance from U.S. Appl. No. 15/181,383, dated Mar. 20, 2019, 10 pages.
Notice of Allowance mailed for U.S. Appl. No. 12/917,257, dated Feb. 15, 2013, 18 pages.
Notice of Grant from foreign counterpart China Patent Application No. 201210464974.6 dated Jul. 1, 2015, 3 pages.
Notice of Reasons for Rejection from foreign counterpart Japanese Patent Application No. 20150510498, dated Sep. 26, 2016, 21 pages.
Notice of Reasons for Rejection from foreign counterpart Japanese Patent Application No. 2016-234908, dated Nov. 22, 2018, 10 pages.
Notice of Reasons for Rejection from foreign counterpart Korean Patent Application No. 10-2014-7009876 (Atty. Docket No. 6181P524XKR), dated Mar. 25, 2019, 11 pages.
Notice to File a Response from foreign counterpart Korean Patent Application No. 10-2018-7035654, dated Dec. 14, 2018, 10 pages.
Notification for Granting Patent Right from foreign counterpart Chinese Patent Application No. 201180061132.X, dated Apr. 6, 2017, 6 pages.
Notification of Reasons for Refusal from foreign counterpart Japanese Patent Application No. 2017-112639, dated Aug. 13, 2018, 4 pages.
Notification on Grant of Patent Right for Invention from foreign counterpart Chinese Patent Application No. 201210466082.X, dated Jan. 26, 2017, 3 pages.
Office Action and Examination Search Report from foreign counterpart Canadian Patent Application No. 2904981, dated May 3, 2019, 6 pages.
Office Action and Search Report from foreign counterpart Chinese Patent Application No. CN201380035543, dated Jan. 3, 2017, 22 pages.
Office Action and Search Report from foreign counterpart Russian Patent Application No. 2014148791/28(078479), dated Apr. 13, 2017, 14 pages.
Office Action and Search Report from foreign counterpart Russian Patent Application No. 2015143188/07, dated Dec. 15, 2017, 13 pages.
Office Action and Search Report from foreign counterpart Taiwan Patent Application No. 105143637, dated Jan. 19, 2018, 12 pages.
Office Action and Search Report from foreign counterpart Taiwan Patent Application No. 103107541, dated Dec. 6, 2017, 15 pages.
Office Action for foreign counterpart China Patent Application No. 20051008867.1, dated Oct. 26, 2010, 4 pages.
Office Action from foreign counterpart Australian Patent Application No. 2004203336, dated Jun. 5, 2009, 2 pages.
Office Action from foreign counterpart Canada Patent Application No. 2514383, dated Jul. 26, 2012, 3 pages.
Office Action from foreign counterpart China Patent Application No. 200510088676 dated Jan. 25, 2011, 8 pages.
Office Action from foreign counterpart China Patent Application No. 200510088676.1 dated Mar. 20, 2009, 24 pages.
Office Action from foreign counterpart China Patent Application No. 200510088676.1 dated Feb. 5, 2010, 18 pages.
Office Action from foreign counterpart China Patent Application No. 201180061132.X, dated May 27, 2015, 6 pages.
Office Action from foreign counterpart China Patent Application No. 201180061132.X, dated Oct. 10, 2016, 11 pages.
Office Action from foreign counterpart Israel Patent Application No. 235518, dated Apr. 7, 2019, 4 pages.
Office Action from foreign counterpart Japan Patent Application No. 2013-537753, dated Sep. 7, 2015, 9 pages.
Office Action from foreign counterpart Japanese Patent Application No. 2007- 506302, dated Jan. 11, 2011, 5 pages.
Office Action from foreign counterpart Japanese Patent Application No. 2012-057351, dated Jul. 1, 2013, 6 pages.
Office Action from foreign counterpart Japanese Patent Application No. 2012-057351, dated Mar. 10, 2014, 2 pages.
Office Action from foreign counterpart Japanese Patent Application No. 2013-156855 dated Apr. 22, 2015, 6 pages.
Office Action from foreign counterpart Japanese Patent Application No. 2014 -140413, dated Jun. 27, 2015, 6 pages.
Office Action from foreign counterpart Japanese Patent Application No. 20150162819, dated Oct. 3, 2016, 6 pages.
Office Action from foreign counterpart Japanese Patent Application No. 2016-550718, dated Jan. 10, 2019, 4 pages.
Office Action from foreign counterpart Japanese Patent Application No. 2019- 039195, dated Jun. 17, 2019, 8 pages.
Office Action from foreign counterpart Korean Patent Application No. 1020107006265, dated Jul. 29, 2014, 10 pages.
Office Action from foreign counterpart Korean Patent Application No. 20050070079, dated Jul. 29, 2011, 3 pages.
Office Action from foreign counterpart Korean Patent Application No. 2015-7002560, dated May 21, 2015, 10 pages.
Office Action from foreign counterpart Mexican Patent Application No. MX/a/2014/002900, dated May 25, 2015, 7 pages.
Office Action from foreign counterpart Mexican Patent Application No. MX/a/2014/013377, dated Mar. 22, 2016, 20 pages.
Office Action from foreign counterpart Mexican Patent Application No. MX/a/2014/013377, dated Nov. 30, 2017, 4 pages.
Office Action from foreign counterpart Mexican Patent Application No. MX/a/2015/002992, dated Nov. 8, 2016, 4 pages.
Office Action from foreign counterpart New Zealand Patent Application No. 610463 dated Jan. 22, 2014, 2 pages.
Office Action from foreign counterpart Russian Patent Application No. 2014151216, dated Sep. 30, 2016, 12 pages.
Office Action from foreign counterpart Russian Patent Application No. 2016144927, dated Dec. 21, 2016, 6 pages.
Office Action from foreign counterpart Taiwan Application No. 100139880, dated Jan. 26, 2017, 7 pages.
Office Action from Foreign Counterpart Taiwan Patent Application No. 094125985, dated Jan. 6, 2012, 7 pages.
Office Action from foreign counterpart Taiwan Patent Application No. 101133865, dated Oct. 28, 2016, 5 pages.
Office Action from foreign counterpart Taiwan Patent Application No. 102116145, dated Mar. 31, 2017, 7 pages.
Office Action from foreign counterpart Taiwan Patent Application No. 102117728, dated Nov. 29, 2016, 6 pages.
Partial Supplementary European Search Report for Application No. 15780522.7, dated Oct. 20, 2017, 7 pages.
Preliminary Report on Patentability and Written Opinion for Application No. PCT/US2014/025105, dated Sep. 24, 2015, 10 pages.
Rejection Decision from foreign counterpart Japanese Patent Application No. JP2014264325, dated Oct. 3, 2016, 7 pages.
Requirement for Restriction/Election from U.S. Appl. No. 15/792,610, dated Jun. 11, 2018, 6 pages.
Second Office Action and Search Report from foreign counterpart Chinese Patent Application No. 201180061132.X dated Mar. 11, 2016, 11 pages.
Second Office Action and Search report from foreign counterpart Chinese Patent Application No. 201280044869.5, dated Jan. 17, 2017, 19 pages.
Second Office Action from foreign counterpart Mexican Patent Application No. MX/a/2014/013795, dated Feb. 3, 2016, 7 pages.
Communication pursuant to Article 94(3) EPC for Application No. EP13856705.2, dated Mar. 13, 2018, 6 pages.
Corrected Notice of Allowance from U.S. Appl. No. 13/797,950, dated Nov. 13, 2018, 16 pages.
Corrected Notice of Allowance from U.S. Appl. No. 13/797,984, dated Apr. 5, 2018, 12 pages.
Decision to grant a European patent pursuant to Article 97(1) EPC for Application No. 11838640.8, dated Feb. 7, 2019, 2 pages.
Examination report from foreign counterpart Indian Patent Application No. 3496/CHENP/2013, dated Oct. 29, 2018, 7 pages.
Final Office Action from U.S. Appl. No. 13/233,006, dated Nov. 13, 2018, 9 pages.
Final Office Action from U.S. Appl. No. 13/844,355, dated Feb. 21, 2019, 34 pages.

(56) References Cited

OTHER PUBLICATIONS

Final Office Action from U.S. Appl. No. 13/844,355, dated Jun. 3, 2019, 26 pages.
Final Office Action from U.S. Appl. No. 15/340,914, dated Jan. 3, 2019, 67 pages.
Final Office Action from U.S. Appl. No. 12/802,975, dated Jun. 22, 2018, 27 pages.
Final Office Action from U.S. Appl. No. 14/611,565, dated Oct. 25, 2018, 20 pages.
Final Office Action from U.S. Appl. No. 15/057,002, dated Jul. 16, 2018, 13 pages.
First Examination Report from foreign counterpart Australian Patent Application No. AU2017245425, dated May 9, 2018, 9 pages.
First Examination Report from foreign counterpart New Zealand Application No. 742186, dated Jun. 28, 2018, 4 pages.
First Examination Report from foreign counterpart New Zealand Application No. 743604, dated Jul. 10, 2018, 5 pages.
First Office Action and Search Report from foreign counterpart Chinese Patent Application No. 201480016091.6, dated Apr. 25, 2018, 17 pages.
Non-Final Office Action from U.S. Appl. No. 14/611,565, dated Apr. 19, 2018, 141 pages.
Non-Final Office Action from U.S. Appl. No. 12/802,975, dated Jan. 14, 2019, 112 pages.
Non-Final Office Action from U.S. Appl. No. 15/682,076, dated Jan. 28, 2019, 20 pages.
Non-Final Office Action from U.S. Appl. No. 15/792,610, dated Apr. 18, 2019, 147 pages.
Non-Final Office Action from U.S. Appl. No. 13/233,006, dated Jul. 11, 2018, 29 pages.
Non-Final Office Action from U.S. Appl. No. 15/181,383, dated Jun. 25, 2018, 7 pages.
Notice of Allowance from U.S. Appl. No. 12/802,988, dated Sep. 25, 2018, 96 pages.
Notice of Allowance from U.S. Appl. No. 13/232,996, dated Jan. 9, 2019, 11 pages.
Notice of Allowance from U.S. Appl. No. 13/233,006, dated May 30, 2019, 12 pages.
Notice of Allowance from U.S. Appl. No. 14/086,700, dated Sep. 28, 2018, 21 pages.
Notice of Allowance from U.S. Appl. No. 15/057,002, dated Apr. 16, 2019, 11 pages.
Notice of Allowance from U.S. Appl. No. 15/181,383, dated Jan. 25, 2019, 87 pages.
Notice of Allowance from U.S. Appl. No. 15/201,276, dated Jan. 23, 2019, 29 pages.
Notice of Allowance from U.S. Appl. No. 15/201,276, dated May 28, 2019, 4 pages.
Notice of Allowance from U.S. Appl. No. 12/802,988, dated Nov. 15, 2018, 11 pages.
Notice of Acceptance from foreign counterpart New Zealand Patent Application No. 729017, dated Jun. 28, 2018, 1 page.
Notice of Allowance from U.S. Appl. No. 13/797,950, dated Aug. 2, 2018, 23 pages.
Notice of Allowance from U.S. Appl. No. 14/086,700, dated May 18, 2018, 21 pages.
Notice of Allowance from U.S. Appl. No. 15/201,276, dated Oct. 11, 2018, 5 pages.
Notice of Allowance from U.S. Appl. No. 15/616,817, dated Jun. 26, 2018, 131 pages.
Notice of Allowance from U.S. Appl. No. 15/616,817, dated Oct. 22, 2018, 21 pages.
Notice of Allowance from U.S. Appl. No. 13/797,950, dated Apr. 16, 2018, 117 pages.
Notice of Reasons for Rejection from foreign counterpart Japanese Patent Application No. 2016-501744, dated Mar. 5, 2018, 15 pages.
Office Action and Search Report from foreign counterpart Russian Patent Application No. 2016144927/08(072072), dated Oct. 30, 2018, 12 pages.
Office Action from foreign counterpart Taiwan Patent Application No. 103107541, dated Sep. 28, 2018, 7 pages.
Requirement for Restriction/Election from U.S. Appl. No. 15/792,610, dated Nov. 29, 2018, 7 pages.
Communication pursuant to Article 94(3) EPC for Application No. 10184659.0, dated Dec. 21, 2018, 4 pages.
Corrected Notice of Allowance from U.S. Appl. No. 14/086,700, dated Nov. 8, 2018, 104 pages.
Examination report No. 1 from foreign counterpart Australian Patent Application No. 2015214278, dated Jun. 5, 2018, 4 pages.
Non-Final Office Action from U.S. Appl. No. 13/232,996, dated Nov. 5, 2018, 36 pages.
Non-Final Office Action from U.S. Appl. No. 13/844,355, dated Aug. 27, 2018, 39 pages.
Non-Final Office Action from U.S. Appl. No. 14/672,014, dated Jun. 14, 2018, 129 pages.
Non-Final Office Action from U.S. Appl. No. 16/208,895, dated Apr. 26, 2019, 7 pages.
Notice of Allowance from U.S. Appl. No. 15/057,002, dated Dec. 19, 2018, 68 pages.
Notice of Reasons for Rejection from foreign counterpart Japanese Patent Application No. 2016-234908, dated May 30, 2019, 5 pages.
Office Action from foreign counterpart Israel Patent Application No. 248265, dated Oct. 25, 2018, 6 pages.
Office Action from foreign counterpart Israel Patent Application No. 253541, dated Nov. 29, 2018, 4 pages.
Notice of Allowance from U.S. Appl. No. 12/802,958, dated Sep. 19, 2018, 22 pages.
Supplemental Notice of Allowance from U.S. Appl. No. 12/802,958, dated Dec. 3, 2018, 11 pages.
Summons to attend oral proceedings pursuant to rule 115(1) EPC for Application No. 10156954.9, dated Jan. 30, 2019, 8 pages.
Supplementary European Search Report for Application No. EP05733294 dated Apr. 5, 2012, 4 pages.
Supplementary Partial European Search Report for Application No. EP11838640.8, dated Mar. 2, 2017, 13 pages.
Supplementary Partial European Search Report for Application No. EP14770916, dated Oct. 21, 2016, 6 pages.
Third Office Action from foreign counterpart Chinese Patent Application No. 201280044869.5, dated Aug. 31, 2017, 15 pages.
Third Office Action from foreign counterpart Mexican Patent Application No. MX/a/2014/013795 dated Jul. 27, 2016, 6 pages.
Notice of Allowance, IL App. No. 248265, dated May 7, 2020, 3 pages.
Notice of Allowance, KR App. No. 10-2014-7009876, dated Oct. 4, 2019, 3 pages (1 page of English Translation and 2 pages of Original Document).
Notice of Allowance, KR App. No. 10-2018-7035654, dated Oct. 2, 2019, 4 pages (2 pages of English Translation and 2 pages of Original Document).
Notice of Allowance, TW App. No. 107123446, dated Nov. 20, 2019, 3 pages of Original Document Only.
Notice of Allowance, U.S. Appl. No. 12/802,975, dated Apr. 17 2020, 12 pages.
Notice of Allowance, U.S. Appl. No. 13/233,006, dated Jul. 12, 2019, 12 pages.
Notice of Allowance, U.S. Appl. No. 13/475,598, dated Oct. 19, 2015, 10 pages.
Notice of Allowance, U.S. Appl. No. 13/844,355, dated Dec. 16, 2019, 2 pages.
Notice of Allowance, U.S. Appl. No. 13/844,355, dated Oct. 21, 2019, 8 pages.
Notice of Allowance, U.S. Appl. No. 16/253,028, dated Dec. 27, 2019, 10 pages.
Notice of Allowance, U.S. Appl. No. 16/253,028, dated Feb. 25, 2020, 7 pages.
Notice of Allowance, U.S. Appl. No. 16/253,028, dated Mar. 12, 2020, 7 pages.
Notification of Reason for Refusal, KR App. No. 10-2019-7014768, dated Jun. 27, 2019, 10 pages (5 pages of English Translation and 5 pages of Original Document).

(56) References Cited

OTHER PUBLICATIONS

Notification of the 1st Substantive requirement, MX App. No. MX/A/2017/002906, dated Sep. 13, 2019, 6 pages (3 pages of English Translation and 3 pages of Original Document).
Office Action and Examination Search Report, CA App. No. 2885817, dated Jul. 16, 2019, 4 pages.
Office Action and Search Report, TW App. No. 107123446, dated Aug. 8, 2019, 27 pages (10 pages of English Translation and 17 pages of Original Document).
Office Action, CA App. No. 2816556, dated May 30, 2019, 3 pages.
Office Action, CN App. No. 201380061515.6, dated Apr. 23, 2019, 2 pages.
Office Action, EP App. No. 13790935, dated Oct. 23, 2019, 8 pages.
Office Action, IL App. No. 241319, dated Nov. 26, 2019, 6 pages (3 pages of English Translation and 3 pages of Original Document).
Office Action, IL App. No. 248265, dated Feb. 26, 2020, 4 pages (2 pages of English Translation and 2 pages of Original Document).
Office Action, JP App. No. 2016-562961, dated Feb. 6, 2020, 7 pages (4 pages of English Translation and 3 pages of Original Document).
Office Action, KR App. No. 10-2014-7035524, dated Oct. 21, 2019, 11 pages (6 pages of English Translation and 5 pages of Original Document).
Office Action, TW App No. 102117728, dated Nov. 29, 2016, 6 pages (3 pages of English Translation and 3 pages of Original Document).
Office Action, TW App. No. 108118765, dated Apr. 16, 2020, 6 pages (3 pages of English Translation and 3 pages of Original Document).
Rusek et al., "Scaling up MIMO: Opportunities and Challenges with Very Large Arrays", IEEE Signal Proces. Mag., Jan. 2012, vol. 30, No. 1, pp. 1-30.
Second Examination Report, AU App. No. 2017210619, dated May 31, 2019, 4 pages.
Second Office Action and Search Report, CN App. No. 201580007666.2, dated Jul. 30, 2019, 8 pages (4 pages of English Translation and 4 pages of Original Document).
Srinidhi et al., "Layered Tabu Search Algorithm for Large-MIMO Detection and a Lower Bound on ML Performance," IEEE Trans. Commun, 2010, 5 pages.
Summons to attend oral proceedings pursuant to Rule 115(1) EPC, EP App. No. 12762167.0, dated Nov. 29, 2017, 8 pages.
Summons to attend oral proceedings pursuant to Rule 115(1) EPC, EP App. No. 13856705.2, dated Nov. 5, 2018, 7 pages.
Summons to attend oral proceedings pursuant to Rule 115(1) EPC, EP App. No. 14779084.4, dated Nov. 29, 2019, 9 pages.
Supplementary Partial European Search Report and Search Opinion, EP App No. 17864744.2, dated May 13, 2020, 16 pages.
Third Office Action, CN App. No. 201480016091.6, dated Jul. 10, 2019, 5 pages (2 pages of English Translation and 3 pages of Original Document).
Truong K.T., et al. "Effects of Channel Aging in Massive MIMO Systems," Journal of Communications and Networks, Special Issue on Massive MIMO, 2013, vol. 15 (4), pp. 338-351.
Advisory Action, U.S. Appl. No. 13/844,355, dated Jul. 17, 2019, 3 pages.
Advisory Action, U.S. Appl. No. 14/611,565, dated Feb. 7, 2020, 3 pages.
Communication pursuant to Article 94(3) EPC, EP App. No. 05254757.7, dated Dec. 21, 2018, 4 pages.
Communication pursuant to Article 94(3) EPC, EP App. No. 05254757.7, dated Nov. 11, 2019, 5 pages.
Communication Pursuant to Article 94(3) EPC, EP App. No. 10156950.7, dated Dec. 12, 2017, 9 pages.
Communication pursuant to Article 94(3) EPC, EP App. No. 10184659, dated Dec. 4, 2017, 5 pages.
Communication pursuant to Article 94(3) EPC, EP App. No. 10184659, dated Nov. 11, 2019, 5 pages.
Communication Pursuant to Article 94(3) EPC, EP App. No. 12762167.0, dated Sep. 30, 2016, 6 pages.
Communication Pursuant to Article 94(3) EPC, EP App. No. 13784690.3, dated Apr. 15, 2019, 4 pages.
Communication Pursuant to Article 94(3) EPC, EP App. No. 13843203.4, dated Feb. 25, 2019, 6 pages.
Communication Pursuant to Article 94(3) EPC, EP App. No. 13843203.4, dated Mar. 23, 2018, 5 pages.
Communication Pursuant to Article 94(3) EPC, EP App. No. 14770916.6, dated Mar. 13, 2018, 5 pages.
Communication Pursuant to Article 94(3) EPC, EP App. No. 15780522.7, dated Mar. 19, 2020, 6 pages.
Communication pursuant to Article 94(3) EPC, EP App. No. 18186156.8, dated Jul. 30, 2019, 5 pages.
Communication under Rule 71(3) EPC, EP App. No. 10156950.7, dated Jan. 7, 2020, 6 pages.
Decision of Grant, RU App. No. 2016144927, dated Nov. 29, 2019, 8 pages of Original Document Only.
Decision to grant a European patent, EP App. No. 10156950.7, dated May 8, 2020, 2 pages.
European Search Report and Search Opinion, EP App. No. 17844265.3, dated Feb. 21, 2020, 12 pages.
European Search Report, EP App. No. 19159810.1, dated Sep. 25, 2019, 8 pages.
Examination report, AU App. No. 2018241100, dated Sep. 27, 2019, 2 pages.
Examiner's Report, AU App. No. 2010256510, dated Apr. 16, 2015, 3 pages.
Final Office Action, U.S. Appl. No. 12/802,975, dated Oct. 18, 2019, 21 pages.
Final Office Action, U.S. Appl. No. 14/611,565, dated Dec. 4, 2019, 19 pages.
Final Office Action, U.S. Appl. No. 14/672,014, dated Oct. 2, 2019, 10 pages.
Final Office Action, U.S. Appl. No. 15/682,076, dated Oct. 30, 2019, 26 pages.
Final Office Action, U.S. Appl. No. 15/792,610, dated Dec. 16, 2019, 8 pages.
First Examination Report, AU App. No. AU2011323559, dated Sep. 30, 2015, 3 pages.
First Examination Report, NZ App. No. 701691, dated Feb. 10, 2016, 4 pages.
First Examination Report, NZ App. No. 751530, dated Oct. 18, 2019, 3 pages.
First Examination Report, NZ App. No. 757995, dated Nov. 1, 2019, 2 pages.
First Office Action and Search Report, CN App. No. 201580019760.X, dated Jun. 5, 2019, 12 pages (6 pages of English Translation and 6 pages of Original Document).
First Office Action, EP App. No. 10784126.4, dated Dec. 17, 2015, 7 pages.
Fourth Office Action, CN App. No. 201480016091.6, dated Dec. 10, 2019, 6 pages (3 pages of English Translation and 3 pages of Original Document).
Non-Final Office Action, U.S. Appl. No. 13/844,355, dated Aug. 12, 2019, 14 pages.
Non-Final Office Action, U.S. Appl. No. 12/802,975, dated Aug. 1, 2013, 21 pages.
Non-Final Office Action, U.S. Appl. No. 14/611,565, dated Mar. 25, 2020, 5 pages.
Non-Final Office Action, U.S. Appl. No. 14/672,014, dated Jun. 8, 2020, 11 pages.
Non-Final Office Action, U.S. Appl. No. 15/340,914, dated Aug. 8, 2019, 13 pages.
Non-Final Office Action, U.S. Appl. No. 15/340,914, dated Mar. 25, 2020, 15 pages.
Non-Final Office Action, U.S. Appl. No. 15/682,076, dated May 27, 2020, 8 pages.
Non-Final Office Action, U.S. Appl. No. 15/792,610, dated Apr. 29, 2020, 7 pages.
Non-Final Office Action, U.S. Appl. No. 16/188,841, dated Jan. 22, 2020, 9 pages.
Non-Final Office Action, U.S. Appl. No. 16/208,895, dated Jan. 3, 2020, 7 pages.

(56) References Cited

OTHER PUBLICATIONS

Non-Final Office Action, U.S. Appl. No. 16/253,028, dated Oct. 18, 2019, 10 pages.
Non-Final Office Action, U.S. Appl. No. 16/578,265, dated May 12, 2020, 8 pages.
Notice of Acceptance, AU App. No. 2017210619, dated Oct. 14, 2019, 4 pages.
Notice of Acceptance, AU App. No. 2018201553, dated Nov. 14, 2019, 4 pages.
Notice of Acceptance, AU App. No. 2018253582, dated Nov. 18, 2019, 3 pages.
Notice of Allowance, CA App. No. 2,848,355, dated Apr. 3, 2020, 1 page.
Notice of Allowance, CN App. No. 201480016091.6, dated Apr. 24, 2020, 8 pages (3 pages of English Translation and 5 pages of Original Document).

* cited by examiner

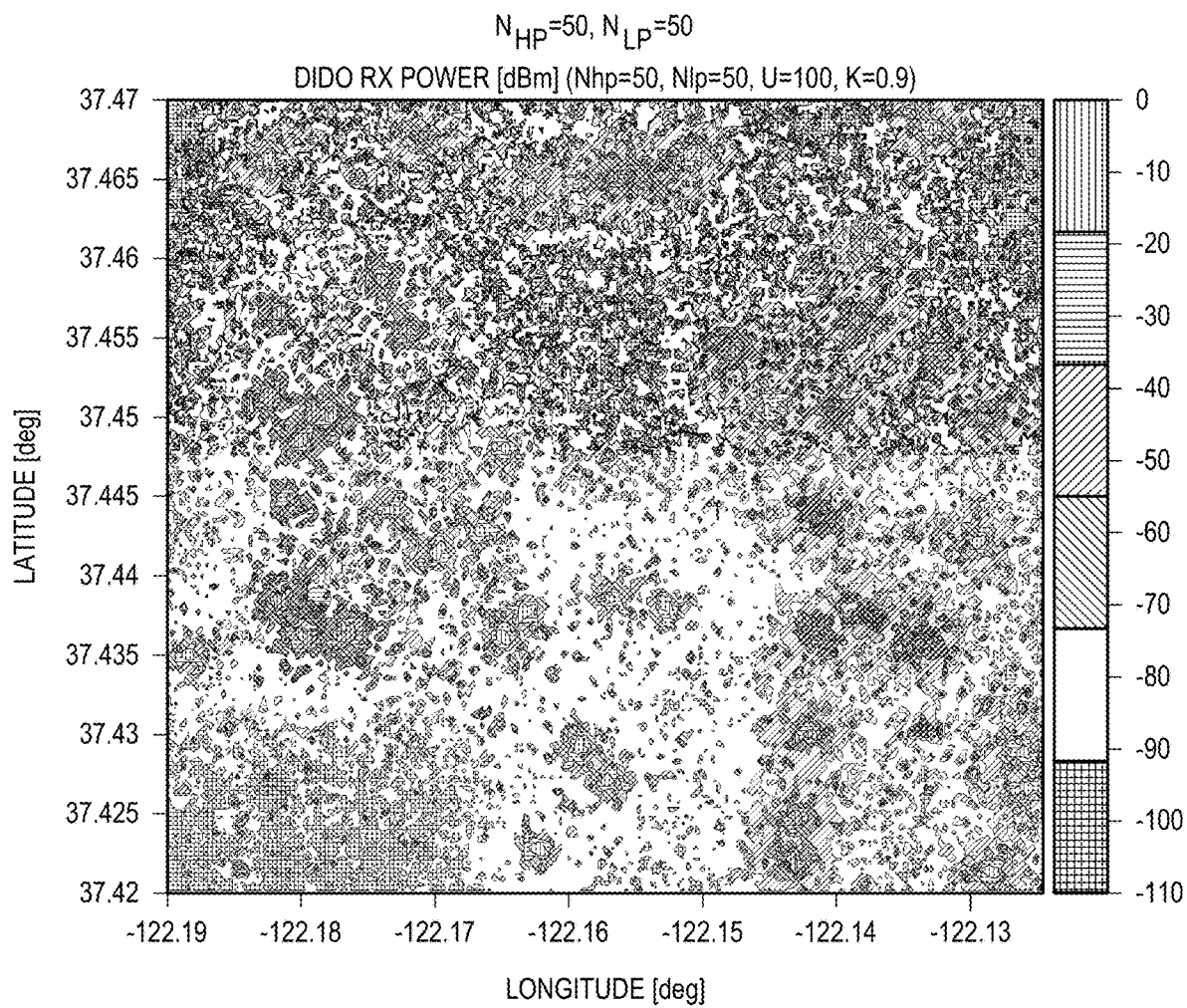

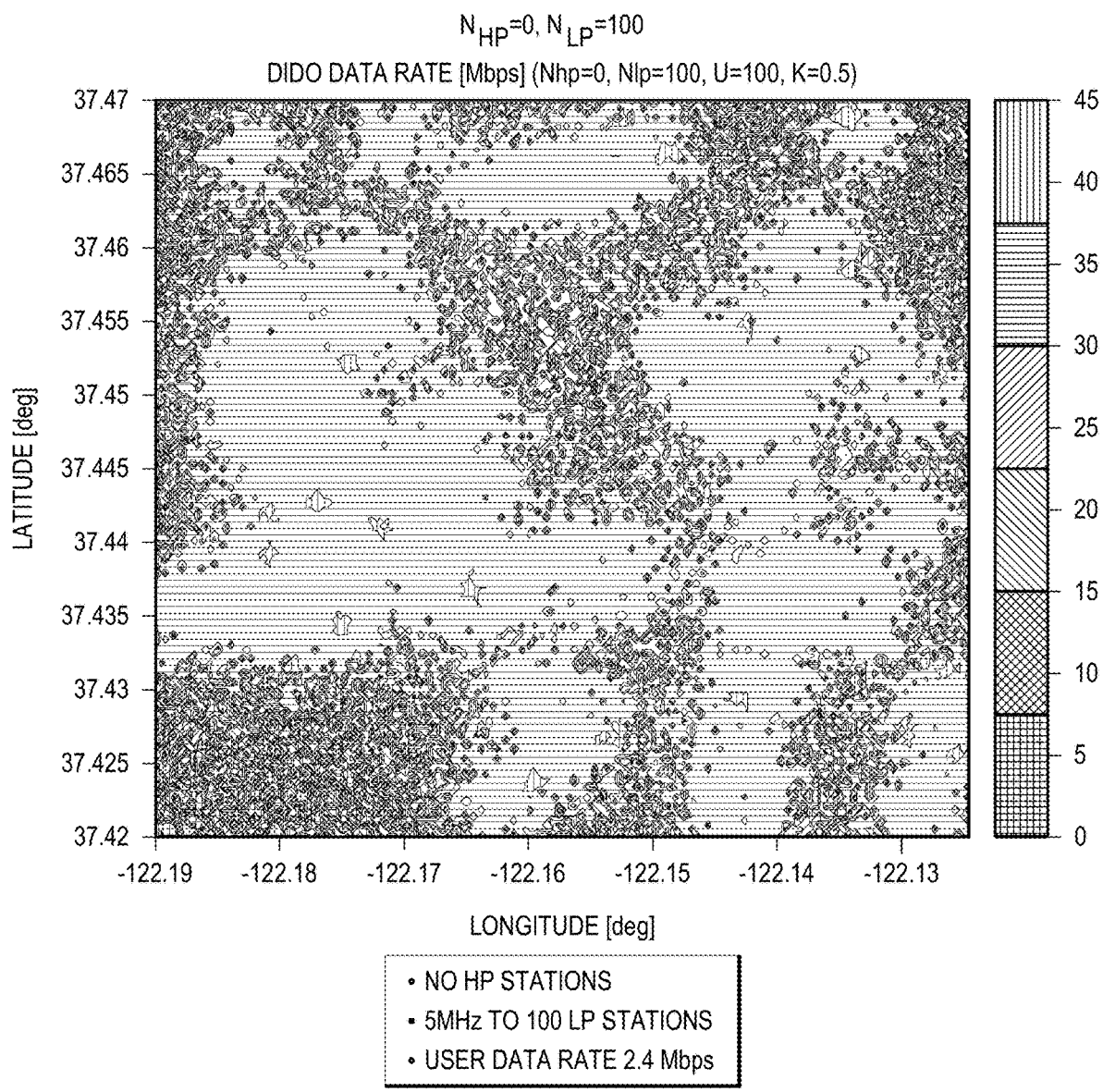

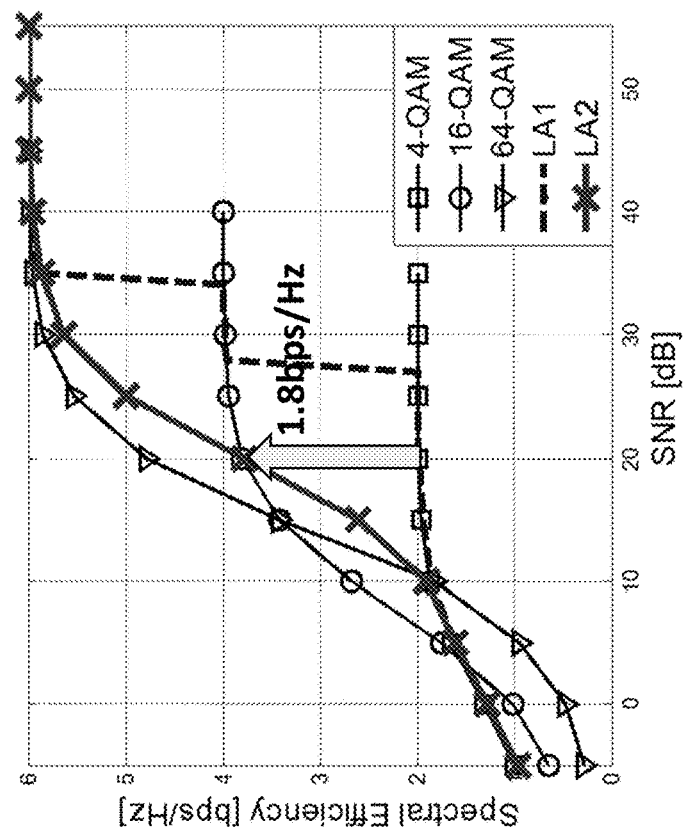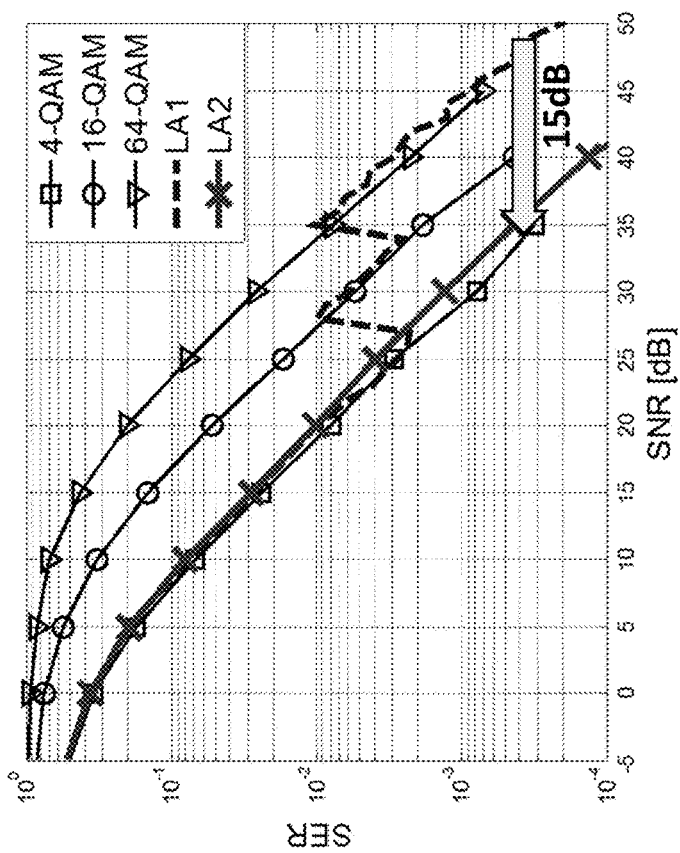
*Fig. 32*

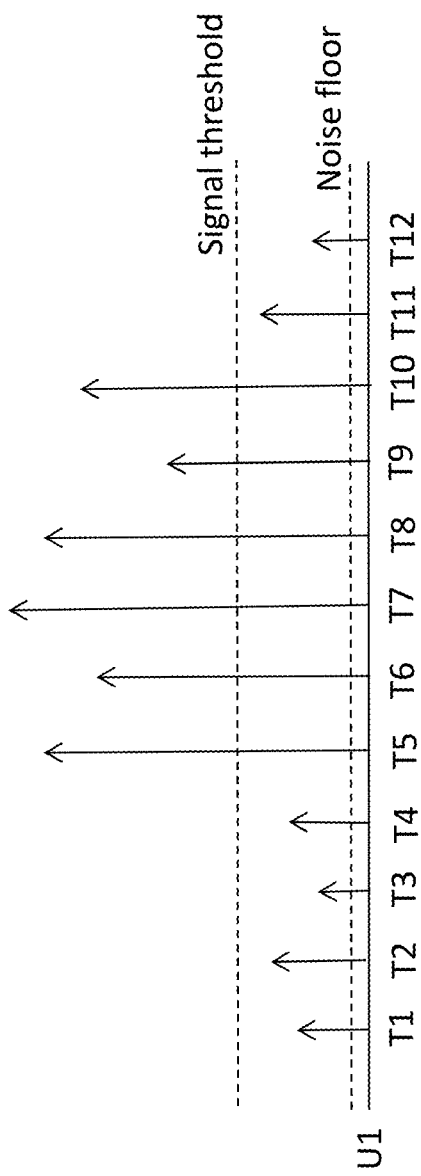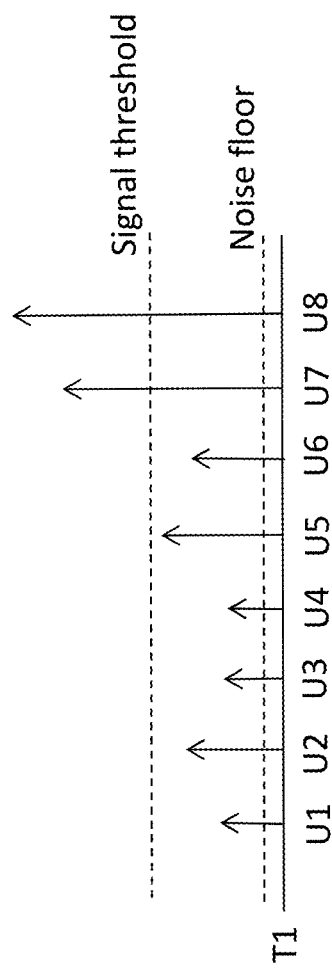
Fig. 38a
Fig. 38b

| | T1 | T2 | T3 | T4 | T5 | T6 | T7 | T8 | T9 | T10 | T11 | T12 |
|---|---|---|---|---|---|---|---|---|---|---|---|---|
| U1 | 0 | 0 | 0 | 0 | $C_{1,5}$ | $C_{1,6}$ | $C_{1,7}$ | $C_{1,8}$ | $C_{1,9}$ | $C_{1,10}$ | 0 | 0 |
| U2 | 0 | 0 | 0 | 0 | $C_{2,5}$ | $C_{2,6}$ | $C_{2,7}$ | 0 | 0 | 0 | 0 | 0 |
| U3 | 0 | 0 | 0 | 0 | 0 | 0 | 0 | 0 | $C_{3,9}$ | $C_{3,10}$ | $C_{3,11}$ | $C_{3,12}$ |
| U4 | 0 | 0 | 0 | 0 | 0 | 0 | $C_{4,7}$ | $C_{4,8}$ | $C_{4,9}$ | $C_{4,10}$ | 0 | 0 |
| U5 | 0 | $C_{5,2}$ | $C_{5,3}$ | 0 | $C_{5,5}$ | $C_{5,6}$ | 0 | 0 | 0 | 0 | 0 | 0 |
| U6 | 0 | 0 | 0 | $C_{6,4}$ | 0 | 0 | 0 | $C_{6,8}$ | $C_{6,9}$ | 0 | 0 | $C_{6,12}$ |
| U7 | $C_{7,1}$ | $C_{7,2}$ | 0 | $C_{7,4}$ | $C_{7,5}$ | 0 | 0 | 0 | 0 | 0 | 0 | 0 |
| U8 | $C_{8,1}$ | $C_{8,2}$ | $C_{8,3}$ | $C_{8,4}$ | 0 | 0 | 0 | 0 | 0 | 0 | 0 | 0 |

*Fig. 39*

|    | T1 | T2 | T3 | T4 | T5 | T6 | T7 | T8 | T9 | T10 | T11 | T12 |
|----|----|----|----|----|----|----|----|----|----|-----|-----|-----|
| U1 | 0  | 0  | 0  | 0  | $C_{1,5}$ | $C_{1,6}$ | $C_{1,7}$ | $C_{1,8}$ | $C_{1,9}$ | $C_{1,10}$ | 0 | 0 |
| U2 | 0  | 0  | 0  | 0  | $C_{2,5}$ | $C_{2,6}$ | $C_{2,7}$ | 0 | 0 | 0 | 0 | 0 |
| U3 | 0  | 0  | 0  | 0  | 0 | 0 | 0 | 0 | $C_{3,9}$ | $C_{3,10}$ | $C_{3,11}$ | $C_{3,12}$ |
| U4 | 0  | 0  | 0  | 0  | 0 | 0 | $C_{4,7}$ | $C_{4,8}$ | $C_{4,9}$ | $C_{4,10}$ | 0 | 0 |
| U5 | 0  | $C_{5,2}$ | $C_{5,3}$ | 0 | $C_{5,5}$ | $C_{5,6}$ | 0 | 0 | 0 | 0 | 0 | 0 |
| U6 | 0  | 0  | 0  | $C_{6,4}$ | 0 | 0 | 0 | $C_{6,8}$ | $C_{6,9}$ | 0 | 0 | $C_{6,12}$ |
| U7 | $C_{7,1}$ | $C_{7,2}$ | 0 | $C_{7,4}$ | $C_{7,5}$ | 0 | 0 | 0 | 0 | 0 | 0 | 0 |
| U8 | $C_{8,1}$ | $C_{8,2}$ | $C_{8,3}$ | $C_{8,4}$ | 0 | 0 | 0 | 0 | 0 | 0 | 0 | 0 |

Fig. 40

|    | T1 | T2 | T3 | T4 | T5 | T6 | T7 | T8 | T9 | T10 | T11 | T12 |
|----|----|----|----|----|----|----|----|----|----|-----|-----|-----|
| U1 | 0 | 0 | 0 | 0 | $C_{1,5}$ | $C_{1,6}$ | $C_{1,7}$ | $C_{1,8}$ | $C_{1,9}$ | $C_{1,10}$ | 0 | 0 |
| U2 | 0 | 0 | 0 | 0 | $C_{2,5}$ | $C_{2,6}$ | $C_{2,7}$ | 0 | 0 | 0 | 0 | 0 |
| U3 | 0 | 0 | 0 | 0 | 0 | 0 | 0 | 0 | $C_{3,9}$ | $C_{3,10}$ | $C_{3,11}$ | $C_{3,12}$ |
| U4 | 0 | 0 | 0 | 0 | 0 | 0 | $C_{4,7}$ | $C_{4,8}$ | $C_{4,9}$ | $C_{4,10}$ | 0 | 0 |
| U5 | 0 | $C_{5,2}$ | $C_{5,3}$ | 0 | $C_{5,5}$ | $C_{5,6}$ | 0 | 0 | 0 | 0 | 0 | 0 |
| U6 | 0 | 0 | 0 | $C_{6,4}$ | 0 | 0 | 0 | $C_{6,8}$ | $C_{6,9}$ | 0 | 0 | $C_{6,12}$ |
| U7 | $C_{7,1}$ | $C_{7,2}$ | 0 | $C_{7,4}$ | $C_{7,5}$ | 0 | 0 | 0 | 0 | 0 | 0 | 0 |
| U8 | $C_{8,1}$ | $C_{8,2}$ | $C_{8,3}$ | $C_{8,4}$ | 0 | 0 | 0 | 0 | 0 | 0 | 0 | 0 |

*Fig. 41*

SYSTEMS AND METHODS TO COORDINATE TRANSMISSIONS IN DISTRIBUTED WIRELESS SYSTEMS VIA USER CLUSTERING

CROSS REFERENCE TO RELATED APPLICATIONS

This application is a continuation and claims the benefit of co-pending U.S. application Ser. No. 15/181,383, filed Jun. 13, 2016, which is a continuation of U.S. application Ser. No. 14/023,302, filed Sep. 10, 2013, entitled, "Systems And Methods To Coordinate Transmissions In Distributed Wireless Systems Via User Clustering" which is a continuation and claims the benefit of co-pending U.S. application Ser. No. 12/917,257, filed Nov. 1, 2010, entitled "Systems And Methods To Coordinate Transmissions In Distributed Wireless Systems Via User Clustering", now U.S. Issued U.S. Pat. No. 8,542,763, Issued on Sep. 24, 2013.

This application is also a continuation-in-part of the following co-pending U.S. patent applications:

U.S. application Ser. No. 12/802,988, filed Jun. 16, 2010, entitled "Interference Management, Handoff, Power Control And Link Adaptation In Distributed-Input Distributed-Output (DIDO) Communication Systems"

U.S. application Ser. No. 12/802,976, filed Jun. 16, 2010, entitled "System And Method For Adjusting DIDO Interference Cancellation Based On Signal Strength Measurements"

U.S. application Ser. No. 12/802,974, filed Jun. 16, 2010, entitled "System And Method For Managing Inter-Cluster Handoff Of Clients Which Traverse Multiple DIDO Clusters"

U.S. application Ser. No. 12/802,989, filed Jun. 16, 2010, entitled "System And Method For Managing Handoff Of A Client Between Different Distributed-Input-Distributed-Output (DIDO) Networks Based On Detected Velocity Of The Client"

U.S. application Ser. No. 12/802,958, filed Jun. 16, 2010, entitled "System And Method For Power Control And Antenna Grouping In A Distributed-Input-Distributed-Output (DIDO) Network"

U.S. application Ser. No. 12/802,975, filed Jun. 16, 2010, entitled "System And Method For Link adaptation In DIDO Multicarrier Systems"

U.S. application Ser. No. 12/802,938, filed Jun. 16, 2010, entitled "System And Method For DIDO Precoding Interpolation In Multicarrier Systems"

U.S. application Ser. No. 12/630,627, filed Dec. 3, 2009, entitled "System and Method For Distributed Antenna Wireless Communications"

U.S. application Ser. No. 12/143,503, filed Jun. 20, 2008 entitled "System and Method For Distributed Input-Distributed Output Wireless Communications";

U.S. application Ser. No. 11/894,394, filed Aug. 20, 2007 entitled, "System and Method for Distributed Input Distributed Output Wireless Communications";

U.S. application Ser. No. 11/894,362, filed Aug. 20, 2007 entitled, "System and method for Distributed Input-Distributed Wireless Communications";

U.S. application Ser. No. 11/894,540, filed Aug. 20, 2007 entitled "System and Method For Distributed Input-Distributed Output Wireless Communications"

U.S. application Ser. No. 11/256,478, filed Oct. 21, 2005 entitled "System and Method For Spatial-Multiplexed Tropospheric Scatter Communications";

U.S. application Ser. No. 10/817,731, filed Apr. 2, 2004 entitled "System and Method For Enhancing Near Vertical Incidence Skywave ("NVIS") Communication Using Space-Time Coding.

BACKGROUND

Prior art multi-user wireless systems may include only a single base station or several base stations.

A single WiFi base station (e.g., utilizing 2.4 GHz 802.11b, g or n protocols) attached to a broadband wired Internet connection in an area where there are no other WiFi access points (e.g. a WiFi access point attached to DSL within a rural home) is an example of a relatively simple multi-user wireless system that is a single base station that is shared by one or more users that are within its transmission range. If a user is in the same room as the wireless access point, the user will typically experience a high-speed link with few transmission disruptions (e.g. there may be packet loss from 2.4 GHz interferers, like microwave ovens, but not from spectrum sharing with other WiFi devices), If a user is a medium distance away or with a few obstructions in the path between the user and WiFi access point, the user will likely experience a medium-speed link. If a user is approaching the edge of the range of the WiFi access point, the user will likely experience a low-speed link, and may be subject to periodic drop-outs if changes to the channel result in the signal SNR dropping below usable levels. And, finally, if the user is beyond the range of the WiFi base station, the user will have no link at all.

When multiple users access the WiFi base station simultaneously, then the available data throughput is shared among them. Different users will typically place different throughput demands on a WiFi base station at a given time, but at times when the aggregate throughput demands exceed the available throughput from the WiFi base station to the users, then some or all users will receive less data throughput than they are seeking. In an extreme situation where a WiFi access point is shared among a very large number of users, throughput to each user can slow down to a crawl, and worse, data throughput to each user may arrive in short bursts separated by long periods of no data throughput at all, during which time other users are served. This "choppy" data delivery may impair certain applications, like media streaming.

Adding additional WiFi base stations in situations with a large number of users will only help up to a point. Within the 2.4 GHz ISM band in the U.S., there are 3 non-interfering channels that can be used for WiFi, and if 3 WiFi base stations in the same coverage area are configured to each use a different non-interfering channel, then the aggregate throughput of the coverage area among multiple users will be increased up to a factor of 3. But, beyond that, adding more WiFi base stations in the same coverage area will not increase aggregate throughput, since they will start sharing the same available spectrum among them, effectually utilizing time-division multiplexed access (TDMA) by "taking turns" using the spectrum. This situation is often seen in coverage areas with high population density, such as within multi-dwelling units. For example, a user in a large apartment building with a WiFi adapter may well experience very poor throughput due to dozens of other interfering WiFi networks (e.g. in other apartments) serving other users that are in the same coverage area, even if the user's access point is in the same room as the client device accessing the base station. Although the link quality is likely good in that situation, the user would be receiving interference from neighbor WiFi adapters operating in the same frequency band, reducing the effective throughput to the user.

Current multiuser wireless systems, including both unlicensed spectrum, such as WiFi, and licensed spectrum, suffer from several limitations. These include coverage area, downlink (DL) data rate and uplink (UL) data rate. Key goals of next generation wireless systems, such as WiMAX and LTE, are to improve coverage area and DL and UL data rate via multiple-input multiple-output (MIMO) technology. MIMO employs multiple antennas at transmit and receive sides of wireless links to improve link quality (resulting in wider coverage) or data rate (by creating multiple non-interfering spatial channels to every user). If enough data rate is available for every user (note, the terms "user" and "client" are used herein interchangeably), however, it may be desirable to exploit channel spatial diversity to create non-interfering channels to multiple users (rather than single user), according to multiuser MIMO (MU-MIMO) techniques. See, e.g., the following references:

G. Caire and S. Shamai, "On the achievable throughput of a multiantenna Gaussian broadcast channel," IEEE Trans. Info. Th., vol. 49, pp. 1691-1706, July 2003.

P. Viswanath and D. Tse, "Sum capacity of the vector Gaussian broadcast channel and uplink-downlink duality," IEEE Trans. Info. Th., vol. 49, pp. 1912-1921, August 2003.

S. Vishwanath, N. Jindal, and A. Goldsmith, "Duality, achievable rates, and sum-rate capacity of Gaussian MIMO broadcast channels," IEEE Trans. Info. Th., vol. 49, pp. 2658-2668, October 2003.

W. Yu and J. Cioffi, "Sum capacity of Gaussian vector broadcast channels," IEEE Trans. Info. Th., vol. 50, pp. 1875-1892, September 2004.

M. Costa, "Writing on dirty paper," IEEE Transactions on Information Theory, vol. 29, pp. 439-441, May 1983.

M. Bengtsson, "A pragmatic approach to multi-user spatial multiplexing," Proc. of Sensor Array and Multichannel Sign. Proc. Workshop, pp. 130-134, August 2002.

K.-K. Wong, R. D. Murch, and K. B. Letaief, "Performance enhancement of multiuser MIMO wireless communication systems," IEEE Trans. Comm., vol. 50, pp. 1960-1970, December 2002.

M. Sharif and B. Hassibi, "On the capacity of MIMO broadcast channel with partial side information," IEEE Trans. Info. Th., vol. 51, pp. 506-522, February 2005.

For example, in MIMO 4×4 systems (i.e., four transmit and four receive antennas), 10 MHz bandwidth, 16-QAM modulation and forward error correction (FEC) coding with rate 3/4 (yielding spectral efficiency of 3 bps/Hz), the ideal peak data rate achievable at the physical layer for every user is 4×30 Mbps=120 Mbps, which is much higher than required to deliver high definition video content (which may only require ~10 Mbps). In MU-MIMO systems with four transmit antennas, four users and single antenna per user, in ideal scenarios (i.e., independent identically distributed, i.i.d., channels) downlink data rate may be shared across the four users and channel spatial diversity may be exploited to create four parallel 30 Mbps data links to the users. Different MU-MIMO schemes have been proposed as part of the LTE standard as described, for example, in 3GPP, "Multiple Input Multiple Output in UTRA", 3GPP TR 25.876 V7.0.0, March 2007; 3GPP, "Base Physical channels and modulation", TS 36.211, V8.7.0, May 2009; and 3GPP, "Multiplexing and channel coding", TS 36.212, V8.7.0, May 2009. However, these schemes can provide only up to 2× improvement in DL data rate with four transmit antennas. Practical implementations of MU-MIMO techniques in standard and proprietary cellular systems by companies like ArrayComm (see, e.g., ArrayComm, "Field-proven results", http://www.arraycomm.com/serve.php?page=proof) have yielded up to a ~3× increase (with four transmit antennas) in DL data rate via space division multiple access (SDMA). A key limitation of MU-MIMO schemes in cellular networks is lack of spatial diversity at the transmit side. Spatial diversity is a function of antenna spacing and multipath angular spread in the wireless links. In cellular systems employing MU-MIMO techniques, transmit antennas at a base station are typically clustered together and placed only one or two wavelengths apart due to limited real estate on antenna support structures (referred to herein as "towers," whether physically tall or not) and due to limitations on where towers may be located. Moreover, multipath angular spread is low since cell towers are typically placed high up (10 meters or more) above obstacles to yield wider coverage.

Other practical issues with cellular system deployment include excessive cost and limited availability of locations for cellular antenna locations (e.g. due to municipal restrictions on antenna placement, cost of real-estate, physical obstructions, etc.) and the cost and/or availability of network connectivity to the transmitters (referred to herein as "backhaul"). Further, cellular systems often have difficulty reaching clients located deeply in buildings due to losses from walls, ceilings, floors, furniture and other impediments.

Indeed, the entire concept of a cellular structure for wide-area network wireless presupposes a rather rigid placement of cellular towers, an alternation of frequencies between adjacent cells, and frequently sectorization, so as to avoid interference among transmitters (either base stations or users) that are using the same frequency. As a result, a given sector of a given cell ends up being a shared block of DL and UL spectrum among all of the users in the cell sector, which is then shared among these users primarily in only the time domain. For example, cellular systems based on Time Division Multiple Access (TDMA) and Code Division Multiple Access (CDMA) both share spectrum among users in the time domain. By overlaying such cellular systems with sectorization, perhaps a 2-3× spatial domain benefit can be achieved. And, then by overlaying such cellular systems with a MU-MIMO system, such as those described previously, perhaps another 2-3× space-time domain benefit can be achieved. But, given that the cells and sectors of the cellular system are typically in fixed locations, often dictated by where towers can be placed, even such limited benefits are difficult to exploit if user density (or data rate demands) at a given time does not match up well with tower/sector placement. A cellular smart phone user often experiences the consequence of this today where the user may be talking on the phone or downloading a web page without any trouble at all, and then after driving (or even walking) to a new location will suddenly see the voice quality drop or the web page slow to a crawl, or even lose the connection entirely. But, on a different day, the user may have the exact opposite occur in each location. What the user is probably experiencing, assuming the environmental conditions are the same, is the fact that user density (or data rate demands) is highly variable, but the available total spectrum (and thereby total data rate, using prior art techniques) to be shared among users at a given location is largely fixed.

Further, prior art cellular systems rely upon using different frequencies in different adjacent cells, typically 3 different frequencies. For a given amount of spectrum, this reduces the available data rate by 3×.

So, in summary, prior art cellular systems may lose perhaps 3× in spectrum utilization due to cellularization, and may improve spectrum utilization by perhaps 3× through sectorization and perhaps 3× more through MU-MIMO techniques, resulting in a net 3*3/3=3× potential spectrum utilization. Then, that bandwidth is typically divided up among users in the time domain, based upon what sector of what cell the users fall into at a given time. There are even further inefficiencies that result due to the fact that a given user's data rate demands are typically independent of the user's location, but the available data rate varies depending on the link quality between the user and the base station. For example, a user further from a cellular base station will typically have less available data rate than a user closer to a base station. Since the data rate is typically shared among all of the users in a given cellular sector, the result of this is that all users are impacted by high data rate demands from distant users with poor link quality (e.g. on the edge of a cell) since such users will still demand the same amount of data rate, yet they will be consuming more of the shared spectrum to get it.

Other proposed spectrum sharing systems, such as that used by WiFi (e.g., 802.11b, g, and n) and those proposed by the White Spaces Coalition, share spectrum very inefficiently since simultaneous transmissions by base stations within range of a user result in interference, and as such, the systems utilize collision avoidance and sharing protocols. These spectrum sharing protocols are within the time domain, and so, when there are a large number of interfering base stations and users, no matter how efficient each base station itself is in spectrum utilization, collectively the base stations are limited to time domain sharing of the spectrum among each other. Other prior art spectrum sharing systems similarly rely upon similar methods to mitigate interference among base stations (be they cellular base stations with antennas on towers or small scale base stations, such as WiFi Access Points (APs)). These methods include limiting transmission power from the base station so as to limit the range of interference, beamforming (via synthetic or physical means) to narrow the area of interference, time-domain multiplexing of spectrum and/or MU-MIMO techniques with multiple clustered antennas on the user device, the base station or both. And, in the case of advanced cellular networks in place or planned today, frequently many of these techniques are used at once.

But, what is apparent by the fact that even advanced cellular systems can achieve only about a 3× increase in spectrum utilization compared to a single user utilizing the spectrum is that all of these techniques have done little to increase the aggregate data rate among shared users for a given area of coverage. In particular, as a given coverage area scales in terms of users, it becomes increasingly difficult to scale the available data rate within a given amount of spectrum to keep pace with the growth of users. For example, with cellular systems, to increase the aggregate data rate within a given area, typically the cells are subdivided into smaller cells (often called nano-cells or femto-cells). Such small cells can become extremely expensive given the limitations on where towers can be placed, and the requirement that towers must be placed in a fairly structured pattern so as to provide coverage with a minimum of "dead zones", yet avoid interference between nearby cells using the same frequencies. Essentially, the coverage area must be mapped out, the available locations for placing towers or base stations must be identified, and then given these constraints, the designers of the cellular system must make do with the best they can. And, of course, if user data rate demands grow over time, then the designers of the cellular system must yet again remap the coverage area, try to find locations for towers or base stations, and once again work within the constraints of the circumstances. And, very often, there simply is no good solution, resulting in dead zones or inadequate aggregate data rate capacity in a coverage area. In other words, the rigid physical placement requirements of a cellular system to avoid interference among towers or base stations utilizing the same frequency results in significant difficulties and constraints in cellular system design, and often is unable to meet user data rate and coverage requirements.

So-called prior art "cooperative" and "cognitive" radio systems seek to increase the spectral utilization in a given area by using intelligent algorithms within radios such that they can minimize interference among each other and/or such that they can potentially "listen" for other spectrum use so as to wait until the channel is clear. Such systems are proposed for use particularly in unlicensed spectrum in an effort to increase the spectrum utilization of such spectrum.

A mobile ad hoc network (MANET) (see http://en.wikipedia.org/wiki/Mobile_ad_hoc_network) is an example of a cooperative self-configuring network intended to provide peer-to-peer communications, and could be used to establish communication among radios without cellular infrastructure, and with sufficiently low-power communications, can potentially mitigate interference among simultaneous transmissions that are out of range of each other. A vast number of routing protocols have been proposed and implemented for MANET systems (see http://en.wikipedia.org/wiki/List_of_ad-hoc_routing_protocols for a list of dozens of routing protocols in a wide range of classes), but a common theme among them is they are all techniques for routing (e.g. repeating) transmissions in such a way to minimize transmitter interference within the available spectrum, towards the goal of particular efficiency or reliability paradigms.

All of the prior art multi-user wireless systems seek to improve spectrum utilization within a given coverage area by utilizing techniques to allow for simultaneous spectrum utilization among base stations and multiple users. Notably, in all of these cases, the techniques utilized for simultaneous spectrum utilization among base stations and multiple users achieve the simultaneous spectrum use by multiple users by mitigating interference among the waveforms to the multiple users. For example, in the case of 3 base stations each using a different frequency to transmit to one of 3 users, there interference is mitigated because the 3 transmissions are at 3 different frequencies. In the case of sectorization from a base station to 3 different users, each 180 degrees apart relative to the base station, interference is mitigated because the beamforming prevents the 3 transmissions from overlapping at any user.

When such techniques are augmented with MU-MIMO, and, for example, each base station has 4 antennas, then this has the potential to increase downlink throughput by a factor of 4, by creating four non-interfering spatial channels to the users in given coverage area. But it is still the case that some technique must be utilized to mitigate the interference among multiple simultaneous transmissions to multiple users in different coverage areas.

And, as previously discussed, such prior art techniques (e.g. cellularization, sectorization) not only typically suffer from increasing the cost of the multi-user wireless system and/or the flexibility of deployment, but they typically run into physical or practical limitations of aggregate throughput in a given coverage area. For example, in a cellular system, there may not be enough available locations to install more base stations to create smaller cells. And, in an MU-MIMO system, given the clustered antenna spacing at each base station location, the limited spatial diversity results in asymptotically diminishing returns in throughput as more antennas are added to the base station.

And further, in the case of multi-user wireless systems where the user location and density is unpredictable, it results in unpredictable (with frequently abrupt changes) in throughput, which is inconvenient to the user and renders some applications (e.g. the delivery of services requiring predictable throughput) impractical or of low quality. Thus, prior art multi-user wireless systems still leave much to be desired in terms of their ability to provide predictable and/or high-quality services to users.

Despite the extraordinary sophistication and complexity that has been developed for prior art multi-user wireless systems over time, there exist common themes: transmissions are distributed among different base stations (or ad hoc transceivers) and are structured and/or controlled so as to avoid the RF waveform transmissions from the different base stations and/or different ad hoc transceivers from interfering with each other at the receiver of a given user.

Or, to put it another way, it is taken as a given that if a user happens to receive transmissions from more than one base station or ad hoc transceiver at the same time, the interference from the multiple simultaneous transmissions will result in a reduction of the SNR and/or bandwidth of the signal to the user which, if severe enough, will result in loss of all or some of the potential data (or analog information) that would otherwise have been received by the user.

Thus, in a multiuser wireless system, it is necessary to utilize one or more spectrum sharing approaches or another to avoid or mitigate such interference to users from multiple base stations or ad hoc transceivers transmitting at the same frequency at the same time. There are a vast number of prior art approaches to avoiding such interference, including controlling base stations' physical locations (e.g. cellularization), limiting power output of base stations and/or ad hoc transceivers (e.g. limiting transmit range), beamforming/sectorization, and time domain multiplexing. In short, all of these spectrum sharing systems seek to address the limitation of multiuser wireless systems that when multiple base stations and/or ad hoc transceivers transmitting simultaneously at the same frequency are received by the same user, the resulting interference reduces or destroys the data throughput to the affected user. If a large percentage, or all, of the users in the multi-user wireless system are subject to interference from multiple base stations and/or ad hoc transceivers (e.g. in the event of the malfunction of a component of a multi-user wireless system), then it can result in a situation where the aggregate throughput of the multi-user wireless system is dramatically reduced, or even rendered non-functional.

Prior art multi-user wireless systems add complexity and introduce limitations to wireless networks and frequently result in a situation where a given user's experience (e.g. available bandwidth, latency, predictability, reliability) is impacted by the utilization of the spectrum by other users in the area. Given the increasing demands for aggregate bandwidth within wireless spectrum shared by multiple users, and the increasing growth of applications that can rely upon multi-user wireless network reliability, predictability and low latency for a given user, it is apparent that prior art multi-user wireless technology suffers from many limitations. Indeed, with the limited availability of spectrum suitable for particular types of wireless communications (e.g. at wavelengths that are efficient in penetrating building walls), it may be the case that prior art wireless techniques will be insufficient to meet the increasing demands for bandwidth that is reliable, predictable and low-latency.

Prior art related to the current invention describes beamforming systems and methods for null-steering in multiuser scenarios. Beamforming was originally conceived to maximize received signal-to-noise ratio (SNR) by dynamically adjusting phase and/or amplitude of the signals (i.e., beamforming weights) fed to the antennas of the array, thereby focusing energy toward the user's direction. In multiuser scenarios, beamforming can be used to suppress interfering sources and maximize signal-to-interference-plus-noise ratio (SINR). For example, when beamforming is used at the receiver of a wireless link, the weights are computed to create nulls in the direction of the interfering sources. When beamforming is used at the transmitter in multiuser downlink scenarios, the weights are calculated to pre-cancel inter-user interference and maximize the SINR to every user. Alternative techniques for multiuser systems, such as BD precoding, compute the precoding weights to maximize throughput in the downlink broadcast channel. The co-pending applications, which are incorporated herein by reference, describe the foregoing techniques (see co-pending applications for specific citations).

BRIEF DESCRIPTION OF THE DRAWINGS

A better understanding of the present invention can be obtained from the following detailed description in conjunction with the drawings, in which:

FIGS. 21a-b illustrate two power distributions corresponding to the configurations in FIGS. 20a and 20b, respectively.

FIG. 22a-b illustrate the rate distribution for the two scenarios shown in FIGS. 99a and 99b, respectively.

FIG. 32 illustrates SER performance of one embodiment of the link adaptation (LA) techniques.

FIGS. 38a-b illustrate link quality metric thresholds employed in one embodiment of the invention.

FIGS. 39-41 illustrate examples of link-quality matrices for establishing user clusters.

DETAILED DESCRIPTION

Figure 1:
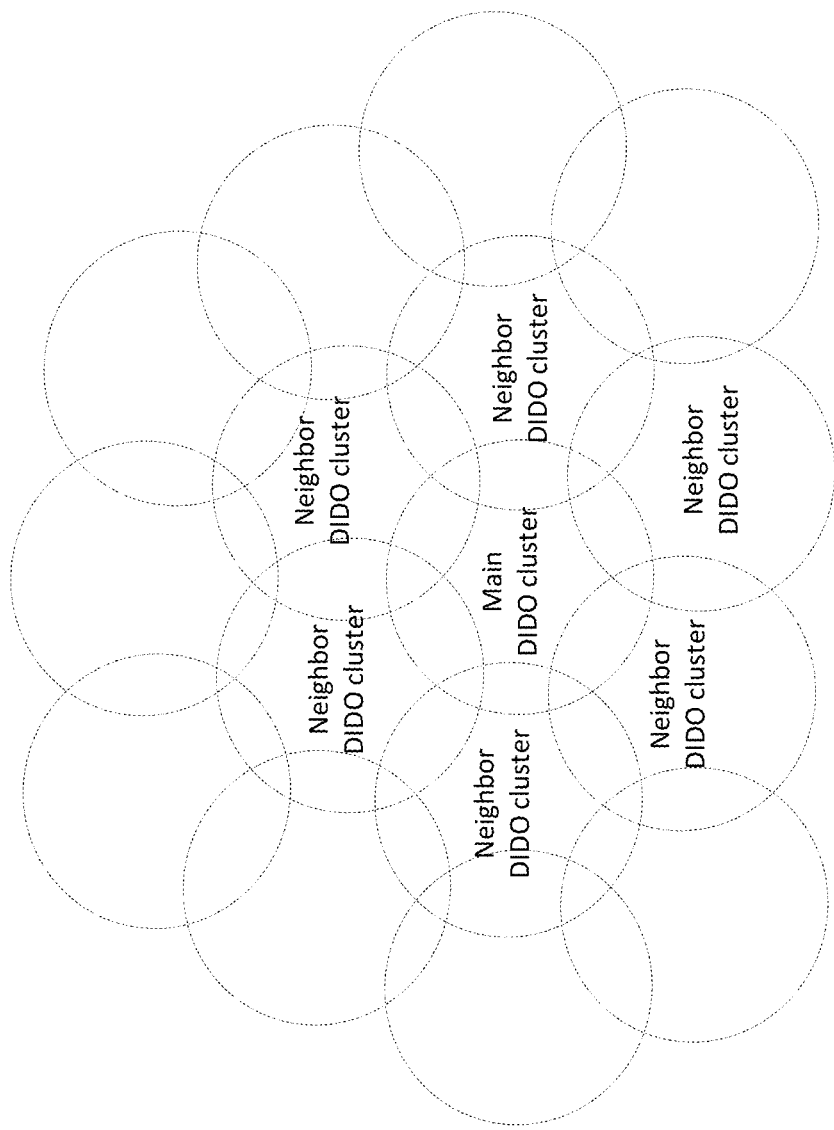
FIG. 1 illustrates a main DIDO cluster surrounded by neighboring DIDO clusters in one embodiment of the invention.

One solution to overcome many of the above prior art limitations is an embodiment of Distributed-Input Distributed-Output (DIDO) technology. DIDO technology is described in the following patents and patent applications, all of which are assigned the assignee of the present patent and are incorporated by reference. These patents and applications are sometimes referred to collectively herein as the "related patents and applications":

U.S. application Ser. No. 12/802,988, filed Jun. 16, 2010, entitled "Interference Management, Handoff, Power Control And Link Adaptation In Distributed-Input Distributed-Output (DIDO) Communication Systems"

U.S. application Ser. No. 12/802,976, filed Jun. 16, 2010, entitled "System And Method For Adjusting DIDO Interference Cancellation Based On Signal Strength Measurements"

U.S. application Ser. No. 12/802,974, filed Jun. 16, 2010, entitled "System And Method For Managing Inter-Cluster Handoff Of Clients Which Traverse Multiple DIDO Clusters"

U.S. application Ser. No. 12/802,989, filed Jun. 16, 2010, entitled "System And Method For Managing Handoff Of A Client Between Different Distributed-Input-Distributed-Output (DIDO) Networks Based On Detected Velocity Of The Client"

U.S. application Ser. No. 12/802,958, filed Jun. 16, 2010, entitled "System And Method For Power Control And Antenna Grouping In A Distributed-Input-Distributed-Output (DIDO) Network"

U.S. application Ser. No. 12/802,975, filed Jun. 16, 2010, entitled "System And Method For Link adaptation In DIDO Multicarrier Systems"

U.S. application Ser. No. 12/802,938, filed Jun. 16, 2010, entitled "System And Method For DIDO Precoding Interpolation In Multicarrier Systems"

U.S. application Ser. No. 12/630,627, filed Dec. 2, 2009, entitled "System and Method For Distributed Antenna Wireless Communications"

U.S. Pat. No. 7,599,420, filed Aug. 20, 2007, issued Oct. 6, 2009, entitled "System and Method for Distributed Input Distributed Output Wireless Communication";

U.S. Pat. No. 7,633,994, filed Aug. 20, 2007, issued Dec. 15, 2009, entitled "System and Method for Distributed Input Distributed Output Wireless Communication";

U.S. Pat. No. 7,636,381, filed Aug. 20, 2007, issued Dec. 22, 2009, entitled "System and Method for Distributed Input Distributed Output Wireless Communication";

U.S. application Ser. No. 12/143,503, filed Jun. 20, 2008 entitled, "System and Method For Distributed Input-Distributed Output Wireless Communications";

U.S. application Ser. No. 11/256,478, filed Oct. 21, 2005 entitled "System and Method For Spatial-Multiplexed Tropospheric Scatter Communications";

U.S. Pat. No. 7,418,053, filed Jul. 30, 2004, issued Aug. 26, 2008, entitled "System and Method for Distributed Input Distributed Output Wireless Communication";

U.S. application Ser. No. 10/817,731, filed Apr. 2, 2004 entitled "System and Method For Enhancing Near Vertical Incidence Skywave ("NVIS") Communication Using Space-Time Coding.

To reduce the size and complexity of the present patent application, the disclosure of some of the related patents and applications is not explicitly set forth below. Please see the related patents and applications for a full detailed description of the disclosure.

Note that section I below (Disclosure From Related application Ser. No. 12/802,988) utilizes its own set of endnotes which refer to prior art references and prior applications assigned to the assignee of the present application. The endnote citations are listed at the end of section I (just prior to the heading for Section II). Citations in Section II uses may have numerical designations for its citations which overlap with those used in Section I even through these numerical designations identify different references (listed at the end of Section II). Thus, references identified by a particular numerical designation may be identified within the section in which the numerical designation is used.

I. DISCLOSURE FROM RELATED APPLICATION SER. NO. 12/802,988

1. Methods to Remove Inter-Cluster Interference

Described below are wireless radio frequency (RF) communication systems and methods employing a plurality of distributed transmitting antennas to create locations in space with zero RF energy. When M transmit antennas are employed, it is possible to create up to (M−1) points of zero RF energy in predefined locations. In one embodiment of the invention, the points of zero RF energy are wireless devices and the transmit antennas are aware of the channel state information (CSI) between the transmitters and the receivers. In one embodiment, the CSI is computed at the receivers and fed back to the transmitters. In another embodiment, the CSI is computed at the transmitter via training from the receivers, assuming channel reciprocity is exploited. The transmitters may utilize the CSI to determine the interfering signals to be simultaneously transmitted. In one embodiment, block diagonalization (BD) precoding is employed at the transmit antennas to generate points of zero RF energy.

The system and methods described herein differ from the conventional receive/transmit beamforming techniques described above. In fact, receive beamforming computes the weights to suppress interference at the receive side (via null-steering), whereas some embodiments of the invention described herein apply weights at the transmit side to create interference patters that result in one or multiple locations in space with "zero RF energy." Unlike conventional transmit beamforming or BD precoding designed to maximize signal quality (or SINR) to every user or downlink throughput, respectively, the systems and methods described herein minimize signal quality under certain conditions and/or from certain transmitters, thereby creating points of zero RF energy at the client devices (sometimes referred to herein as "users"). Moreover, in the context of distributed-input distributed-output (DIDO) systems (described in our related patents and applications), transmit antennas distributed in space provide higher degrees of freedom (i.e., higher channel spatial diversity) that can be exploited to create multiple points of zero RF energy and/or maximum SINR to different users. For example, with M transmit antennas it is possible to create up to (M−1) points of RF energy. By contrast, practical beamforming or BD multiuser systems are typically designed with closely spaced antennas at the transmit side that limit the number of simultaneous users that can be serviced over the wireless link, for any number of transmit antennas M.

Consider a system with M transmit antennas and K users, with K<M. We assume the transmitter is aware of the CSI ($H \in C^{K \times M}$) between the M transmit antennas and K users. For simplicity, every user is assumed to be equipped with single antenna, but the same method can be extended to multiple receive antennas per user. The precoding weights ($w \in C^{M \times 1}$) that create zero RF energy at the K users' locations are computed to satisfy the following condition $$Hw = 0^{K \times 1}$$

where $0^{K \times 1}$ is the vector with all zero entries and H is the channel matrix obtained by combining the channel vectors ($h_k \in C^{1 \times M}$) from the M transmit antennas to the K users as $$H = \begin{bmatrix} h_1 \\ \vdots \\ h_K \\ \vdots \\ h_K \end{bmatrix}.$$

In one embodiment, singular value decomposition (SVD) of the channel matrix H is computed and the precoding weight w is defined as the right singular vector corresponding to the null subspace (identified by zero singular value) of H.

The transmit antennas employ the weight vector defined above to transmit RF energy, while creating K points of zero RF energy at the locations of the K users such that the signal received at the $k^{th}$ user is given by $$r_k = h_k w s_k + n_k = 0 + n_k$$

where $n_k \in C^{1 \times 1}$ is the additive white Gaussian noise (AWGN) at the $k^{th}$ user. In one embodiment, singular value decomposition (SVD) of the channel matrix H is computed and the precoding weight w is defined as the right singular vector corresponding to the null subspace (identified by zero singular value) of H.

In another embodiment, the wireless system is a DIDO system and points of zero RF energy are created to pre-cancel interference to the clients between different DIDO coverage areas. In U.S. application Ser. No. 12/630,627, a DIDO system is described which includes:
DIDO clients
DIDO distributed antennas
DIDO base transceiver stations (BTS)
DIDO base station network (BSN)

Every BTS is connected via the BSN to multiple distributed antennas that provide service to given coverage area called DIDO cluster. In the present patent application we describe a system and method for removing interference between adjacent DIDO clusters. As illustrated in FIG. 1, we assume the main DIDO cluster hosts the client (i.e. a user device served by the multi-user DIDO system) affected by interference (or target client) from the neighbor clusters.

Figure 2:
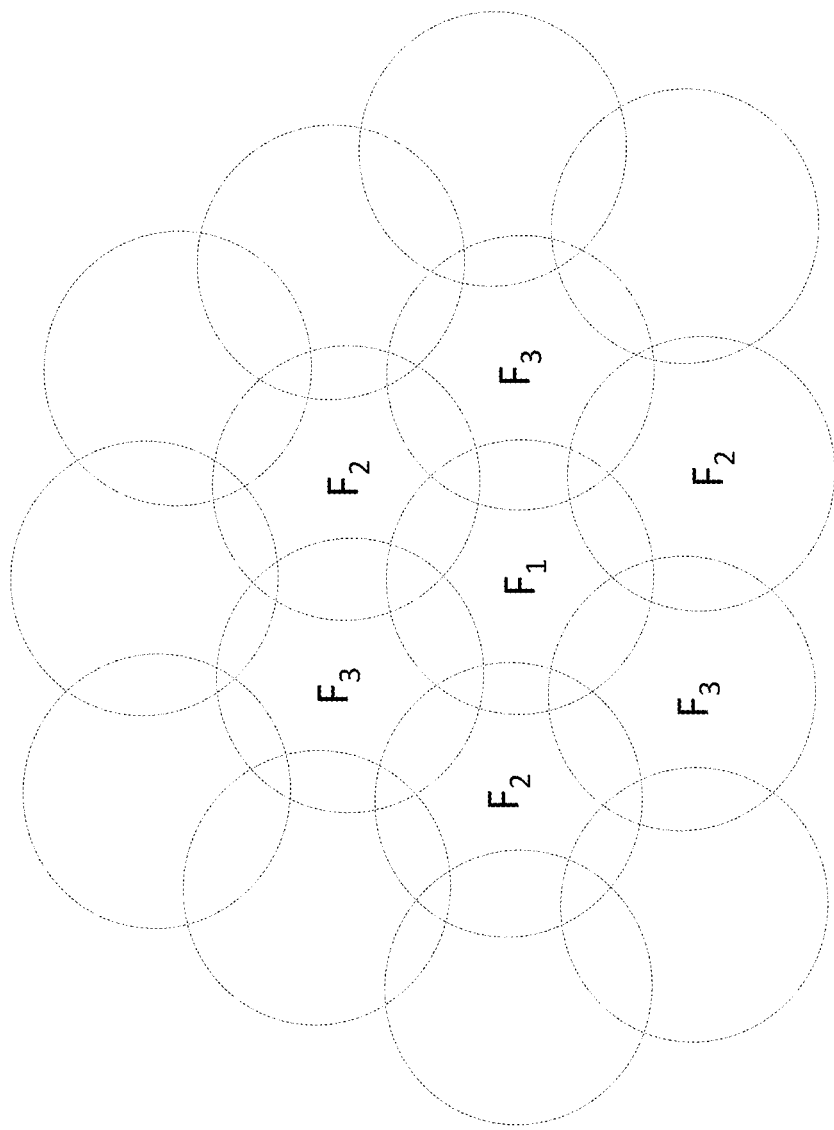
FIG. 2 illustrates frequency division multiple access (FDMA) techniques employed in one embodiment of the invention.

In one embodiment, neighboring clusters operate at different frequencies according to frequency division multiple access (FDMA) techniques similar to conventional cellular systems. For example, with frequency reuse factor of 3, the same carrier frequency is reused every third DIDO cluster as illustrated in FIG. 2. In FIG. 2, the different carrier frequencies are identified as $F_1$, $F_2$ and $F_3$. While this embodiment may be used in some implementations, this solution yields loss in spectral efficiency since the available spectrum is divided in multiple subbands and only a subset of DIDO clusters operate in the same subband. Moreover, it requires complex cell planning to associate different DIDO clusters to different frequencies, thereby preventing interference.

Like prior art cellular systems, such cellular planning requires specific placement of antennas and limiting of transmit power to as to avoid interference between clusters using the same frequency.

Figure 3:
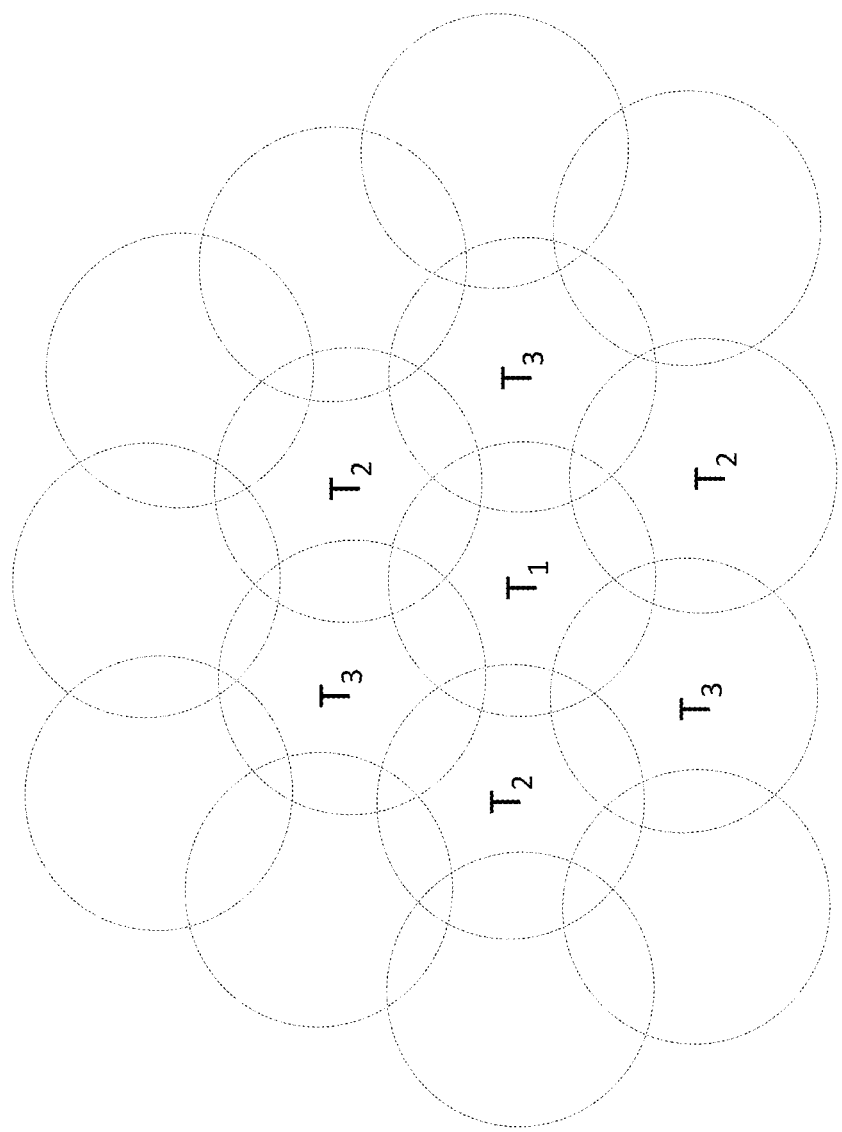
FIG. 3 illustrates time division multiple access (TDMA) techniques employed in one embodiment of the invention.

In another embodiment, neighbor clusters operate in the same frequency band, but at different time slots according to time division multiple access (TDMA) technique. For example, as illustrated in FIG. 3 DIDO transmission is allowed only in time slots $T_1$, $T_2$, and $T_3$ for certain clusters, as illustrated. Time slots can be assigned equally to different clusters, such that different clusters are scheduled according to a Round-Robin policy. If different clusters are characterized by different data rate requirements (i.e., clusters in crowded urban environments as opposed to clusters in rural areas with fewer number of clients per area of coverage), different priorities are assigned to different clusters such that more time slots are assigned to the clusters with larger data rate requirements. While TDMA as described above may be employed in one embodiment of the invention, a TDMA approach may require time synchronization across different clusters and may result in lower spectral efficiency since interfering clusters cannot use the same frequency at the same time.

In one embodiment, all neighboring clusters transmit at the same time in the same frequency band and use spatial processing across clusters to avoid interference. In this embodiment, the multi-cluster DIDO system: (i) uses conventional DIDO precoding within the main cluster to transmit simultaneous non-interfering data streams within the same frequency band to multiple clients (such as described in the related patents and applications, including U.S. Pat. Nos. 7,599,420; 7,633,994; 7,636,381; and application Ser. No. 12/143,503); (ii) uses DIDO precoding with interference cancellation in the neighbor clusters to avoid interference to the clients lying in the interfering zones 8010 in FIG. 4, by creating points of zero radio frequency (RF) energy at the locations of the target clients. If a target client is in an interfering zone 410, it will receive the sum of the RF containing the data stream from the main cluster 411 and the zero RF energy from the interfering cluster 412-413, which will simply be the RF containing the data stream from the main cluster. Thus, adjacent clusters can utilize the same frequency simultaneously without target clients in the interfering zone suffering from interference.

In practical systems, the performance of DIDO precoding may be affected by different factors such as: channel estimation error or Doppler effects (yielding obsolete channel state information at the DIDO distributed antennas); intermodulation distortion (IMD) in multicarrier DIDO systems; time or frequency offsets. As a result of these effects, it may be impractical to achieve points of zero RF energy. However, as long as the RF energy at the target client from the interfering clusters is negligible compared to the RF energy from the main cluster, the link performance at the target client is unaffected by the interference. For example, let us assume the client requires 20 dB signal-to-noise ratio (SNR) to demodulate 4-QAM constellations using forward error correction (FEC) coding to achieve target bit error rate (BER) of $10^{-6}$. If the RF energy at the target client received from the interfering cluster is 20 dB below the RF energy received from the main cluster, the interference is negligible and the client can demodulate data successfully within the predefined BER target. Thus, the term "zero RF energy" as used herein does not necessarily mean that the RF energy from interfering RF signals is zero. Rather, it means that the RF energy is sufficiently low relative to the RF energy of the desired RF signal such that the desired RF signal may be received at the receiver. Moreover, while certain desirable thresholds for interfering RF energy relative to desired RF energy are described, the underlying principles of the invention are not limited to any particular threshold values.

Figure 4:
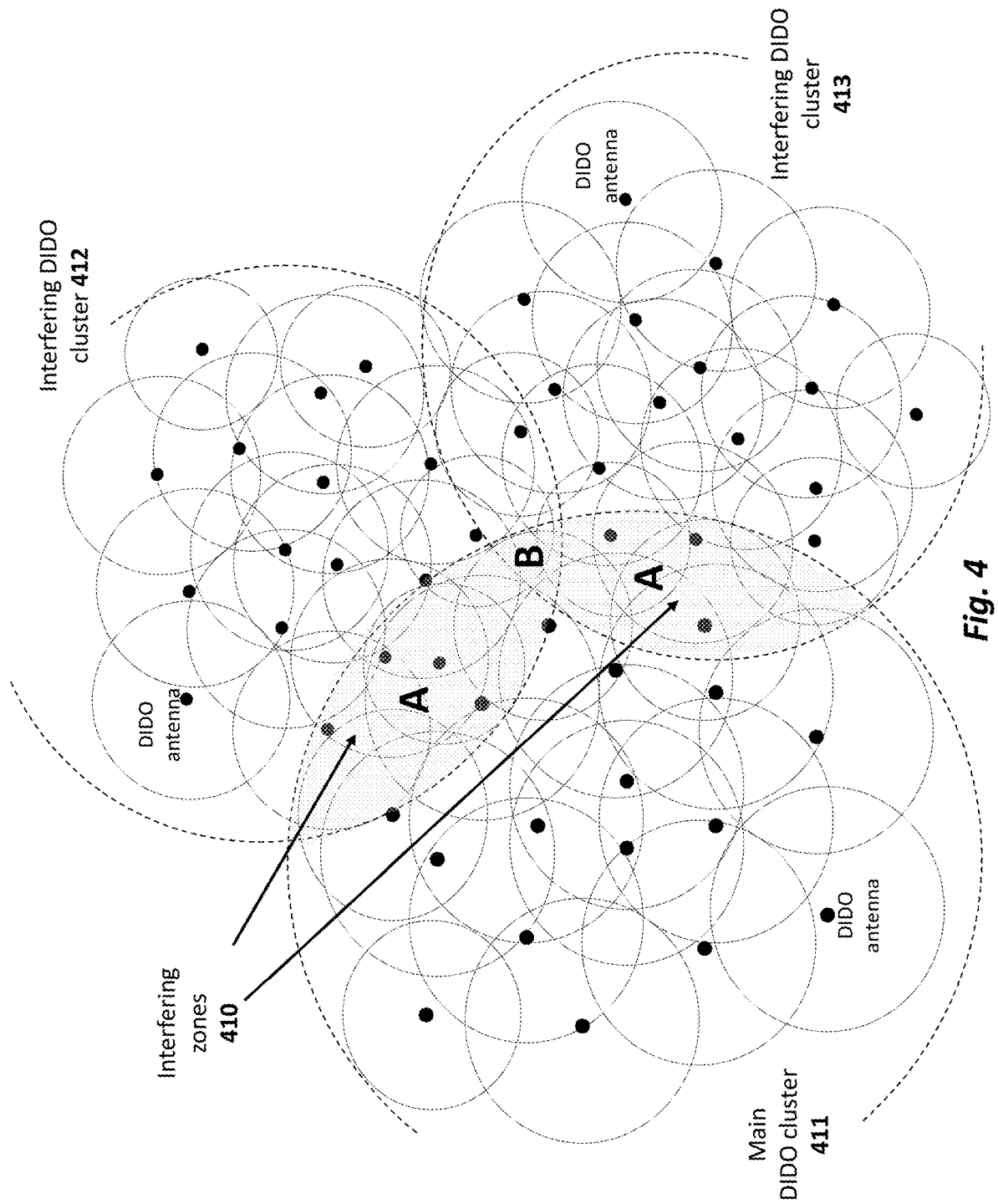
FIG. 4 illustrates different types of interfering zones addressed in one embodiment of the invention.

There are different types of interfering zones 8010 as shown in FIG. 4. For example, "type A" zones (as indicated by the letter "A" in FIG. 80) are affected by interference from only one neighbor cluster, whereas "type B" zones (as indicated by the letter "B") account for interference from two or multiple neighbor clusters.

Figure 5:
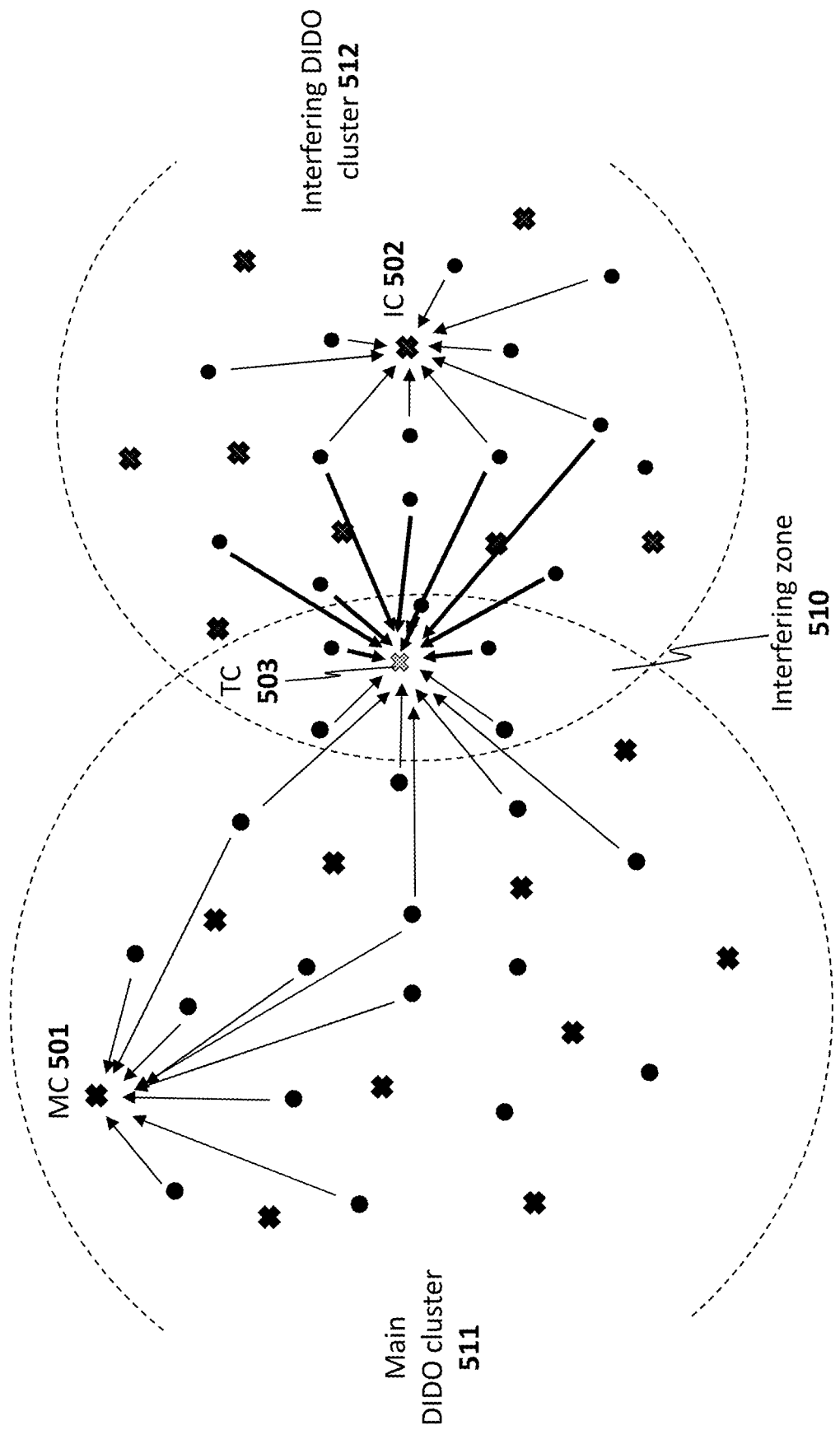
FIG. 5 illustrates a framework employed in one embodiment of the invention.

FIG. 5 depicts a framework employed in one embodiment of the invention. The dots denote DIDO distributed antennas, the crosses refer to the DIDO clients and the arrows indicate the directions of propagation of RF energy. The DIDO antennas in the main cluster transmit precoded data signals to the clients MC 501 in that cluster. Likewise, the DIDO antennas in the interfering cluster serve the clients IC 502 within that cluster via conventional DIDO precoding. The green cross 503 denotes the target client TC 503 in the interfering zone. The DIDO antennas in the main cluster 511 transmit precoded data signals to the target client (black arrows) via conventional DIDO precoding. The DIDO antennas in the interfering cluster 512 use precoding to create zero RF energy towards the directions of the target client 503 (green arrows).

The received signal at target client k in any interfering zone 410A, B in FIG. 4 is given by $$r_k = H_k W_k s_k + H_k \sum_{\substack{u=1 \\ u \ne k}}^{U} W_u s_u + \sum_{c=1}^{C} H_{c,k} \sum_{i=1}^{I_c} W_{c,i} s_{c,i} + n_k \quad (1)$$

where k=1, . . . , K, with K being the number of clients in the interfering zone 8010A, B, U is the number of clients in the main DIDO cluster, C is the number of interfering DIDO clusters 412-413 and $I_c$ is the number of clients in the interfering cluster c. Moreover, $r_k \in C^{N \times M}$ is the vector containing the receive data streams at client k, assuming M transmit DIDO antennas and N receive antennas at the client devices; $s_k \in C^{N \times 1}$ is the vector of transmit data streams to client k in the main DIDO cluster; $s_u \in C^{N \times 1}$ is the vector of transmit data streams to client u in the main DIDO cluster; $s_{c,i} \in C^{N \times 1}$ is the vector of transmit data streams to client i in the $c^{th}$ interfering DIDO cluster; $n_k \in C^{N \times 1}$ is the vector of additive white Gaussian noise (AWGN) at the N receive antennas of client k; $H_k \in C^{N \times M}$ is the DIDO channel matrix from the M transmit DIDO antennas to the N receive antennas at client k in the main DIDO cluster; $H_{c,k} \in C^{N \times M}$ is the DIDO channel matrix from the M transmit DIDO antennas to the N receive antennas t client k in the $c^{th}$ interfering DIDO cluster; $W_k \in C^{M \times N}$ is the matrix of DIDO precoding weights to client k in the main DIDO cluster; $W_k \in C^{M \times N}$ is the matrix of DIDO precoding weights to client u in the main DIDO cluster; $W_{c,i} \in C^{M \times N}$ is the matrix of DIDO precoding weights to client i in the $c^{th}$ interfering DIDO cluster.

To simplify the notation and without loss of generality, we assume all clients are equipped with N receive antennas and there are M DIDO distributed antennas in every DIDO cluster, with $M \geq (N \cdot U)$ and $M \geq (N \cdot I_c)$, $\forall c = 1, \ldots, C$. If M is larger than the total number of receive antennas in the cluster, the extra transmit antennas are used to pre-cancel interference to the target clients in the interfering zone or to improve link robustness to the clients within the same cluster via diversity schemes described in the related patents and applications, including U.S. Pat. Nos. 7,599,420; 7,633,994; 7,636,381; and application Ser. No. 12/143,503.

The DIDO precoding weights are computed to pre-cancel inter-client interference within the same DIDO cluster. For example, block diagonalization (BD) precoding described in the related patents and applications, including U.S. Pat. Nos. 7,599,420; 7,633,994; 7,636,381; and application Ser. No. 12/143,503 and [7] can be used to remove inter-client interference, such that the following condition is satisfied in the main cluster $$H_k W_u = 0^{N \times N}; \forall u=1, \ldots, U; \text{ with } u \neq k. \tag{2}$$

The precoding weight matrices in the neighbor DIDO clusters are designed such that the following condition is satisfied $$H_{c,k} W_{c,i} = 0^{N \times N}; \forall c=1, \ldots, C \text{ and } \forall i=1, \ldots, I_c. \tag{3}$$

To compute the precoding matrices $W_{c,i}$, the downlink channel from the M transmit antennas to the $I_c$ clients in the interfering cluster as well as to client k in the interfering zone is estimated and the precoding matrix is computed by the DIDO BTS in the interfering cluster. If BD method is used to compute the precoding matrices in the interfering clusters, the following effective channel matrix is built to compute the weights to the $i^{th}$ client in the neighbor clusters $$\bar{H}_{c,i} = \begin{bmatrix} H_{c,k} \\ \tilde{H}_{c,i} \end{bmatrix} \tag{4}$$

where $\tilde{H}_{c,i}$ is the matrix obtained from the channel matrix $H_c \in \mathbb{C}^{(N \cdot I_c) \times M}$ for the interfering cluster c, where the rows corresponding to the $i^{th}$ client are removed.

Substituting conditions (2) and (3) into (1), we obtain the received data streams for target client k, where intra-cluster and inter-cluster interference is removed $$r_k = H_k W_k s_k + n_k. \tag{5}$$

The precoding weights $W_{c,i}$ in (1) computed in the neighbor clusters are designed to transmit precoded data streams to all clients in those clusters, while pre-cancelling interference to the target client in the interfering zone. The target client receives precoded data only from its main cluster. In a different embodiment, the same data stream is sent to the target client from both main and neighbor clusters to obtain diversity gain. In this case, the signal model in (5) is expressed as $$r_k = (H_k W_k + \Sigma_{c=1}^{C} H_{c,k} W_{c,k}) s_k + n_k \tag{6}$$

where $W_{c,k}$ is the DIDO precoding matrix from the DIDO transmitters in the $c^{th}$ cluster to the target client k in the interfering zone. Note that the method in (6) requires time synchronization across neighboring clusters, which may be complex to achieve in large systems, but nonetheless, is quite feasible if the diversity gain benefit justifies the cost of implementation.

We begin by evaluating the performance of the proposed method in terms of symbol error rate (SER) as a function of the signal-to-noise ratio (SNR). Without loss of generality, we define the following signal model assuming single antenna per client and reformulate (1) as $$r_k = \sqrt{SNR} h_k w_k s_k + \sqrt{INR} h_{c,k} \Sigma_{i=1}^{I} w_{c,i} s_{c,i} + n_k \tag{7}$$

where INR is the interference-to-noise ratio defined as INR=SNR/SIR and SIR is the signal-to-interference ratio.

Figure 6:
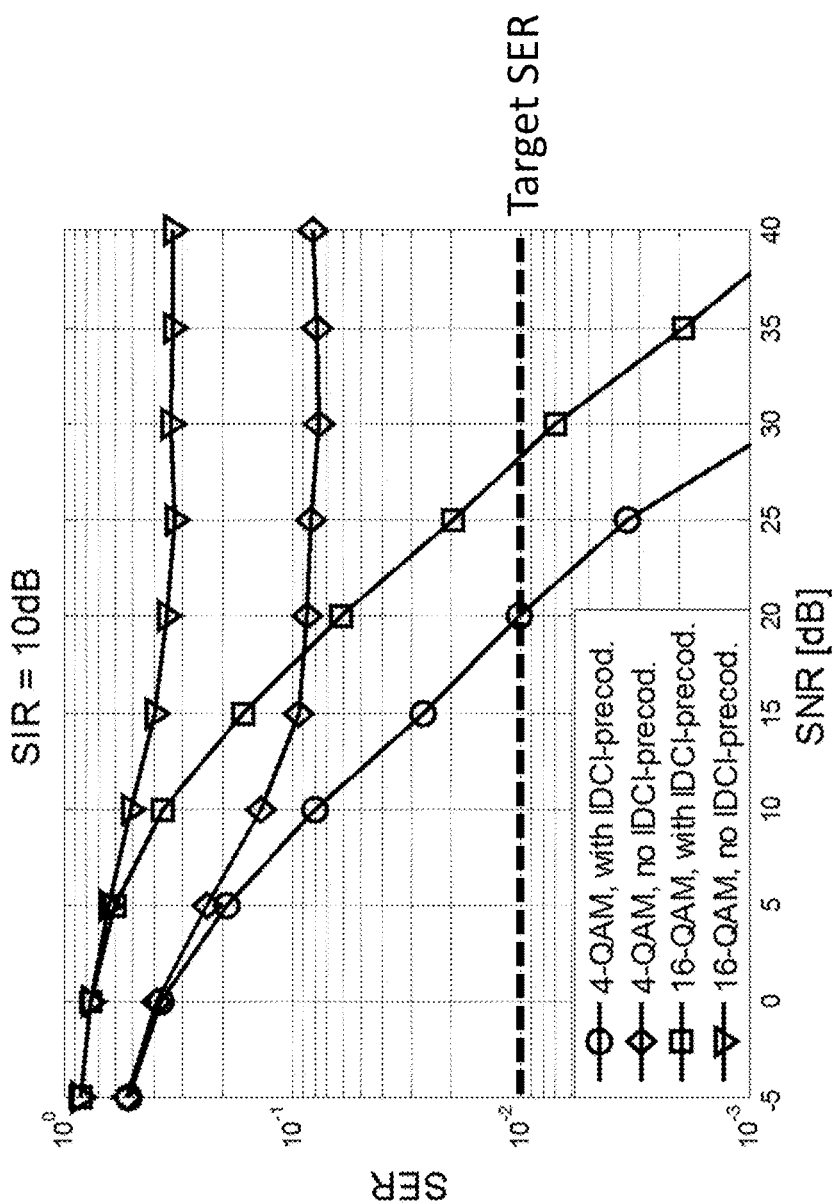
FIG. 6 illustrates a graph showing SER as a function of the SNR, assuming SIR=10 dB for the target client in the interfering zone.

FIG. 6 shows the SER as a function of the SNR, assuming SIR=10 dB for the target client in the interfering zone. Without loss of generality, we measured the SER for 4-QAM and 16-QAM without forwards error correction (FEC) coding. We fix the target SER to 1% for uncoded systems. This target corresponds to different values of SNR depending on the modulation order (i.e., SNR=20 dB for 4-QAM and SNR=28 dB for 16-QAM). Lower SER targets can be satisfied for the same values of SNR when using FEC coding due to coding gain. We consider the scenario of two clusters (one main cluster and one interfering cluster) with two DIDO antennas and two clients (equipped with single antenna each) per cluster. One of the clients in the main cluster lies in the interfering zone. We assume flat-fading narrowband channels, but the following results can be extended to frequency selective multicarrier (OFDM) systems, where each subcarrier undergoes flat-fading. We consider two scenarios: (i) one with inter-DIDO-cluster interference (IDCI) where the precoding weights $w_{c,i}$ are computed without accounting for the target client in the interfering zone; and (ii) the other where the IDCI is removed by computing the weights $w_{c,i}$ to cancel IDCI to the target client. We observe that in presence of IDCI the SER is high and above the predefined target. With IDCI-precoding at the neighbor cluster the interference to the target client is removed and the SER targets are reached for SNR>20 dB.

Figure 7:
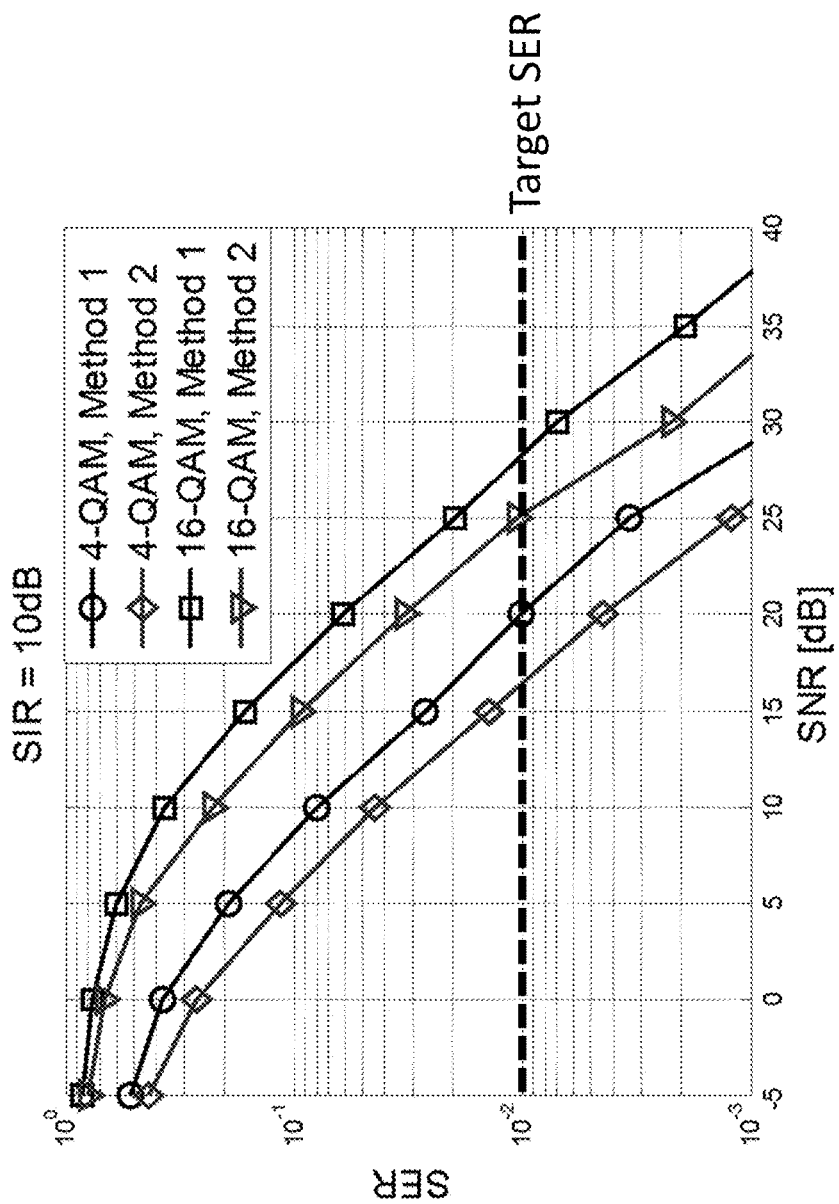
FIG. 7 illustrates a graph showing SER derived from two IDCI-precoding techniques.

The results in FIG. 6 assumes IDCI-precoding as in (5). If IDCI-precoding at the neighbor clusters is also used to precode data streams to the target client in the interfering zone as in (6), additional diversity gain is obtained. FIG. 7 compares the SER derived from two techniques: (i) "Method 1" using the IDCI-precoding in (5); (ii) "Method 2" employing IDCI-precoding in (6) where the neighbor clusters also transmit precoded data stream to the target client. Method 2 yields ~3 dB gain compared to conventional IDCI-precoding due to additional array gain provided by the DIDO antennas in the neighbor cluster used to transmit precoded data stream to the target client. More generally, the array gain of Method 2 over Method 1 is proportional to 10*log 10(C+1), where C is the number of neighbor clusters and the factor "1" refers to the main cluster.

Figure 8:
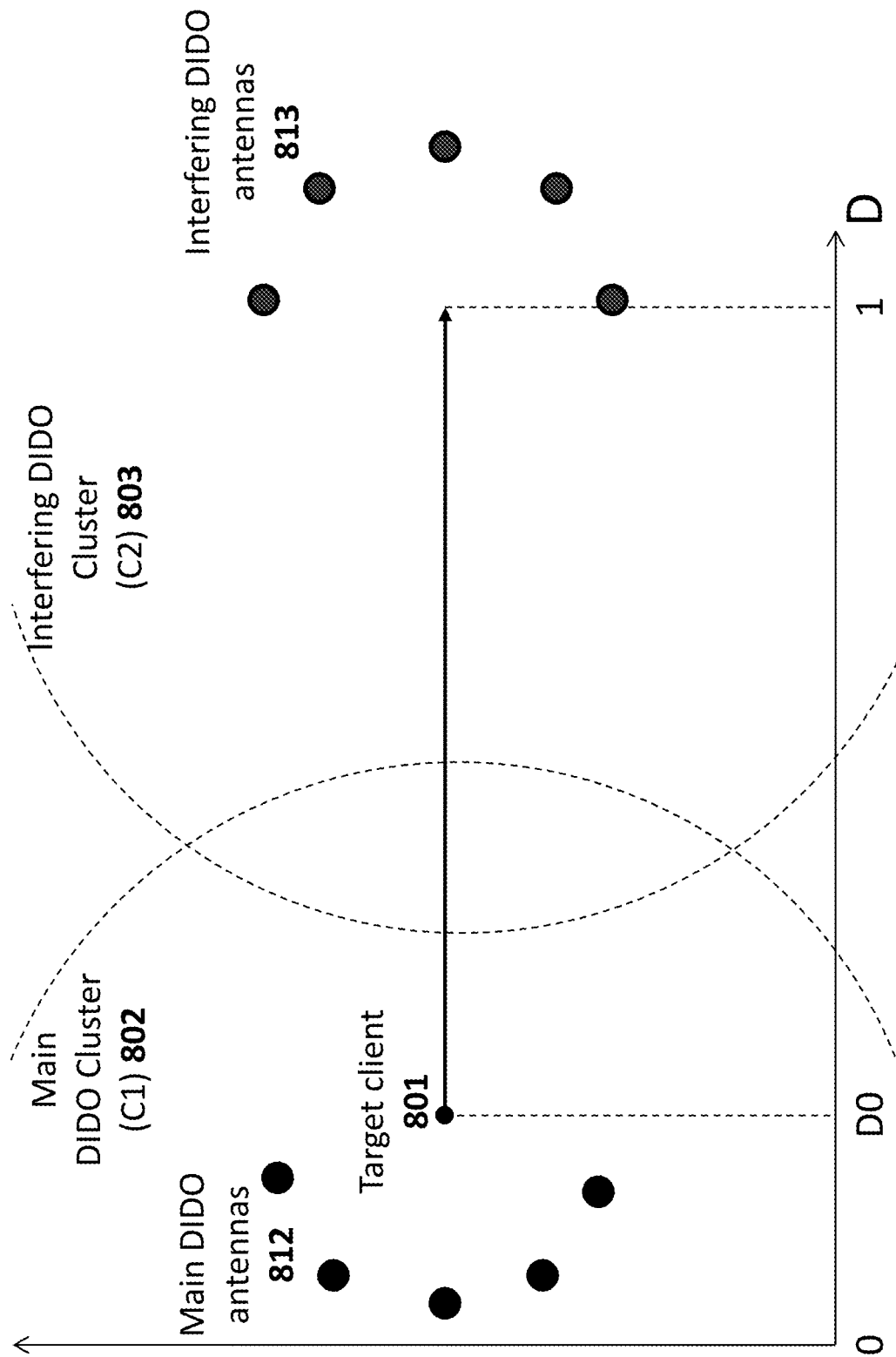
FIG. 8 illustrates an exemplary scenario in which a target client moves from a main DIDO cluster to an interfering cluster.

Next, we evaluate the performance of the above method as a function of the target client's location with respect to the interfering zone. We consider one simple scenario where a target client 8401 moves from the main DIDO cluster 802 to the interfering cluster 803, as depicted in FIG. 8. We assume all DIDO antennas 812 within the main cluster 802 employ BD precoding to cancel intra-cluster interference to satisfy condition (2). We assume single interfering DIDO cluster, single receiver antenna at the client device 801 and equal pathloss from all DIDO antennas in the main or interfering cluster to the client (i.e., DIDO antennas placed in circle around the client). We use one simplified pathloss model with pathloss exponent 4 (as in typical urban environments) [11].

The analysis hereafter is based on the following simplified signal model that extends (7) to account for pathloss $$r_k = \sqrt{\frac{SNR \cdot D_o^4}{D^4}} h_k w_k s_k + \sqrt{\frac{SNR \cdot D_o^4}{(1-D)^4}} h_{c,k} \sum_{i=1}^{I} w_{c,i} s_{c,i} + n_k \tag{8}$$

where the signal-to-interference (SIR) is derived as SIR=$((1-D)/D)^4$. In modeling the IDCI, we consider three scenarios: i) ideal case with no IDCI; ii) IDCI pre-cancelled via BD precoding in the interfering cluster to satisfy condition (3); iii) with IDCI, not pre-cancelled by the neighbor cluster.

Figure 9:
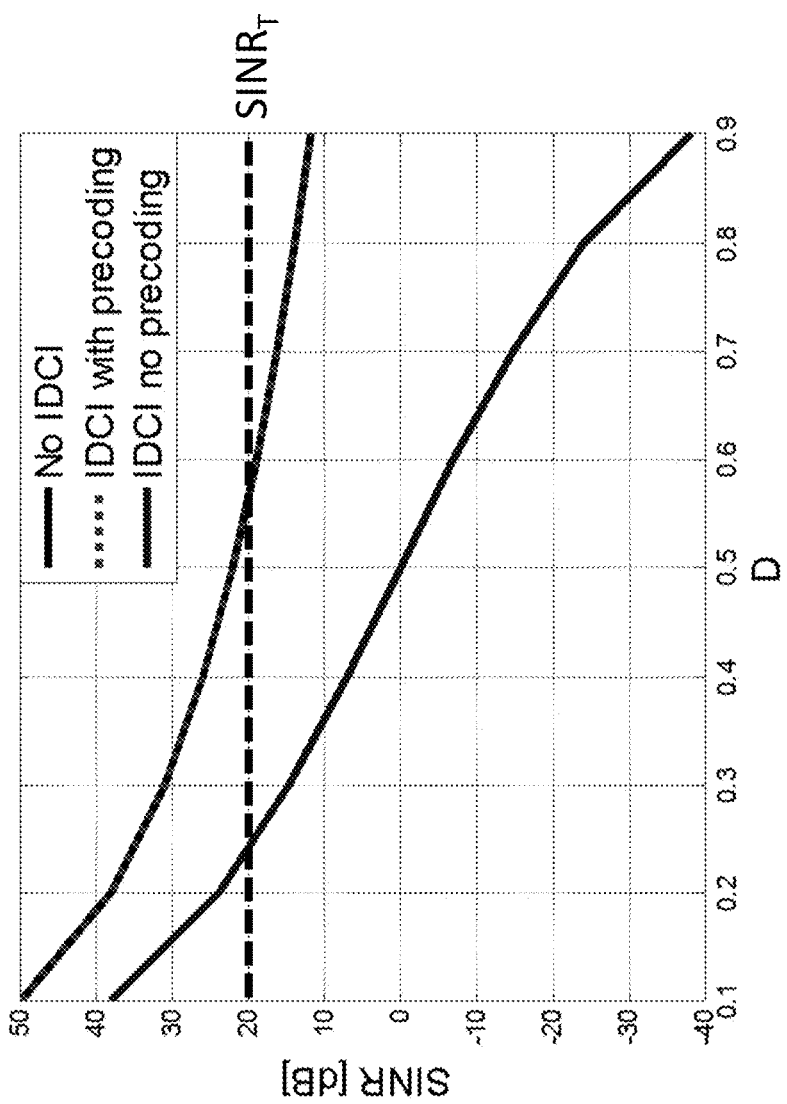
FIG. 9 illustrates the signal-to-interference-plus-noise ratio (SINR) as a function of distance (D).

FIG. 9 shows the signal-to-interference-plus-noise ratio (SINR) as a function of D (i.e., as the target client moves from the main cluster 802 towards the DIDO antennas 813 in the interfering cluster 8403). The SINR is derived as the ratio of signal power and interference plus noise power using the signal model in (8). We assume that $D_o$=0.1 and SNR=50 dB for D=$D_o$. In absence of IDCI the wireless link performance is only affected by noise and the SINR decreases due to pathloss. In presence of IDCI (i.e., without IDCI-precoding) the interference from the DIDO antennas in the neighbor cluster contributes to reduce the SINR.

Figure 10:
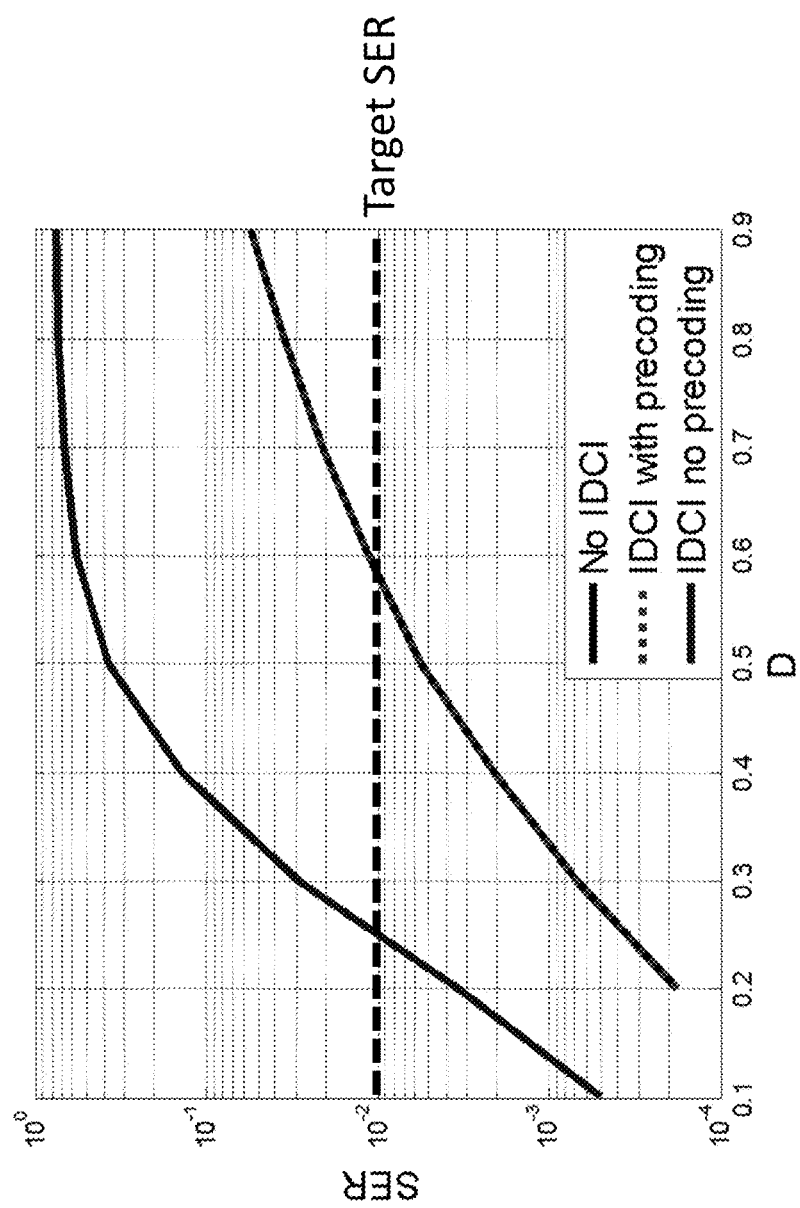
FIG. 10 illustrates the symbol error rate (SER) performance of the three scenarios for 4-QAM modulation in flat-fading narrowband channels.

FIG. 10 shows the symbol error rate (SER) performance of the three scenarios above for 4-QAM modulation in flat-fading narrowband channels. These SER results correspond to the SINR in FIG. 9. We assume SER threshold of 1% for uncoded systems (i.e., without FEC) corresponding to SINR threshold $SINR_T$=20 dB in FIG. 9. The SINR threshold depends on the modulation order used for data transmission. Higher modulation orders are typically characterized by higher $SINR_T$ to achieve the same target error rate. With FEC, lower target SER can be achieved for the same SINR value due to coding gain. In case of IDCI without precoding, the target SER is achieved only within the range D<0.25. With IDCI-precoding at the neighbor cluster the range that satisfies the target SER is extended up to D<0.6. Beyond that range, the SINR increases due to pathloss and the SER target is not satisfied.

Figure 11:
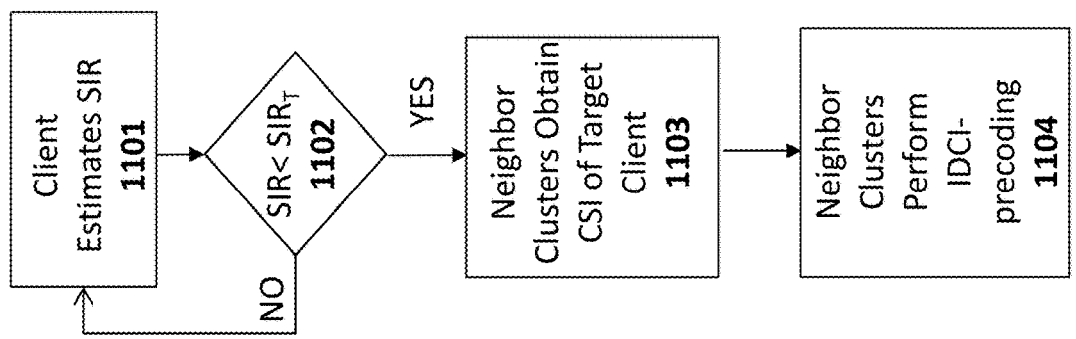
FIG. 11 illustrates a method for IDCI precoding according to one embodiment of the invention.

One embodiment of a method for IDCI precoding is shown in FIG. 11 and consists of the following steps:

SIR estimate 1101: Clients estimate the signal power from the main DIDO cluster (i.e., based on received precoded data) and the interference-plus-noise signal power from the neighbor DIDO clusters. In single-carrier DIDO systems, the frame structure can be designed with short periods of silence. For example, periods of silence can be defined between training for channel estimation and precoded data transmissions during channel state information (CSI) feedback. In one embodiment, the interference-plus-noise signal power from neighbor clusters is measured during the periods of silence from the DIDO antennas in the main cluster. In practical DIDO multicarrier (OFDM) systems, null tones are typically used to prevent direct current (DC) offset and attenuation at the edge of the band due to filtering at transmit and receive sides. In another embodiment employing multicarrier systems, the interference-plus-noise signal power is estimated from the null tones. Correction factors can be used to compensate for transmit/receive filter attenuation at the edge of the band. Once the signal-plus-interference-and-noise power ($P_S$) from the main cluster and the interference-plus-noise power from neighbor clusters ($P_{IN}$) are estimated, the client computes the SINR as $$SINR = \frac{P_S - P_{IN}}{P_{IN}}. \tag{9}$$

Alternatively, the SINR estimate is derived from the received signal strength indication (RSSI) used in typical wireless communication systems to measure the radio signal power.

We observe the metric in (9) cannot discriminate between noise and interference power level. For example, clients affected by shadowing (i.e., behind obstacles that attenuate the signal power from all DIDO distributed antennas in the main cluster) in interference-free environments may estimate low SINR even though they are not affected by inter-cluster interference. A more reliable metric for the proposed method is the SIR computed as $$SIR = \frac{P_S - P_{IN}}{P_{IN} - P_N} \tag{10}$$

where $P_N$ is the noise power. In practical multicarrier OFDM systems, the noise power $P_N$ in (10) is estimated from the null tones, assuming all DIDO antennas from main and neighbor clusters use the same set of null tones. The interference-plus-noise power ($P_{IN}$), is estimated from the period of silence as mentioned above. Finally, the signal-plus-interference-and-noise power ($P_S$) is derived from the data tones. From these estimates, the client computes the SIR in (10).

Channel estimation at neighbor clusters 1102-1103: If the estimated SIR in (10) is below predefined threshold ($SIR_T$), determined at 8702 in FIG. 11, the client starts listening to training signals from neighbor clusters. Note that $SIR_T$ depends on the modulation and FEC coding scheme (MCS) used for data transmission. Different SIR targets are defined depending on the client's MCS. When DIDO distributed antennas from different clusters are time-synchronized (i.e., locked to the same pulse-per-second, PPS, time reference), the client exploits the training sequence to deliver its channel estimates to the DIDO antennas in the neighbor clusters at 8703. The training sequence for channel estimation in the neighbor clusters are designed to be orthogonal to the training from the main cluster. Alternatively, when DIDO antennas in different clusters are not time-synchronized, orthogonal sequences (with good cross-correlation properties) are used for time synchronization in different DIDO clusters. Once the client locks to the time/frequency reference of the neighbor clusters, channel estimation is carried out at 1103.

IDCI Precoding 1104: Once the channel estimates are available at the DIDO BTS in the neighbor clusters, IDCI-precoding is computed to satisfy the condition in (3). The DIDO antennas in the neighbor clusters transmit precoded data streams only to the clients in their cluster, while pre-cancelling interference to the clients in the interfering zone 410 in FIG. 4. We observe that if the client lies in the type B interfering zone 410 in FIG. 4, interference to the client is generated by multiple clusters and IDCI-precoding is carried out by all neighbor clusters at the same time.

Methods for Handoff

Hereafter, we describe different handoff methods for clients that move across DIDO clusters populated by distributed antennas that are located in separate areas or that provide different kinds of services (i.e., low- or high-mobility services).

a. Handoff Between Adjacent DIDO Clusters

In one embodiment, the IDCI-precoder to remove inter-cluster interference described above is used as a baseline for handoff methods in DIDO systems. Conventional handoff in cellular systems is conceived for clients to switch seamlessly across cells served by different base stations. In DIDO systems, handoff allows clients to move from one cluster to another without loss of connection.

To illustrate one embodiment of a handoff strategy for DIDO systems, we consider again the example in FIG. 8 with only two clusters 802 and 803. As the client 801 moves from the main cluster (C1) 802 to the neighbor cluster (C2) 803, one embodiment of a handoff method dynamically calculates the signal quality in different clusters and selects the cluster that yields the lowest error rate performance to the client.

Figure 12:
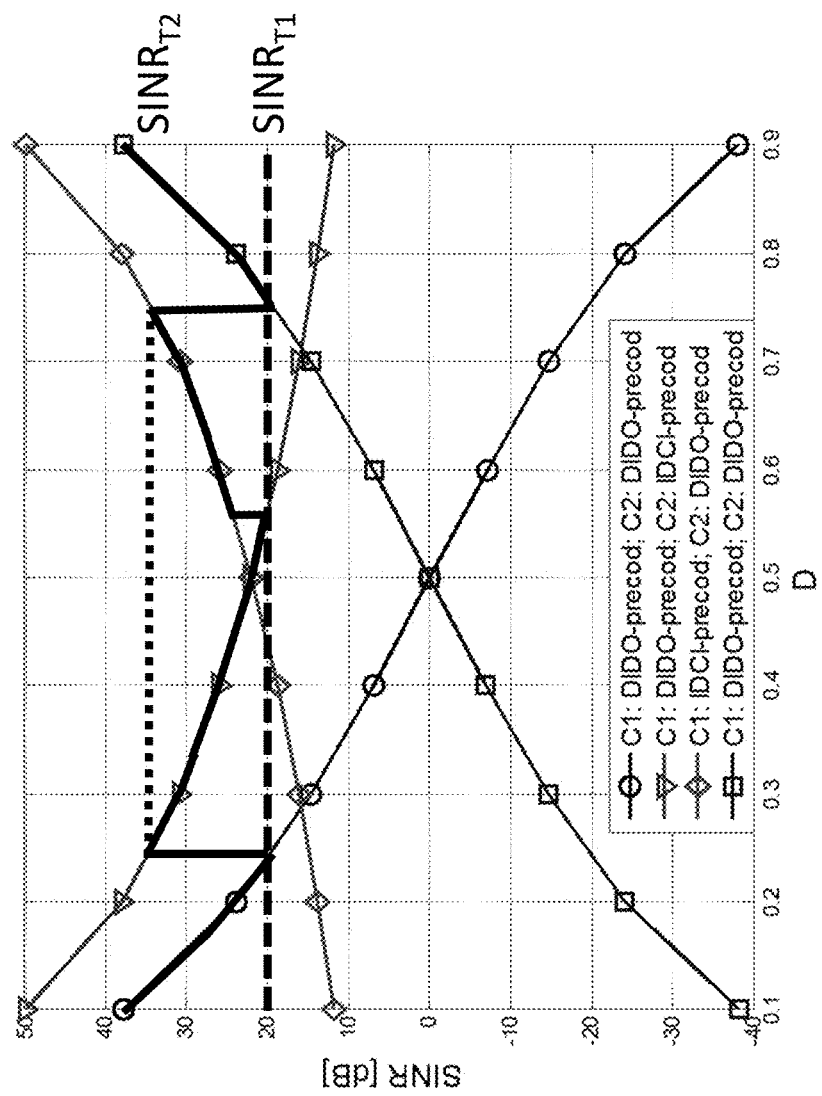
FIG. 12 illustrates the SINR variation in one embodiment as a function of the client's distance from the center of main DIDO clusters.

FIG. 12 shows the SINR variation as a function of the client's distance from the center of clusters C1. For 4-QAM modulation without FEC coding, we consider target SINR=20 dB. The line identified by circles represents the SINR for the target client being served by the DIDO antennas in C1, when both C1 and C2 use DIDO precoding without interference cancellation. The SINR decreases as a function of D due to pathloss and interference from the neighboring cluster. When IDCI-precoding is implemented at the neighboring cluster, the SINR loss is only due to pathloss (as shown by the line with triangles), since interference is completely removed. Symmetric behavior is experienced when the client is served from the neighboring cluster. One embodiment of the handoff strategy is defined such that, as the client moves from C1 to C2, the algorithm switches between different DIDO schemes to maintain the SINR above predefined target.

Figure 13:
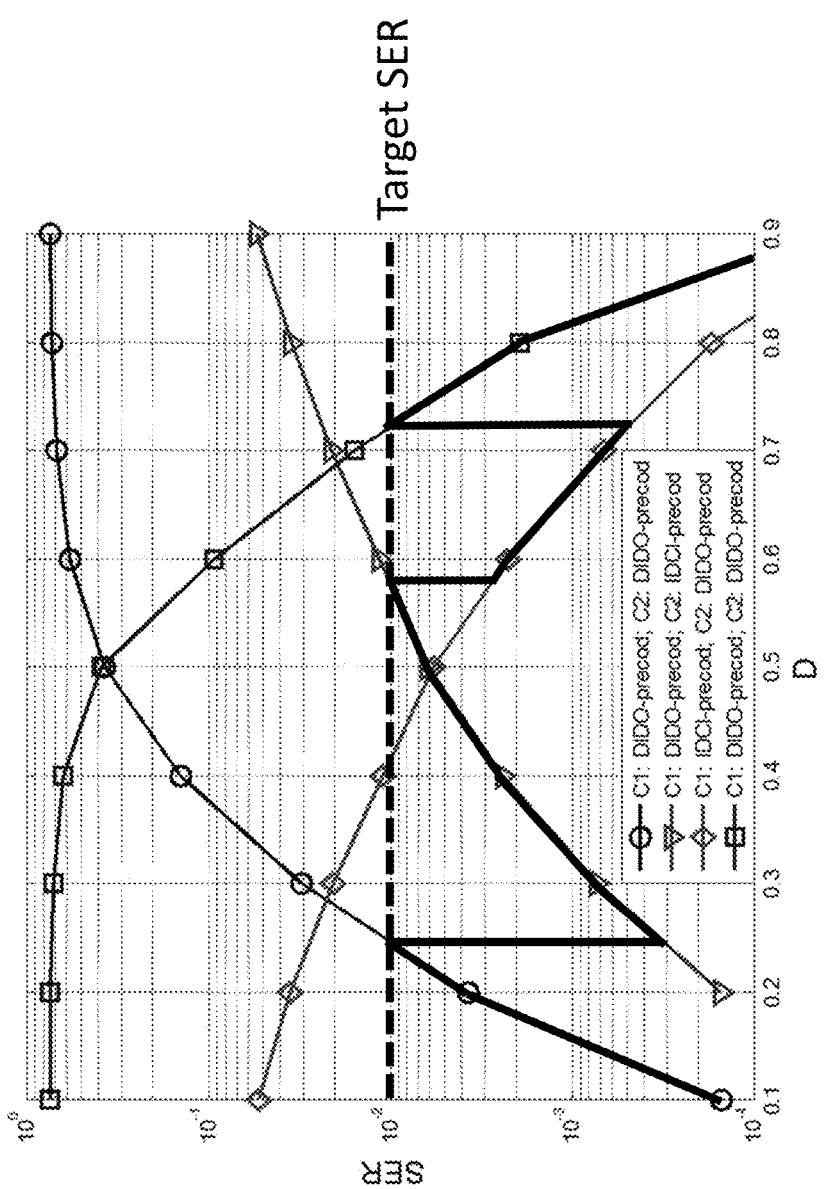
FIG. 13 illustrates one embodiment in which the SER is derived for 4-QAM modulation.

From the plots in FIG. 12, we derive the SER for 4-QAM modulation in FIG. 13. We observe that, by switching between different precoding strategies, the SER is maintained within predefined target.

One embodiment of the handoff strategy is as follows.

C1-DIDO and C2-DIDO precoding: When the client lies within C1, away from the interfering zone, both clusters C1 and C2 operate with conventional DIDO precoding independently.

C1-DIDO and C2-IDCI precoding: As the client moves towards the interfering zone, its SIR or SINR degrades. When the target $SINR_{T1}$ is reached, the target client starts estimating the channel from all DIDO antennas in C2 and provides the CSI to the BTS of C2. The BTS in C2 computes IDCI-precoding and transmits to all clients in C2 while preventing interference to the target client. For as long as the target client is within the interfering zone, it will continue to provide its CSI to both C1 and C2.

C1-IDCI and C2-DIDO precoding: As the client moves towards C2, its SIR or SINR keeps decreasing until it again reaches a target. At this point the client decides to switch to the neighbor cluster. In this case, C1 starts using the CSI from the target client to create zero interference towards its direction with IDCI-precoding, whereas the neighbor cluster uses the CSI for conventional DIDO-precoding. In one embodiment, as the SIR estimate approaches the target, the clusters C1 and C2 try both DIDO- and IDCI-precoding schemes alternatively, to allow the client to estimate the SIR in both cases. Then the client selects the best scheme, to maximize certain error rate performance metric. When this method is applied, the cross-over point for the handoff strategy occurs at the intersection of the curves with triangles and rhombus in FIG. 12. One embodiment uses the modified IDCI-precoding method described in (6) where the neighbor cluster also transmits precoded data stream to the target client to provide array gain. With this approach the handoff strategy is simplified, since the client does not need to estimate the SINR for both strategies at the cross-over point.

C1-DIDO and C2-DIDO precoding: As the client moves out of the interference zone towards C2, the main cluster C1 stops pre-cancelling interference towards that target client via IDCI-precoding and switches back to conventional DIDO-precoding to all clients remaining in C1. This final cross-over point in our handoff strategy is useful to avoid unnecessary CSI feedback from the target client to C1, thereby reducing the overhead over the feedback channel. In one embodiment a second target $SINR_{T2}$ is defined. When the SINR (or SIR) increases above this target, the strategy is switched to C1-DIDO and C2-DIDO. In one embodiment, the cluster C1 keeps alternating between DIDO- and IDCI-precoding to allow the client to estimate the SINR. Then the client selects the method for C1 that more closely approaches the target $SINR_{T1}$ from above.

The method described above computes the SINR or SIR estimates for different schemes in real time and uses them to select the optimal scheme. In one embodiment, the handoff algorithm is designed based on the finite-state machine illustrated in FIG. 14. The client keeps track of its current state and switches to the next state when the SINR or SIR drops below or above the predefined thresholds illustrated in FIG. 12. As discussed above, in state 1201, both clusters C1 and C2 operate with conventional DIDO precoding independently and the client is served by cluster C1; in state 1202, the client is served by cluster C1, the BTS in C2 computes IDCI-precoding and cluster C1 operates using conventional DIDO precoding; in state 1203, the client is served by cluster C2, the BTS in C1 computes IDCI-precoding and cluster C2 operates using conventional DIDO precoding; and in state 1204, the client is served by cluster C2, and both clusters C1 and C2 operate with conventional DIDO precoding independently.

Figure 14:
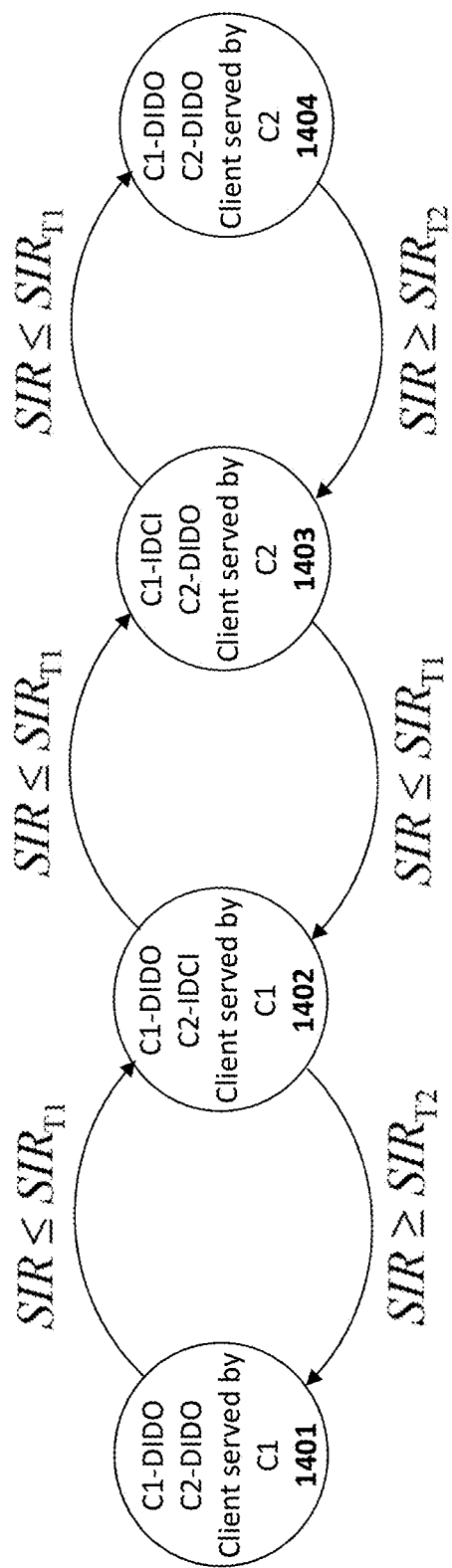
FIG. 14 illustrates one embodiment of the invention in which a finite state machine implements a handoff algorithm.
Figure 15:
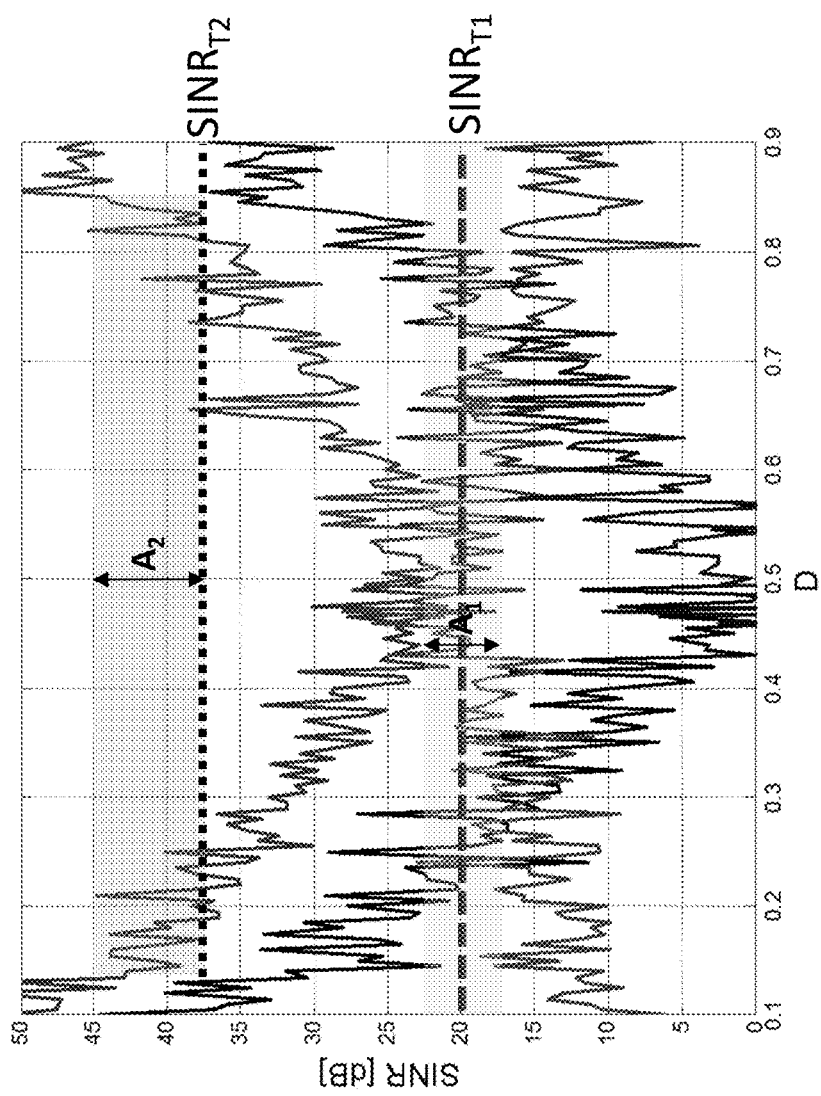
FIG. 15 illustrates depicts one embodiment of a handoff strategy in the presence of shadowing.

In presence of shadowing effects, the signal quality or SIR may fluctuate around the thresholds as shown in FIG. 15, causing repetitive switching between consecutive states in FIG. 14. Changing states repetitively is an undesired effect, since it results in significant overhead on the control channels between clients and BTSs to enable switching between transmission schemes. FIG. 15 depicts one example of a handoff strategy in the presence of shadowing. In one embodiment, the shadowing coefficient is simulated according to log-normal distribution with variance 3 [3]. Hereafter, we define some methods to prevent repetitive switching effect during DIDO handoff.

Figure 16:
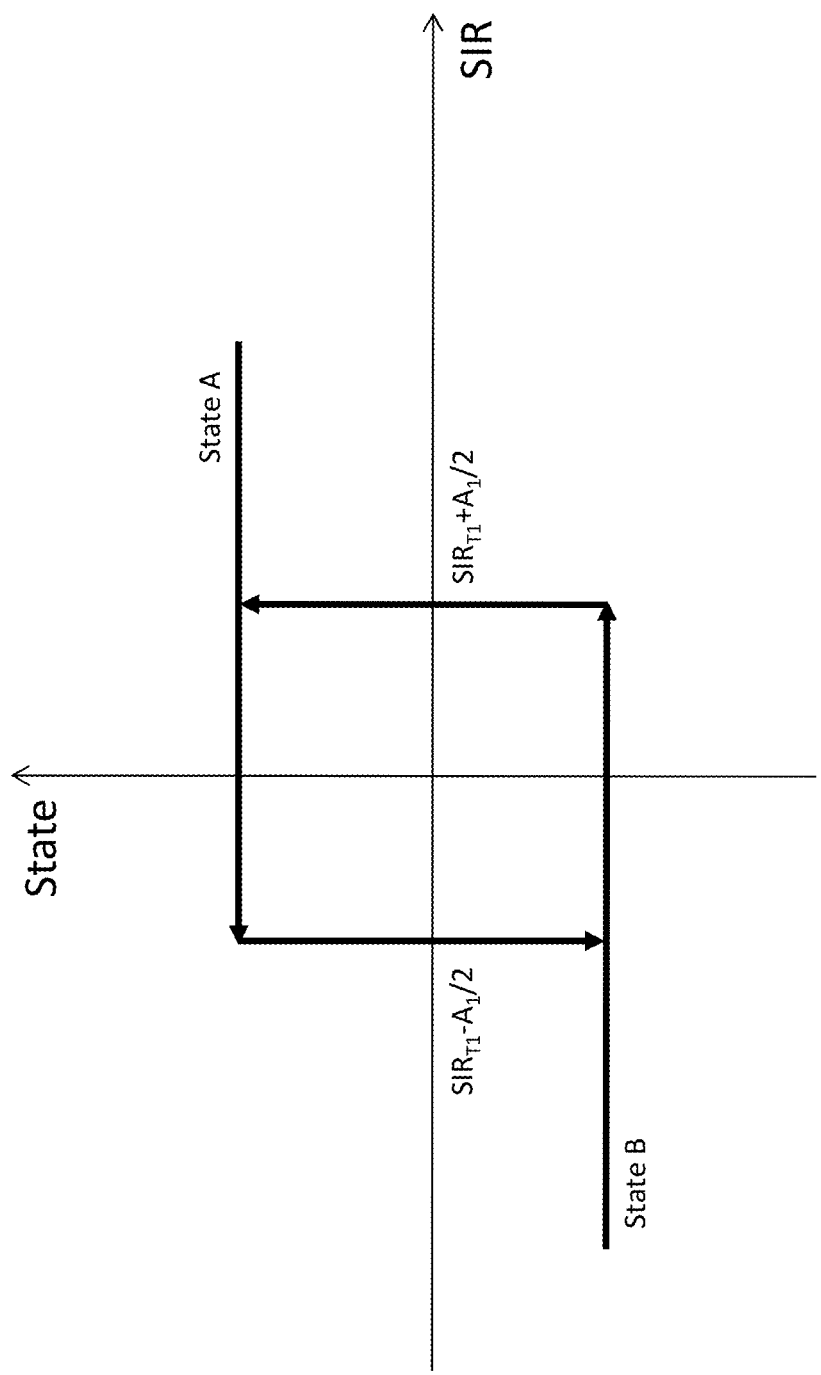
FIG. 16 illustrates the hysteresis loop mechanism when switching between any two states in FIG. 93.

One embodiment of the invention employs a hysteresis loop to cope with state switching effects. For example, when switching between "C1-DIDO,C2-IDCI" 9302 and "C1-IDCI,C2-DIDO" 9303 states in FIG. 14 (or vice versa) the threshold $SINR_{T1}$ can be adjusted within the range $A_1$. This method avoids repetitive switches between states as the signal quality oscillates around $SINR_{T1}$. For example, FIG. 16 shows the hysteresis loop mechanism when switching between any two states in FIG. 14. To switch from state B to A the SIR must be larger than $(SIR_{T1}+A_1/2)$, but to switch back from A to B the SIR must drop below $(SIR_{T1}-A_1/2)$.

In a different embodiment, the threshold $SINR_{T2}$ is adjusted to avoid repetitive switching between the first and second (or third and fourth) states of the finite-state machine in FIG. 14. For example, a range of values $A_2$ may be defined such that the threshold $SINR_{T2}$ is chosen within that range depending on channel condition and shadowing effects.

In one embodiment, depending on the variance of shadowing expected over the wireless link, the SINR threshold is dynamically adjusted within the range $[SINR_{T2}, SINR_{T2}+A_2]$. The variance of the log-normal distribution can be estimated from the variance of the received signal strength (or RSSI) as the client moves from its current cluster to the neighbor cluster.

The methods above assume the client triggers the handoff strategy. In one embodiment, the handoff decision is deferred to the DIDO BTSs, assuming communication across multiple BTSs is enabled.

For simplicity, the methods above are derived assuming no FEC coding and 4-QAM. More generally, the SINR or SIR thresholds are derived for different modulation coding schemes (MCSs) and the handoff strategy is designed in combination with link adaptation (see, e.g., U.S. Pat. No. 7,636,381) to optimize downlink data rate to each client in the interfering zone.

b. Handoff Between Low- and High-Doppler DIDO Networks

DIDO systems employ closed-loop transmission schemes to precode data streams over the downlink channel. Closed-loop schemes are inherently constrained by latency over the feedback channel. In practical DIDO systems, computational time can be reduced by transceivers with high processing power and it is expected that most of the latency is introduced by the DIDO BSN, when delivering CSI and baseband precoded data from the BTS to the distributed antennas. The BSN can be comprised of various network technologies including, but not limited to, digital subscriber lines (DSL), cable modems, fiber rings, T1 lines, hybrid fiber coaxial (HFC) networks, and/or fixed wireless (e.g., WiFi). Dedicated fiber typically has very large bandwidth and low latency, potentially less than a millisecond in local region, but it is less widely deployed than DSL and cable modems. Today, DSL and cable modem connections typically have between 10-25 ms in last-mile latency in the United States, but they are very widely deployed.

The maximum latency over the BSN determines the maximum Doppler frequency that can be tolerated over the DIDO wireless link without performance degradation of DIDO precoding. For example, in [1] we showed that at the carrier frequency of 400 MHz, networks with latency of about 10 msec (i.e., DSL) can tolerate clients' velocity up to 8 mph (running speed), whereas networks with 1 msec latency (i.e., fiber ring) can support speed up to 70 mph (i.e., freeway traffic).

We define two or multiple DIDO sub-networks depending on the maximum Doppler frequency that can be tolerated over the BSN. For example, a BSN with high-latency DSL connections between the DIDO BTS and distributed antennas can only deliver low mobility or fixed-wireless services (i.e., low-Doppler network), whereas a low-latency BSN over a low-latency fiber ring can tolerate high mobility (i.e., high-Doppler network). We observe that the majority of broadband users are not moving when they use broadband, and further, most are unlikely to be located near areas with many high speed objects moving by (e.g., next to a highway) since such locations are typically less desirable places to live or operate an office. However, there are broadband users who will be using broadband at high speeds (e.g., while in a car driving on the highway) or will be near high speed objects (e.g., in a store located near a highway). To address these two differing user Doppler scenarios, in one embodiment, a low-Doppler DIDO network consists of a typically larger number of DIDO antennas with relatively low power (i.e., 1 W to 100 W, for indoor or rooftop installation) spread across a wide area, whereas a high-Doppler network consists of a typically lower number of DIDO antennas with high power transmission (i.e., 100 W for rooftop or tower installation). The low-Doppler DIDO network serves the typically larger number of low-Doppler users and can do so at typically lower connectivity cost using inexpensive high-latency broadband connections, such as DSL and cable modems. The high-Doppler DIDO network serves the typically fewer number of high-Doppler users and can do so at typically higher connectivity cost using more expensive low-latency broadband connections, such as fiber.

To avoid interference across different types of DIDO networks (e.g. low-Doppler and high-Doppler), different multiple access techniques can be employed such as: time division multiple access (TDMA), frequency division multiple access (FDMA), or code division multiple access (CDMA).

Hereafter, we propose methods to assign clients to different types of DIDO networks and enable handoff between them. The network selection is based on the type of mobility of each client. The client's velocity (v) is proportional to the maximum Doppler shift according to the following equation [6]

$$f_d = \frac{v}{\lambda}\sin\theta \quad (11)$$

where $f_d$ is the maximum Doppler shift, $\lambda$ is the wavelength corresponding to the carrier frequency and $\theta$ is the angle between the vector indicating the direction transmitter-client and the velocity vector.

In one embodiment, the Doppler shift of every client is calculated via blind estimation techniques. For example, the Doppler shift can be estimated by sending RF energy to the client and analyzing the reflected signal, similar to Doppler radar systems.

In another embodiment, one or multiple DIDO antennas send training signals to the client. Based on those training signals, the client estimates the Doppler shift using techniques such as counting the zero-crossing rate of the channel gain, or performing spectrum analysis. We observe that for fixed velocity v and client's trajectory, the angular velocity v sin θ in (11) may depend on the relative distance of the client from every DIDO antenna. For example, DIDO antennas in the proximity of a moving client yield larger angular velocity and Doppler shift than faraway antennas. In one embodiment, the Doppler velocity is estimated from multiple DIDO antennas at different distances from the client and the average, weighted average or standard deviation is used as an indicator for the client's mobility. Based on the estimated Doppler indicator, the DIDO BTS decides whether to assign the client to low- or high-Doppler networks.

The Doppler indicator is periodically monitored for all clients and sent back to the BTS. When one or multiple clients change their Doppler velocity (i.e., client riding in the bus versus client walking or sitting), those clients are dynamically re-assigned to different DIDO network that can tolerate their level of mobility.

Although the Doppler of low-velocity clients can be affected by being in the vicinity of high-velocity objects (e.g. near a highway), the Doppler is typically far less than the Doppler of clients that are in motion themselves. As such, in one embodiment, the velocity of the client is estimated (e.g. by using a means such as monitoring the clients position using GPS), and if the velocity is low, the client is assigned to a low-Doppler network, and if the velocity if high, the client is assigned to a high-Doppler network.

Methods for Power Control and Antenna Grouping

Figure 17:
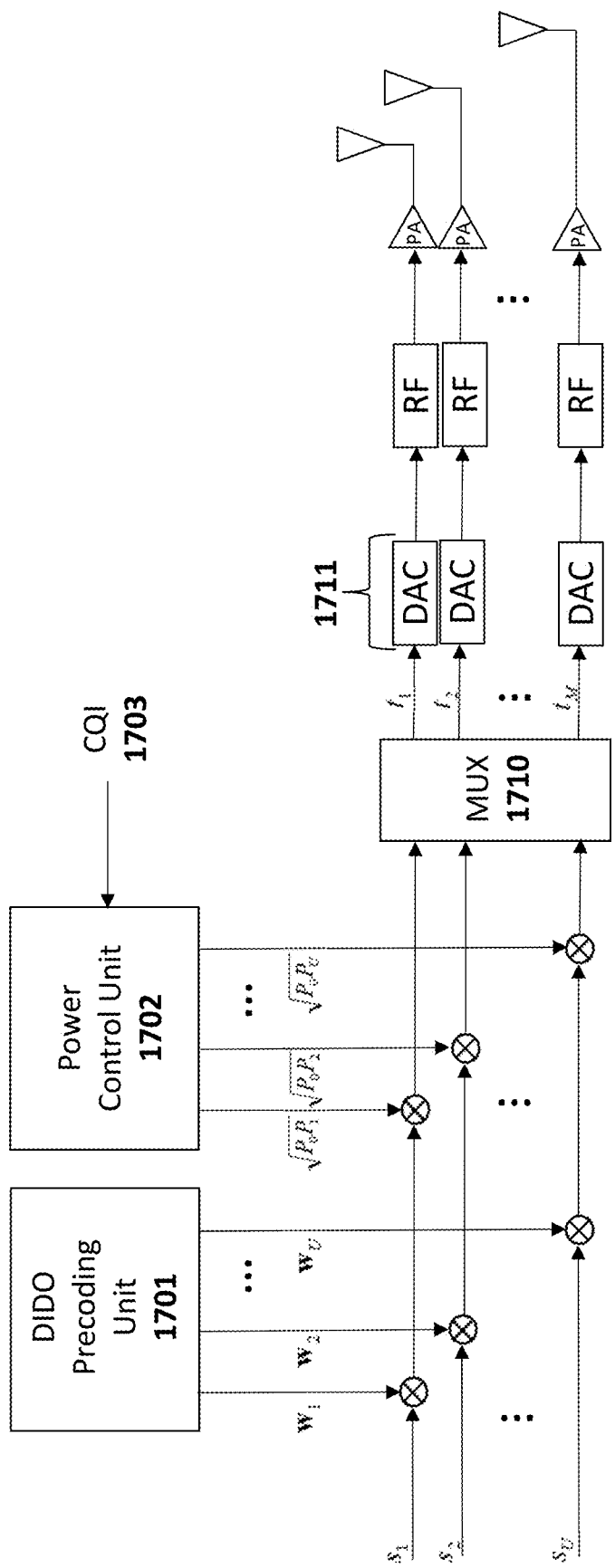
FIG. 17 illustrates one embodiment of a DIDO system with power control.

The block diagram of DIDO systems with power control is depicted in FIG. 17. One or multiple data streams ($s_k$) for every client (1, ..., U) are first multiplied by the weights generated by the DIDO precoding unit. Precoded data streams are multiplied by power scaling factor computed by the power control unit, based on the input channel quality information (CQI). The CQI is either fed back from the clients to DIDO BTS or derived from the uplink channel assuming uplink-downlink channel reciprocity. The U precoded streams for different clients are then combined and multiplexed into M data streams ($t_m$), one for each of the M transmit antennas. Finally, the streams $t_m$ are sent to the digital-to-analog converter (DAC) unit, the radio frequency (RF) unit, power amplifier (PA) unit and finally to the antennas.

The power control unit measures the CQI for all clients. In one embodiment, the CQI is the average SNR or RSSI. The CQI varies for different clients depending on pathloss or shadowing. Our power control method adjusts the transmit power scaling factors $P_k$ for different clients and multiplies them by the precoded data streams generated for different clients. Note that one or multiple data streams may be generated for every client, depending on the number of clients' receive antennas.

To evaluate the performance of the proposed method, we defined the following signal model based on (5), including pathloss and power control parameters $$r_k = \sqrt{SNR P_k \alpha_k} H_k W_k s_k + n_k \quad (12)$$

where k=1, ..., U, U is the number of clients, SNR=$P_o/N_o$, with $P_o$ being the average transmit power, $N_o$ the noise power and $\alpha_k$ the pathloss/shadowing coefficient. To model pathloss/shadowing, we use the following simplified model $$\alpha_k = e^{-a\frac{k-1}{U}} \quad (13)$$

where a=4 is the pathloss exponent and we assume the pathloss increases with the clients' index (i.e., clients are located at increasing distance from the DIDO antennas).

Figure 18:
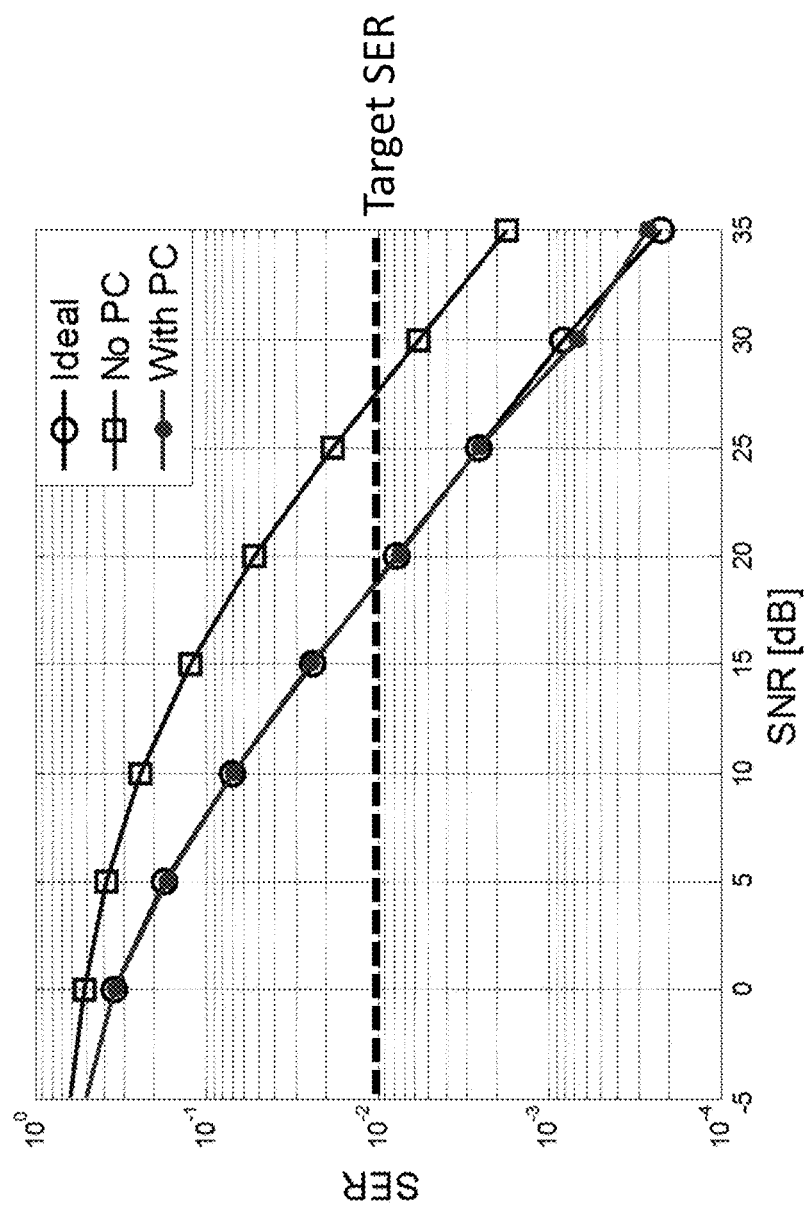
FIG. 18 illustrates the SER versus SNR assuming four DIDO transmit antennas and four clients in different scenarios.

FIG. 18 shows the SER versus SNR assuming four DIDO transmit antennas and four clients in different scenarios. The ideal case assumes all clients have the same pathloss (i.e., a=0), yielding $P_k$=1 for all clients. The plot with squares refers to the case where clients have different pathloss coefficients and no power control. The curve with dots is derived from the same scenario (with pathloss) where the power control coefficients are chosen such that $P_k$=1/$\alpha_k$. With the power control method, more power is assigned to the data streams intended to the clients that undergo higher pathloss/shadowing, resulting in 9 dB SNR gain (for this particular scenario) compared to the case with no power control.

The Federal Communications Commission (FCC) (and other international regulatory agencies) defines constraints on the maximum power that can be transmitted from wireless devices to limit the exposure of human body to electromagnetic (EM) radiation. There are two types of limits [2]: i) "occupational/controlled" limit, where people are made fully aware of the radio frequency (RF) source via fences, warnings or labels; ii) "general population/uncontrolled" limit where there is no control over the exposure.

Different emission levels are defined for different types of wireless devices. In general, DIDO distributed antennas used for indoor/outdoor applications qualify for the FCC category of "mobile" devices, defined as [2]:

"transmitting devices designed to be used in other than fixed locations that would normally be used with radiating structures maintained 20 cm or more from the body of the user or nearby persons."

Figure 19:
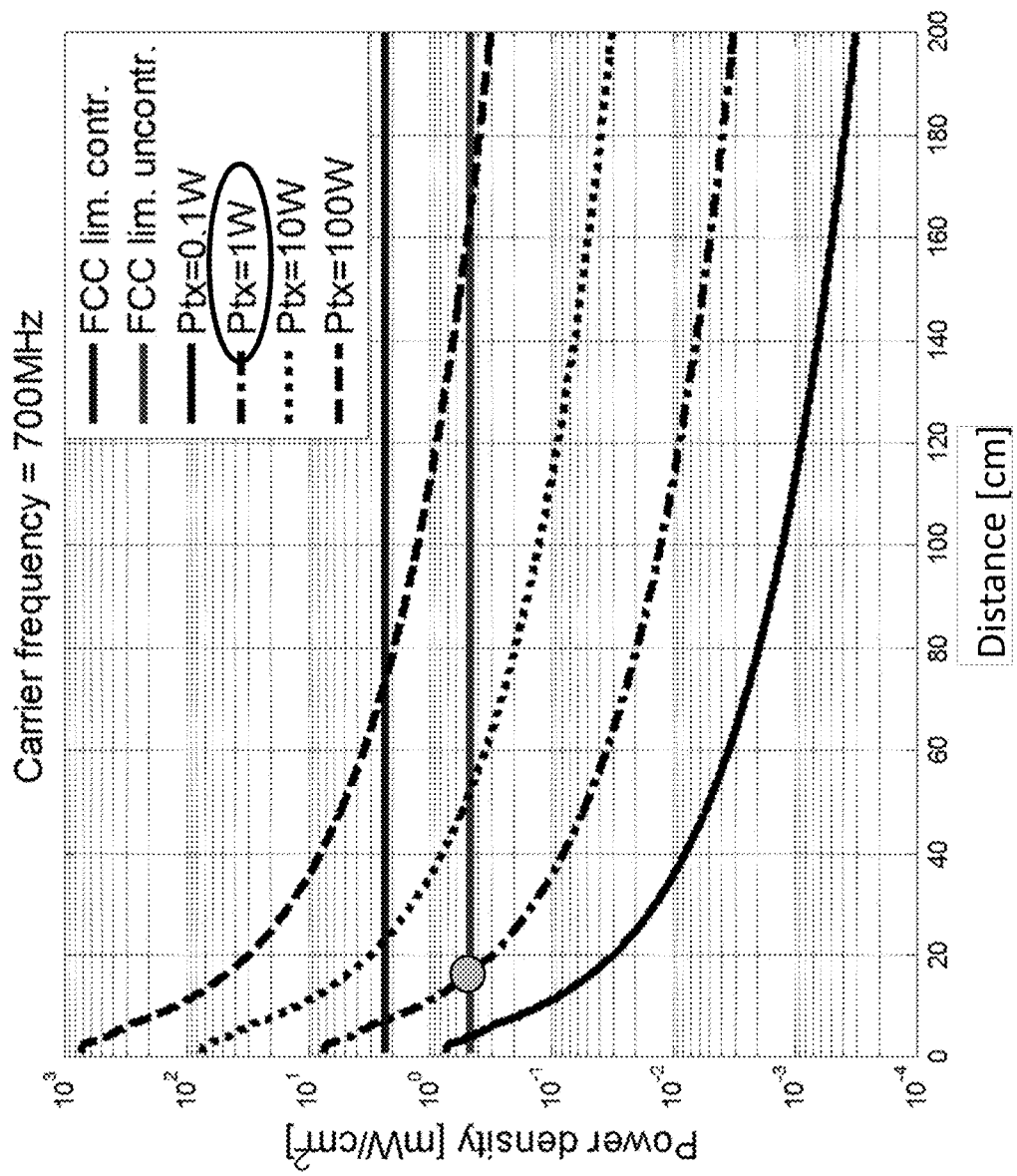
FIG. 19 illustrates MPE power density as a function of distance from the source of RF radiation for different values of transmit power according to one embodiment of the invention.

The EM emission of "mobile" devices is measured in terms of maximum permissible exposure (MPE), expressed in mW/cm². FIG. 19 shows the MPE power density as a function of distance from the source of RF radiation for different values of transmit power at 700 MHz carrier frequency. The maximum allowed transmit power to meet the FCC "uncontrolled" limit for devices that typically operate beyond 20 cm from the human body is 1 W.

Less restrictive power emission constraints are defined for transmitters installed on rooftops or buildings, away from the "general population". For these "rooftop transmitters" the FCC defines a looser emission limit of 1000 W, measured in terms of effective radiated power (ERP).

Based on the above FCC constraints, in one embodiment we define two types of DIDO distributed antennas for practical systems:

Low-power (LP) transmitters: located anywhere (i.e., indoor or outdoor) at any height, with maximum transmit power of 1 W and 5 Mbps consumer-grade broadband (e.g. DSL, cable modem, Fibre To The Home (FTTH)) backhaul connectivity.

High-power (HP) transmitters: rooftop or building mounted antennas at height of approximately 10 meters, with transmit power of 100 W and a commercial-grade broadband (e.g. optical fiber ring) backhaul (with effectively "unlimited" data rate compared to the throughput available over the DIDO wireless links).

Note that LP transmitters with DSL or cable modem connectivity are good candidates for low-Doppler DIDO networks (as described in the previous section), since their clients are mostly fixed or have low mobility. HP transmitters with commercial fiber connectivity can tolerate higher client's mobility and can be used in high-Doppler DIDO networks.

Figure 20A:
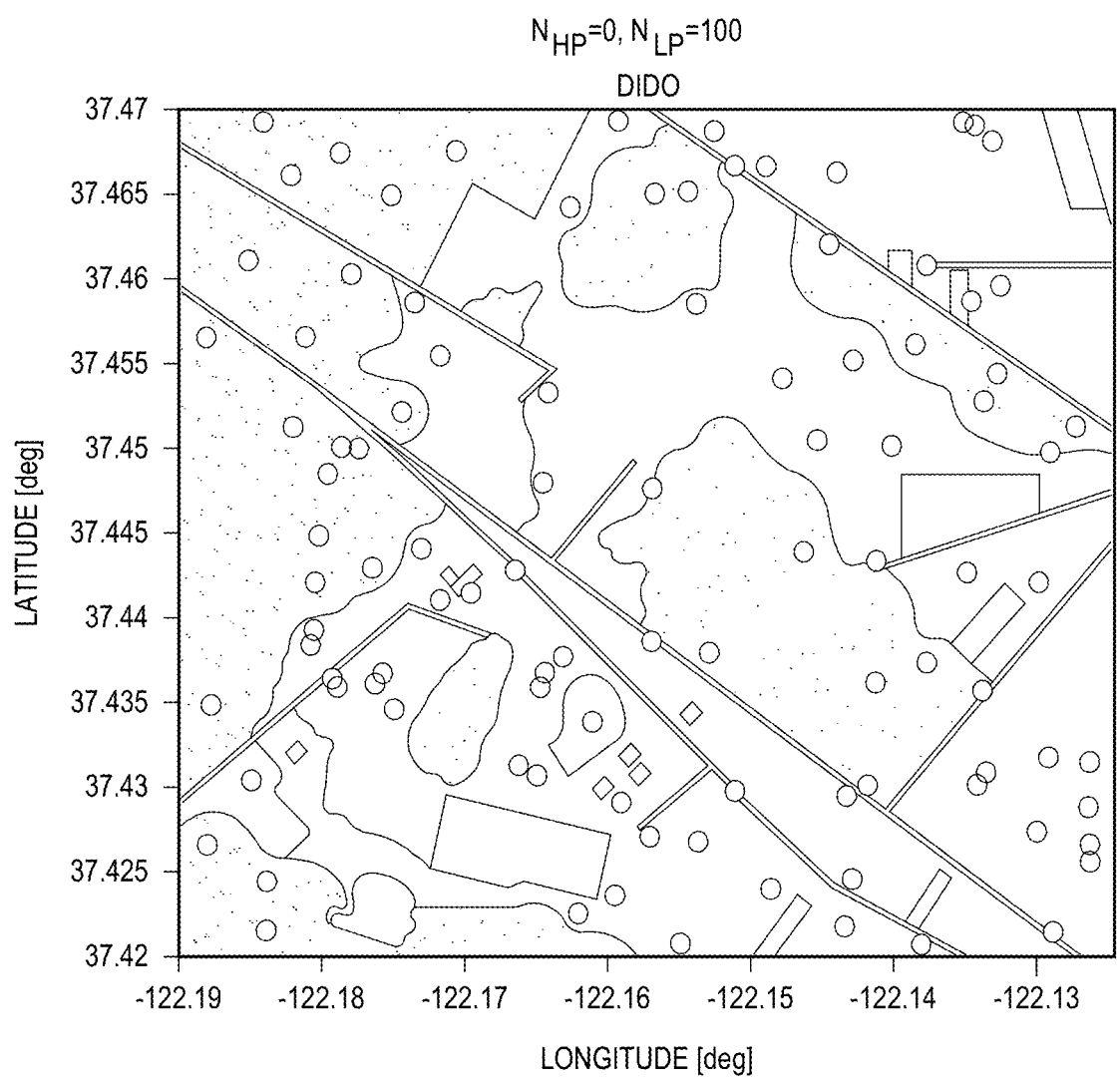
FIGS. 20a-b illustrate different distributions of low-power and high-power DIDO distributed antennas.
Figure 20B:
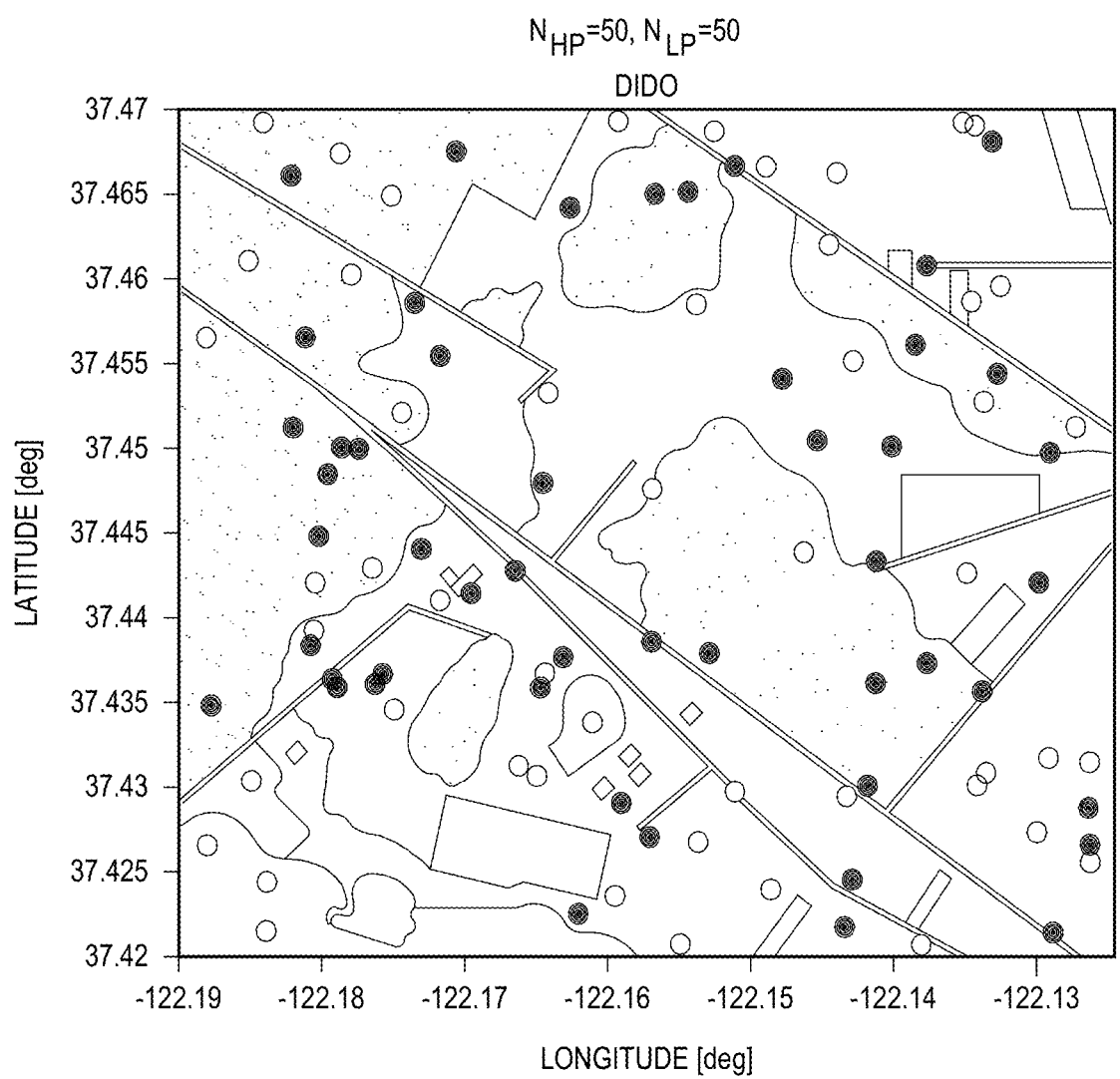

To gain practical intuition on the performance of DIDO systems with different types of LP/HP transmitters, we consider the practical case of DIDO antenna installation in downtown Palo Alto, Calif. FIG. 20a shows a random distribution of $N_{LP}$=100 low-power DIDO distributed antennas in Palo Alto. In FIG. 20b, 50 LP antennas are substituted with $N_{HP}$=50 high-power transmitters.

Figure 21A:
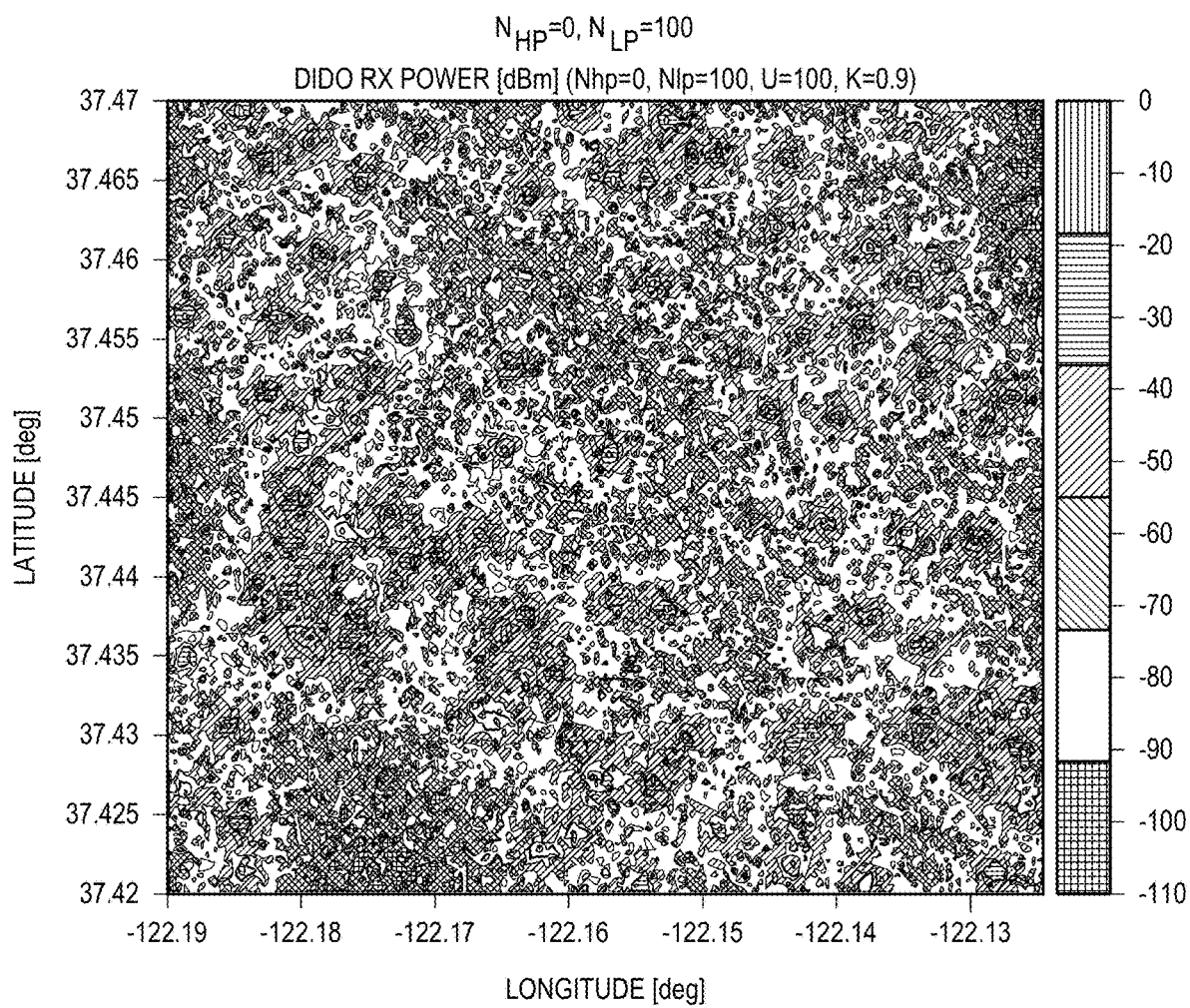

Based on the DIDO antenna distributions in FIGS. 20a-b, we derive the coverage maps in Palo Alto for systems using DIDO technology. FIGS. 21a and 21b show two power distributions corresponding to the configurations in FIG. 20a and FIG. 20b, respectively. The received power distribution (expressed in dBm) is derived assuming the pathloss/shadowing model for urban environments defined by the 3GPP standard [3] at the carrier frequency of 700 MHz. We observe that using 50% of HP transmitters yields better coverage over the selected area.

Figure 22B:
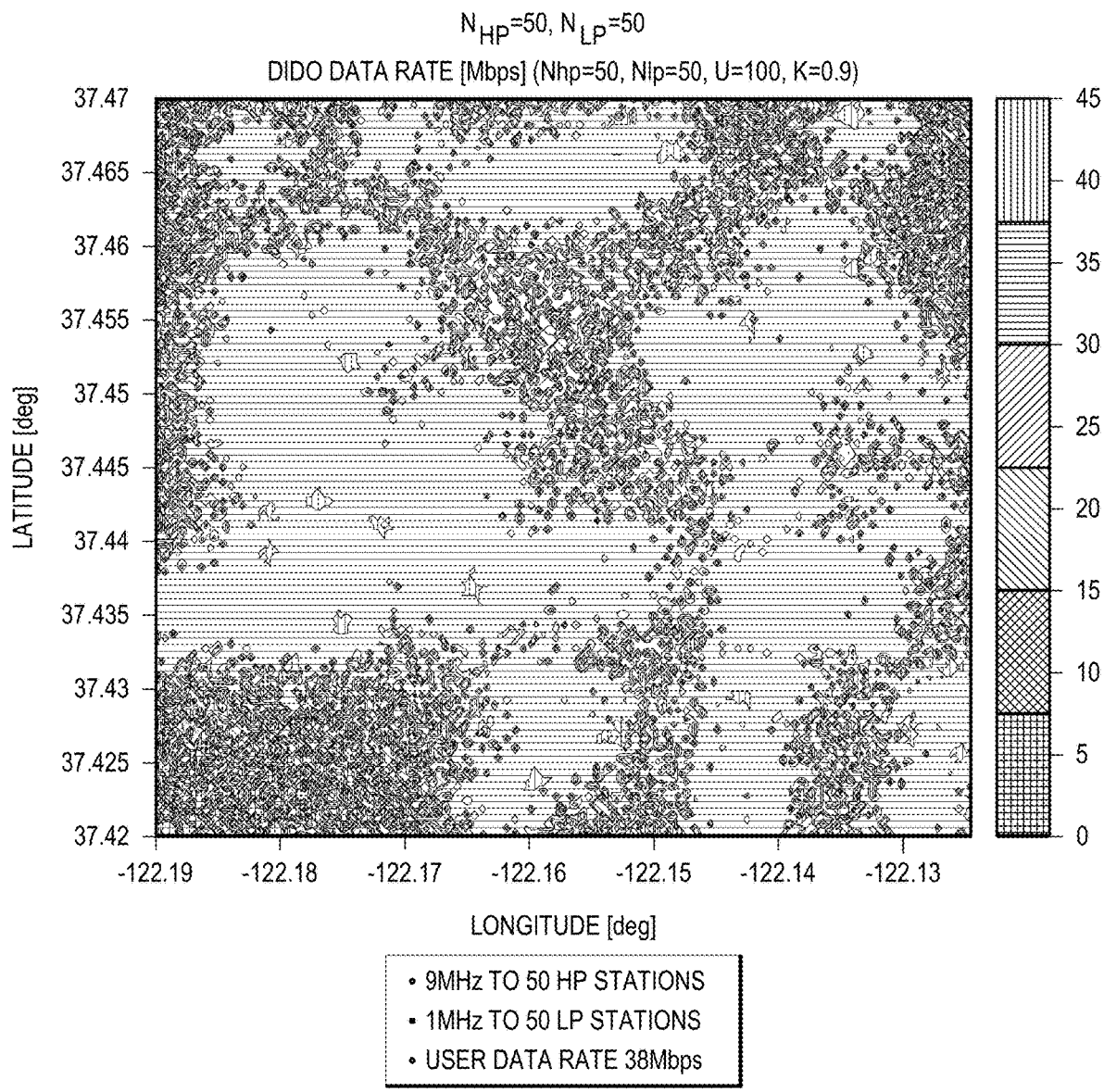

FIGS. 22a-b depict the rate distribution for the two scenarios above. The throughput (expressed in Mbps) is derived based on power thresholds for different modulation coding schemes defined in the 3GPP long-term evolution (LTE) standard in [4, 5]. The total available bandwidth is fixed to 10 MHz at 700 MHz carrier frequency. Two different frequency allocation plans are considered: i) 5 MHz spectrum allocated only to the LP stations; ii) 9 MHz to HP transmitters and 1 MHz to LP transmitters. Note that lower bandwidth is typically allocated to LP stations due to their DSL backhaul connectivity with limited throughput. FIGS. 22a-b shows that when using 50% of HP transmitters it is possible to increase significantly the rate distribution, raising the average per-client data rate from 2.4 Mbps in FIG. 22a to 38 Mbps in FIG. 22b.

Next, we defined algorithms to control power transmission of LP stations such that higher power is allowed at any given time, thereby increasing the throughput over the downlink channel of DIDO systems in FIG. 22b. We observe that the FCC limits on the power density is defined based on average over time as [2]

$$S = \frac{\sum_{n=1}^{N} S_n t_n}{T_{MPE}} \tag{14}$$

where $T_{MPE} = \sum_{n=1}^{N} t_n$ is the MPE averaging time, $t_n$ is the period of time of exposure to radiation with power density $S_n$. For "controlled" exposure the average time is 6 minutes, whereas for "uncontrolled" exposure it is increased up to 30 minutes. Then, any power source is allowed to transmit at larger power levels than the MPE limits, as long as the average power density in (14) satisfies the FCC limit over 30 minute average for "uncontrolled" exposure.

Based on this analysis, we define adaptive power control methods to increase instantaneous per-antenna transmit power, while maintaining average power per DIDO antenna below MPE limits. We consider DIDO systems with more transmit antennas than active clients. This is a reasonable assumption given that DIDO antennas can be conceived as inexpensive wireless devices (similar to WiFi access points) and can be placed anywhere there is DSL, cable modem, optical fiber, or other Internet connectivity.

Figure 23:
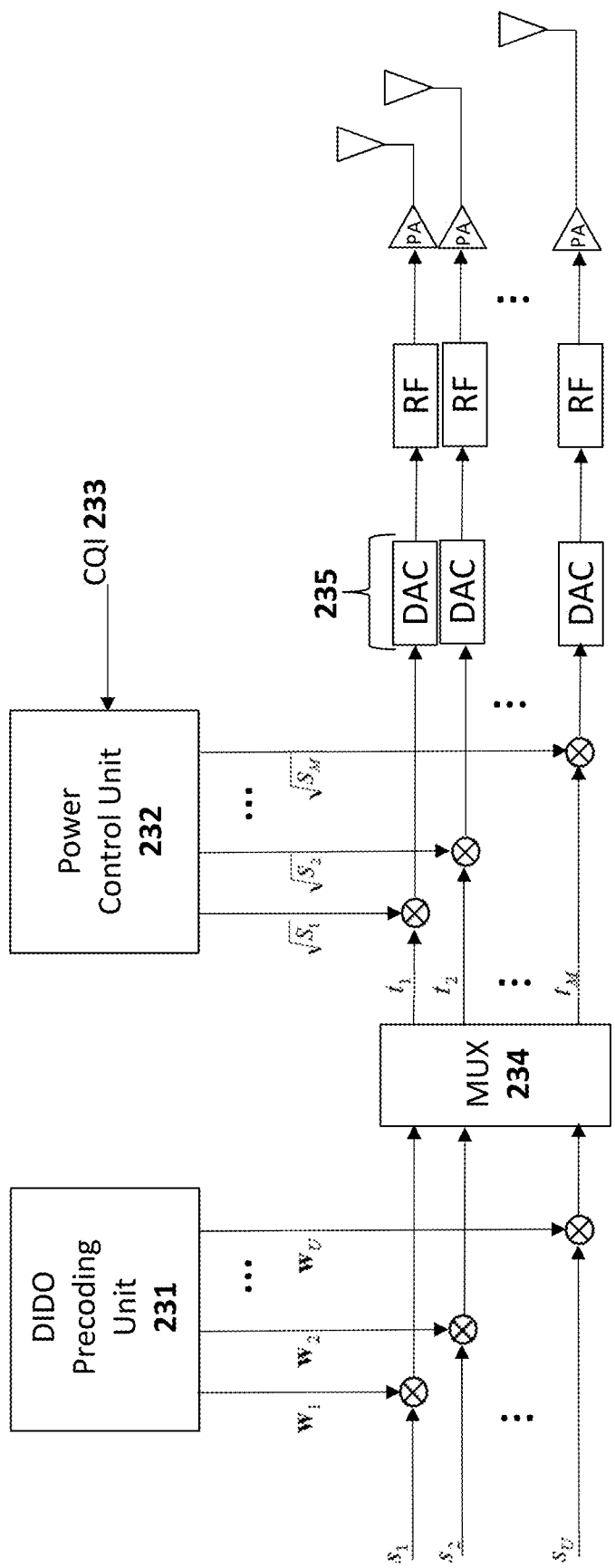
FIG. 23 illustrates one embodiment of a DIDO system with power control.
Figure 24:
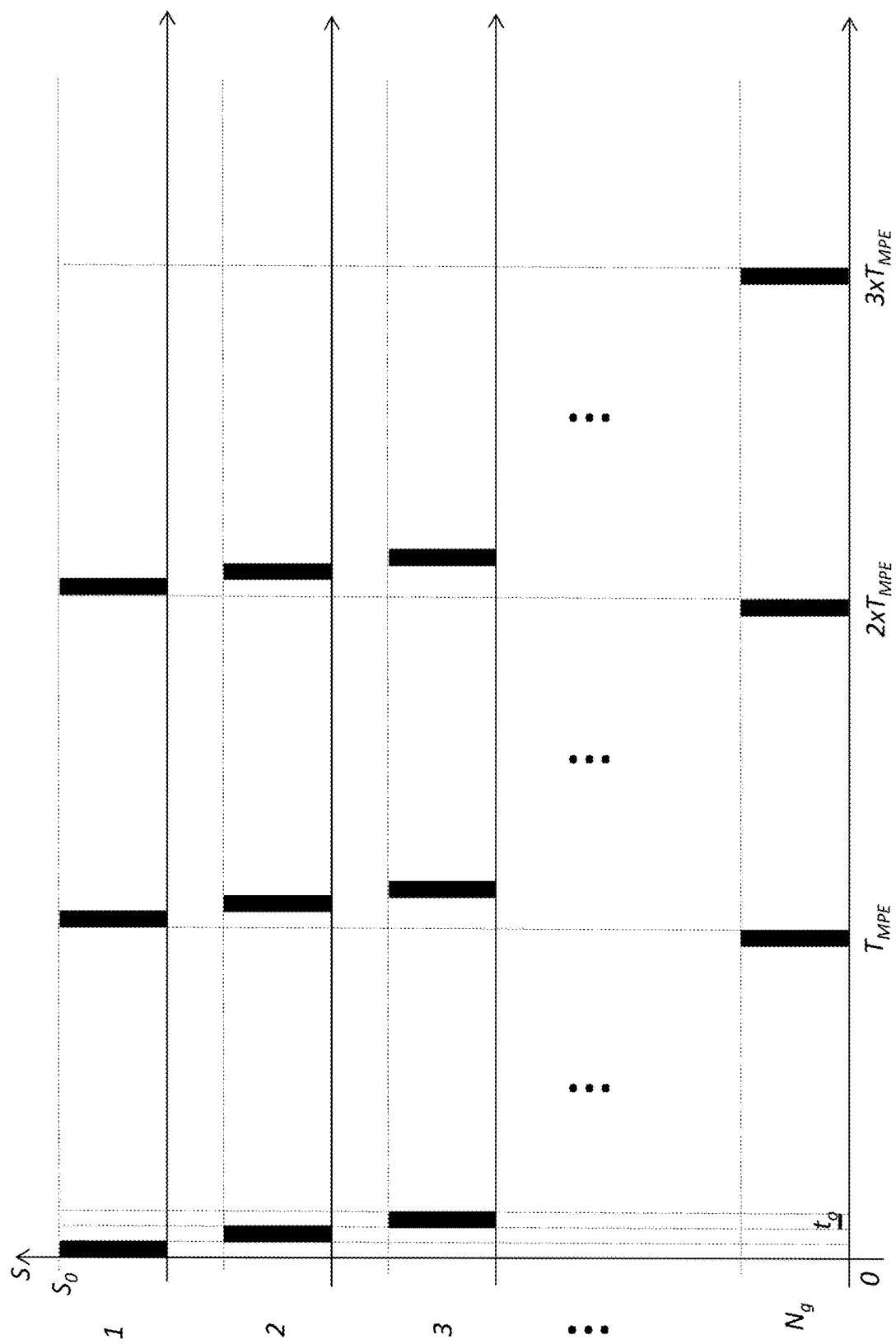
FIG. 24 illustrates one embodiment of a method which iterates across all antenna groups according to Round-Robin scheduling policy for transmitting data.

The framework of DIDO systems with adaptive per-antenna power control is depicted in FIG. 23. The amplitude of the digital signal coming out of the multiplexer 234 is dynamically adjusted with power scaling factors $S_1, \ldots, S_M$, before being sent to the DAC units 235. The power scaling factors are computed by the power control unit 232 based on the CQI 233.

In one embodiment, $N_g$ DIDO antenna groups are defined. Every group contains at least as many DIDO antennas as the number of active clients (K). At any given time, only one group has $N_a > K$ active DIDO antennas transmitting to the clients at larger power level ($S_o$) than MPE limit ($\overline{MPE}$). One method iterates across all antenna groups according to Round-Robin scheduling policy depicted in FIG. 24. In another embodiment, different scheduling techniques (i.e., proportional-fair scheduling [8]) are employed for cluster selection to optimize error rate or throughput performance.

Assuming Round-Robin power allocation, from (14) we derive the average transmit power for every DIDO antenna as $$S = S_o \frac{t_o}{T_{MPE}} \leq \overline{MPE} \tag{15}$$

where $t_o$ is the period of time over which the antenna group is active and $T_{MPE}$=30 min is the average time defined by the FCC guidelines [2]. The ratio in (15) is the duty factor (DF) of the groups, defined such that the average transmit power from every DIDO antenna satisfies the MPE limit ($\overline{MPE}$). The duty factor depends on the number of active clients, the number of groups and active antennas per-group, according to the following definition $$DF \triangleq \frac{K}{N_g N_a} = \frac{t_o}{T_{MPE}}. \tag{16}$$

The SNR gain (in dB) obtained in DIDO systems with power control and antenna grouping is expressed as a function of the duty factor as $$G_{dB} = 10\log_{10}\left(\frac{1}{DF}\right). \tag{17}$$

We observe the gain in (17) is achieved at the expense of $G_{dB}$ additional transmit power across all DIDO antennas.

In general, the total transmit power from all $N_a$ of all $N_g$ groups is defined as $$\overline{P} = \sum_{j=1}^{N_g} \sum_{i=1}^{N_a} P_{ij} \tag{18}$$

where the $P_{ij}$ is the average per-antenna transmit power given by $$P_{ij} = \frac{1}{T_{MPE}} \int_0^{T_{MPE}} S_{ij}(t) dt \leq \overline{MPE} \tag{19}$$

and $S_{ij}(t)$ is the power spectral density for the $i^{th}$ transmit antenna within the $j^{th}$ group. In one embodiment, the power spectral density in (19) is designed for every antenna to optimize error rate or throughput performance.

To gain some intuition on the performance of the proposed method, consider 400 DIDO distributed antennas in a given coverage area and 400 clients subscribing to a wireless Internet service offered over DIDO systems. It is unlikely that every Internet connection will be fully utilized all the time. Let us assume that 10% of the clients will be actively using the wireless Internet connection at any given time. Then, 400 DIDO antennas can be divided in $N_g$=10 groups of $N_a$=40 antennas each, every group serving K=40 active clients at any given time with duty factor DF=0.1. The SNR gain resulting from this transmission scheme is $G_{dB}$=10 $\log_{10}$(1/DF)=10 dB, provided by 10 dB additional transmit power from all DIDO antennas. We observe, however, that the average per-antenna transmit power is constant and is within the MPE limit.

Figure 25:
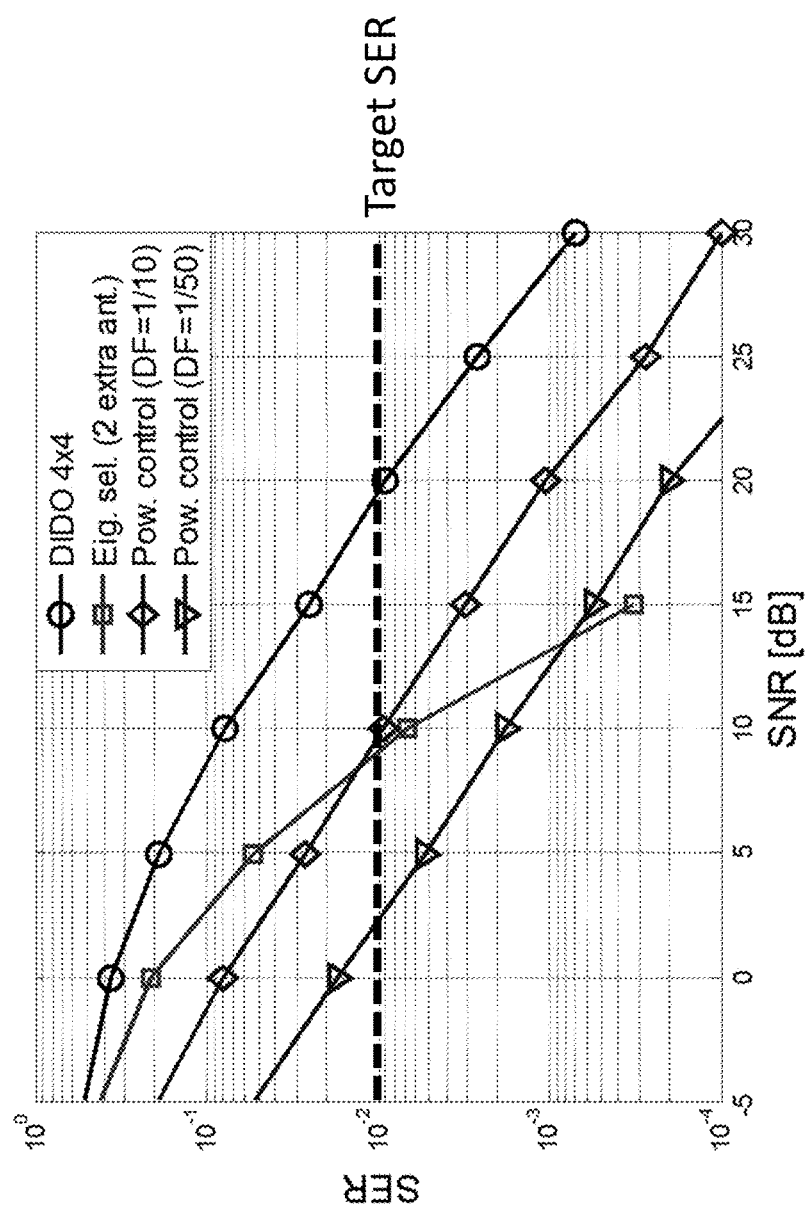
FIG. 25 illustrates a comparison of the uncoded SER performance of power control with antenna grouping against conventional eigenmode selection in U.S. Pat. No. 7,636,381.
Figure 26:
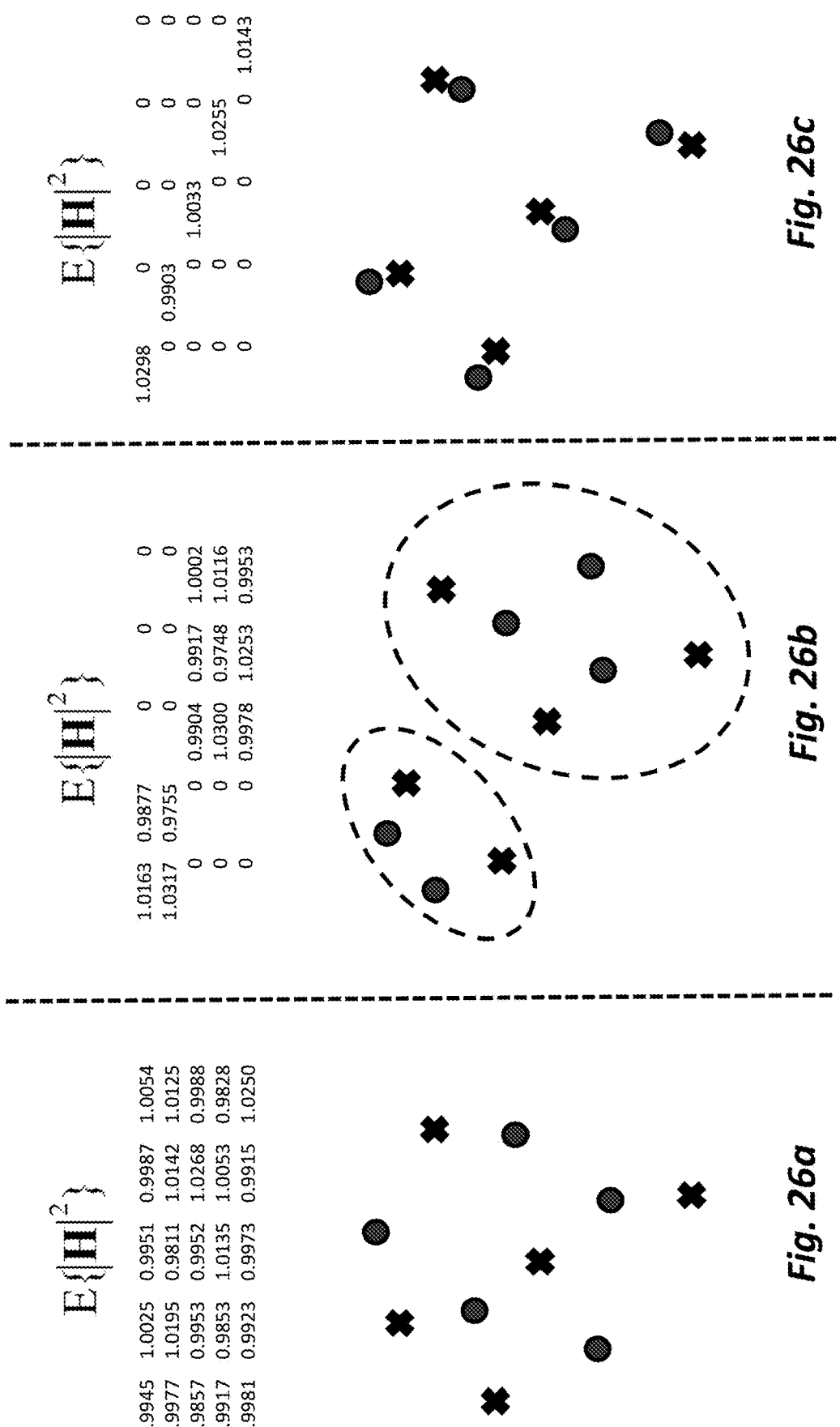
FIGS. 26a-c illustrate three scenarios in which BD precoding dynamically adjusts the precoding weights to account for different power levels over the wireless links between DIDO antennas and clients.

FIG. 25 compares the (uncoded) SER performance of the above power control with antenna grouping against conventional eigenmode selection in U.S. Pat. No. 7,636,381. All schemes use BD precoding with four clients, each client equipped with single antenna. The SNR refers to the ratio of per-transmit-antenna power over noise power (i.e., per-antenna transmit SNR). The curve denoted with DIDO 4×4 assumes four transmit antenna and BD precoding. The curve with squares denotes the SER performance with two extra transmit antennas and BD with eigenmode selection, yielding 10 dB SNR gain (at 1% SER target) over conventional BD precoding. Power control with antenna grouping and DF=1/10 yields 10 dB gain at the same SER target as well. We observe that eigenmode selection changes the slope of the SER curve due to diversity gain, whereas our power control method shifts the SER curve to the left (maintaining the same slope) due to increased average transmit power. For comparison, the SER with larger duty factor DF=1/50 is shown to provide additional 7 dB gain compared to DF=1/10.

Note that our power control may have lower complexity than conventional eigenmode selection methods. In fact, the antenna ID of every group can be pre-computed and shared among DIDO antennas and clients via lookup tables, such that only K channel estimates are required at any given time. For eigenmode selection, (K+2) channel estimates are computed and additional computational processing is required to select the eigenmode that minimizes the SER at any given time for all clients.

Next, we describe another method involving DIDO antenna grouping to reduce CSI feedback overhead in some special scenarios. FIG. 26a shows one scenario where clients (dots) are spread randomly in one area covered by multiple DIDO distributed antennas (crosses). The average power over every transmit-receive wireless link can be computed as $$A = \{|H|^2\}. \qquad (20)$$

where H is the channel estimation matrix available at the DIDO BTS.

The matrices A in FIGS. 26a-c are obtained numerically by averaging the channel matrices over 1000 instances. Two alternative scenarios are depicted in FIG. 26b and FIG. 26c, respectively, where clients are grouped together around a subset of DIDO antennas and receive negligible power from DIDO antennas located far away. For example, FIG. 26b shows two groups of antennas yielding block diagonal matrix A. One extreme scenario is when every client is very close to only one transmitter and the transmitters are far away from one another, such that the power from all other DIDO antennas is negligible. In this case, the DIDO link degenerates in multiple SISO links and A is a diagonal matrix as in FIG. 26c.

In all three scenarios above, the BD precoding dynamically adjusts the precoding weights to account for different power levels over the wireless links between DIDO antennas and clients. It is convenient, however, to identify multiple groups within the DIDO cluster and operate DIDO precoding only within each group. Our proposed grouping method yields the following advantages:

Computational gain: DIDO precoding is computed only within every group in the cluster. For example, if BD precoding is used, singular value decomposition (SVD) has complexity $O(n^3)$, where n is the minimum dimension of the channel matrix H. If H can be reduced to a block diagonal matrix, the SVD is computed for every block with reduced complexity. In fact, if the channel matrix is divided into two block matrices with dimensions $n_1$ and $n_2$ such that $n=n_1+n_2$, the complexity of the SVD is only $O(n_1^3)+O(n_2^3)<O(n^3)$. In the extreme case, if H is diagonal matrix, the DIDO link reduce to multiple SISO links and no SVD calculation is required.

Reduced CSI feedback overhead: When DIDO antennas and clients are divided into groups, in one embodiment, the CSI is computed from the clients to the antennas only within the same group. In TDD systems, assuming channel reciprocity, antenna grouping reduces the number of channel estimates to compute the channel matrix H. In FDD systems where the CSI is fed back over the wireless link, antenna grouping further yields reduction of CSI feedback overhead over the wireless links between DIDO antennas and clients.

Multiple Access Techniques for the DIDO Uplink Channel

In one embodiment of the invention, different multiple access techniques are defined for the DIDO uplink channel. These techniques can be used to feedback the CSI or transmit data streams from the clients to the DIDO antennas over the uplink. Hereafter, we refer to feedback CSI and data streams as uplink streams.

Multiple-input multiple-output (MIMO): the uplink streams are transmitted from the client to the DIDO antennas via open-loop MIMO multiplexing schemes. This method assumes all clients are time/frequency synchronized. In one embodiment, synchronization among clients is achieved via training from the downlink and all DIDO antennas are assumed to be locked to the same time/frequency reference clock. Note that variations in delay spread at different clients may generate jitter between the clocks of different clients that may affect the performance of MIMO uplink scheme. After the clients send uplink streams via MIMO multiplexing schemes, the receive DIDO antennas may use non-linear (i.e., maximum likelihood, ML) or linear (i.e., zeros-forcing, minimum mean squared error) receivers to cancel co-channel interference and demodulate the uplink streams individually.

Time division multiple access (TDMA): Different clients are assigned to different time slots. Every client sends its uplink stream when its time slot is available.

Frequency division multiple access (FDMA): Different clients are assigned to different carrier frequencies. In multicarrier (OFDM) systems, subsets of tones are assigned to different clients that transmit the uplink streams simultaneously, thereby reducing latency.

Code division multiple access (CDMA): Every client is assigned to a different pseudo-random sequence and orthogonality across clients is achieved in the code domain.

In one embodiment of the invention, the clients are wireless devices that transmit at much lower power than the DIDO antennas. In this case, the DIDO BTS defines client sub-groups based on the uplink SNR information, such that interference across sub-groups is minimized. Within every sub-group, the above multiple access techniques are employed to create orthogonal channels in time, frequency, space or code domains thereby avoiding uplink interference across different clients.

In another embodiment, the uplink multiple access techniques described above are used in combination with antenna grouping methods presented in the previous section to define different client groups within the DIDO cluster.

System and Method for Link Adaptation in DIDO Multicarrier Systems

Link adaptation methods for DIDO systems exploiting time, frequency and space selectivity of wireless channels were defined in U.S. Pat. No. 7,636,381. Described below are embodiments of the invention for link adaptation in multicarrier (OFDM) DIDO systems that exploit time/frequency selectivity of wireless channels.

We simulate Rayleigh fading channels according to the exponentially decaying power delay profile (PDP) or Saleh-Valenzuela model in [9]. For simplicity, we assume single-cluster channel with multipath PDP defined as $$P_n = e^{-\beta n} \qquad (21)$$

where $n=0, \ldots, L-1$, is the index of the channel tap, L is the number of channel taps and $\beta=1/\sigma_{DS}$ is the PDP exponent that is an indicator of the channel coherence bandwidth, inverse proportional to the channel delay spread ($\sigma_{DS}$). Low values of $\beta$ yield frequency-flat channels, whereas high values of $\beta$ produce frequency selective channels. The PDP in (21) is normalized such that the total average power for all L channel taps is unitary $$\bar{P}_n = \frac{P_n}{\sum_{i=0}^{L-1} P_i}. \quad (22)$$

Figure 27:
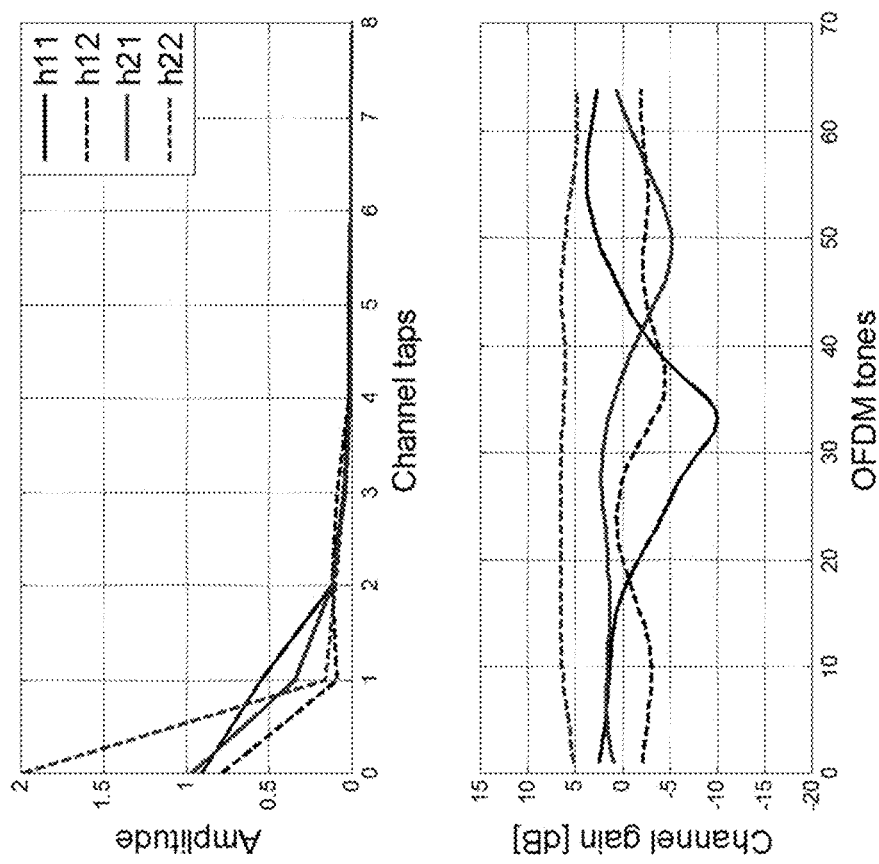
FIG. 27 illustrates the amplitude of low frequency selective channels (assuming $\beta=1$) over delay domain or instantaneous PDP (upper plot) and frequency domain (lower plot) for DIDO 2×2 systems
Figure 28:
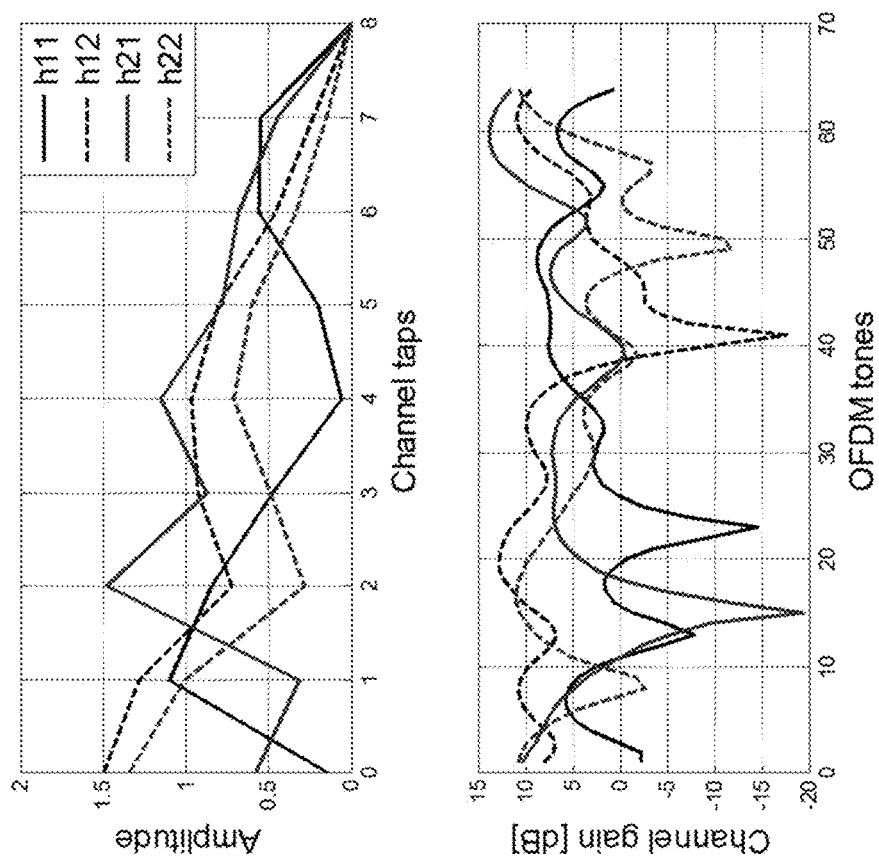
FIG. 28 illustrates one embodiment of a channel matrix frequency response for DIDO 2×2, with a single antenna per client.

FIG. 27 depicts the amplitude of low frequency selective channels (assuming β=1) over delay domain or instantaneous PDP (upper plot) and frequency domain (lower plot) for DIDO 2×2 systems. The first subscript indicates the client, the second subscript the transmit antenna. High frequency selective channels (with β=0.1) are shown in FIG. 28.

Next, we study the performance of DIDO precoding in frequency selective channels. We compute the DIDO precoding weights via BD, assuming the signal model in (1) that satisfies the condition in (2). We reformulate the DIDO receive signal model in (5), with the condition in (2), as $$r_k = H_{ek} s_k + n_k. \quad (23)$$

where $H_{ex} = H_k W_k$ is the effective channel matrix for user k. For DIDO 2×2, with a single antenna per client, the effective channel matrix reduces to one value with a frequency response shown in FIG. 29 and for channels characterized by high frequency selectivity (e.g., with β=0.1) in FIG. 28. The continuous line in FIG. 29 refers to client 1, whereas the line with dots refers to client 2. Based on the channel quality metric in FIG. 29 we define time/frequency domain link adaptation (LA) methods that dynamically adjust MCSs, depending on the changing channel conditions.

We begin by evaluating the performance of different MCSs in AWGN and Rayleigh fading SISO channels. For simplicity, we assume no FEC coding, but the following LA methods can be extended to systems that include FEC.

Figure 30:
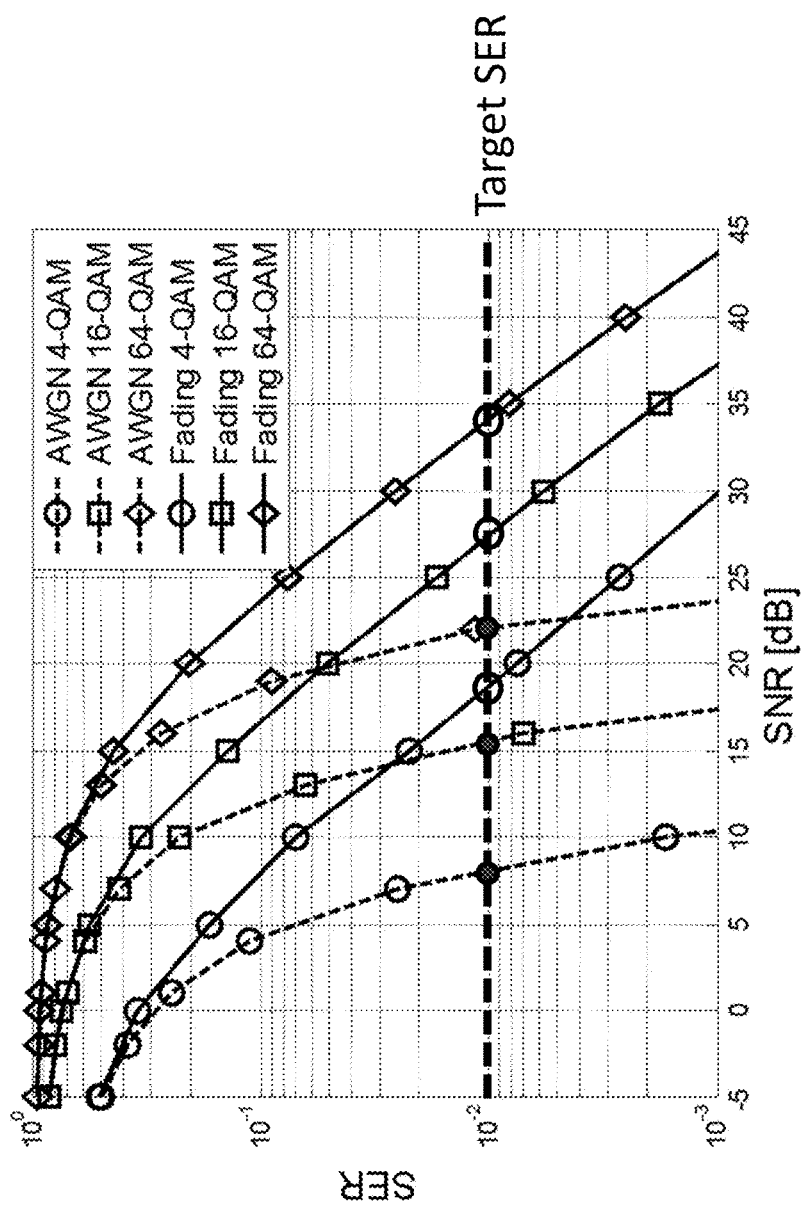
FIG. 30 illustrates exemplary SER for different QAM schemes (i.e., 4-QAM, 16-QAM, 64-QAM).

FIG. 30 shows the SER for different QAM schemes (i.e., 4-QAM, 16-QAM, 64-QAM). Without loss of generality, we assume target SER of 1% for uncoded systems. The SNR thresholds to meet that target SER in AWGN channels are 8 dB, 15.5 dB and 22 dB for the three modulation schemes, respectively. In Rayleigh fading channels, it is well known the SER performance of the above modulation schemes is worse than AWGN [13] and the SNR thresholds are: 18.6 dB, 27.3 dB and 34.1 dB, respectively. We observe that DIDO precoding transforms the multi-user downlink channel into a set of parallel SISO links. Hence, the same SNR thresholds as in FIG. 30 for SISO systems hold for DIDO systems on a client-by-client basis. Moreover, if instantaneous LA is carried out, the thresholds in AWGN channels are used.

The key idea of the proposed LA method for DIDO systems is to use low MCS orders when the channel undergoes deep fades in the time domain or frequency domain (depicted in FIG. 28) to provide link-robustness. Contrarily, when the channel is characterized by large gain, the LA method switches to higher MCS orders to increase spectral efficiency. One contribution of the present application compared to U.S. Pat. No. 7,636,381 is to use the effective channel matrix in (23) and in FIG. 29 as a metric to enable adaptation.

Figure 29:
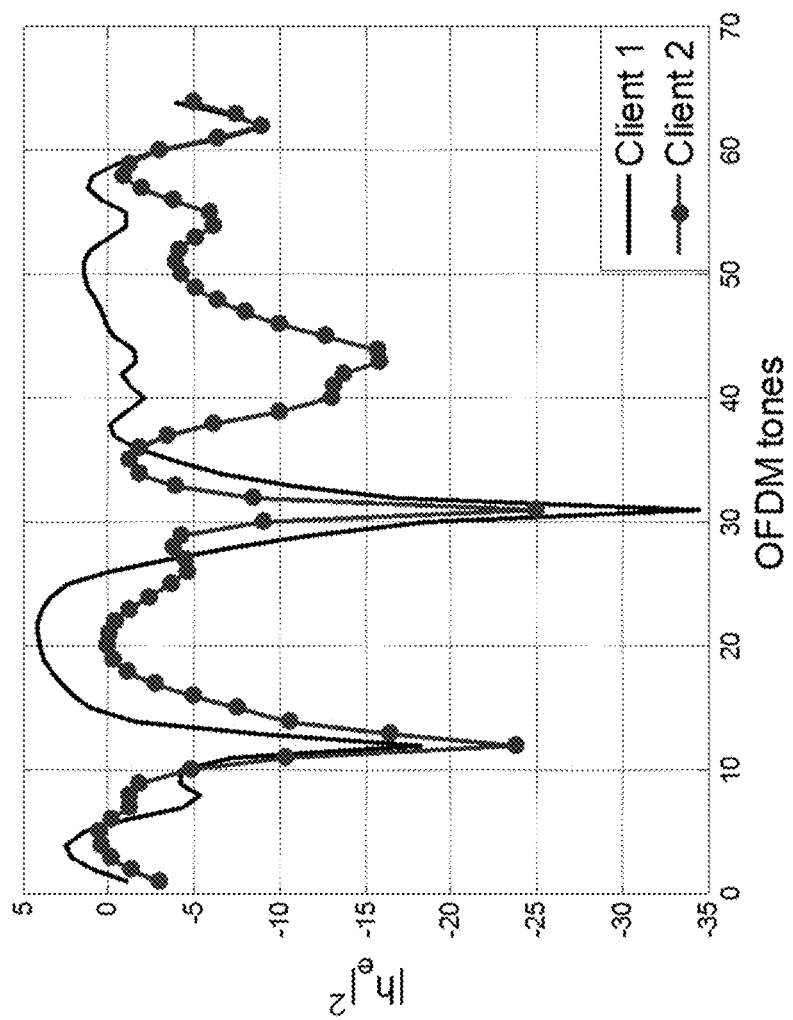
FIG. 29 illustrates one embodiment of a channel matrix frequency response for DIDO 2×2, with a single antenna per client for channels characterized by high frequency selectivity (e.g., with $\beta=0.1$).
Figure 31:
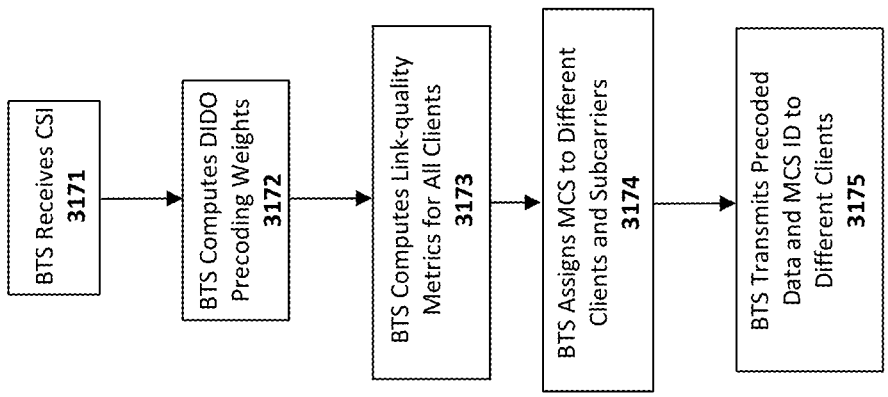
FIG. 31 illustrates one embodiment of a method for implementing link adaptation (LA) techniques.

The general framework of the LA methods is depicted in FIG. 31 and defined as follows:
CSI estimation: At 3171 the DIDO BTS computes the CSI from all users. Users may be equipped with single or multiple receive antennas.
DIDO precoding: At 3172, the BTS computes the DIDO precoding weights for all users. In one embodiment, BD is used to compute these weights. The precoding weights are calculated on a tone-by-tone basis.
Link-quality metric calculation: At 3173 the BTS computes the frequency-domain link quality metrics. In OFDM systems, the metrics are calculated from the CSI and DIDO precoding weights for every tone. In one embodiment of the invention, the link-quality metric is the average SNR over all OFDM tones. We define this method as LA1 (based on average SNR performance). In another embodiment, the link quality metric is the frequency response of the effective channel in (23). We define this method as LA2 (based on tone-by-tone performance to exploit frequency diversity). If every client has single antenna, the frequency-domain effective channel is depicted in FIG. 29. If the clients have multiple receive antennas, the link-quality metric is defined as the Frobenius norm of the effective channel matrix for every tone. Alternatively, multiple link-quality metrics are defined for every client as the singular values of the effective channel matrix in (23).
Bit-loading algorithm: At 3174, based on the link-quality metrics, the BTS determines the MCSs for different clients and different OFDM tones. For LA1 method, the same MCS is used for all clients and all OFDM tones based on the SNR thresholds for Rayleigh fading channels in FIG. 30. For LA2, different MCSs are assigned to different OFDM tones to exploit channel frequency diversity.
Precoded data transmission: At 3175, the BTS transmits precoded data streams from the DIDO distributed antennas to the clients using the MCSs derived from the bit-loading algorithm. One header is attached to the precoded data to communicate the MCSs for different tones to the clients. For example, if eight MCSs are available and the OFDM symbols are defined with N=64 tone, log 2(8)*N=192 bits are required to communicate the current MCS to every client. Assuming 4-QAM (2 bits/symbol spectral efficiency) is used to map those bits into symbols, only 192/2/N=1.5 OFDM symbols are required to map the MCS information. In another embodiment, multiple subcarriers (or OFDM tones) are grouped into subbands and the same MCS is assigned to all tones in the same subband to reduce the overhead due to control information. Moreover, the MCS are adjusted based on temporal variations of the channel gain (proportional to the coherence time). In fixed-wireless channel (characterized by low Doppler effect) the MCS are recalculated every fraction of the channel coherence time, thereby reducing the overhead required for control information.

FIG. 32 shows the SER performance of the LA methods described above. For comparison, the SER performance in Rayleigh fading channels is plotted for each of the three QAM schemes used. The LA2 method adapts the MCSs to the fluctuation of the effective channel in the frequency domain, thereby providing 1.8 bps/Hz gain in spectral efficiency for low SNR (i.e., SNR=20 dB) and 15 dB gain in SNR (for SNR>35 dB) compared to LA1.

System and Method for DIDO Precoding Interpolation in Multicarrier Systems

The computational complexity of DIDO systems is mostly localized at the centralized processor or BTS. The most computationally expensive operation is the calculation of the precoding weights for all clients from their CSI. When BD precoding is employed, the BTS has to carry out as many singular value decomposition (SVD) operations as the number of clients in the system. One way to reduce complexity is through parallelized processing, where the SVD is computed on a separate processor for every client.

In multicarrier DIDO systems, each subcarrier undergoes flat-fading channel and the SVD is carried out for every client over every subcarrier. Clearly the complexity of the system increases linearly with the number of subcarriers. For example, in OFDM systems with 1 MHz signal bandwidth, the cyclic prefix ($L_0$) must have at least eight channel taps (i.e., duration of 8 microseconds) to avoid intersymbol interference in outdoor urban macrocell environments with large delay spread [3]. The size ($N_{FFT}$) of the fast Fourier transform (FFT) used to generate the OFDM symbols is typically set to multiple of $L_0$ to reduce loss of data rate. If $N_{FFT}$=64, the effective spectral efficiency of the system is limited by a factor $N_{FFT}/(N_{FFT}+L_0)$=89%. Larger values of $N_{FFT}$ yield higher spectral efficiency at the expense of higher computational complexity at the DIDO precoder.

One way to reduce computational complexity at the DIDO precoder is to carry out the SVD operation over a subset of tones (that we call pilot tones) and derive the precoding weights for the remaining tones via interpolation. Weight interpolation is one source of error that results in inter-client interference. In one embodiment, optimal weight interpolation techniques are employed to reduce inter-client interference, yielding improved error rate performance and lower computational complexity in multicarrier systems. In DIDO systems with M transmit antennas, U clients and N receive antennas per clients, the condition for the precoding weights of the $k^{th}$ client ($W_k$) that guarantees zero interference to the other clients u is derived from (2) as $$H_u W_k = 0^{N \times N}; \forall u=1, \ldots, U; \text{ with } u \neq k \quad (24)$$

where $H_u$ are the channel matrices corresponding to the other DIDO clients in the system.

In one embodiment of the invention, the objective function of the weight interpolation method is defined as $$f(\theta_k) = \sum_{\substack{u=1 \\ u \neq k}}^{U} \|H_u \hat{W}_k(\theta_k)\|_F \quad (25)$$

where $\theta_k$ is the set of parameters to be optimized for user k, $\hat{W}_k(\theta_k)$ is the weight interpolation matrix and $\|\cdot\|_F$ denotes the Frobenius norm of a matrix. The optimization problem is formulated as $$\theta_{k,opt} = \arg\min_{\theta_k \in \Theta_k} f(\theta_k) \quad (26)$$

where $\Theta_k$ is the feasible set of the optimization problem and $\theta_{k,opt}$ is the optimal solution.

The objective function in (25) is defined for one OFDM tone. In another embodiment of the invention, the objective function is defined as linear combination of the Frobenius norm in (25) of the matrices for all the OFDM tones to be interpolated. In another embodiment, the OFDM spectrum is divided into subsets of tones and the optimal solution is given by $$\theta_{k,opt} = \arg\min_{\theta_k \in \Theta_k} \max_{n \in A} f(n, \theta_k) \quad (27)$$

where n is the OFDM tone index and A is the subset of tones.

The weight interpolation matrix $W_k(\theta_k)$ in (25) is expressed as a function of a set of parameters $\theta_k$. Once the optimal set is determined according to (26) or (27), the optimal weight matrix is computed. In one embodiment of the invention, the weight interpolation matrix of given OFDM tone n is defined as linear combination of the weight matrices of the pilot tones. One example of weight interpolation function for beamforming systems with single client was defined in [11]. In DIDO multi-client systems we write the weight interpolation matrix as $$\hat{W}_k(lN_0+n, \theta_k) = (1-c_n) \cdot W(l) + c_n e^{j\theta_k} \cdot W(l+1) \quad (28)$$

where $0 \leq l \leq (L_0-1)$, $L_0$ is the number of pilot tones and $c_n=(n-1)/N_0$, with $N_0=N_{FFT}/L_0$. The weight matrix in (28) is then normalized such that $\|\hat{W}_k\|_F = \sqrt{NM}$ to guarantee unitary power transmission from every antenna. If N=1 (single receive antenna per client), the matrix in (28) becomes a vector that is normalized with respect to its norm. In one embodiment of the invention, the pilot tones are chosen uniformly within the range of the OFDM tones. In another embodiment, the pilot tones are adaptively chosen based on the CSI to minimize the interpolation error.

We observe that one key difference of the system and method in [11] against the one proposed in this patent application is the objective function. In particular, the systems in [11] assumes multiple transmit antennas and single client, so the related method is designed to maximize the product of the precoding weight by the channel to maximize the receive SNR for the client. This method, however, does not work in multi-client scenarios, since it yields inter-client interference due to interpolation error. By contrast, our method is designed to minimize inter-client interference thereby improving error rate performance to all clients.

Figure 33:
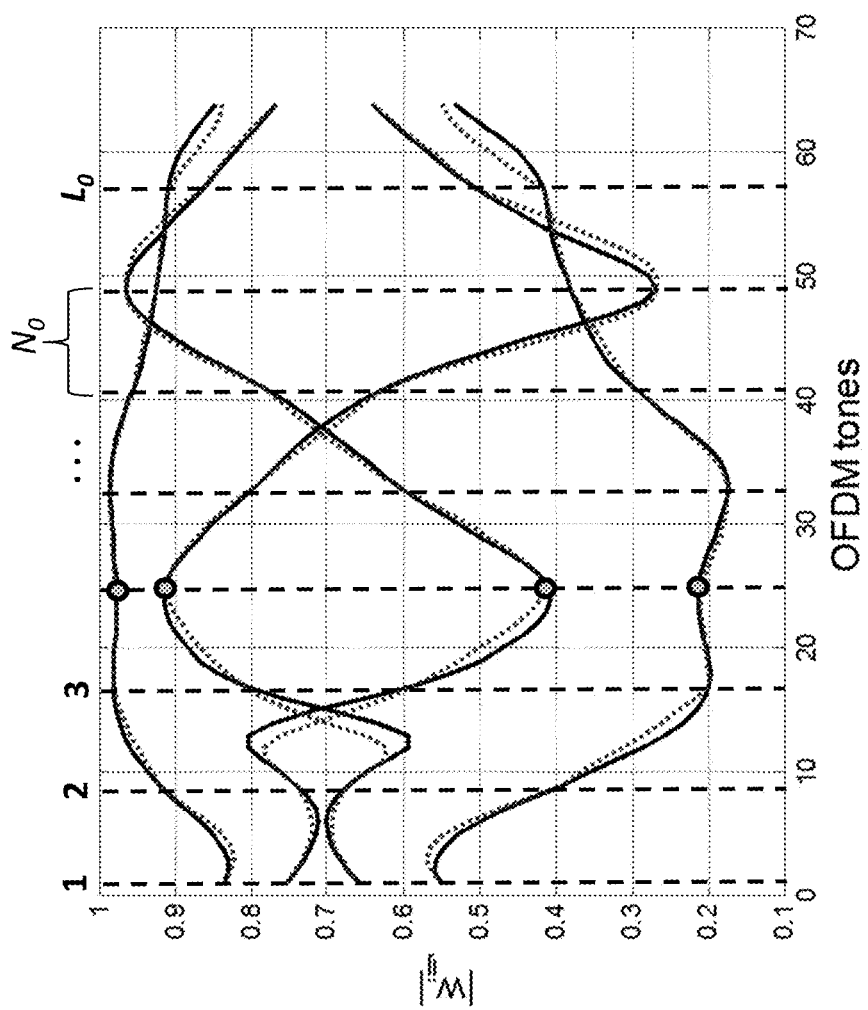
FIG. 33 illustrates the entries of the matrix in equation (28) as a function of the OFDM tone index for DIDO 2×2 systems with $N_{FFT}=64$ and $L_0=8$.

FIG. 33 shows the entries of the matrix in (28) as a function of the OFDM tone index for DIDO 2×2 systems with $N_{FFT}$=64 and $L_0$=8. The channel PDP is generated according to the model in (21) with β=1 and the channel consists of only eight channel taps. We observe that $L_0$ must be chosen to be larger than the number of channel taps. The solid lines in FIG. 33 represent the ideal functions, whereas the dotted lines are the interpolated ones. The interpolated weights match the ideal ones for the pilot tones, according to the definition in (28). The weights computed over the remaining tones only approximate the ideal case due to estimation error.

Figure 34:
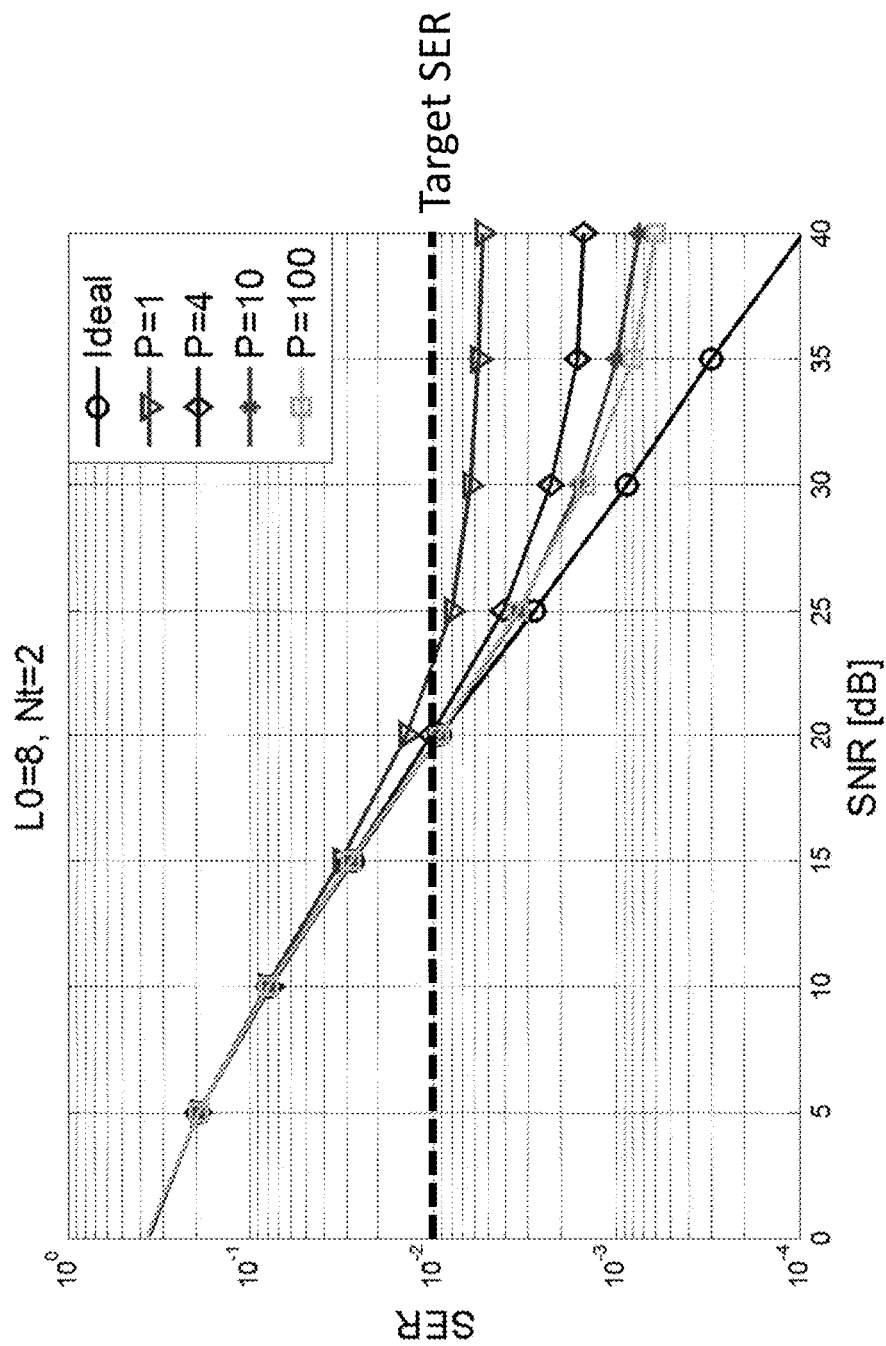
FIG. 34 illustrates the SER versus SNR for $L_0=8$, $M=N_t=2$ transmit antennas and a variable number of P.

One way to implement the weight interpolation method is via exhaustive search over the feasible set $\Theta_k$ in (26). To reduce the complexity of the search, we quantize the feasible set into P values uniformly in the range $[0,2\pi]$. FIG. 34 shows the SER versus SNR for $L_0$=8, M=$N_t$=2 transmit antennas and variable number of P. As the number of quantization levels increases, the SER performance improves. We observe the case P=10 approaches the performance of P=100 for much lower computational complexity, due to reduced number of searches.

Figure 35:
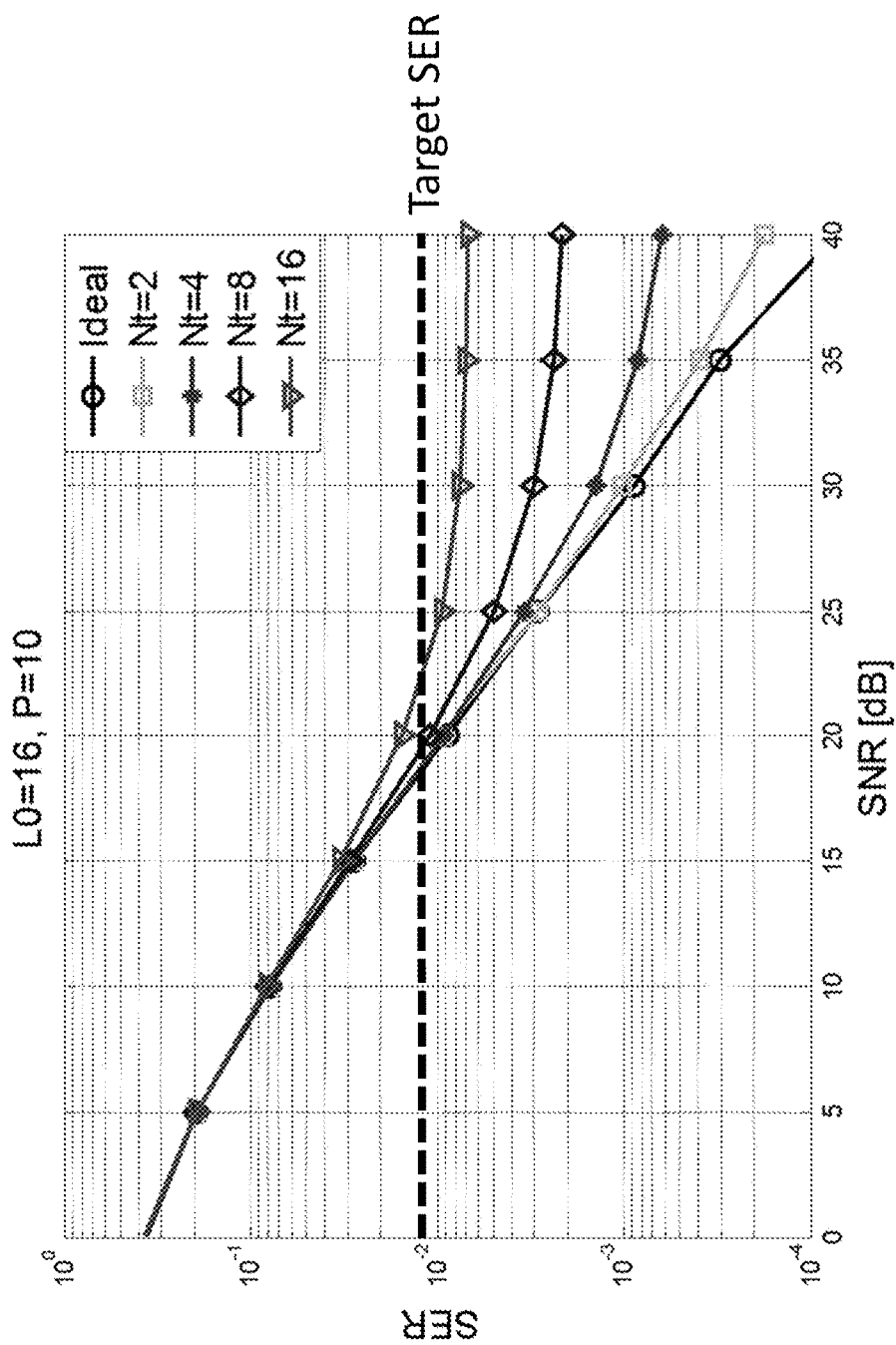
FIG. 35 illustrates the SER performance of one embodiment of an interpolation method for different DIDO orders and $L_0=16$.

FIG. 35 shows the SER performance of the interpolation method for different DIDO orders and $L_0$=16. We assume the number of clients is the same as the number of transmit antennas and every client is equipped with single antenna. As the number of clients increases the SER performance degrades due to increase inter-client interference produced by weight interpolation errors.

In another embodiment of the invention, weight interpolation functions other than those in (28) are used. For example, linear prediction autoregressive models [12] can be used to interpolate the weights across different OFDM tones, based on estimates of the channel frequency correlation.

REFERENCES

[1] A. Forenza and S. G. Perlman, "System and method for distributed antenna wireless communications", U.S. application Ser. No. 12/630,627, filed Dec. 2, 2009, entitled "System and Method For Distributed Antenna Wireless Communications"

[2] FCC, "Evaluating compliance with FCC guidelines for human exposure to radiofrequency electromagnetic fields," OET Bulletin 65, Ed. 97-01, August 1997

[3] 3GPP, "Spatial Channel Model AHG (Combined ad-hoc from 3GPP & 3GPP2)", SCM Text V6.0, Apr. 22, 2003

[4] 3GPP TR 25.912, "Feasibility Study for Evolved UTRA and UTRAN", V9.0.0 (2009-10)

[5] 3GPP TR 25.913, "Requirements for Evolved UTRA (E-UTRA) and Evolved UTRAN (E-UTRAN)", V8.0.0 (2009-01)

[6] W. C. Jakes, *Microwave Mobile Communications*, IEEE Press, 1974

[7] K. K. Wong, et al., "A joint channel diagonalization for multiuser MIMO antenna systems," IEEE Trans. Wireless Comm., vol. 2, pp. 773-786, July 2003;

[8] P. Viswanath, et al., "Opportunistic beamforming using dump antennas," IEEE Trans. On Inform. Theory, vol. 48, pp. 1277-1294, June 2002.

[9] A. A. M. Saleh, et al., "A statistical model for indoor multipath propagation," IEEE Jour. Select. Areas in Comm., vol. 195 SAC-5, no. 2, pp. 128-137, February 1987.

[10] A. Paulraj, et al., *Introduction to Space-Time Wireless Communications*, Cambridge University Press, 40 West 20th Street, New York, N.Y., USA, 2003.

[11] J. Choi, et al., "Interpolation Based Transmit Beamforming for MIMO-OFDM with Limited Feedback," *IEEE Trans. on Signal Processing*, vol. 53, no. 11, pp. 4125-4135, November 2005.

[12] I. Wong, et al., "Long Range Channel Prediction for Adaptive OFDM Systems," *Proc. of the IEEE Asilomar Conf. on Signals, Systems, and Computers*, vol. 1, pp. 723-736, Pacific Grove, Calif., USA, Nov. 7-10, 2004.

[13] J. G. Proakis, *Communication System Engineering*, Prentice Hall, 1994

[14] B. D. Van Veen, et al., "Beamforming: a versatile approach to spatial filtering," *IEEE ASSP Magazine*, April 1988.

[15] R. G. Vaughan, "On optimum combining at the mobile," *IEEE Trans. On Vehic. Tech.*, vol 37, n. 4, pp. 181-188, November 1988

[16] F. Qian, "Partially adaptive beamforming for correlated interference rejection," *IEEE Trans. On Sign. Proc.*, vol. 43, n. 2, pp. 506-515, February 1995

[17] H. Krim, et. al., "Two decades of array signal processing research," *IEEE Signal Proc. Magazine*, pp. 67-94, July 1996

[19] W. R. Remley, "Digital beamforming system", U.S. Pat. No. 4,003,016, January 1977

[18] R. J. Masak, "Beamforming/null-steering adaptive array", U.S. Pat. No. 4,771,289, September 1988

[20] K.-B. Yu, et. al., "Adaptive digital beamforming architecture and algorithm for nulling mainlobe and multiple sidelobe radar jammers while preserving monopulse ratio angle estimation accuracy", U.S. Pat. No. 5,600,326, February 1997

[21] H. Boche, et al., "Analysis of different precoding/decoding strategies for multiuser beamforming", IEEE Vehic. Tech. Conf., vol. 1, April 2003

[22] M. Schubert, et al., "Joint 'dirty paper' pre-coding and downlink beamforming," vol. 2, pp. 536-540, December 2002

[23] H. Boche, et al. "A general duality theory for uplink and downlink beamformingc", vol. 1, pp. 87-91, December 2002

[24] K. K. Wong, R. D. Murch, and K. B. Letaief, "A joint channel diagonalization for multiuser MIMO antenna systems," IEEE Trans. Wireless Comm., vol. 2, pp. 773-786, July 2003;

[25] Q. H. Spencer, A. L. Swindlehurst, and M. Haardt, "Zero forcing methods for downlink spatial multiplexing in multiuser MIMO channels," IEEE Trans. Sig. Proc., vol. 52, pp. 461-471, February 2004.

II. DISCLOSURE OF THE PRESENT APPLICATION

Described below are wireless radio frequency (RF) communication systems and methods employing a plurality of distributed transmitting antennas operating cooperatively to create wireless links to given users, while suppressing interference to other users. Coordination across different transmitting antennas is enabled via user-clustering. The user cluster is a subset of transmitting antennas whose signal can be reliably detected by given user (i.e., received signal strength above noise or interference level). Every user in the system defines its own user-cluster. The waveforms sent by the transmitting antennas within the same user-cluster coherently combine to create RF energy at the target user's location and points of zero RF interference at the location of any other user reachable by those antennas.

Consider a system with M transmit antennas within one user-cluster and K users reachable by those M antennas, with K≤M. We assume the transmitters are aware of the CSI ($H \in C^{K \times M}$) between the M transmit antennas and K users. For simplicity, every user is assumed to be equipped with a single antenna, but the same method can be extended to multiple receive antennas per user. Consider the channel matrix H obtained by combining the channel vectors ($h_k \in C^{1 \times M}$) from the M transmit antennas to the K users as $$H = \begin{bmatrix} h_1 \\ \vdots \\ h_k \\ \vdots \\ h_K \end{bmatrix}.$$

The precoding weights ($w_k \in C^{M \times 1}$) that create RF energy to user k and zero RF energy to all other K−1 users are computed to satisfy the following condition $$\tilde{H}_k w_k = 0^{K \times 1}$$

where $\tilde{H}_k$ is the effective channel matrix of user k obtained by removing the k-th row of matrix H and $0^{K \times 1}$ is the vector with all zero entries In one embodiment, the wireless system is a DIDO system and user clustering is employed to create a wireless communication link to the target user, while pre-cancelling interference to any other user reachable by the antennas lying within the user-cluster. In U.S. application Ser. No. 12/630,627, a DIDO system is described which includes:

DIDO clients: user terminals equipped with one or multiple antennas;

DIDO distributed antennas: transceiver stations operating cooperatively to transmit precoded data streams to multiple users, thereby suppressing inter-user interference;

DIDO base transceiver stations (BTS): centralized processor generating precoded waveforms to the DIDO distributed antennas;

DIDO base station network (BSN): wired backhaul connecting the BTS to the DIDO distributed antennas or to other BTSs.

Figure 36:
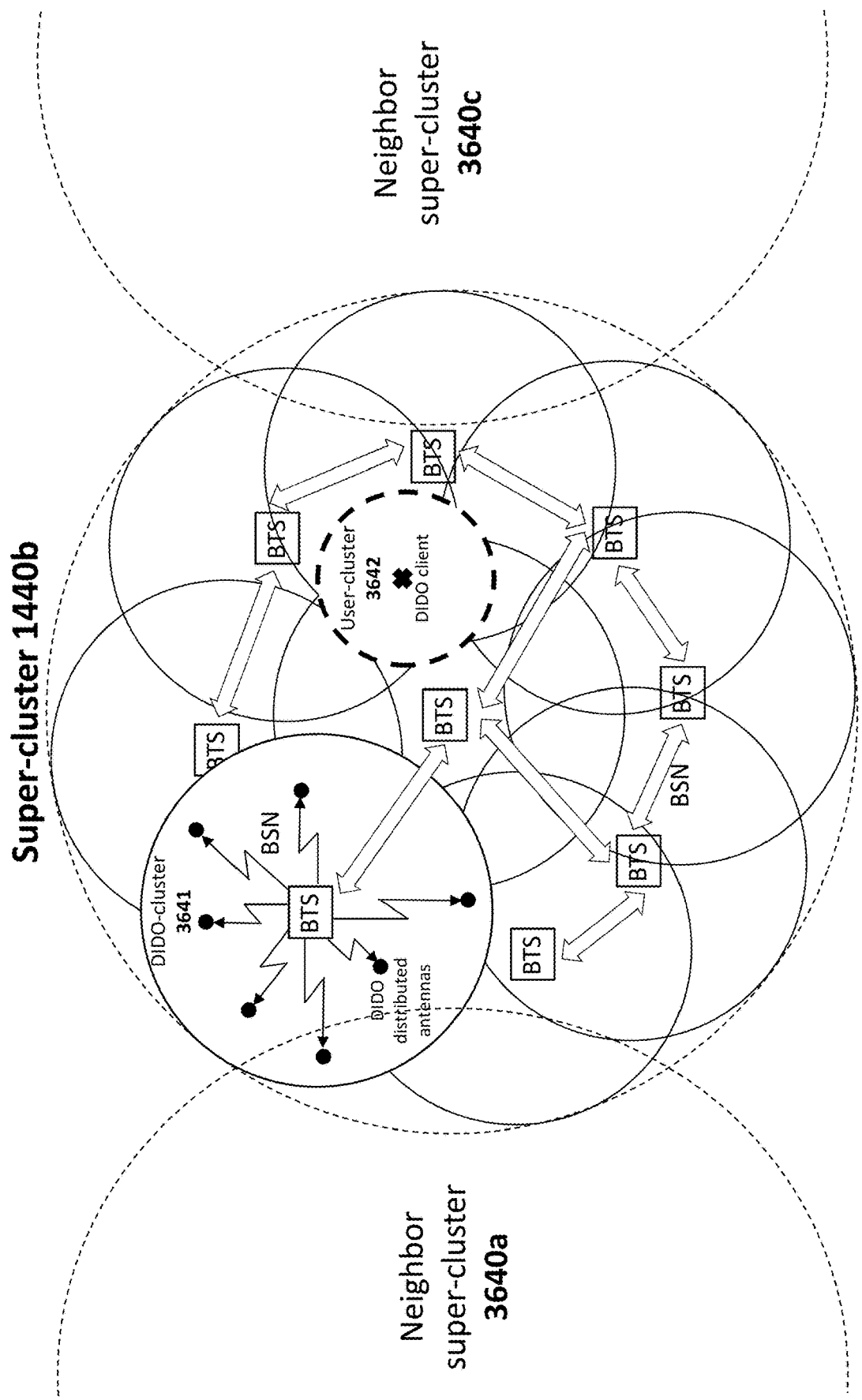
FIG. 36 illustrates one embodiment of a system which employs super-clusters, DIDO-clusters and user-clusters.

The DIDO distributed antennas are grouped into different subsets depending on their spatial distribution relative to the location of the BTSs or DIDO clients. We define three types of clusters, as depicted in FIG. 36:

Super-cluster 3640: is the set of DIDO distributed antennas connected to one or multiple BTSs such that the round-trip latency between all BTSs and the respective users is within the constraint of the DIDO precoding loop;

DIDO-cluster 3641: is the set of DIDO distributed antennas connected to the same BTS. When the super-cluster contains only one BTS, its definition coincides with the DIDO-cluster;

User-cluster 3642: is the set of DIDO distributed antennas that cooperatively transmit precoded data to given user.

For example, the BTSs are local hubs connected to other BTSs and to the DIDO distributed antennas via the BSN. The BSN can be comprised of various network technologies including, but not limited to, digital subscriber lines (DSL), ADSL, VDSL [6], cable modems, fiber rings, T1 lines, hybrid fiber coaxial (HFC) networks, and/or fixed wireless (e.g., WiFi). All BTSs within the same super-cluster share information about DIDO precoding via the BSN such that the round-trip latency is within the DIDO precoding loop.

Figure 37:
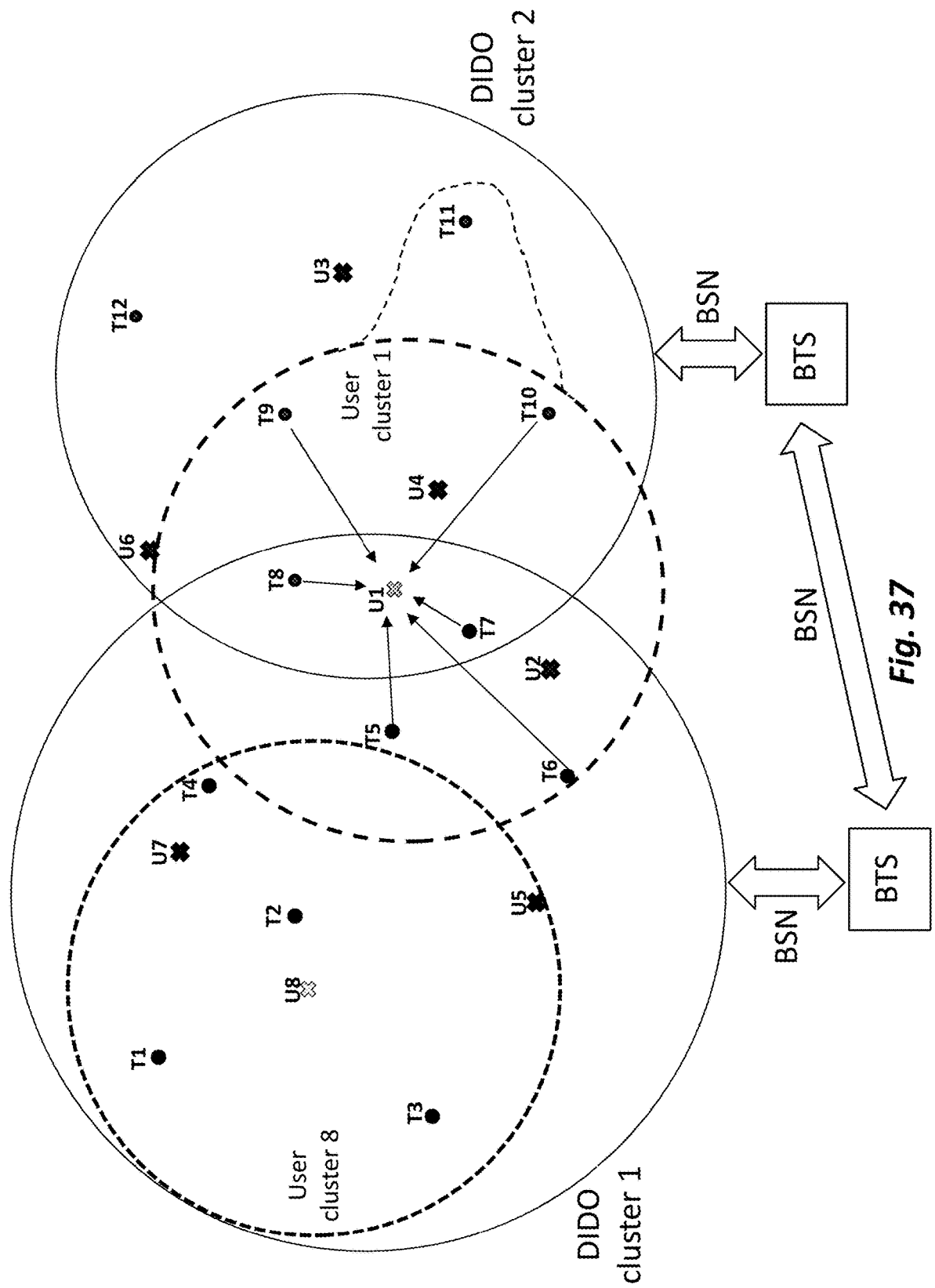
FIG. 37 illustrates a system with user clusters according to one embodiment of the invention.

In FIG. 37, the dots denote DIDO distributed antennas, the crosses are the users and the dashed lines indicate the user-clusters for users U1 and U8, respectively. The method described hereafter is designed to create a communication link to the target user U1 while creating points of zero RF energy to any other user (U2-U8) inside or outside the user-cluster.

We proposed similar method in [5], where points of zero RF energy were created to remove interference in the overlapping regions between DIDO clusters. Extra antennas were required to transmit signal to the clients within the DIDO cluster while suppressing inter-cluster interference. One embodiment of a method proposed in the present application does not attempt to remove inter-DIDO-cluster interference; rather it assumes the cluster is bound to the client (i.e., user-cluster) and guarantees that no interference (or negligible interference) is generated to any other client in that neighborhood.

One idea associated with the proposed method is that users far enough from the user-cluster are not affected by radiation from the transmit antennas, due to large pathloss. Users close or within the user-cluster receive interference-free signal due to precoding. Moreover, additional transmit antennas can be added to the user-cluster (as shown in FIG. 37) such that the condition K≤M is satisfied.

One embodiment of a method employing user clustering consists of the following steps:

a. Link-quality measurements: the link quality between every DIDO distributed antenna and every user is reported to the BTS. The link-quality metric consists of signal-to-noise ratio (SNR) or signal-to-interference-plus-noise ratio (SINR).

In one embodiment, the DIDO distributed antennas transmit training signals and the users estimate the received signal quality based on that training. The training signals are designed to be orthogonal in time, frequency or code domains such that the users can distinguish across different transmitters. Alternatively, the DIDO antennas transmit narrowband signals (i.e., single tone) at one particular frequency (i.e., a beacon channel) and the users estimate the link-quality based on that beacon signal. One threshold is defined as the minimum signal amplitude (or power) above the noise level to demodulate data successfully as shown in FIG. 38a. Any link-quality metric value below this threshold is assumed to be zero. The link-quality metric is quantized over a finite number of bits and fed back to the transmitter.

In a different embodiment, the training signals or beacons are sent from the users and the link quality is estimated at the DIDO transmit antennas (as in FIG. 38b), assuming reciprocity between uplink (UL) and downlink (DL) pathloss. Note that pathloss reciprocity is a realistic assumption in time division duplexing (TDD) systems (with UL and DL channels at the same frequency) and frequency division duplexing (FDD) systems when the UL and DL frequency bands are relatively close. Information about the link-quality metrics is shared across different BTSs through the BSN as depicted in FIG. 37 such that all BTSs are aware of the link-quality between every antenna/user couple across different DIDO clusters.

b. Definition of user-clusters: the link-quality metrics of all wireless links in the DIDO clusters are the entries to the link-quality matrix shared across all BTSs via the BSN. One example of link-quality matrix for the scenario in FIG. 37 is depicted in FIG. 39.

The link-quality matrix is used to define the user clusters. For example, FIG. 39 shows the selection of the user cluster for user U8. The subset of transmitters with non-zero link-quality metrics (i.e., active transmitters) to user U8 is first identified. These transmitters populate the user-cluster for the user U8. Then the sub-matrix containing non-zero entries from the transmitters within the user-cluster to the other users is selected. Note that since the link-quality metrics are only used to select the user cluster, they can be quantized with only two bits (i.e., to identify the state above or below the thresholds in FIG. 38) thereby reducing feedback overhead.

Another example is depicted in FIG. 40 for user U1. In this case the number of active transmitters is lower than the number of users in the sub-matrix, thereby violating the condition K≤M. Therefore, one or more columns are added to the sub-matrix to satisfy that condition. If the number of transmitters exceeds the number of users, the extra antennas can be used for diversity schemes (i.e., antenna or eigenmode selection).

Yet another example is shown in FIG. 41 for user U4. We observe that the sub-matrix can be obtained as combination of two sub-matrices.

c. CSI report to the BTSs: Once the user clusters are selected, the CSI from all transmitters within the user-cluster to every user reached by those transmitters is made available to all BTSs. The CSI information is shared across all BTSs via the BSN. In TDD systems, UL/DL channel reciprocity can be exploited to derive the CSI from training over the UL channel. In FDD systems, feedback channels from all users to the BTSs are required. To reduce the amount of feedback, only the CSI corresponding to the non-zero entries of the link-quality matrix are fed back.

d. DIDO precoding: Finally, DIDO precoding is applied to every CSI sub-matrix corresponding to different user clusters (as described, for example, in the related U.S. patent applications).

In one embodiment, singular value decomposition (SVD) of the effective channel matrix $\tilde{H}_k$ is computed and the precoding weight $w_k$ for user k is defined as the right singular vector corresponding to the null subspace of $\tilde{H}_k$. Alternatively, if M>K and the SVD decomposes the effective channel matrix as $\tilde{H}_k = V_k \Sigma_k U_k^H$, the DIDO precoding weight for user k is given by $$w_k = U_o(U_o^H \cdot h_k^T)$$

where $U_o$ is the matrix with columns being the singular vectors of the null subspace of $\tilde{H}_k$.

From basic linear algebra considerations, we observe that the right singular vector in the null subspace of the matrix $\tilde{H}$ is equal to the eigenvetor of C corresponding to the zero eigenvalue $$C = \tilde{H}^H \tilde{H} = (V \Sigma U^H)^H (V \Sigma U^H) = U \Sigma^2 U^H$$

where the effective channel matrix is decomposed as $\tilde{H} = V \Sigma U^H$, according to the SVD. Then, one alternative to computing the SVD of $\tilde{H}_K$ is to calculate the eigenvalue decomposition of C. There are several methods to compute eigenvalue decomposition such as the power method. Since we are only interested to the eigenvector corresponding to the null subspace of C, we use the inverse power method described by the iteration $$u_{i+1} = \frac{(C - \lambda I)^{-1} u_i}{\|(C - \lambda I)^{-1} u_i\|}$$

where the vector ($u_i$) at the first iteration is a random vector.

Given that the eigenvalue ($\lambda$) of the null subspace is known (i.e., zero) the inverse power method requires only one iteration to converge, thereby reducing computational complexity. Then, we write the precoding weight vector as $$w = C^{-1} u_1$$

where $u_1$ is the vector with real entries equal to 1 (i.e., the precoding weight vector is the sum of the columns of $C^{-1}$).

The DIDO precoding calculation requires one matrix inversion. There are several numerical solutions to reduce the complexity of matrix inversions such as the Strassen's algorithm [1] or the Coppersmith-Winograd's algorithm [2, 3]. Since C is Hermitian matrix by definition, an alternative solution is to decompose C in its real and imaginary components and compute matrix inversion of a real matrix, according to the method in [4, Section 11.4].

Figure 42:
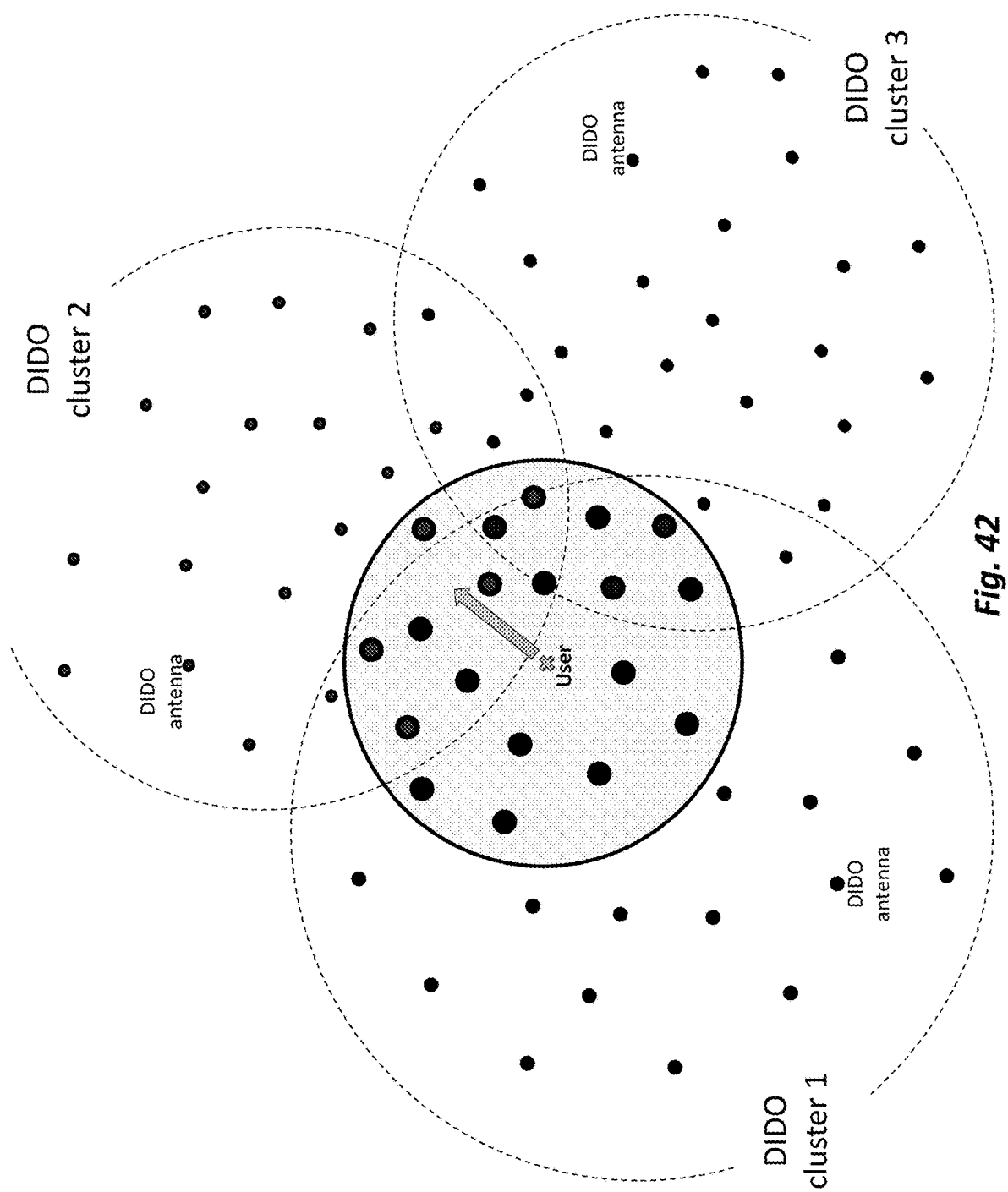
FIG. 42 illustrates an embodiment in which a client moves across different different DIDO clusters.

Another feature of the proposed method and system is its reconfigurability. As the client moves across different DIDO clusters as in FIG. 42, the user-cluster follows its moves. In other words, the subset of transmit antennas is constantly updated as the client changes its position and the effective channel matrix (and corresponding precoding weights) are recomputed.

The method proposed herein works within the super-cluster in FIG. 36, since the links between the BTSs via the BSN must be low-latency. To suppress interference in the overlapping regions of different super-clusters, it is possible to use our method in [5] that uses extra antennas to create points of zero RF energy in the interfering regions between DIDO clusters.

It should be noted that the terms "user" and "client" are used interchangeably herein.

REFERENCES

[1] S. Robinson, "Toward an Optimal Algorithm for Matrix Multiplication", SIAM News, Volume 38, Number 9, November 2005

[2] D. Coppersmith and S. Winograd, "Matrix Multiplication via Arithmetic Progression", J. Symb. Comp. vol. 9, p. 251-280, 1990

[3] H. Cohn, R. Kleinberg, B. Szegedy, C. Umans, "Group-theoretic Algorithms for Matrix Multiplication", p. 379-388, November 2005

[4] W. H. Press, S. A. Teukolsky, W. T. Vetterling, B. P. Flannery "NUMERICAL RECIPES IN C: THE ART OF SCIENTIFIC COMPUTING", Cambridge University Press, 1992

[5] A. Forenza and S. G. Perlman, "INTERFERENCE MANAGEMENT, HANDOFF, POWER CONTROL AND LINK ADAPTATION IN DISTRIBUTED-INPUT DISTRIBUTED-OUTPUT (DIDO) COMMUNICATION SYSTEMS", patent application Ser. No. 12/802,988, filed Jun. 16, 2010

[6] Per-Erik Eriksson and Bjorn Odenhammar, "VDSL2: Next important broadband technology", Ericsson Review No. 1, 2006

Embodiments of the invention may include various steps as set forth above. The steps may be embodied in machine-executable instructions which cause a general-purpose or special-purpose processor to perform certain steps. For example, the various components within the Base Stations/APs and Client Devices described above may be implemented as software executed on a general purpose or special purpose processor. To avoid obscuring the pertinent aspects of the invention, various well known personal computer components such as computer memory, hard drive, input devices, etc., have been left out of the figures.

Alternatively, in one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, certain modules such as the Coding, Modulation and Signal Processing Logic 903 described above may be implemented on a programmable digital signal processor ("DSP") (or group of DSPs) such as a DSP using a Texas Instruments' TMS320x architecture (e.g., a TMS320C6000, TMS320C5000, . . . etc). The DSP in this embodiment may be embedded within an add-on card to a personal computer such as, for example, a PCI card. Of course, a variety of different DSP architectures may be used while still complying with the underlying principles of the invention.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. Accordingly, the scope and spirit of the present invention should be judged in terms of the claims which follow.

Moreover, throughout the foregoing description, numerous publications were cited to provide a more thorough understanding of the present invention. All of these cited references are incorporated into the present application by reference.

The invention claimed is:

1. A method implemented within a multiuser (MU) multiple antenna system (MU-MAS) comprising:
measuring the quality of the wireless links between one or a plurality of users and a plurality distributed wireless transceiver stations within a coverage area;
using the link quality measurements to select one or a plurality of subsets of wireless transceiver stations for one or the plurality of users;
measuring channel state information (CSI) between one or the plurality of users and each respective subset of wireless transceiver stations and using the CSI for precoding data transmissions in a way that the link for one or the plurality of users is interference-free;
adjusting the selection of the wireless transceiver stations within one or the plurality of subsets as the users move within the coverage area and adaptively recomputing CSI and precoding data transmissions.

2. The method as in claim 1 wherein adjusting the selection comprises dynamically removing or adding wireless transceiver stations to the subsets of wireless transceiver stations.

3. The method as in claim 1 wherein adjusting the selection comprises dynamically assigning the subsets of wireless transceiver stations to the respective users based on Doppler velocity of the users.

4. The method as in claim 1 wherein precoding is implemented through a QR decomposition.

5. The method as in claim 1 wherein precoding is implemented through a singular value decomposition (SVD).

6. The method as in claim 1 wherein precoding is implemented through an inverse power method.

7. A multiuser (MU) multiple antenna system (MU-MAS) comprising:
a plurality of users;
a plurality of distributed wireless transceiver stations communicatively coupled with the plurality of users through a plurality of wireless links;
a plurality of processing units communicatively coupled with the wireless transceiver stations through a network;
wherein the processing units measure the quality of the wireless links between one or a plurality of users and a plurality distributed wireless transceiver stations within a coverage area;
use the link quality measurements to select one or a plurality of subsets of wireless transceiver stations for one or the plurality of users;
measure channel state information (CSI) between one or the plurality of users and each respective subset of wireless transceiver stations and use the CSI for precoding data transmissions in a way that the link for one or the plurality of users is interference-free;
adjust the selection of the wireless transceiver stations within one or the plurality of subsets as the users move within the coverage area and adaptively recompute CSI and precoding data transmissions.

8. The system as in claim 7 wherein adjusting the selection comprises dynamically removing or adding wireless transceiver stations to the subsets of wireless transceiver stations.

9. The system as in claim 7 wherein adjusting the selection comprises dynamically assigning the subsets of wireless transceiver stations to the respective users based on Doppler velocity of the users.

10. The system as in claim 7 wherein precoding is implemented through a QR decomposition.

11. The system as in claim 7 wherein precoding is implemented through a singular value decomposition (SVD).

12. The system as in claim 7 wherein precoding is implemented through an inverse power method.

13. A method implemented within a multiuser (MU) multiple antenna system (MU-MAS) comprising:
selecting one or a plurality of subsets of distributed wireless transceiver stations wherein the wireless transceiver stations from different subsets operate at different carrier frequencies;
assigning a plurality of users to each subset of wireless transceiver stations;
measuring channel state information (CSI) between one or the plurality of users and each respective subset of wireless transceiver stations;
and using the CSI for precoding data transmissions in a way that the link for one or the plurality of users is interference-free.

14. A multiuser (MU) multiple antenna system (MU-MAS) comprising:
a plurality of users;
a plurality of distributed wireless transceiver stations communicatively coupled with the plurality of users through a plurality of wireless links;
a plurality of processing units communicatively coupled with the wireless transceiver stations through a network;
wherein the processing units select one or a plurality of subsets of distributed wireless transceiver stations and the wireless transceiver stations from different subsets operate at different carrier frequencies; and
wherein the processing units assign a plurality of users to each subset of wireless transceiver stations;
measure channel state information (CSI) between one or the plurality of users and each respective subset of wireless transceiver stations;
and use the CSI for precoding data transmissions in a way that the link for one or the plurality of users is interference-free.

15. A multiuser (MU) multiple antenna system (MU-MAS) comprising:
a plurality of users;

a plurality of distributed wireless transceiver stations communicatively coupled with the plurality of users through a plurality of wireless links;
a plurality of processing units communicatively coupled with the wireless transceiver stations through a network;
wherein one or the plurality of processing units selects one or a plurality of subsets of wireless transceiver stations and computes a plurality of precoded waveforms sent between the processing units and the subsets of wireless transceiver stations via the network;
and wherein the precoded waveforms are sent over the wireless links to create a plurality of interference-free data links for the users.

* * * * *